(12) United States Patent
Noh et al.

(10) Patent No.: US 10,820,300 B2
(45) Date of Patent: Oct. 27, 2020

(54) METHOD AND APPARATUS FOR COEXISTANCE OF DEVICE-TO-DEVICE COMMUNICATIONS AND CELLULAR COMMUNICATIONS IN MOBILE COMMUNICATIONS SYSTEM

(71) Applicant: SAMSUNG ELECTRONICS CO., LTD., Suwon-si (KR)

(72) Inventors: Hoondong Noh, Suwon-si (KR); Yongjun Kwak, Yongin-si (KR); Donghan Kim, Osan-si (KR); Jinyoung Oh, Seoul (KR); Seunghoon Choi, Seongnam-si (KR); Jeongho Yeo, Hwaseong-si (KR); Youngbum Kim, Seoul (KR); Youngwoo Kwak, Suwon-si (KR); Younsun Kim, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 22 days.

(21) Appl. No.: 16/089,940

(22) PCT Filed: Apr. 3, 2017

(86) PCT No.: PCT/KR2017/003654
§ 371 (c)(1),
(2) Date: Sep. 28, 2018

(87) PCT Pub. No.: WO2017/171523
PCT Pub. Date: Oct. 5, 2017

(65) Prior Publication Data
US 2019/0090218 A1    Mar. 21, 2019

(30) Foreign Application Priority Data

Apr. 1, 2016   (KR) .................. 10-2016-0039964
Apr. 6, 2016   (KR) .................. 10-2016-0042513
(Continued)

(51) Int. Cl.
*H04W 72/04*    (2009.01)
*H04W 72/00*    (2009.01)
(Continued)

(52) U.S. Cl.
CPC ......... *H04W 72/005* (2013.01); *H04L 5/0032* (2013.01); *H04L 5/0053* (2013.01);
(Continued)

(58) Field of Classification Search
CPC ............... H04W 72/005; H04W 88/06; H04W 72/1289; H04W 72/14; H04W 72/1215;
(Continued)

(56) References Cited

U.S. PATENT DOCUMENTS 10,383,034 B2 *  8/2019  Agiwal .............. H04W 72/042
2015/0180623 A1  6/2015  Kim et al.
(Continued)

FOREIGN PATENT DOCUMENTS

WO   2012/135998 A1   10/2012
WO   2015/002466 A2   1/2015

OTHER PUBLICATIONS

LG Electronics, "Correction on cross-carrier Scheduling in LAA", R1-161295, 3GPP TSG-RAN WG1 Meeting #84, St Julian's, Malta, Feb. 15, 2016 thru Feb. 19, 2016. (13 pages total).
(Continued)

*Primary Examiner* — Jay P Patel
(74) *Attorney, Agent, or Firm* — Sughrue Mion, PLLC

(57) ABSTRACT

The present disclosure relates to a communication method and system for converging a 5th-Generation (5G) commu-
(Continued)

nication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present disclosure provides a method and an apparatus for coexistence of device-to-device communications and cellular communications in a mobile communications system.

20 Claims, 72 Drawing Sheets

(30) Foreign Application Priority Data

| May 12, 2016 | (KR) | 10-2016-0057915 |
| Nov. 2, 2016 | (KR) | 10-2016-0144884 |

(51) Int. Cl.

| H04L 27/26 | (2006.01) |
| H04W 72/12 | (2009.01) |
| H04L 27/00 | (2006.01) |
| H04L 5/00 | (2006.01) |
| H04W 88/06 | (2009.01) |
| H04W 72/14 | (2009.01) |
| H04B 7/00 | (2006.01) |

(52) U.S. Cl.
CPC ........ *H04L 5/0062* (2013.01); *H04L 27/0006* (2013.01); *H04L 27/26* (2013.01); *H04W 72/042* (2013.01); *H04W 72/048* (2013.01); *H04W 72/1215* (2013.01); *H04W 72/1289* (2013.01); *H04W 72/14* (2013.01); *H04W 88/06* (2013.01); *H04B 7/00* (2013.01); *H04L 5/0023* (2013.01); *H04L 27/2602* (2013.01); *H04W 72/1268* (2013.01); *H04W 72/1273* (2013.01)

(58) Field of Classification Search
CPC ............. H04W 72/048; H04W 72/042; H04W 72/1273; H04W 72/1268; H04L 5/0062; H04L 5/0053; H04L 27/0006; H04L 27/26; H04L 5/0032; H04L 5/0023; H04L 27/2602; H04B 7/00
See application file for complete search history.

(56) References Cited

U.S. PATENT DOCUMENTS

| 2015/0312901 A1* | 10/2015 | Yoshizawa | H04W 72/042 |
| | | | 370/329 |
| 2016/0007373 A1 | 1/2016 | Davydov et al. | |
| 2016/0219475 A1 | 7/2016 | Kim | |
| 2016/0226612 A1* | 8/2016 | Axmon | H04B 7/022 |
| 2016/0262144 A1* | 9/2016 | Kitazoe | H04W 72/048 |
| 2016/0269986 A1* | 9/2016 | Bergstrom | H04W 48/08 |
| 2017/0127461 A1* | 5/2017 | Tiwari | H04W 76/18 |
| 2017/0353915 A1* | 12/2017 | da Silva | H04W 48/18 |
| 2018/0041901 A1* | 2/2018 | Yilmaz | H04W 60/005 |
| 2018/0049104 A1* | 2/2018 | Van Phan | H04W 76/14 |
| 2018/0063825 A1* | 3/2018 | Van Phan | H04W 72/042 |
| 2018/0124708 A1* | 5/2018 | Davydov | H04W 52/143 |
| 2018/0152807 A1* | 5/2018 | Van Phan | H04W 76/14 |
| 2018/0343047 A1* | 11/2018 | He | H04B 7/0645 |
| 2018/0375707 A1* | 12/2018 | Bala | H04L 27/2627 |
| 2019/0029071 A1* | 1/2019 | Moon | H04L 5/005 |
| 2019/0082491 A1* | 3/2019 | Shelby | H04W 76/28 |
| 2019/0132790 A1* | 5/2019 | Lee | H04W 76/27 |

OTHER PUBLICATIONS

Qualcomm Incorporated, "Cross-carrier scheduling for UL", 3GPP TSG RAN WG1 #84, Feb. 15, 2016 thru Feb. 19, 2016, St. Julian's, Malta, R1-160891. (12 pages total).

Search Report dated Jul. 13, 2017 by the International Searching Authority in International Patent Application No. PCT/KR2017/003654. (PCT/ISA/210).

Written Opiniont dated Jul. 13, 2017 by the International Searching Authority in International Patent Application No. PCT/KR2017/003654. (PCT/ISA/237).

AT&T, "Proposed Objective and Requirements on Dynamic Co-Existence of LTE and Next Generation RAT", 3GPP TSG RAN Meeting #71, RP-160583, Goteborg, Sweden, Mar. 7, 2016-Mar. 10, 2016, XP051077265. (15 pages total).

Samsung, "Co-existence of LTE and NR", 3GPP TSG RAN WG1 #85, Nanjing, China, May 23, 2016-May 27, 2016, R1-164020, XP051096918. (4 pages total).

Search Report dated Feb. 15, 2019 by the European Patent Office in counterpart European Patent Application No. 17775947.9.

\* cited by examiner

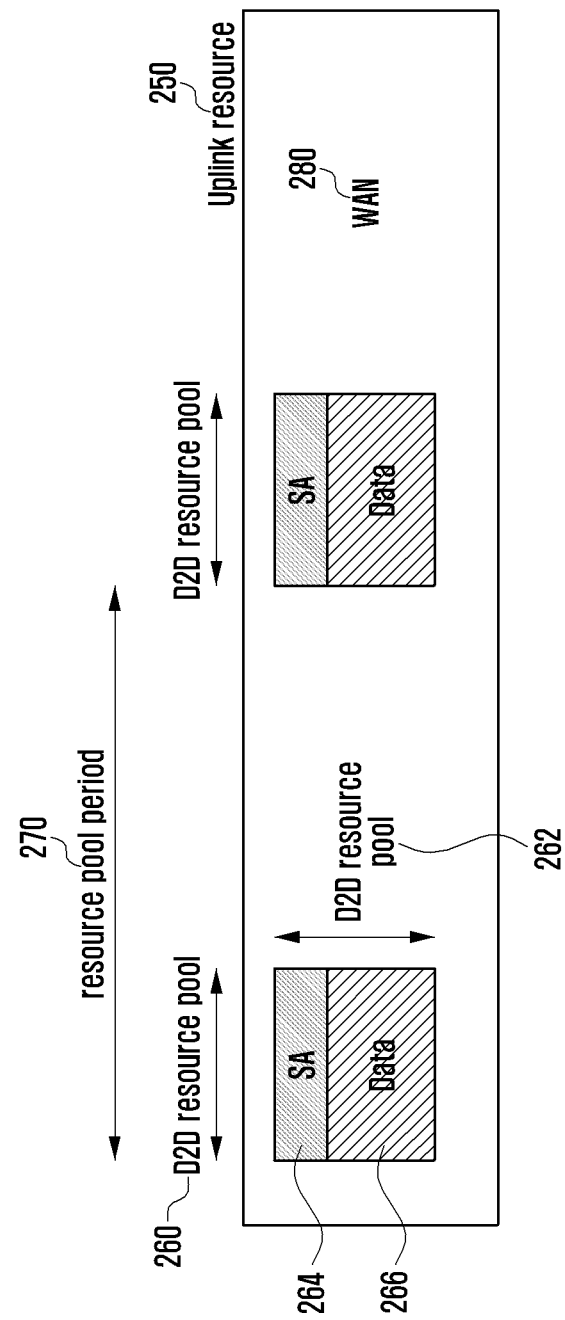

FIG. 15

Table 6.10.5.2-1: Mapping from CSI reference signal configuration to
($k'$, $l'$) for normal cyclic prefix

| | CSI reference signal configuration | Number of CSI reference signals configured | | | | | |
|---|---|---|---|---|---|---|---|
| | | 1 or 2 | | 4 | | 8 | |
| | | ($k'$, $l'$) | $n_s$ mod 2 | ($k'$, $l'$) | $n_s$ mod 2 | ($k'$, $l'$) | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

FIG. 30
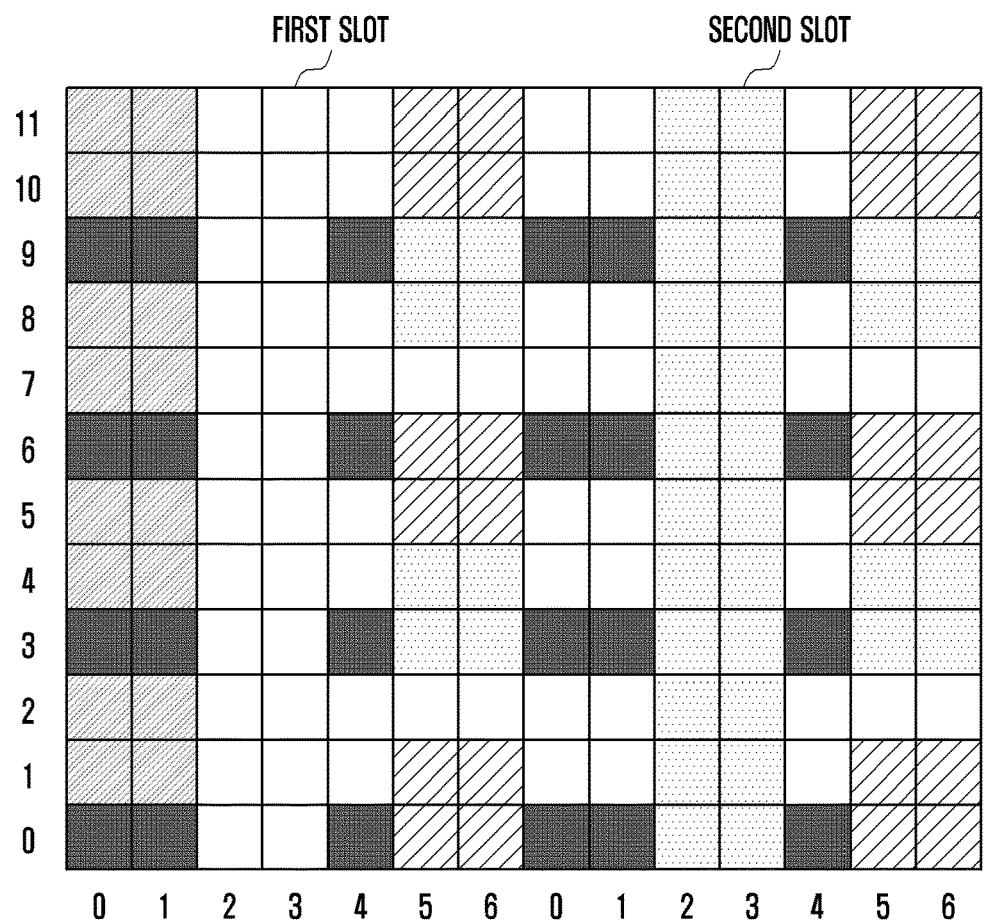
 CRS ~3000
 DMRS ~3010
 CSI-RS ~3020
 Control channel ~3030
 PDSCH ~3040

METHOD AND APPARATUS FOR COEXISTANCE OF DEVICE-TO-DEVICE COMMUNICATIONS AND CELLULAR COMMUNICATIONS IN MOBILE COMMUNICATIONS SYSTEM

TECHNICAL FIELD

The present invention relates to a method for facilitating coexistence of device-to-device (D2D) and cellular communications in a mobile communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Meanwhile, researches are conducted on coexistence of D2D and cellular communications in a mobile communication system.

DISCLOSURE OF INVENTION

Technical Problem

D2D is a technology that allows terminals to directly communicate each other without assistance of a base station. The D2D technology may be used for inter-vehicle safety services, e.g., vehicles may exchange their information through D2D communication for driving safety enhancement. By nature of the D2D communication in LTE where the terminals use uplink (UL) resources, i.e., UL frequency and UL time period, operation ambiguity problems arise when D2D transmission and cellular UL transmission and reception occur simultaneously. The present invention aims to proposes unambiguous operations of a terminal for D2D-based vehicle-to-everything (V2X) communication.

Meanwhile, discussions are also under way to introduce FD-MIMO with uniform planar array (UPA) antenna ports with the growing demand of vertical direction dynamic precoding. The present invention proposes a method for configuring a variable number of CSI-RS of {20, 24, 28, 32} by improving the current CSI-RS configuration limited in number to {(1 or 2), 4, 8, 12, and 16}. Also, the present invention proposes a CSI-RS CDM-4 or CDM-8 mapping method, CDM-2/CDM-4/CDM-8 switching CSI-RS mapping method, and CSI-RS port index mapping method to overcome problems occurring in association with multiple CSI-RSs.

Also, the present invention proposes a method for transmitting downlink (DL) and UL scheduling information efficiently in a situation where UL and UL scheduling information are configured to be transmitted through different cells in a mobile communication system operating in an unlicensed band or requiring a channel sensing or listen-to-talk operation.

In order to meet various user requirements and service qualities in a 5G wireless cellular communication system (5G communication system), it is important to design the system so as to support different transmission/reception schemes and services that may be newly introduced afterward in consideration of forward compatibility. Also, there is a need of a unified and efficient initial access scheme for terminals supporting different transmission/reception schemes and parameters on the basis of such 5G system design requirements. Also, it is necessary to design the initial access signal such that the forward compatibility is not broken down by uncertainty of initial access signal.

Also, the present invention provides a method for use of multimedia broadcast/multicast service single frequency network (MBSFN) subframes, UL subframes, licensed assisted access (LAA) operation in an unlicensed band, and cell activation in carrier aggregation (CA) for coexistence of LTE and 5G on at least one LTE carrier.

Solution to Problem

In accordance with an aspect of the present invention, a data transmission and reception method of a terminal in a wireless communication system including an unlicensed band includes receiving cross-carrier scheduling information from a base station, monitoring a physical downlink control channel (PDCCH) in a first cell based on the cross-carrier scheduling information, and transmitting uplink data to the base station in a second cell according to uplink scheduling information received based on the cross-carrier scheduling information.

In accordance with another aspect of the present invention, a data transmission and reception method of a base station in a wireless communication system including an unlicensed band includes transmitting cross-carrier scheduling information to a terminal, transmitting uplink scheduling information on a physical downlink control channel (PDCCH) in a first cell based on the cross-carrier scheduling information, and receiving uplink data from the terminal in a second cell according to the uplink scheduling information based on the cross-carrier scheduling information.

In accordance with another aspect of the present invention, a terminal for transmitting and receiving data in a wireless communication system including an unlicensed band includes a transmitter configured to transmit a signal to a base station, a receiver configured to receive a signal from the base station, and a controller configure to control to receive cross-carrier scheduling information from a base station, monitor a physical downlink control channel (PDCCH) in a first cell based on the cross-carrier scheduling information, and transmit uplink data to the base station in a second cell according to uplink scheduling information received based on the cross-carrier scheduling information.

In accordance with still another aspect of the present invention, a base station for transmitting and receiving data in a wireless communication system including an unlicensed band includes a transmitter configured to transmit a signal to a terminal, a receiver configured to receive a signal from the terminal, and a controller configured to control to transmit cross-carrier scheduling information to a terminal, transmit uplink scheduling information on a physical downlink control channel (PDCCH) in a first cell based on the cross-carrier scheduling information, and receive uplink data from the terminal in a second cell according to the uplink scheduling information based on the cross-carrier scheduling information.

Advantageous Effects of Invention

The present invention is advantageous in terms of securing unambiguous transmission and reception operations of a terminal supporting D2D-based V2X communication in a system where the legacy cellular and D2D communications coexist.

Also, the present invention is advantageous in terms of providing a method and apparatus for configuring reference signals and generating channel information in consideration of power boosting in a mobile communication system supporting a large number of array antennas.

Also, the present invention is advantageous in terms of transmitting scheduling information efficiently by configuring the cells for transmitting UL and DL scheduling information to a terminal differently and reconfiguring, when the cells for transmitting UL and DL scheduling information to a terminal differently, reconfiguring at least one of the cells through which the UL scheduling information and DL scheduling information are transmitted.

Also, the present invention is advantageous in terms of supporting services with different transmission and reception schemes and services and different transmission and reception parameters and guaranteeing efficient initial access of the terminal in a 5G system designed in consideration of forward compatibility.

Also, the present invention is advantageous in terms of providing a method for use of multimedia broadcast/multicast service single frequency network (MBSFN) subframes, UL subframes, licensed assisted access (LAA) operation in an unlicensed band, and cell activation in carrier aggregation (CA) for coexistence of LTE and 5G on one or multiple LTE carrier frequencies without addition of extra carrier for 5G. Also, the present invention is advantageous in terms of providing a data communication method and apparatus allowing a terminal capable of communicating with at least one of LTE and 5G communication systems to communicate with the respective communication systems. Other advantageous effects will be disclosed explicitly or implicitly in the detailed descriptions of the embodiments that follow.

BRIEF DESCRIPTION OF DRAWINGS

FIGS. 2A and 2B are diagrams illustrating resource configurations for V2X transmission;

FIG. 15 is a diagram illustrating a CSI-RS RE mapping table;

FIG. 30 is a diagram illustrating DL radio resources of a LTE system;

MODE FOR THE INVENTION

Figure 1:
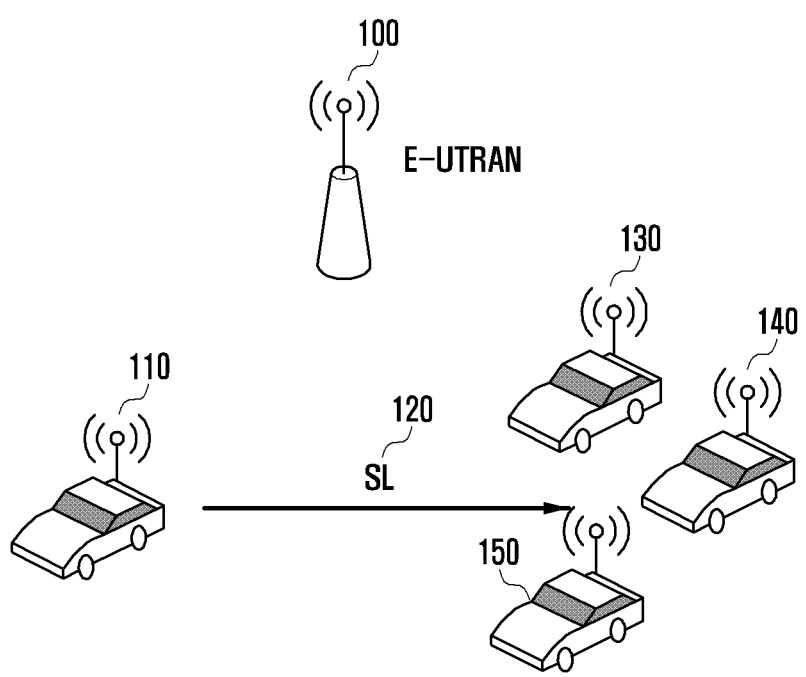
FIG. 1 is a diagram illustrating a basic operation of V2X.

Exemplary embodiments of the present invention are described with reference to the accompanying drawings in detail. Detailed description of well-known functions and structures incorporated herein may be omitted to avoid obscuring the subject matter of the present invention. Further, the following terms are defined in consideration of the functionality in the present invention, and may vary according to the intention of a user or an operator, usage, etc. Therefore, the definition should be made on the basis of the overall content of the present specification.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this invention will be thorough and complete and will fully convey the concept of the invention to those skilled in the art, and the present invention will only be defined by the appended claims Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions that are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means that implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or may be performed in reverse order according to their functions.

According to various embodiments of the present disclosure, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

Exemplary embodiments of the present invention are described with reference to the accompanying drawings in detail. Detailed description of well-known functions and structures incorporated herein may be omitted to avoid obscuring the subject matter of the present invention. Further, the following terms are defined in consideration of the functionality in the present invention, and may vary according to the intention of a user or an operator, usage, etc. Therefore, the definition should be made on the basis of the overall content of the present specification.

Although the description is directed to the OFDM-based radio communication system, particularly the 3GPP EUTRA, it will be understood by those skilled in the art that the present invention can be applied even to other communication systems having a similar technical background and channel format, with a slight modification, without departing from the spirit and scope of the present invention.

Embodiment 1

With the diversification of wireless mobile communication services, there is a growing demand for new technologies capable of supporting the newly emerging services more efficiently; thus, research and development are being conducted on new methods and technologies to meet the demand in a wireless mobile communication system.

D2D communication is a new technology that emerged as a solution for facilitating new communication services by enabling neighboring devices to communicate directly with each other. In the D2D communication mode, a terminal may perform a discovery operation for finding neighboring terminals and a direct communication operation, if necessary, for communication with one of the found terminals.

D2D direct communication is advantageous in terms of radio resource utilization efficiency because it requires a relatively small amount of resources in comparison with the base station-involved communication in the legacy radio network. Also, the D2D discovery operation that enables a terminal to find neighboring terminals makes it possible for the terminal to transmit necessary information to target terminals and thus facilitate implementation of advertisement services and social network services (SNS). It is also necessary for the D2D technology to be supported in LTE-Advanced (LTE-A), and it was discussed as part of the LTE-A.

Recently, the D2D-based V2X communication (or vehicle-2-vehicle (V2V) technology standardization work is underway to bring the LTE technology to vehicles. The V2X communication makes it possible for the neighboring vehicles to exchange information necessary for inter-vehicle safety service via a predetermined D2D technology. For example, LTE V2X technology-enabled vehicles may transmit their location information continuously such that each vehicle predicts sudden acceleration or collision risk of another vehicle based on the collected information and notify the driver of the prediction result. It may also be possible implement a V2X-based function for special vehicles such as ambulances to transmit predetermined information to the adjacent vehicles via the LTE V2X technology such that the adjacent vehicles yield to the special vehicles. Of course, other various useful functions can be implemented based on LTE V2X technology.

FIG. 1 is a diagram illustrating a concept of D2D-based V2X. Vehicles 110, 130, 140, and 150 are equipped with an LTE eNB 10 each, and vehicle 110 transmits arbitrary V2X information through a D2D channel. For signal transmission, a sidelink (SL) channel 120 is used, and this SL channel uses UL resources.

Figure 2A:
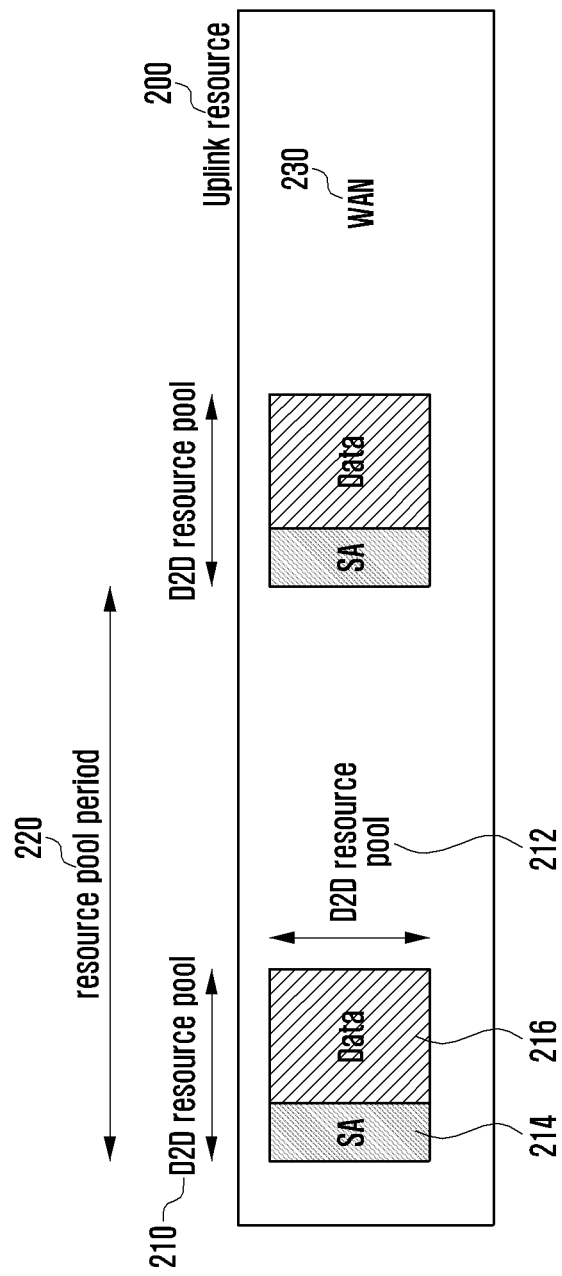

FIG. 2A is a diagram illustrating a method for configuring SL radio resources. In FIG. 2A, the SL radio resources are configured with UL resources in conformance with the legacy Rel-12 resource allocation scheme. The SL channels include physical SL control channel (PSCCH) and physical sidelink shared channel (PSSCH), and the PSCCH and PSSCH are assigned the resources 214 and 216, respectively. That is, the PSCCH and PSSCH are multiplexed in the time domain, and a terminal transmits control information on the PSCCH and data information on the PSCCH. The control information transmission on PSCCH may be interchangeably referred to as PSCCH transmission, and the data information transmission on PSCCH may be interchangeably referred to as PSSCH transmission.

The receive terminal may check whether there is data for which control information should be received on the PSCCH and, if a signal is received on the PSCCH performs decoding on PSSCH signal based on the information received on the PSCCH. The transmit terminal and receive terminal may share the PSCCH and PSSCH resources configurations as follows. By setting the PSCCH and PSSCH resources sizes in time and frequency domains as denoted by reference number 210 and a PSCCH transmission interval 220 in the time domain, the entire SL resources 212 including the PSCCH and PSSCH are configured. The SL resources configuration information is transmitted from the base station to the terminal which wants to transmit/receive SL information via a system information block (SIB), the SL resource configuration information being received by IDLE terminals as well as CONNECTED terminals. The UL resources 230 that are not configured as SL resources are used for uplink transmission/reception at their original purpose.

In the above-described SL resource allocation method, the PSCCH and PSSCH are multiplexed in the time domain. In the case where the PSCCH and PSSCH are multiplexed in the time domain, the V2X information is transmitted on the SL in such a way of transmitting the control information first and then the data information, which may cause extra delay. Since a long V2X information transmission delay is likely to cause a safety problem, there is a need of a method for minimizing the V2X information transmission delay. In order to use the V2X technology over D2D, it is necessary to introduce a method for multiplexing the PSCCH and PSSCH in the frequency domain as depicted in FIG. 2B.

FIG. 2B is a diagram illustrating another method for configuring SL radio resources. In FIG. 2B, the PSCCH and PSSCH are assigned the resources 264 and 226 respectively, i.e., the PSCCH and PSSCH are multiplexed in the frequency domain. In the case where the PSCCH and PSSCH are multiplexed in the frequency domain, the terminal can transmit control information and data information simultaneously on the frequency multiplexed PSCCH and PSSCH. In this case, the receive terminal checks the control information first on the PSCCH and then receive the data information on the PSSCH based on the control information. The transmit terminal and receive terminal may share the PSCCH and PSSCH resources configurations as follows. By setting the PSCCH and PSSCH resources sizes in time and frequency domains as denoted by reference number 260 and a PSCCH transmission interval 270 in the time domain, the entire SL resources 262 are configured. The UL resources 280 that are not configured as SL resources are used for uplink transmission/reception at their original purpose.

Embodiment 1-1

As described above, an in-vehicle terminal transmits data for V2X suing the SL resources as part of the UL resources. The coexistence of the SL and UL resources may cause some problems.

One of the problems is the in-band emission power problem. If an arbitrary channel is transmitted on arbitrary frequency resources, a certain noise signal, although weak, is transmitted on a frequency different from the frequency resources in the same subframe, which is called in-band emission power. Although such a problem can be overcome through power control for the situation where only UL transmission exists, if UL and SL transmissions of multiple terminals are multiplexed on the UL resources, this is likely to cause in-band transmit power problems.

Figure 3:
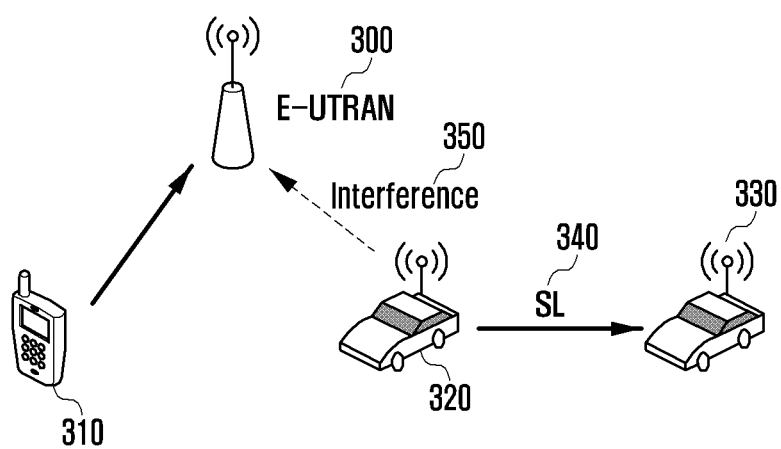
FIG. 3 is a diagram illustrating an issue of coexistence of sidelink and uplink channels between terminals.

FIG. 3 is a diagram for explaining in-band emission problems. There are a terminal 310, and an in-vehicle terminals 320 and 330 within the signal range of the base station 300, and the UE 310 is transmitting UL information to the base station. It is assumed that the in-vehicle terminal 320 is transmitting V2X information to the in-vehicle terminal 330 on the SL 340 in the same subframe. It is also assumed that the terminal 300 is located from a certain distance from the base station 300 while the in-vehicle terminal is located very close to the base station 300. If the in-vehicle terminal 320 transmits V2X information at a high transmit power, the reception value 350 of the in-band emission power is not negligible at the base station 300 in comparison with the receive power value of the UL information transmitted by the terminal 310. In this case, the base station 300 may have a problem in receiving the UL information. Since the SL resources are allocated in the UL resources and it may be possible to allocate part of the entire frequency resources as the SL resources and then the remaining frequency resources as UL resources, it may frequently occur that the SL and UL resources are used at the same time, resulting in reception performance degradation of the base station.

In order to solve the in-band emission problem, this embodiment proposes two methods.

The first method is to control the transmit power for transmitting V2X SL information. In the first method, the transmit power of the SL channel for V2X transmission is determined based on the distance from the base station. That is, the transmit power for V2X information transmission is set to low for the in-vehicle terminal located close to the base station and high for the in-vehicle terminal located far from the base station. the PSSCH and PSCCH transmit powers may be determined by Equation 1.

$$P_{PSSCH} = \{P_{CMAX,PSSCH}, 10 \log_{10}(M_{PSSCH}) + P_{O\_PSSCH,1} + \alpha_{PSSCH,1} \cdot PL\} \; \{dBm\}$$

$$P_{PSCCH} = \{P_{CMAX,PSCCH}, 10 \log_{10}(M_{PSCCH}) + P_{O\_PSCCH,1} + \alpha_{PSCCH,1} \cdot PL\} \; \{dBm\} \quad \text{[Equation 1]}$$

As shown in Equation 1, the transmit power is determined based on the value of PL, i.e., information on the signal attenuation between the base station and the terminal.

In the case of using this power control method, the in-vehicle terminal located close to the base station is always limited in transmit power and thus its signal propagation distance is decreased. In this respect, the second method is characterized by determining a resource pool based on the signal power of the base station in addition to controlling the transmit power.

Figure 4:
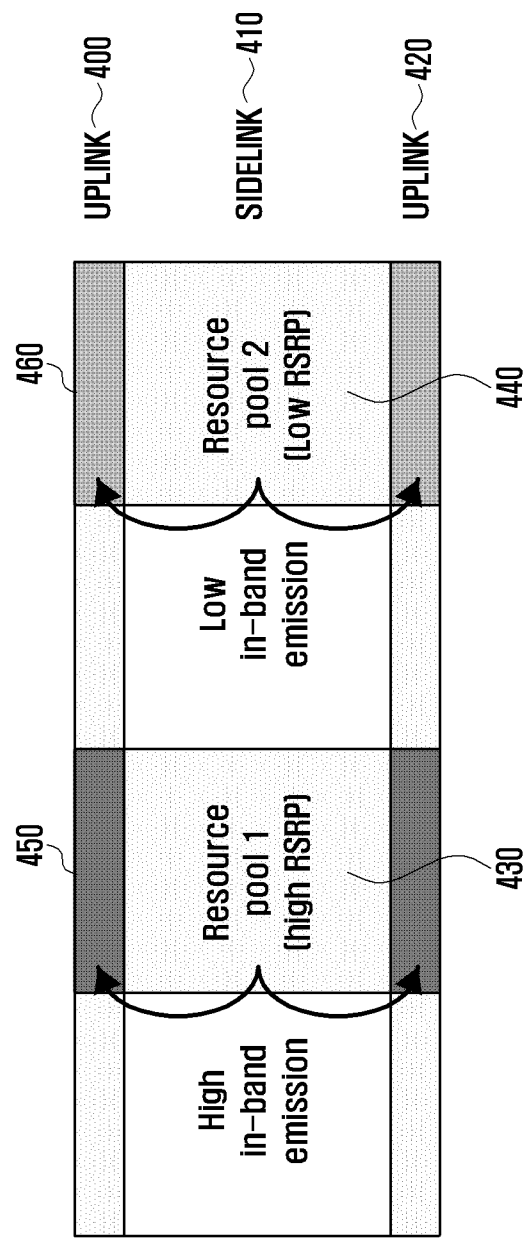
FIG. 4 is a diagram illustrating an RSRP-based solution according to embodiment 1-1.

FIG. 4 is a diagram for explaining a method for configuring SL resources for V2X transmission. In reference to FIG. 4, it may be possible to configure multiple SL resources pools for V2X transmission in order for an in-vehicle terminal which wants to transmit V2X information to select an SL resource pool to use for signal transmission based on the reference signal received power (RSRP) of the base station. The RSRP range per resource pool may be designated via higher layer signaling, e.g., SIB and RRC signaling. The in-vehicle terminal which wants to transmit V2X information measures the RSRP, selects a resource pool having the RSRP range in which the measured RSRP is included, and transmits the V2X information on the selected resources.

As shown in FIG. 4, it is possible to configure two SR resource pools such that the in-vehicle terminals with a high RSRP select the resource pool 430 and the in-vehicle terminals with a low RSRP select the resource pool 440. If the RSRP measured by the terminal is high, the terminal is likely to be located close to the base station and thus cause in-band emission problem; if the RSRP measured by the terminal is low, the terminal is likely to be located far from the base station and thus can neglect the in-band emission problem. Accordingly, since the base station is likely to determine that UL reception performance for the UL signal transmitted in the subframe carrying the V2X information transmitted by an in-vehicle terminal with a high RSRP and that the UL reception performance for the UL signal transmitted in the subframe carrying the v2 information transmitted by an in-vehicle terminal with a low RSRP is not so bad, it may be possible to use this information for UL channel scheduling. For example, the base station may allocate UL resources preferentially in the subframe 460 and avoid allocating UL resources as far as possible in the subframe 450.

Embodiment 1-2

The second problem caused by the coexistence of the SL and UL resources is in-device transmission collision. The in-vehicle terminal which is performing V2X transmission may also perform UL transmission and DL reception on the same carrier frequency or in the same subframe. Although a V2X-enabled in-vehicle terminal has V2X information to transmit in SL and information to transmit in UL, the in-vehicle terminal cannot perform the UL and SL transmissions simultaneously. Accordingly, the in-vehicle terminal has to perform one of the SL transmission or UL transmission at one time. Although the V2X-enabled in-vehicle terminal has V2X information to receive in SL and information to transmit in UL, the in-vehicle terminal cannot perform the SL reception and UL transmission simultaneously and thus has to perform one of the SL reception and UL transmission selectively. In the case where the V2X-enabled in-vehicle terminal has V2X information to receive in SL and information to receive in DL, the in-vehicle terminal may not perform the SL and DL receptions simultaneously depending on its reception capability and, in this case, it has to perform one of the SL and UL receptions at one time.

Figure 5:
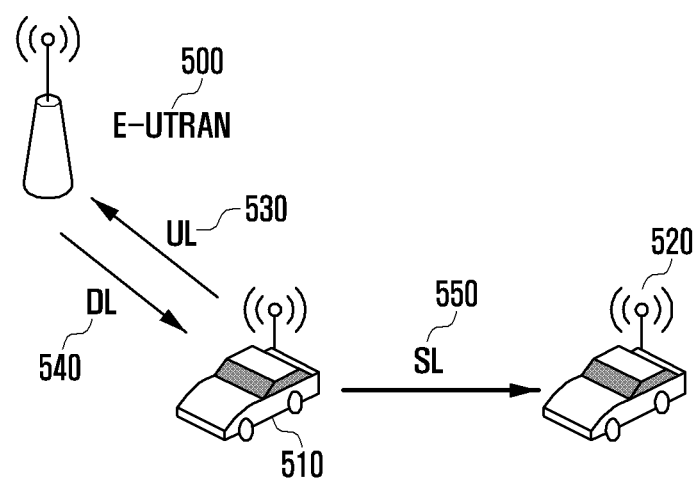
FIG. 5 is a diagram illustrating a situation of coexistence of sidelink and uplink channels between terminals.

FIG. 5 is a diagram illustrating the aforementioned SL and UL/DL transmission collision problems. There are in-vehicle terminals 510 and 520 within the signal range of the base station 500, and the in-vehicle terminal 510 is transmitting UL information or receiving DL information to or from the base station 500. It is assumed that the in-vehicle terminal 510 is exchanging V2X information with the in-vehicle terminal 520 through the SL 550 in the same subframe. In this case, it is necessary to define how to select one of transmission and reception operations and give up the other as described above. Hereinafter, a description is made of the operation of selecting one of channel transmission and reception operations when transmission collision occurs there between.

First, a description is made of the collision between a UL transmission and an SL transmission. It may be possible to define the operation of assigning a priority to the UL transmission and giving up the SL transmission to perform the UL transmission preferentially in the standard because the information transmitted in UL is likely to be more important than that transmitted in SL.

However, if the UL transmission is always prioritized over the SL transmission, this may bring about a safety problem, because the V2X information being transmitted in SL is associated with the driving safety of vehicles. Accordingly, it may be considered to assign priorities as follows.

The first method is to prioritize the operations according to the type of message. V2X transmission information is defined in various manners and, as an example, V2X messages may be categorized into cooperative awareness message as a periodic message and decentralized environmental notification message as an event-triggered message. The CAM message is transmitted periodically and thus, although transmitted at one occasion, it can be transmitted at the next occasion; although the CAM message transmission with a low priority collides with the UL transmission, this may not cause significant problem. However, the DENM message as an event-triggered message is delay-sensitive and conveys information that is closely related to the driving safety of vehicles and thus, if it is assigned a low priority to give up its transmission chance in a situation of collision with a UL transmission, the expected effect of the V2X technology is likely to be reduced. Accordingly, in this embodiment, the UL transmission is prioritized over the SL transmission conveying the CAM message to perform the UL transmission preferentially when they collide with each other, and an SL transmission conveying the DENM message is prioritized over the UL transmission to perform the SL transmission preferentially when they collide with each other.

The second method is to prioritize the SL transmission conveying V2X information over the UL transmission. Since the CAM message is also related to driving safety of vehicles even though it is less important, the SL transmission conveying the V2X message can be prioritized over the UL transmission. This method may be implemented in such a way of prioritizing the UL transmission over the SL transmission to perform the UL transmission preferentially when they collide to each other for the case where the terminal is configured to determine whether the SL is configured for the legacy D2D transmission or a new V2X transmission and perform the legacy D2D operation in the initial configuration, and prioritizing the SL transmission over the UL transmission to perform the SL transmission preferentially for the case where the UE is configured to perform the new V2X transmission operation.

The third method is to designate the channel to be prioritized, when the SL and UL transmission collide, per resource pool in configuring SL resource pools and transmits, at the base station, the configuration via higher layer signaling. The resource pool information may be configured via SIB or RRC signaling with the least information indicating one of the SL and UL transmissions to be performed preferentially when they collide each other.

The fourth method is to prioritize, when transmissions collide, the transmissions based on the priorities assigned to the D2D resource pools. The resource pools are given priorities from 1 to 8 such that the terminal which knows the priority of the information to be transmitted selects the resource pool corresponding to the priority for transmitting the information. In this case, the SL transmission is prioritized over the UL transmission, when they collide each other, on the basis of the priorities of the corresponding resource pools. For example, if the SL and UL transmission collide each other, the UL transmission is prioritized over the SL transmission in the resource pools with the priorities 1 to 4, and the SL transmission is prioritized over the UL transmission in the resource pools with the priorities 5 to 8.

Finally, in the case where a signal sensing-based SL transmission operation is configured, it may be possible to prioritize the S transmission over the UL transmission. In the legacy D2D, PSCCH and PSSCH resource allocation may be performed in two modes: mode 1 in which the base station allocates resources for PSCCH and PSSCH transmissions on the PDCCH directly and mode 2 in which the terminal selects the resources for PSCCH and PSSCH transmissions in the PSCCH/PSSCH resource pools preconfigured by the base station or system.

In mode 2, if the SL resources for transmitting PSCCH and PSSCH are selected in the preconfigured resource pool, it may occur that multiple terminals select the same resources, which results in significant V2X message reception performance degradation. Mode 2 may be further elaborated for V2X operation to select the SL resources for PSCCH and PSSCH transmission based on signal sensing. That is, before transmitting PSCCH, the terminal may determine whether a PSCCH in use by another terminal exists in the PSCCH resources of the first PSCCH transmission period and transmit the PSCCH in the PSCCH resources not in use by another terminal in the next PSCCH transmission period.

The PSCCH signal sensing may be performed in such a way that the terminal decodes all possible PSCCHs to determine that another terminal is transmitting the PSCCH signal in the resource where the decoding is successful or a way that the terminal performs energy sensing to determine that another terminal is transmitting the PSCCH in the resource where the energy level is higher than a predetermined value. It may also be possible to use the signal sensing technique for determining the PSSCH resource and, in the method for determining presence/absence of PSCCH through PSCCH decoding, the terminal is capable of checking the PSCCH resource in use by another terminal because the PSCCH information includes the PSSCH resource information. In the method of determining the presence/absence of PSCCH through PSCCH energy sensing, however, the terminal can ascertain no PSCCH information and thus check the PSCCH resource in use by another terminal through reception energy sensing in the PSSCH resource pool.

Here, the resource location is logically fixed according to the interval of the PSCCH and PSSCH resources. That is, if the terminal has transmitted PSCCH at a resource location in a PSCCH resource pool, it has to transmit the PSCCH at the same resource location in the next PSCCH resource pool. This is inevitably for the terminal which senses the signal to check the resources for transmission in the next PSCCH resource pool. This is also the case for PSSCH operation; thus, if the terminal has transmitted PSSCH at a resource location in a PSSCH resource pool, it has to transmit the PSSCH at the same resource location in the next PSSCH resource pool.

The signal sensing-based mode 2 resource allocation method has been described above. In this case, the resource allocation is performed based on the signal signaling for PSCCH or PSSCH in the whole resource pool. Accordingly, if it occurs that a terminal performs UL transmission in the subframe scheduled for PSCCH transmission because of the UL transmission with a priority higher than that the PSCCH transmission occurs, the terminal attempting to newly transmit the PSCCH carrying the V2X information the PSCCH resource not in use by the other terminal through signal sensing and select the PSCCH resource mapped to the PSCCH resources in the next resource pool to transmit the PSCCH. In this case, it may occur that multiple terminals transmit PSCCH simultaneously, which causes a collision problem. As an alternative prioritization method, it may be considered to prioritize the SL transmission as a sensing target, in the case of using the signal sensing scheme for SL transmission of mode 2, over the UL transmission. As described above, the signal sensing may be performed only on the PSCCH or both the PSCCH and PSSCH, and it may be possible to prioritize the PSCCH transmission over the UL transmission and the UL transmission over the PSSCH transmission for the former case and to prioritize both the PSSCH and PSCCH transmission over the UL transmission.

For the case where the signal sensing-based SL transmission operation is configured, it may be necessary to overcome the collision problem occurring when multiple terminals transmit PSCCH (or another V2X channel, which is the case in the following description) as follows. If it occurs that a terminal performs UL transmission in the subframe scheduled for PSCCH transmission because of the UL transmission with a priority higher than that the PSCCH transmission occurs, the terminal determines whether the resources the resources are occupied by another terminal rather than transmitting PSCCH on the previously-occupied resources and then perform PSCCH transmission again. That is, the terminal checks the PSCCH resources that are not occupied by another terminal with a resource detection method such as reception energy detection, selects the best resources, and transmits the PSCCH for next V2V transmission in the newly selected resources.

The resources in use for the PSCCH transmission may be the resources at the same logical location mapped to the resource used at the previous occasion in which UL transmission is performed because the priority of the PSCCH transmission is lower than that of the UL transmission or new resources different from the previously used resources. The latter case may be the case where it is determined that another terminal occupies the previously used resources through a new resource detection, and the former case may be the case where the previously used resource is not occupied by another terminal.

In summary, if a V2X-enable terminal prioritizes the UL transmission over the V2X channel transmission such as PSCCH transmission to perform UL transmission, it performs a resource reallocation operation through signal detection for V2X channel transmission such as PSCCH transmission afterward to select resources newly for transmitting V2X channel such as PSCCH afterward. The resources selected newly through the resource reallocation may be identical with or different from the previously used resources.

This resource reallocation triggered by preferential UL transmission may be performed in such a way of prioritizing the UL transmission over the SL transmission unconditionally or prioritizing the UL transmission over the SL transmission in part of the resources and the SL transmission over the UL transmission in the remaining part of the resources. Assuming that SL channel is prioritized over the UL channel in part (time period 1) of the entire V2X resources and the UL channel is prioritized over the SL channel in the remaining part (time period 2), if the UL transmission is performed even though a terminal needs to perform V2X transmission over SL in the time period 2 because the UL transmission has a priority higher than that of the SL transmission, the terminal perform a resource reallocation procedure to select the resources for the next V2X transmission. The time period 1 or the time period 2 may be configured by the base station, which transmits the corresponding configuration information to the terminal via RRC signaling, SIB signaling, MAC signaling, or L1 signaling.

Next, a description is made of the collision problem between a UL transmission and a SL transmission. The terminal prioritizes the UL transmission over the SL reception when it as the data to transmit in UL because it is difficult to determine which information is received in SL.

Finally, a description is made of the collision problem between a DL reception and a DL reception. If the receiver of the terminal is configured such that it is difficult to receive two channels simultaneously, the terminal has to select one of the channels to receive. If the terminal has data to receive, the terminal has to prioritize the DL reception over the SL reception.

Figure 6:
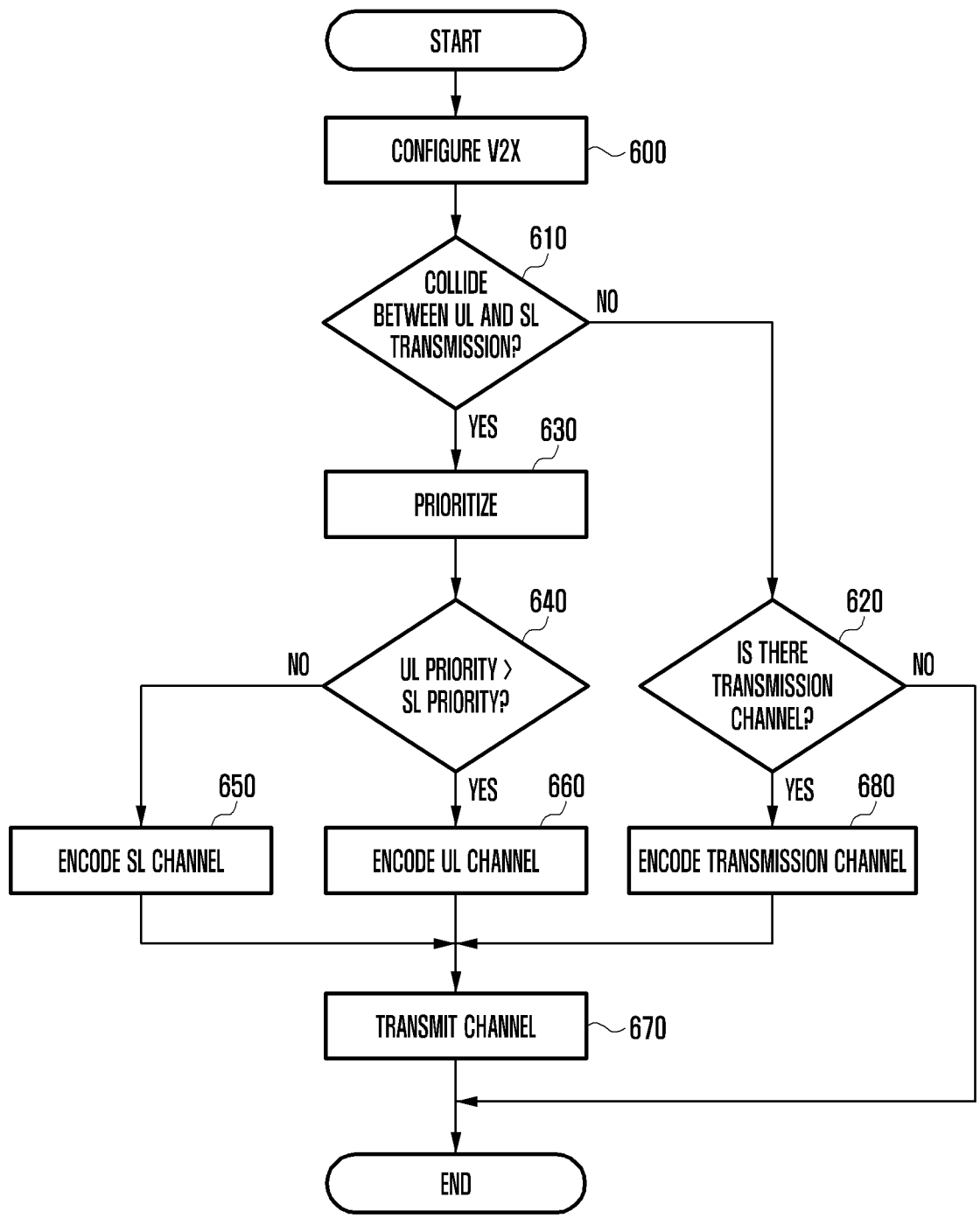
FIG. 6 is a flowchart illustrating an operation prioritization method of a terminal.

FIG. 6 is a flowchart illustrating an operation prioritization method of a terminal according to an embodiment of the present invention.

In reference to FIG. 6, an in-vehicle terminal performs V2X configuration, i.e., resource pool, transmit power, and message information configuration, at step 600. Next, the terminal determines at step 610 whether there is collision between UL and SL transmissions in the current subframe and, if it is determine that there is no collision between UL and SL transmissions, determines at step 620 whether there is a channel to transmit; if there is a channel to transmit, the terminal encodes the transmission channel at step 680, transmits the encoded channel at step 670, and ends the procedure. Otherwise, if there is no channel to transmit, the terminal ends the procedure.

If it is determined at step 610 that there is collision between UL and SL transmission, the terminal prioritizes, at step 630, the SL and UL channels according to the above-described prioritization method. If it is determined that the UL channel is prioritized over the SL channel, the terminal performs channel coding on the UL transmission at step 660, transmits the coded channel at step 670, and ends the procedure. Otherwise, if it is determined that the SL channel is prioritized over the UL channel, the terminal performs channel coding on the SL channel at step 650, transmits the coded channel at step 670, and ends the procedure.

At step 630, the prioritization of the UL and SL channel transmissions may be performed with one of the following rules.
1. Prioritize channels by message type
2. Prioritize SL channel for V2X message over UL channel unconditionally
3. Prioritize channels by resource pool
4. Prioritize channels by mapping to priorities designated to resource pools
5. Prioritize SL channel for signal sensing operation over UL channel Embodiment 1-3

Finally, a problem occurring by coexistence of LS and UL resources is power assignment problem caused in-device transmission collision. An in-vehicle terminal is capable of performing UL transmission on a carrier frequency during a V2X transmission, i.e., the terminal is capable of perform SL transmission on carrier frequency 1 and the UL transmission on carrier frequency 2 which differs from carrier frequency 1 in the same subframe. In the case of performing the UL and SL transmission on different carrier frequencies, the terminal has to perform power control based on the priorities of the transmissions. That is, the terminal may assign power to the channel with the high priority preferentially and then the remaining power to the channel with the low priority.

Figure 7:
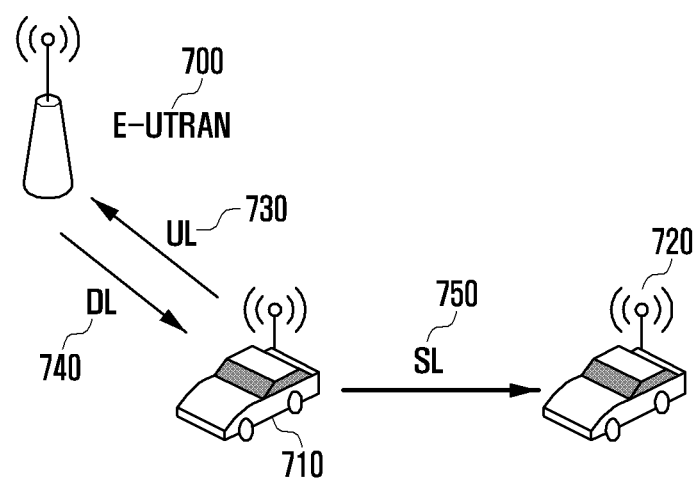
FIG. 7 is a diagram illustrating a situation of coexistence of sidelink and uplink channels on different carrier frequencies.

FIG. 7 is a diagram illustrating the aforementioned SL, UL, and/or DS transmission collision problems. There are in-vehicle terminals 710 and 720 within the signal range of the base station 700, and the in-vehicle terminal 710 is transmitting UL information to the base station 500 on the frequency carrier 1. The in-vehicle terminal 710 may also transmit or receive V2X information to the in-vehicle terminal 720 through the SL 750 on the carrier frequency 2 in the same subframe. As described above, the terminal may allocate power to one of the transmissions occurring simultaneously preferentially and then the remaining power to the other.

Figure 8:
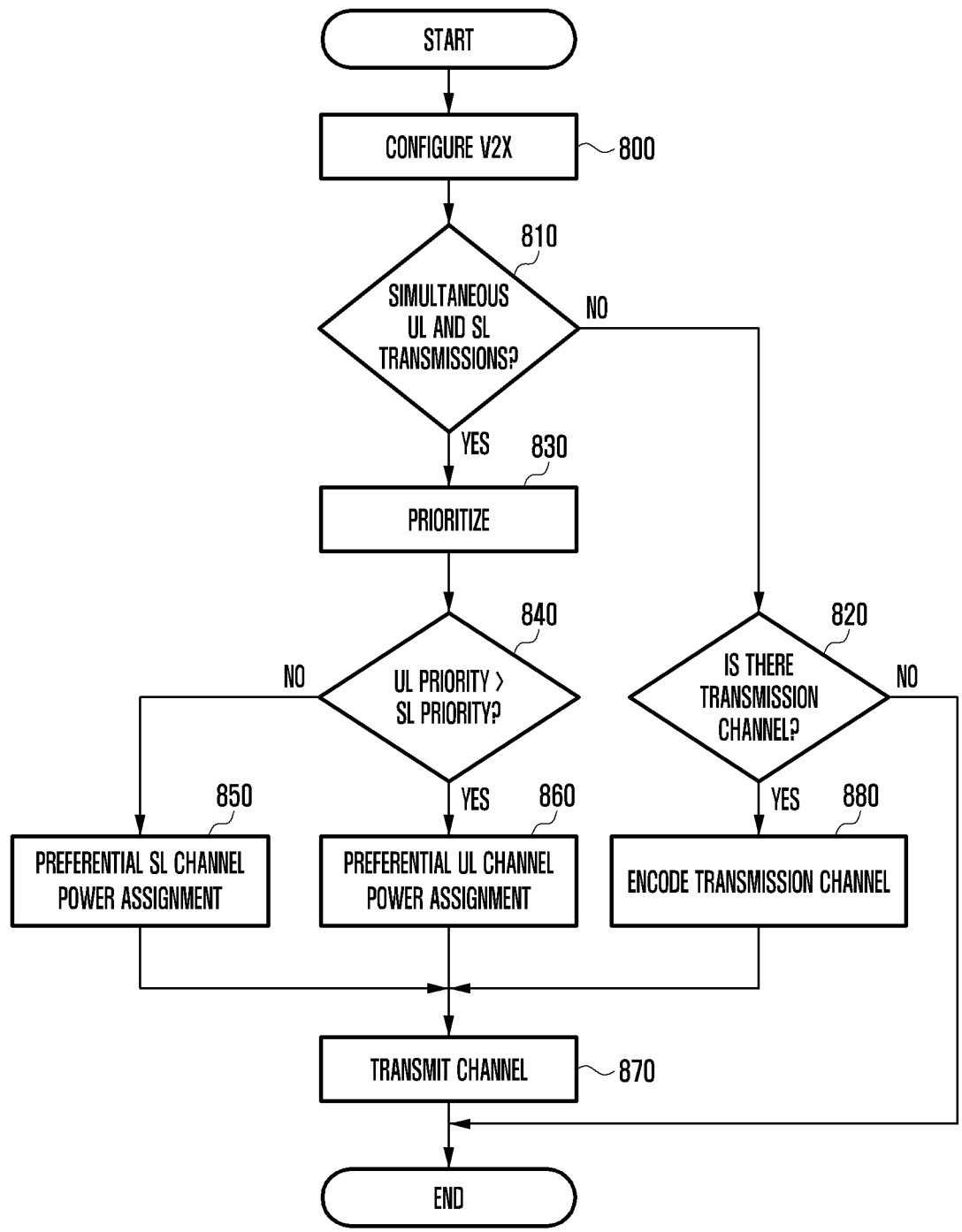
FIG. 8 is a flowchart illustrating a power assignment operation of a terminal.

FIG. 8 is a flowchart illustrating a power assignment method of a terminal according to an embodiment of the present invention.

An in-vehicle terminal performs V2X configuration, i.e., resource pool, transmit power, and message information configuration, at step 800. Next, the terminal determines at step 810 whether there is collision between UL and SL transmissions in the current subframe and, if it is determine that there is no collision between UL and SL transmissions, determines at step 820 whether there is a channel to transmit; if there is a channel to transmit, the terminal performs encoding on the transmission channel at step 880, transmits the encoded channel at step 870, and ends the procedure. Otherwise, if it is determined that there is no channel to transmit, the terminal ends the procedure.

If it is determined at step 810 that there is collision between UL and SL transmission, the terminal prioritizes, at step 830, the SL and UL channels according to the above-described prioritization method. If it is determined that the UL channel is prioritized over the SL channel, the terminal assigns, at step 860, a transmit power for the UL transmission preferentially and then performs transmit power assignment to the SL channel with the remaining power. Next, the terminal transmits the coded channel at step 870 and ends the procedure.

If it is determined that the SL channel is prioritized over the UL channel, the terminal assigns, at step 850, a transmit power to For the SL transmission and then performs transmit power assignment to the UL with the remaining power. Next, the terminal transmits the coded channel at step 870 and ends the procedure.

At step 830, the prioritization of the UL and SL channel transmissions may be performed with one of the following rules.
1. Prioritize channels by message type
2. Prioritize SL channel for V2X message over UL channel unconditionally
3. Prioritize channels by resource pool
4. Prioritize channels by mapping to priorities designated to resource pools
5. Prioritize SL channel for signal sensing operation over UL channel FIG. 9 is a block diagram illustrating a configuration of a base station according to an embodiment of the present invention.

Figure 9:
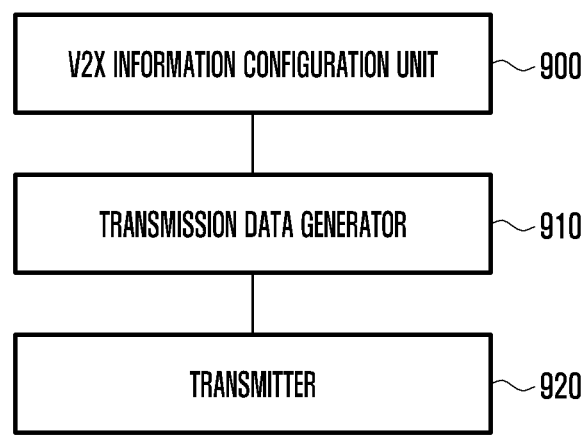
FIG. 9 is a block diagram illustrating a configuration of a base station according to embodiment 1.

In reference to FIG. 9, the base station transmits to a terminal V2X transmission configuration information via a system information block (SIB) or RRC signaling. The base station may include a V2X information configuration unit 900, a transmission data generator 910, and a transmitter 920. The V2X information configuration unit 900 configures V2X information, the transmission data generator 910 generates transmission data including the V2X information, and the transmitter 920 transmits the transmission data including the V2X information. Although not shown in the drawing, the V2X information configuration unit and the transmission data generator may be included in a controller, which is capable of performing the functions of the V2X information configuration unit and transmission data generator and controlling the transmitter.

Figure 10:
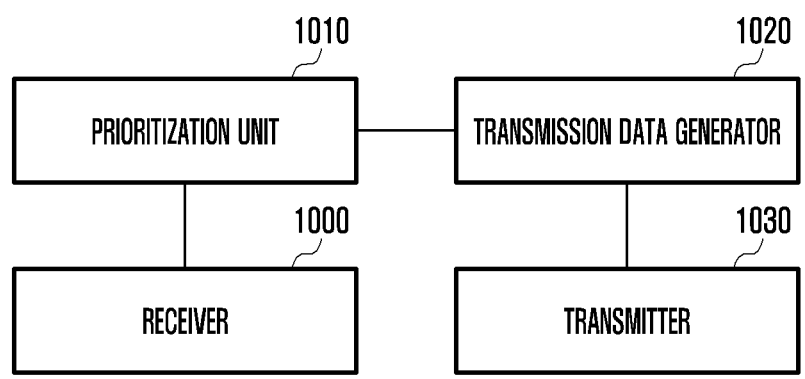
FIG. 10 is a block diagram illustrating a configuration of a terminal according to embodiment 1.

FIG. 10 is a block diagram illustrating a configuration of a terminal according to an embodiment of the present invention. In reference to FIG. 10, the terminal may include a receiver 1000, a prioritization unit 1010, a transmission data generator 1020, and a transmitter 1030. The receiver 1000 receives V2X configuration information from a base station, the prioritization unit 1010 prioritizes UL and SL channels according to the above-described methods, the transmission data generator 1020 generates a data channel to transmit in consideration of the determined priorities, and the transmitter 1030 transmits the generated data channel. Although not shown in drawing, the prioritization unit and the transmission data generator may be included in a controller, which is capable of performing the functions of the prioritization unit and the transmission data generator and controlling the receiver and the transmitter.

Embodiment 2

The present invention relates to a typical wireless mobile communication system and, in particular, to a reference signal configuration and transmission method of a base station with a plurality of active array antennas and a reference signal configuration information and reference signal reception method of a terminal in the wireless mobile communication system employing a multicarrier multiple access scheme such as orthogonal frequency division multiple access (OFDMA).

Exemplary embodiments of the present invention are described in detail with reference to the accompanying drawings. The same reference numbers are used throughout the drawings to refer to the same or like parts; detailed descriptions of well-known functions and structures incorporated herein may be omitted to avoid obscuring the subject matter of the present invention. Further, the following terms are defined in consideration of the functionality in the present invention, and they may vary according to the intention of a user or an operator, usage, etc. Therefore, the definition should be made on the basis of the overall content of the present specification.

Various changes may be made to the invention, and the invention may have various forms, such that exemplary embodiments will be illustrated in the drawings and described in detail. However, such an embodiment is not intended to limit the invention to the disclosed exemplary embodiment and it should be understood that the embodiment include all changes, equivalents, and substitutes within the spirit and scope of the invention.

As used herein, the singular forms "a,", "an", and "the" are intended to include the plural forms as well, unless the context clearly indicates otherwise. For example, the expression "a component surface" is intended to include one or more component surfaces.

As used herein, ordinal terms such as "first", "second", etc. are used to describe various components; however, it is obvious that the components should not be defined by these terms. The terms are used only for distinguishing one component from another component. For example, a first component may be referred to as a second component and, likewise, a second component may also be referred to as a first component, without departing from the teaching of the inventive concept. Also, the expression "and/or" is taken as specific disclosure of each and any combination of enumerated things.

The terminology used herein is for the purpose of describing particular embodiments only and is not intended to be limiting of the invention. As used herein, singular forms are intended to include the plural forms as well, unless the context clearly indicates otherwise. It will be understood that the terms "comprises" and/or "has" when used in this specification, specify the presence of a stated feature, number, step, operation, component, element, or a combination thereof; but they do not preclude the presence or addition of one or more other features, numbers, steps, operations, components, elements, or combinations thereof.

According to an embodiment of the present invention, a main entity which is responsible for resource allocation to terminals may a Node B, an evolved Node B (eNB), a base station (BS), a radio access unit, a base station controller, or any network node. Meanwhile, an entity being served by the main entity may be a user equipment (UE), a mobile station (MS), a cellular phone, a smartphone, a computer, a communication function-enable multimedia system, an communication function-enabled small-size sensor, or an IoT device.

In the present invention, the term 'Downlink (DL)' denotes a radio transmission path from an eNB to a UE, and the term 'Uplink (UL)' denotes a radio transmission path from the UE to the eNB. Although the following description is directed to LTE and LTE-A, it will be understood by those skilled in the art that the present invention can be applied to other communication systems having similar technical background and channel format, with a slight modification, without departing from the spirit and scope of the present invention.

Although all embodiments of the present invention are not exclusive from each other and can be combined together, the individual embodiments and examples are described in distinctive manner for convenience of explanation.

Embodiment 2-1

The mobile communication system has evolved to a high-speed, high-quality wireless packet data communication system capable of providing data and multimedia services beyond the early voice-oriented services. The standardization organizations such as the $3^{rd}$ Generation Partnership Project (3GPP), the $3^{rd}$ Generation Partnership Project-2 (3GPP2), and the Institute of Electrical and Electronics Engineers (IEEE) have standardized $4^{th}$ Generation mobile communication systems based on multicarrier multiple-access scheme. Recently, various multicarrier-based mobile communication standards such as 3GPP Long Term Evolution (LTE), LTE-advanced (LTE-A), LTE-A Pro, and IEEE 802.16m have been developed to meet the requirements of the high-speed, high-quality wireless packet data communication services.

The existing 4G advanced mobile communication systems such as LTE-A, LTE-A Pro, and 802.16m operate based on multicarrier multiple access schemes and employ various techniques such as MIMO, beamforming, Adaptive Modulation and Coding (AMC), and Channel-Sensitive Scheduling to improve the transmission efficiency. The above techniques are capable of improving transmission efficiency and system throughput in such a way of adjusting data rate by concentrating transmission power to certain antennas according to the channel quality and transmitting data selectively to the user with a high channel quality.

Since most of aforementioned techniques operate based on channel status information between a base station (BS) (hereinafter, interchangeably referred to as evolved Node B (eNB) and a terminal (hereinafter, interchangeably referred to as User Equipment (UE) or Mobile Station (MS)), it is necessary for the eNB or the UE to measure the channel state therebetween using a reference signal such as Channel State Indication Reference Signal (CSI-RS). The eNB denotes an entity located at a certain place for downlink transmission and uplink reception, and one eNB may support a plurality of cells for transmission/reception. A mobile communication system includes a plurality of eNBs that are geometrically distributed geometrically, and each eNB transmits/receives signals through a plurality of cells.

Existing 3G and 4G mobile communication systems represented by LTE/LTE-A adopt MIMO technique which uses a plurality transmission/receive antennas to increase data rate and system throughput. The MIMO technique makes it possible to transmit spatially-separated multiple information streams. This technique of transmitting multiple spatially-separated information streams is referred to as spatial multiplexing. Typically, the number of information streams to be spatially multiplexed is determined depending on the numbers of antennas of the transmitter and receiver. The number of information streams that can be spatially multiplexed is referred to as rank of the corresponding transmission. The LTE Release 12 supports 2×2, 4×4, and 8×8 MIMO spatial multiplexing and up to rank 8.

Figure 11:
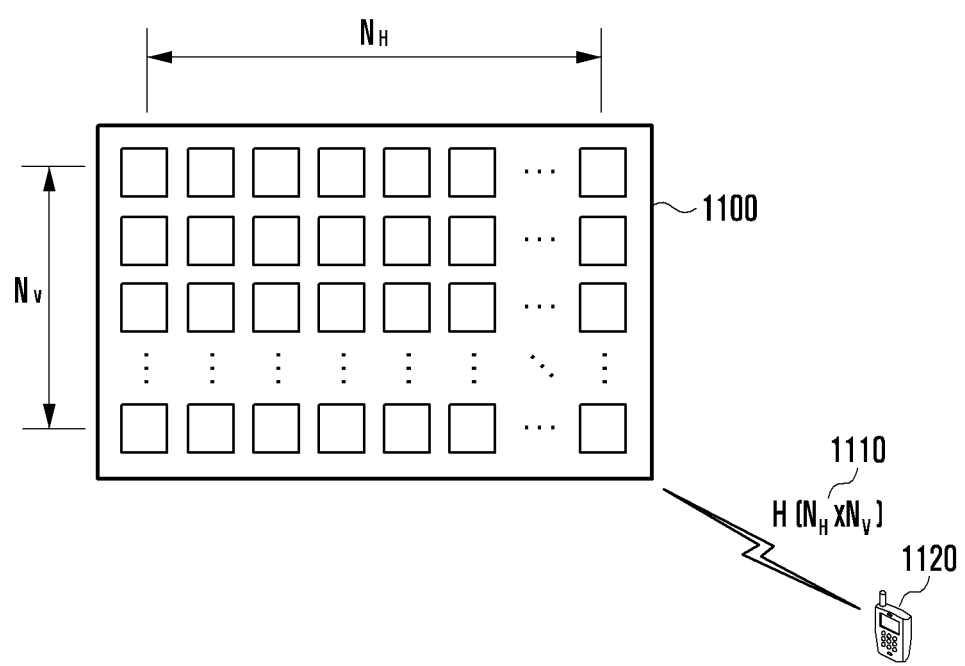
FIG. 11 is a diagram illustrating a massive MIMO or FD-MIMO system.

Meanwhile, a massive MIMO or full-dimension MIMO (FD-MIMO) system to which the proposed method of the present invention is applied is composed of 2-dimensionally arranged 8 or more antenna. FIG. 11 is a diagram illustrating a massive MIMO or FD-MIMO system. In FIG. 11, a transmitter of the eNB transmits radio signals using a few dozen or more transmit antennas. The transmit antennas are arranges to maintain a predetermined distance among each other. The minimum distance may, by way of example, be half the wavelength of the radio signal. In the case where the transmit antennas are arranged in the distance of half the wavelength of the radio signal, the signals transmitted by the respective transmit antennas are influenced by radio channels with low correlation. As the inter-antenna distance increases, the correlation decreases.

In order to prevent the size of the transmitter from increasing excessively, the large number of antennas of the transmitter of the eNB may be arranged 2-dimensionally. In this case, the eNB transmits a signal with the antennas $N_H$ in horizontal axis and $N_V$ in vertical axis, and the UE 1120 measures the channel 1110 of the corresponding antennas.

In FIG. 11, a few dozen or more transmit antennas of the eNB transmitter may be used to transmit signals to one or more UEs. In order to transmit signals to a plurality of UEs simultaneously, it may be possible to perform precoding on the signals. In this case, a UE may receive one or more information streams. Typically, the number of information streams that one UE can receive is determined according to the number of receive antennas of the UE and the channel condition.

In order to implement the massive MIMO effectively, it is necessary for the UE to measure the channel condition and interferences accurately based on multiple reference signals and transmit the channel status information generated based on the measurement result to the eNB efficiently. The eNB determines the UE to which it transmit signals and data rate and precoding to be applied for transmission based on the received channel status information. In the case of applying the channel status information transmission/reception method of the legacy LTE system to the FD-MIMO system, the increased control information amount for the large number of transmit antennas causes a UL overhead problem.

The mobile communication systems are characterized by constraints on time, frequency, and power. This means that the more the resources are allocated for reference signals, the less the resources are allocated for data traffic channel, resulting in reduction of absolute data transmission amount. In this case, it may be possible to expect the enhancement of channel measurement and channel estimation performance, but the decreased data transmission amount results in the reduction of the total system throughput.

There is therefore a need of a method for allocating resources for reference signals and data traffic channels appropriately so as to optimize the total system throughput.

Figure 12:
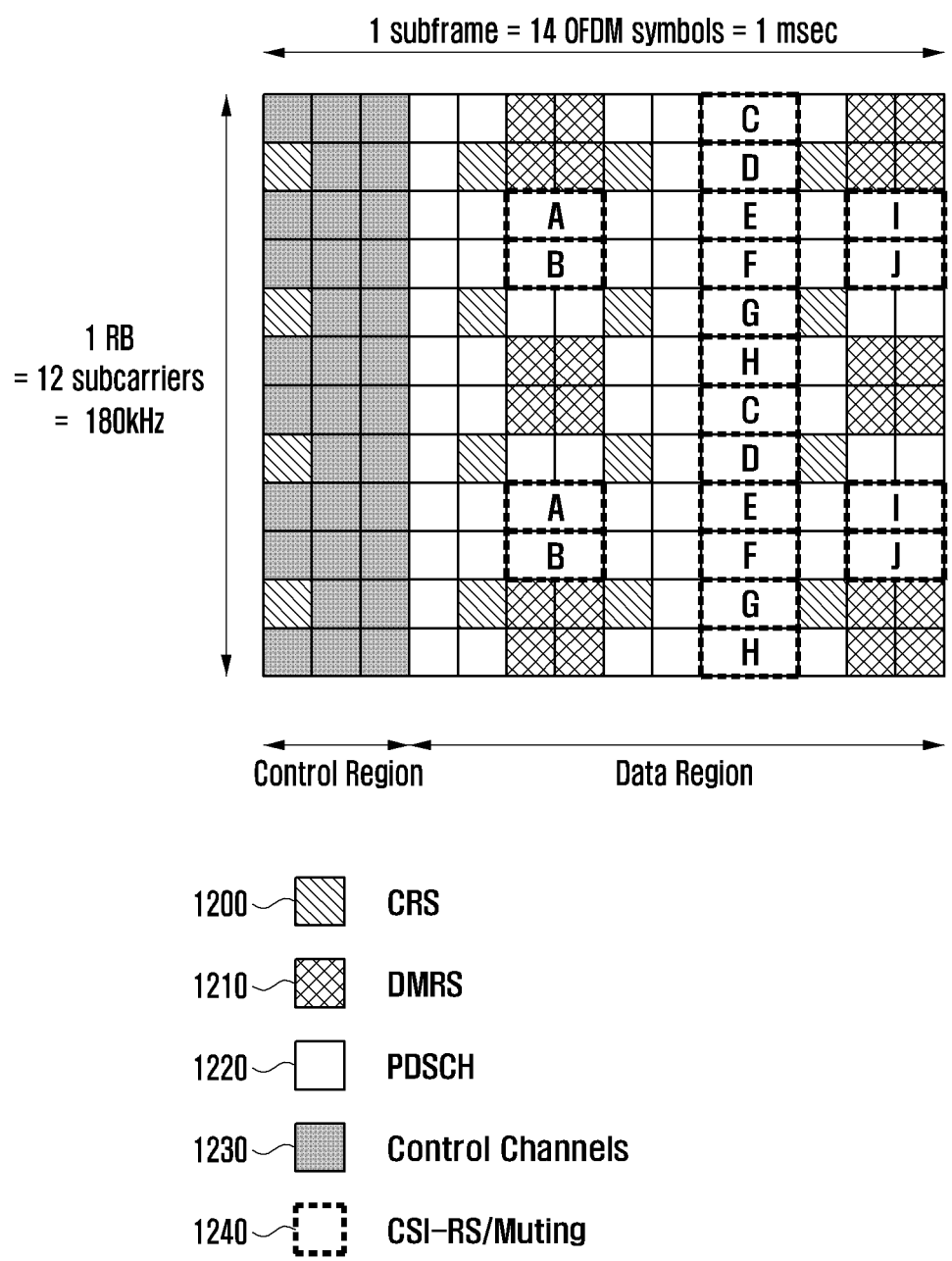
FIG. 12 is a diagram illustrating radio resources corresponding to 1 subframe and 1 RB for use in a LTE or LTE system.

FIG. 12 is a diagram illustrating radio resources corresponding to 1 subframe and 1 resource block (RB) as the smallest unit for DL scheduling in an LTE system. The radio resources depicted in FIG. 12 is composed of one subframe in the time domain and one RB in the frequency domain. The radio resources consist of 12 subcarriers in the frequency domain and 14 OFDM symbols in the time domain, i.e. 168 unique frequency-time positions. In LTE, each frequency-time position is referred to as Resource Element (RE).

The radio resource structured as shown in FIG. 12 may be configured to transmit different types of signals as follows:

1. Cell-specific Reference Signal (CRS 1200): This is a reference signal broadcast periodically for use commonly by all UEs within one cell.

2. Demodulation Reference Signal (DMRS 1210): This is a reference signal transmitted for specific UE and used only for transmitting data to corresponding UE. It may be possible to support up to 8 DMRS ports. In LTE/LTE-A, antenna ports 7 to 14 are allocated for DMRS and these ports maintain orthogonality with Code Division Multiplexing (CDM) or Frequency Division Multiplexing (FDM) to avoid interference to each other.

3. Physical Downlink Shared Channel (PDSCH 1220): This is a downlink channel for use in transmitting traffic (or data) from an eNB to a UE. The eNB may transmit data using REs to which no reference signal is mapped in the data region (or PDSCH region) in FIG. 12.

4. Channel Status Information Reference signal (CSI-RS 1240): This is a reference signal transmitted for use by UEs within a cell in channel status measurement. There may be multiple CSI-RSs transmitted within a cell. In the LTE system, the CSI-RS may be mapped to one, two, four, or eight antenna ports. Particularly in the LTE-A Pro system, one CSI-RS may correspond to one, two, four, eight, twelve, or sixteen antenna ports; the number of antenna ports to which the CSI-RS corresponds may increase, by way of example, to thirty.

5. Other control channels (Physical Hybrid-ARQ Indicator Channel (PHICH), Physical Control Format Indicator Channel (PCFICH), and Physical Downlink Control Channel (PDCCH) 1230): An eNB may provide a UE with control information for use in receiving data on PDSCH or transmit HARQ ACK/NACK corresponding to uplink data transmission.

In addition to the aforementioned signals, muting may be configured in order for the UEs within the corresponding cell to receive the CSI-RSs transmitted by other eNBs in the LTE-A and LTE-A Pro systems. The muting may be configured at the positions designated for CSI-RS and, typically, the UE may skip attempt of receiving traffic signals at the muted CSI-RS positions. In the LTE-A and LTE-A Pro system, the muting is referred to as zero power CSI-RS. This is because the muting by nature is mapped to the CSI-RS positions without assignment of transmit power.

In FIG. 12, the CSI-RS can be transmitted at some of the positions marked by A, B, C, D, E, F, G, H, I, and J according to the number of number of antennas transmitting CSI-RS. Also, the zero power CSI-RS (muting) can be mapped to some of the positions A, B, C, D, E, F, G, H, I, and J. The CSI-RS can be mapped to 2, 4, or 8 REs according to the number of the antenna ports for transmission. For two antenna ports, half of a specific pattern is used for CSI-RS transmission; for four antenna ports, whole of the specific pattern is used for CSI-RS transmission; and for eight antenna ports, two patterns are used for CSI-RS transmission. Meanwhile, the zero power CSI-RS (muting) is always transmitted in unit of pattern. That is, although the muting is applied to plural patterns, if the muting positions mismatch CSI-RS positions, it cannot be applied to one pattern partially. However, if the CSI-RS positions are identical with the zero power CSI-RS (muting) positions, the muting can be applied to part of a pattern.

As described above, it is possible to map two, four, or eight antenna ports to one CSI-RS resource in LTE and LTE-A while it is possible to map two, four, or eight, twelve, or sixteen antenna ports to one CSI-RS resource. Also, LTE-A and LTE-A Pro supports two orthogonal codes of length 2 and length 4 for mapping the CSI-RS to REs. It may be possible to apply the orthogonal code of length 2 for 2-port, 4-port, and 8-port CSI-RS, and orthogonal code of length 2 or length 4 for 12-port and 16-port CSI-RS.

In the case of transmitting the CSI-RSs of two antenna ports, the CSI-RSs are mapped to two REs consecutive in the time domain and distinguished by orthogonal codes. This means that the two CSI-RS ports are code-division-multiplexed (CDM-2) in a 2-port CSI-RS pattern of two consecutive REs. In the case of transmitting the CSI-RSs of four antenna ports, two extra CSI-RSs for the two extra antenna ports are mapped to two other REs. In detail, the 4-port CSI-RS pattern is formed by aggregating two 2-port CSI-RS patterns with a spacing of 6 subcarriers. In this case, the RE pairs multiplexed in CDM-2 are located in the same OFDM symbol and as frequency-division-multiplexed (FDMed). In the case of transmitting the CSI-RSs of eight antenna ports, the 8-port CSI-RS pattern is formed by aggregating two neighboring 4-port CSI-RS patterns. In the case of the 8-port CSI-RS pattern, the RE pairs multiplexed in CDM-2 are located in the same OFDM symbols as FDMed.

In the cases of transmitting the CSI-RSs of twelve or sixteen antenna ports, the 12-port or 14-port CSI-RS pattern is formed by aggregating 4-port and 8-port CSI-RS patterns. In detail, the 12-port CSI-RS pattern is formed by aggregating three 4-port CSI-RS patterns, and the 16-port CSI-RS pattern is formed by aggregating two 8-port CSI-RS patterns and, if CDM-2 is applied, CDMed in the same manner as done in the 4-port and 8-port CSI-RS cases. In the case of applying CDM-4 to the 12-port and 16-port CSI-RS patterns, it is necessary to define a new orthogonal code mapping rule. For this purpose, in the case of the 12-port CSI-RS pattern, the REs of the 4-port CSI-RS pattern are grouped into a group to which orthogonal codes of length 4 are applied; in the case of the 16-port CSI-RS pattern, 4 consecutive REs in the 8-port CSI-RS pattern are grouped into a group to which orthogonal codes of length 4 are applied.

The eNB may boost the transmit power of the CSI-RS to improve channel estimation accuracy. In the case of transmitting four or eight antenna port CSI-RSs, a predetermined antenna port CSI-RS is transmitted at predetermined CSI-RS REs and does not transmitted on a different subcarrier in the same OFDM symbol.

Figure 13:
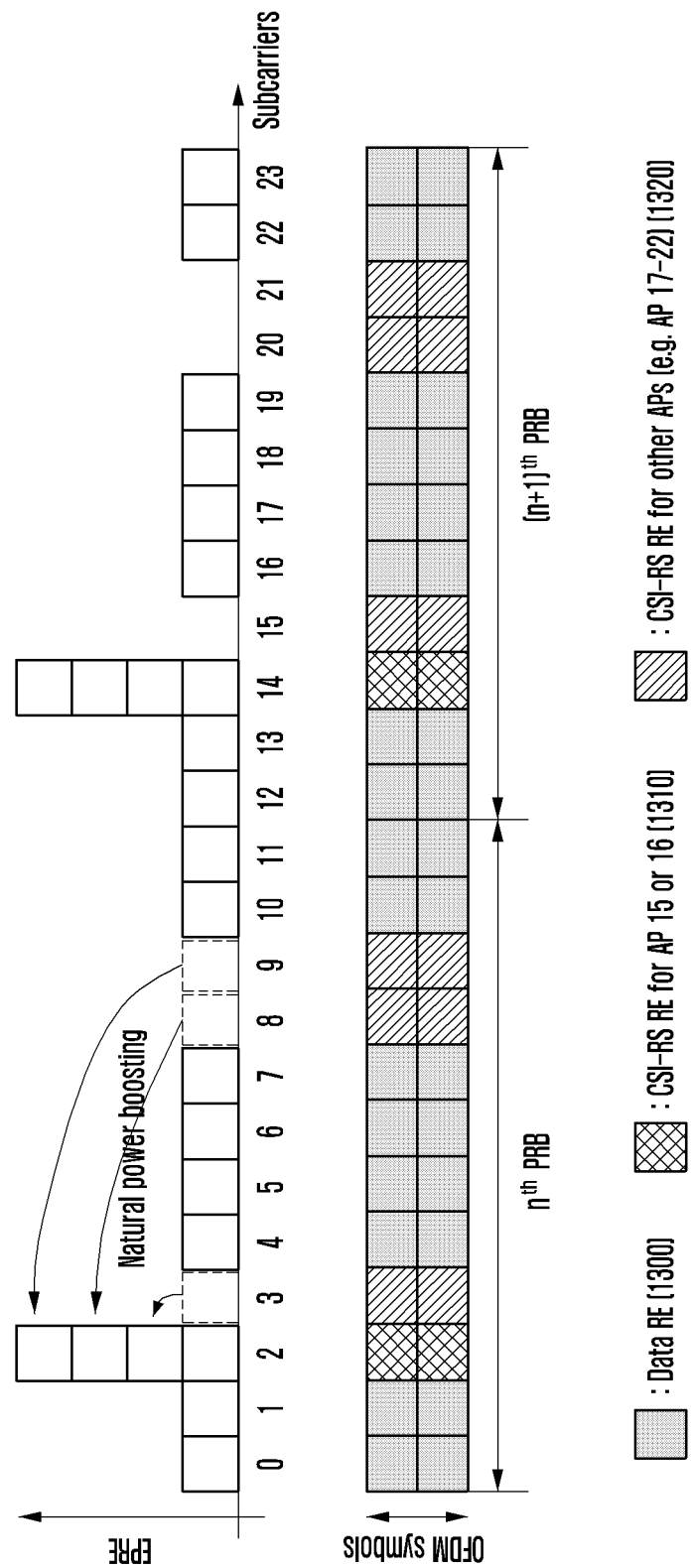
FIG. 13 is a diagram exemplifying CSI-RS RE mapping in the $n^{th}$ and $(n+1)^{th}$ PRB for the case where the eNB transmits 8 CSI-RSs.

FIG. 13 is a diagram exemplifying CSI-RS RE mapping in the $n^{th}$ and $(n+1)^{th}$ PRB for the case where the eNB transmits 8 CSI-RSs. As shown in FIG. 13, in the case where the CSI-RS RE for AP 15 or 16 is located as denoted by reference number 1310 of FIG. 2C, the transmit power for the CSI-RS transmission for AP 16 or 17 is not used at the CSI-RS RE 1320 for the remaining APs 17 to 22. Accordingly, as shown in FIG. 13, the AP 15 or 16 may use the transmit power for the $3^{rd}$, $8^{th}$, and $9^{th}$ subcarriers on the $2^{nd}$ subcarrier. Such a natural power boosting makes it possible to increase the transmit power for the CSI-RS port 15 being transmitted on subcarrier 2 up to 6 dB in comparison with that at the data RE. As described above, in LTE-A and LTE-A Pro, it is possible to accomplish the natural power boost of up to 6 dB in the 2-port, 4-port, and 8-port CSI-RS patterns based on the CDM-2 and transmit the CSI-RSs corresponding to the individual APs with full power utilization. In LTE-A Pro, similarly, it is possible to use the full power utilization through the natural power boosting of up to 6 dB based on CDM-4 in the 12-port and 16-port CSI-RS patterns.

The UE may be also be allocated CSI-IM (interference measurement resources (IMR)) along with CSI-RS; the CSI-IM resources are identical with the CSI-RS resources in resource structure and location. The CSI-IM is the resources for the UE which is receiving data from one or more eNBs to measure interferences from neighboring eNBs accurately. If it is necessary to measure interference amounts for the cases where the neighboring eNBs transmit data and no data respectively, the eNB may configure a CSI-RS and two CSI-IM resources such that the neighboring eNBs transmit signals on one CSI-IM resource and no signal on the other CSI-IM resource, thereby measuring the interference amount of the neighboring eNBs effectively.

In the LTE-A and LTE-A Pro system, the eNB notifies the UE of the CSI-RS resource configuration via higher layer signaling. The CSI-RS resource configuration information includes CSI-RS configuration information index, number of CSI-RS ports, CSI-RS transmission interval, transmission offset, CSI-RS configuration information, CSI-RS scrambling ID, and QCL information. The UE may determine the REs to which the CSI-RSs are mapped based on the CSI-RS configuration information and number of CSI-RS ports In the LTE-A and LTE-A Pro systems, the eNB transmits reference signals to the UE for DL channel state measurement, and the terminal measure the channel state between the eNB and the terminal based on the CRS or CSI-RS transmitted by the eNB. The channel state is measured in consideration of a few factors which, in this embodiment, includes interference amount in DL. The interference amount in DL includes interference signals caused by the antennas of the neighboring eNBs and thermal noise and is used as important information for determining DL channel condition. For example, if an eNB with one transmit antenna transmits a signal to a terminal with one receive antenna, the UE has to check energy per symbol (Es) for DL reception and interference amount ($I_o$) being simultaneously received during the period of receiving the corresponding symbol based on the reference signal transmitted by the eNB to calculate Es/Io. The calculated Es/Io is converted to a data rate or an equivalent value and transmitted in the form of a channel quality indicator (CQI) for use by the eNB in determining a data rate for DL transmission to the UE.

In the LTE-A and LTE-A Pro system, the UE transmits feedback information of the DL channel state for use by the eNB in DL scheduling. That is the UE measures the reference signal transmitted by the eNB in DL and transmits feedback information generated based on the measurement result to the eNB in the format defined in the LTE standard. In LTE, the UE feedback information includes three indicators as follows:

Rank Indicator (RI): number of spatial layers UE can receive in current channel state Precoder Matrix Indicator (PMI): indicator indicating precoding matrix preferred by UE in current channel state Channel Quality Indicator (CQI): indicator indicating maximum data rate for UE to receive signal in current channel state, CQI may be replaced by signal-to-interference plus noise ratio (SINR), maximum error correction code rate and modulation scheme, or data throughput per frequency that can be used similarly instead of the maximum data rate.

The RI, PMI, and CQI are associated among each other in meaning. For example, the precoding matrix supported in LTE/LTE-A is configured differently per rank. Accordingly, the PMI value is interpreted differently depending on whether the RI is set to 1 or 2. In addition, when determining CQI, the UE assumes that the PMI and RI which the UE has reported are applied by the eNB. For example, if the UE reports RI_X, PMI_Y, and CQI_Z, this means that the UE is capable of receiving the signal at the data rate corresponding to CQI_Z when the rank RI_X and the precoding matrix PMI_Y are applied. In this way, the UE calculates CQI with which the optimal performance is achieved in real transmission under the assumption of the transmission mode to be selected by the eNB.

The UE may transmit the channel status information including RI, PMI, and CQI periodically or aperiodically. If the eNB want to acquire the channel status information of specific UE, it may configure aperiodic feedback (or aperiodic channel status information report) to the UE using an aperiodic feedback indicator (or channel status information request field or channel status information request information) included in Downlink Control Information (DCI). It may also be possible to configure the aperiodic feedback such that when the aperiodic feedback indicator is received at $n^{th}$ subframe the UE transmits the aperiodic feedback information (or channel status information) at the $(n+k)^{th}$ subframe during the uplink data transmission. Here, k is set to 4 for Frequency Division Duplexing (FDD) mode and any value of table 1 for Time Division Duplexing (TDD).

TABLE 1

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

In order to generate and report the channel information, the eNB with a large scale antenna array, the eNB equipped with a large scale antenna array has to configure reference signal resources for measuring a channel of 8 or more antennas and send the configuration information to the UE.

In LTE-A Pro, it is possible to configure two, four, eight, twelve, or sixteen antenna ports at one CSI-RS resource, and the number of antenna ports may be increased to twenty, twenty four, twenty eight, and thirty two in the future. In detail, the LTE-A Release 13 supports two CSI-RS configuration schemes.

The first configuration scheme is to use non-preceded CSI-RS, which may be referred to as CSI-RS for Class A CSI report. The eNB may configure 4-port or 8-port CSI-RS pattern to the UE, which can receive 8 or more CSI-RS ports by aggregating the configured CSI-RS patterns. The 11, 2, 4, 81-port CSI-RS is in conformance with the legacy mapping rule, the 12-port CSI-RS is configured by aggregating three 4-port CSI-RS patterns, and 16-port CSI-RS is configured by aggregating 2 8-port CSI-RS patterns. The LTE-A release 13 also supports CDM-2 or CDM-4 with the orthogonal cover code (OCD which is interchangeably referred to as orthogonal code) for 12-port and 16-port CSI-RS.

The embodiment of FIG. 13 is directed to a CSI-RS power boosting based on CDM-2 and, for the full power utilization for CDM-2-based 12-port and 16-port CSI-RS, it is necessary to boost power of up to 9 dB in comparison with that for data (PDSCH) transmission. This means that there is a need of high performance hardware superior to the legacy hardware for full power utilization for the CDM-2-based 12-port and 16-port CSI-RS. In this respect, the 12-port and 16-port CSI-RS is introduced in the LTE-A Pro Release13, which makes it possible to achieve full power utilization through 6-dB power boosting as before.

The second configuration scheme is to use beamformed (BF) CSI-RS, which may be referred to as CSI-RS for Class B CSI report. The eNB is capable of making a distinction between multiple transceiver units (TXRUs) with one CSI-RS port by applying specific beams to the TXRUs. If the eNB has the channel information per UE in advance, it ma configure its TXRU to transmit a small number of CSI-RSs to which channel information-specific beams are applied. As another example, the eNB may configure multiple CSI-RS resources configurations including 8 or less CSI-RS ports to the UE. In this case, the eNB may perform beamforming on the CSI-RS ports by applying CSI-RS resource configuration-specific beam directions.

Figure 14:
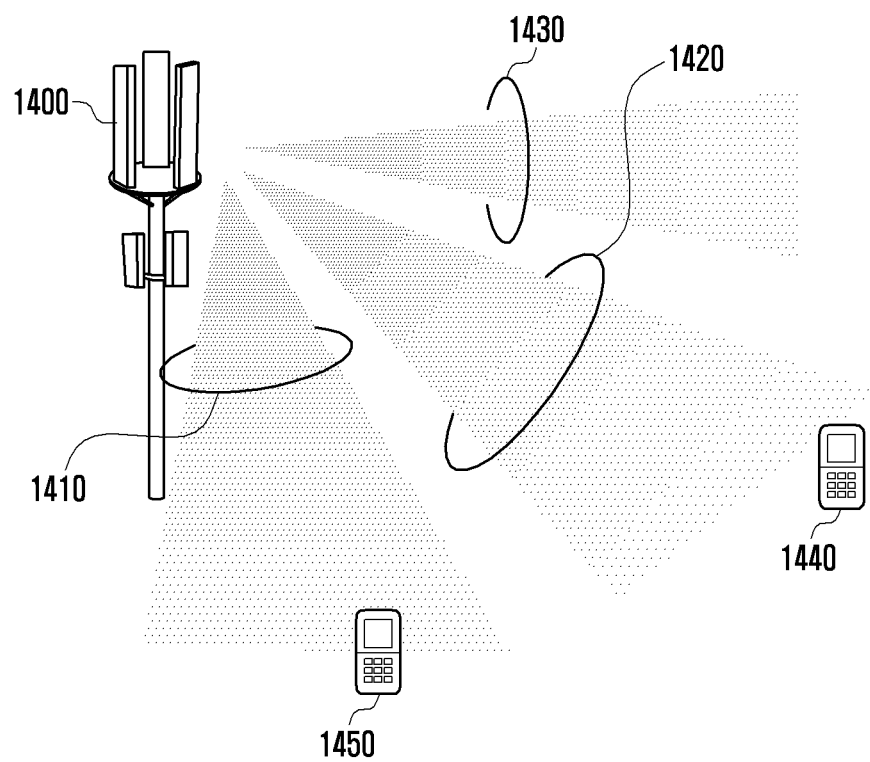
FIG. 14 is a diagram for explaining a BF CSI-RS.

FIG. 14 is a diagram for explaining a BF CSI-RS. In reference to FIG. 14, the eNB 1400 may configure three CSI-RSs 1410, 1420, and 1430 beamformed in different directions to the UEs 1400 and 1450. Each of the CSI-RS resources 1410, 1420, and 1430 may have one or more CSI-RS ports. The UE 1440 may generate channel status information for the respective CSI-RS resources 1410, 1420, and 1430 and transmit to the eNB an index of the its preferred CSI-RS resources by means of a CSI-RS resource indicator (CRI). In the embodiment of FIG. 14, the UE 1440 may report the index of the CSI-RS resources 1420 as its preferred CSI-RS resources, while the UE 1450 may reports the index of the CSI-RS resources 1410 as its preferred CSI-RS resources.

Although the CRI is configured to indicate one CSI-RS index preferred by the UE in the LTE-A Pro Release 13, it may be extended to indicate a combination of preferred CSI-RS indices in the future. For example, if the UE 1440 has two most preferred CSI-RS resources 1420 and 1430, it may report two indices of the corresponding CSI-RS resource explicitly or an index indicating a set of the corresponding CSI-RS resources. This aims to make it possible to support various applications for enabling multiple beam directions for high mobility UEs and selecting multiple CSI-RSs being transmitted from multiple transmission and reception points (TRPs).

In the LTE-A Pro Release 13 or earlier, the detailed CSI-RS configuration values are determined semi-statically via higher layer signaling or RRC signaling as described in embodiment 2-1.

1. Number of CSI-RS ports: number of CSI-RS ports mapped to one CSI-RS resource
2. CSI-RS configuration: setting value indicating CSI-RS RE locations along with number of CSI-RS ports
3. CSI-RS subframe configuration $I_{CSI-RS}$: setting value indicating CSI-RS transmission interval $T_{CSI-RS}$ and subframe offset $\Delta_{CSI-RS}$
4. CSI-RS power boosting factor $P_C$: assumption at UE for ratio of CSI-RS transmit power to PDSCH power
5. Scrambling ID $n_{ID}$
6. quasi co-location (QCL) information The UE may ascertain the accurate RE locations to which the CSI-RS is mapped based on the number of CSI-RS ports and CSI-RS configuration obtained from RRC signal. In an exemplary case of using a normal cyclic prefix (CP), the UE may ascertain k' and l' based on the number of CSI-RS orts and CSI-RS configuration by referencing the table as shown in FIG. 15.

$$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases} \quad \text{[Equation 2]}$$

$$l = l' + \begin{cases} l'' & \text{CSI reference signal configurations} \\ & 0\text{-}19, \text{ normal cyclic prefix} \\ 2l'' & \text{CSI reference signal configurations} \\ & 20\text{-}31, \text{ normal cyclic prefix} \\ l'' & \text{CSI reference signal configurations} \\ & 0\text{-}27, \text{ extended cyclic prefix} \end{cases}$$

$$w_{l'} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

One of the problems caused by configuring 16 or more CSI-RS ports, e.g., 20-port, 24-port, 28-port, and 32-port CSI-RSs is CSI-RS power boosting for full power utilization. In the case of mapping 20, 24, 28, or 32 CSI-RS ports based on CDM-2 or CDM-4 as in the legacy LTE-A and LTE-A Pro standards, it is impossible to achieve the full power utilization through 6 dB CSI-RS power boosting as before. For example, it is necessary to perform 9 dB CSI-RS power boosting to achieve the full power utilization for 32-port CSI-RS. However, an excessive (e.g., over 6 dB) CSI-RS power boosting may bring about significant transmit power difference between the data and CSI-RS REs that are located close to each other, which results in overload of the power amplifier of the eNB and impacts the reception performance at the adjacent data REs.

Embodiment 2-2

This embodiment is directed to a method for configuring various CSI-RS CDM-4 mappings by aggregating CSI-RS CMD-2 mappings. More generally, this may be understood as an operation for configuring a target CDM pattern having an orthogonal code with a long length by aggregating component CDM patterns having an orthogonal code with a relatively short length. Such an understanding is applicable to the embodiments described below.

As described above, in the case of using CDM-2 for CSI-RS transmission, two REs are used for one CSI-RS port transmission. Accordingly, 12-port CSI-RS transmission and 16-port CSI-RS transmission require power boosting of 10 $\log_{10} 12/2 = 7.78$ dB and 10 $\log_{10} 16/2 = 9$ dB, respectively.

Meanwhile, in the case of using CDM-4 for CSI-RS transmission, four REs are used for one CSI-RS port transmission. In this case, 12-port CSI-RS transmission and 16-port CSI-RS transmission require power boosting of 10 $\log_{10} 12/4.77$ 10 $\log_{10} 12/2 = 7.78$ dB and 10 $\log_{10} 16/4 = 6$ 10 $\log_{10} 16/2 = 9$ dB, respectively. This means that it is possible to achieve full power utilization for the 12-port or 16-port CSI-RS transmission with the introduction of CDM-4 at the same level of power boosting in use for 8-port CSI-RS transmission in the legacy LTE and LTE-A standard.

Figure 16:
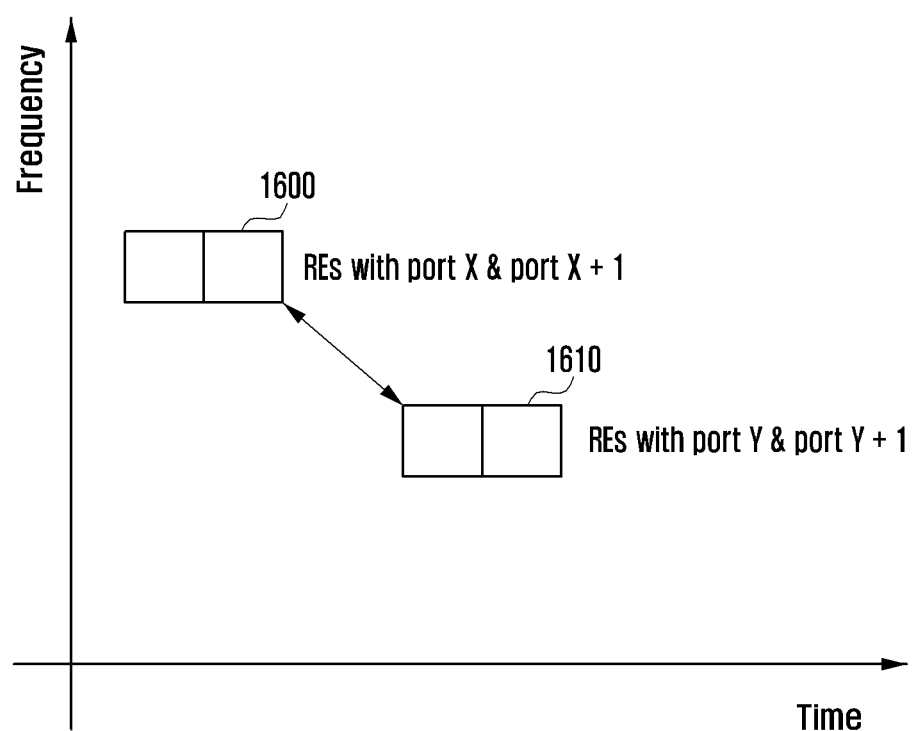
FIG. 16 is a diagram for explaining a method for configuring a CSI-RS CDM-4 mapping based on CSI-RS mappings

In the current LTE-A and LTE-A Pro, it is possible to map the orthogonal code of length 2 according to the CSI-RS port number using the table of FIG. 15 and $w_r$, of Equation 2. FIG. 16 is a diagram for explaining a method for configuring a CSI-RS CDM-4 mapping based on CSI-RS mappings. It is assumed that antenna ports X and X+1 are mapped to the CDM-2 group 1600 in reference to FIG. 15 and Equation 2. In this case, the antenna ports X and X+1 may be mapped with the orthogonal codes [1 1] and [1 -1], respectively. Similarly, it is assumed that antenna ports Y and Y+1 are mapped to the CDM-2 group 1610 in reference to FIG. 15 and Equation 2. In this case, the antenna ports Y and Y+1 may be mapped with the orthogonal codes [1 1] and [1 -1], respectively.

It is assumed that the CDM-2 groups 1600 and 1610 are aggregated into a CDM-4 group composed of 4 REs according to a predetermined rule. It may be possible to generate a new orthogonal code of length 4 based on the orthogonal code of length 2 by changing the plus/minus sign of the orthogonal code assigned to the CDM-2 group 1610 in association with the first CDM-2 group 1600.

As a consequence, in the above example, the antenna ports X and X+1 and Y and Y+1 can be mapped to the CDM-4 group with the orthogonal codes [1 1 1 1], [1 -1 1 -1], [1 1 -1 -1], and [1 -1 -1 1], respectively. Although FIG. 16 depicts that two CDM-2 groups are located at different subcarriers and OFDM symbols, it is obvious that the CDM-2 groups can be located at the same subcarrier or same OFDM symbol.

Although the antenna port indices are expressed by alphabets X and Y for convenience of explanation, they can be expressed by appropriate numbers in consideration of various factors such as antenna shape and codebook structure.

Embodiment 2-3

This embodiment is directed to a method for configuring various CSI-RS CDM-8 mappings by aggregating CSI-RS CDM-2 mappings or CSI-RS CDM-4 mappings.

Figure 17:
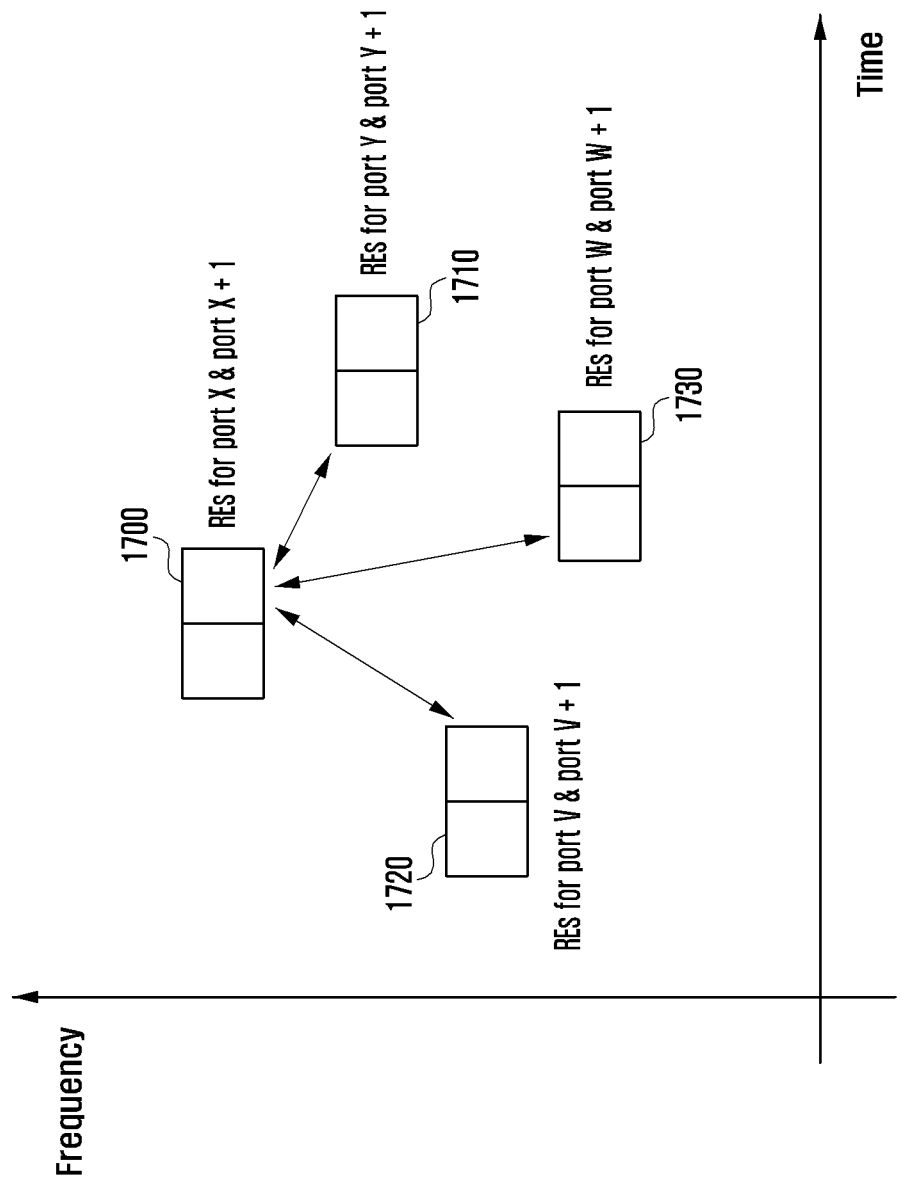
FIG. 17 is a diagram for explaining a method for configuring a CSI-RS CDM-8 mapping by aggregating CSI-RS CDM-2 mappings.

FIG. 17 is a diagram for explaining a method for configuring a CSI-RS CDM-8 mapping by aggregating CSI-RS CDM-2 mappings. Although FIG. 17 depicts a case where four CDM-2 groups are located at different subcarriers and different OFDM symbols, it is obvious that the CDM-2 groups can be located at the same subcarrier or same OFDM symbol.

In the current LTE-A and LTE-A Pro, it is possible to map the orthogonal code of length 2 according to the CSI-RS port number using the table of FIG. 15 and $w_r$, of Equation 2. It may be assumed that antenna ports X and X+1 are mapped to the CDM-2 group 1700 in reference to FIG. 15 and Equation 2. In this case, it is assumed that the antenna ports X and X+1 may be mapped with the orthogonal codes [1 1] and [1 −1], respectively. Similarly, it may be assumed that antenna ports Y and Y+1 are mapped to the CDM-2 group 1710, antenna ports V and V+1 to the CDM-2 group 1720, and antenna ports W and W+1 to CDM-2 group 1730, respectively. In this case, it is assumed that the antenna ports Y, V, and W map be mapped with the orthogonal code [1 1], and the antenna ports Y+1, V+1, and W+1 are mapped with the orthogonal code [1 −1].

On the basis of the above assumptions, it is possible to generate a CDM-8 group composed of 8 REs by aggregating four CDM-2 groups 1700, 1710, 1720, and 1730 according to a predetermined rule. It may be possible to apply a higher layer signaling order of CDM-2 groups, a CSI-RS configuration order of CDM-2 groups as ascending or descending order, and frequency and/or time spacings based on the first CDM-2 group 1700 according to the predetermined rule. In this case, it is possible to generate a new orthogonal code with length 8 using the orthogonal codes with length 2 by changing the plus/minus sign of the orthogonal codes assigned to the three CDM-2 groups 1710, 1720, and 1730 based on the first CDM-2 group 1700 as part, by way of example, of a CDM-4 group.

For example, it may be possible to apply the original orthogonal codes [1 1] and [1 −1] to the two REs designated by the first CDM-2 group 1700 for all of the antenna ports X, Y, V, W, X+1, Y+1, V+1, and W+1. Meanwhile, it may be possible to apply orthogonal codes [1 1] and [1 −1] to the two REs designated by the first CDM-2 group 1710 for the antenna ports X, Y, X+1, and Y+1 and orthogonal codes [−1 −1] and [−1 1] for the antenna ports V, W, V+1, and W+1. Through this process, it is possible to determine the CDM mapping for antenna ports X, Y, V, W, X+1, Y+1, V+1, and W+1 to the four REs designated by the first and second CDM-2 groups 1700 and 1710.

Similarly, it may be possible to determine CDM mapping for the antenna ports X, Y, V, W, X+1, Y+1, V+1, and W+1 to the four REs designated by the third and fourth CDM-2 groups. For the antenna ports X, X+1, V, and V+1, the same orthogonal codes assigned to the two REs designated by the first CDM-2 group 1700 are applied to the two REs designated by the third CD-2 group 1720, and the same orthogonal codes assigned to the two RES designated by the second CDM-2 group 1720 are applied to the two REs designated by the fourth CDM-2 group 1730. Meanwhile, for the antenna ports Y, Y+1, W, and W+1, the code obtained by changing (i.e., multiplying each element by −1) the plus/minus sign of the orthogonal code assigned to the REs designated by the first CDM-2 group 1700 are applied to the two RES designated by the third CDM-2 group 1720, and the code obtained by changing (i.e., multiplying each element by −1) the plus/minus sign of the orthogonal code assigned to the REs designated by the second CDM-2 group 1710 are applied to the two RES designated by the fourth CDM-2 group 1730.

As a result, it is possible to map the antenna ports X, Y, V, W, X+1, Y+1, V+1, and W+1 to the CDM-8 group by referencing table 2 in this embodiment.

Although the antenna port indices are expressed by alphabets X, Y, V, and W for convenience of explanation, they can be expressed by appropriate numbers in consideration of various factors such as antenna shape and codebook structure.

TABLE 2

| CSI-RS port index | Corresponding CDM pattern |
|---|---|
| X | [1 1 1 1 1 1 1 1] |
| X + 1 | [1 −1 1 −1 1 −1 1 −1] |
| Y | [1 1 1 1 −1 −1 −1 −1] |
| Y + 1 | [1 −1 1 −1 −1 1 −1 1] |
| V | [1 1 −1 −1 1 1 −1 −1] |
| V + 1 | [1 −1 1 1 1 −1 −1 1] |
| W | [1 1 −1 −1 −1 −1 1 1] |
| W + 1 | [1 −1 −1 1 −1 1 1 −1] |

Figure 18:
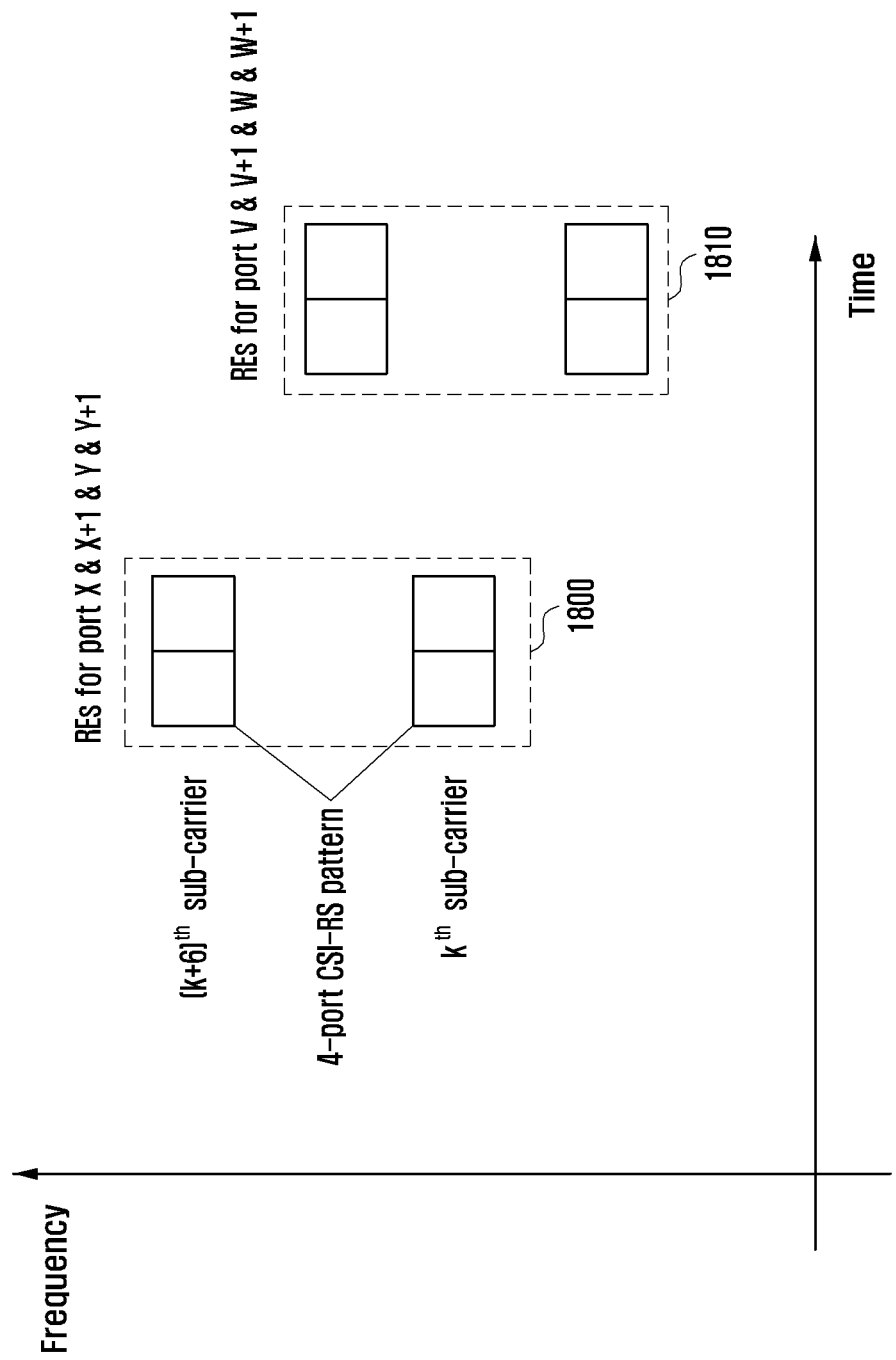
FIG. 18 is a diagram for explaining a method for configuring a new CSI-RS CDM-8 mapping by aggregating 4-port CSI-RS pattern-based CDM-4 mappings.
Figure 19:
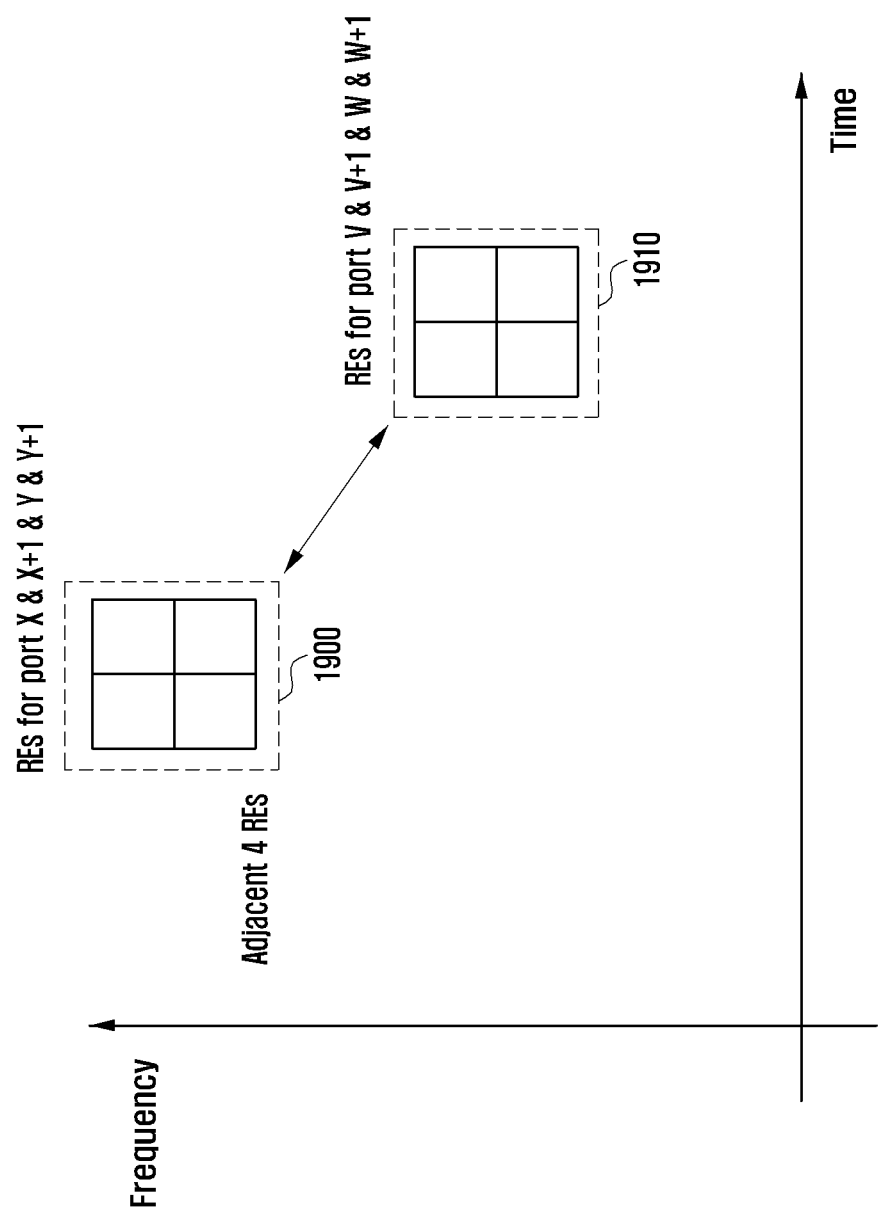
FIG. 19 is a diagram for explaining a method for configuring a new CSI-RS CDM-8 mapping by aggregating CDM-4 mappings that are composed of 4 adjacent RES each

FIGS. 18 and 19 are diagrams for explaining methods for configuring CSI-RS CDM-8 mappings by aggregating CSI-RS CDM-4 mappings. As described above, the LTE-A Pro release 13 supports two CDM-4 mappings in two patterns. The first method is to define CDM-4 groups based on the 4-port CSI-RS pattern, and the second method is to define a CDM-4 group with 4 adjacent REs. Although FIGS. 18 and 19 depict cases where two CDM-4 groups are located at different subcarriers and different OFDM symbols, it is obvious that the CDM-4 groups can be located at the same subcarrier or same OFDM symbol.

FIG. 18 is a diagram for explaining a method for configuring a new CSI-RS CDM-8 mapping by aggregating 4-port CSI-RS pattern-based CDM-4 mappings. In reference to FIG. 18, it may be assumed that antenna ports X, Y, X+1, and Y+1 are mapped to the first 4-port CSI-RS pattern-based CDM-4 group 1800. In this case, it is assumed that the antenna ports X, X+1, Y, and Y+1 are mapped with the orthogonal codes [1 1 1 1], [1 −1 1 −1], [1 1 −1 −1], and [1 −1 −1 1], respectively. Similarly, it may be assumed that antenna ports V, W, V+1, and W+1 mapped to the second CDM-2 group 1810. In this case, it is assumed that the antenna ports V, V+1, W, and W+1 are mapped with the orthogonal codes [1 1 1 1], [1 −1 1 −1], [1 1 −1 −1], and [1 −1 −1 1], respectively.

On the basis of the above assumptions, it is possible to generate a CDM-8 group composed of 8 REs by aggregating two CDM-4 groups 1800 and 1810 according to a predetermined rule. It may be possible to apply a higher layer signaling order of CDM-4 groups, a CSI-RS configuration order of CDM-4 groups as ascending or descending order, and frequency and/or time spacings based on the first CDM-4 group 1800 according to the predetermined rule. In this case, it is possible to generate a new orthogonal code with length 8 using the given orthogonal codes with length 4 by changing the plus/minus sign of the orthogonal codes assigned to the CDM-4 group 1810 based on the first CDM-4 group 1800 as part, by way of example, of the generated CDM-4 groups.

For example, it may be possible to apply the original CDM-4 orthogonal codes [1 1 1 1], [1 1 −1 −1], [1, −1, 1, −1], and [1, −1, −1, 1] to the four REs designated by the first CDM-4 group 1800 for all of the antenna ports X, Y, V, W, X+1, Y+1, V+1, and W+1 under the same assumption as above. Meanwhile, it may be possible to apply the assumed orthogonal codes [1 1 1 1], [1 1 −1 −1], [1, −1, 1, −1], and [1, −1, −1, 1] to the four REs designated by the second CDM-4 group 1810 for the antenna ports X, Y, X+1, and Y+1 and orthogonal codes [−1 −1 −1 −1], [−1 −1 1 1], [−1, 1, −1, 1], and [−1, 1, 1, −1] obtained by changing the plus/minus sign of the assumed orthogonal codes.

As a result, it is possible to map the antenna ports X, Y, V, W, X+1, Y+1, V+1, and W+1 to the CDM-8 group by referencing table 3 below.

Although the antenna port indices are expressed by alphabets X, Y, V, and W for convenience of explanation, they can be expressed by appropriate numbers in consideration of various factors such as antenna shape and codebook structure.

TABLE 3

| CSI-RS port index | Corresponding CDM pattern |
| --- | --- |
| X | [1 1 1 1 1 1 1 1] |
| X + 1 | [1 −1 1 −1 1 −1 1 −1] |
| Y | [1 1 −1 −1 1 1 −1 −1] |
| Y + 1 | [1 −1 −1 1 1 −1 −1 1] |
| V | [1 1 1 1 −1 −1 −1 −1] |
| V + 1 | [1 −1 1 −1 −1 1 −1 1] |
| W | [1 1 −1 −1 −1 −1 1 1] |
| W + 1 | [1 −1 −1 1 −1 1 1 −1] |

FIG. 19 is a diagram for explaining a method for configuring a new CSI-RS CDM-8 mapping by aggregating CDM-4 mappings that are composed of 4 adjacent RES each. The antenna port-orthogonal code mappings and aggregation principle using in the embodiment of FIG. 18 is very similarly applied in the embodiment of FIG. 19 and thus detailed description thereof is omitted herein. In the embodiment of FIG. 19, it may be possible to limit the CDM-8 pattern generated by aggregating the first and second CDM-4 groups 1900 and 1910 to the legacy 8-port CSI-RS patterns in consideration of implementation complexity at the eNB and UE.

Embodiment 2-4

This embodiment is directed to a method for mapping CDM-4 or CDM-8 orthogonal codes in transmitting CSI-RS via high layer signaling.

The first method is to use a 1-bit indicator indicating an orthogonal code extension in the frequency and/or time domain. In this embodiment, the eNB may notify the UE of the CDM-4 or CDM-8 mapping scheme in such a way of indicating whether a length-2 orthogonal code [1 1] or [1 −1] for CDM-2 is extended in the frequency or time direction via higher layer signaling such as RRC configuration. Similarly, the eNB may notify the UE of the CDM-8 mapping scheme in such a way of indicating whether the length-4 orthogonal code [1 1 1 1], [1 1 −1 −1], [1 −1 1 −1], or [1 −1 −1 1] is extended in the frequency or time direction via higher layer signaling such as RRC configuration.

Figure 20:
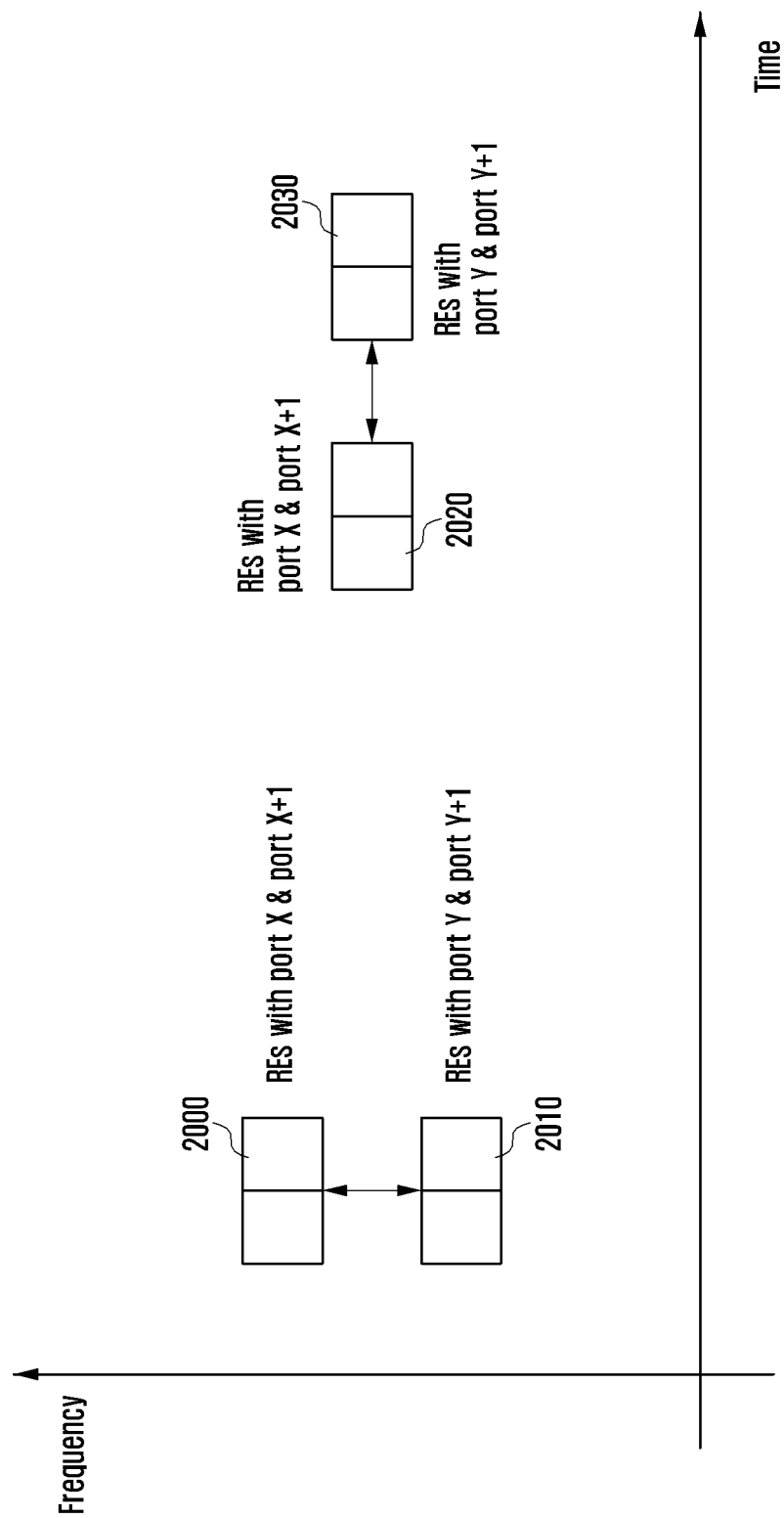
FIG. 20 is a diagram for explaining extension of an orthogonal code in frequency and/or time direction via a 1-bit indicator.

FIG. 20 is a diagram for explaining extension of an orthogonal code in frequency and/or time direction via a 1-bit indicator. Although FIG. 20 depicts an exemplary case of CDM-4 mapping by extending CDM-2 mapping, it is also possible to extend CDM-2 mapping to CDM-8 mapping and CDM-4 mapping to CDM-8 mapping in the same manner.

For example, the indicator may be set to 0 for indicating extension in the frequency direction. In this case, the two CDMs groups 2000 and 2010 composed of two REs consecutive in the time domain each are bound in the frequency domain so as to form a CDM-4 group composed of 4 REs. In this case, the CDM-2 groups 2000 and 2010 are on different subcarriers. The factor for selecting the CDM-2 groups 2000 and 2010 may be a distance between two CDM-2 groups, and it may be possible to bind two CDM-2 groups having a spacing of 6 subcarriers into a CDM-4 group as in the legacy CSI-RS 4 port mapping. The length-4 orthogonal codes for antenna ports X, X+1, Y, and Y+1 that are mapped to the generated CDM-4 group may be configured in the method described in embodiment 2-2. If this method is used for CDM-8 group mapping, the method described in embodiment 2-3 can be applied.

Figure 21:
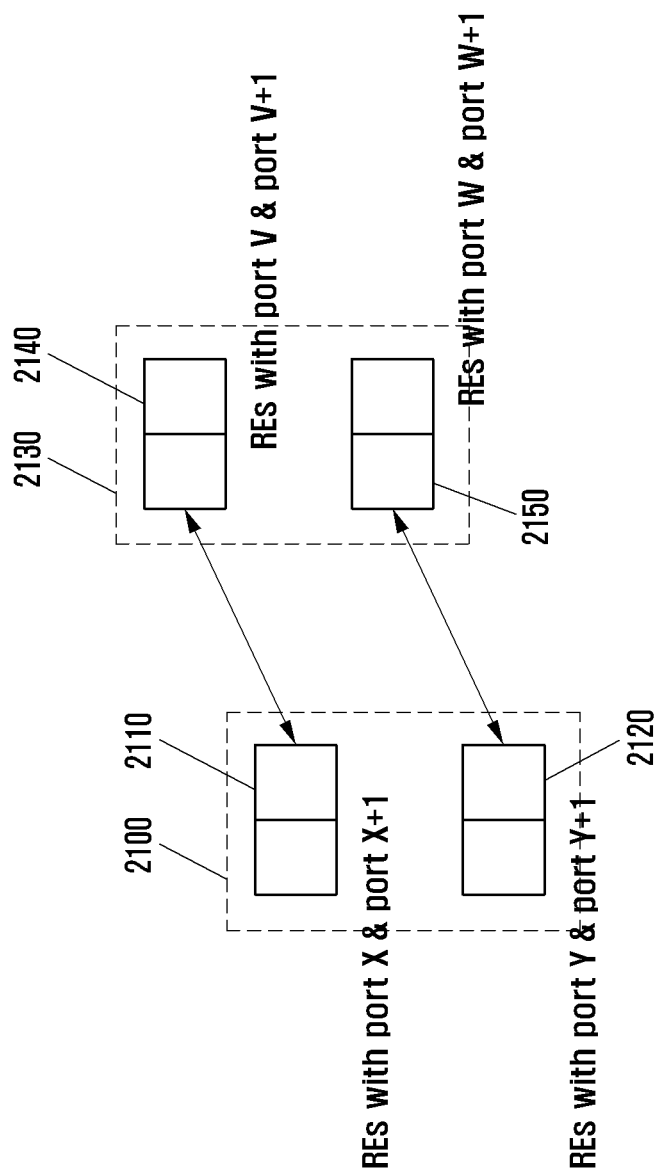
FIG. 21 is a diagram illustrating a method for forming a CDM-4 group.

The indicator may be set to 1 for indicating extension in the time direction. In this case, the two CDMs groups 2020 and 2040 composed of two REs consecutive in the time domain each are bound in the time domain so as to form a CDM-4 group composed of 4 REs. In this case, the CDM-2 groups 2020 and 2040 are in different OFDM symbols. The factor for selecting the CDM-2 groups 2020 and 2040 may be a distance between two CDM-2 groups or predetermined OFDM symbol pool. The length-4 orthogonal codes for antenna ports X, X+1, Y, and Y+1 that are mapped to the generated CDM-4 group may be configured in the method described in embodiment 2-2. If this method is used for CDM-8 group mapping, the method described in embodiment 2-3 can be applied. Although FIG. 21 depicts an exemplary case of generating a CDM-4 pattern based on the length-2 CDM pattern, this method may be applied to a case of generating a CDM-8 pattern based on the length 2 or length 4 CDM pattern without limitation thereto. If this method is used for CDM-8 group mapping, the method described in embodiment 2-3 may be applied as an elaborated length 8 orthogonal code mapping method.

The second method for mapping CDM-4 or CDM-8 to a CSI-RS transmission via higher layer signaling is to use bitmap indication. For example, the eNB may transmit to the UE a length-L bitmap including a CSI-RS port numbering order and a CDM-4 mapping rule via higher layer signaling.

For example, it may be assumed that a CSI-RS aggregation is performed based on a 2-port CSI-RS mapping pattern. In this case, the bitmap with a length L=32 as shown in Equation 3 may include information on CSI-RS resources locations selected for CSI-RS aggregation, a port numbering rule, and CDM-4 or CDM-8 mapping rule. Although L is set to 32 in this embodiment in consideration of 32 CSI-RS resource configurations for 2 ports as in FIG. 15, the bitwidth of the bitmap may be adjusted according to the situation in consideration of only FFD or TTD.

$$I_{PortMapping} = [x_1\ x_2\ x_3\ \ldots\ x_{31}], \quad \text{[Equation 3]}$$

where $$x_i \in \begin{cases} A1, A2, B1, B2, C1, C2, (D1, D2 \\ \text{for 16 port) for selected resources} \\ 0 \text{ for other resources} \end{cases}$$

In Equation 3, $x_i$ is an alphabet indicating whether CSI-RS configurations 0 to 31 and the REs belonging to the CDM-2 group designated in the column for the one or two antenna ports are in use for CSI-RS aggregation and transmission and, if so, how they are associated with configuring the CDM-4 or CDM-8 group. Equation 2 is derived under the assumption of forming a 16-port CSI-RS based on 2-port CSI-RS patterns and, if 16 or more CSI-RS ports are configured, it is obvious that the alphabet for indicating 'selected resources' may be extended to be equal or greater than D. If $x_i$ is set to 0, the REs indicated by the $i^{th}$ CSI-RS configuration in the column for one or two antenna ports in FIG. 15 are not used for CSI-RS transmission. If $x_i$ is set to Xy other than 0, REs indicated by the $i^{th}$ CSI-RS configuration in the column for one or two antenna ports in FIG. 15 are used for CSI-RS transmission. Here, X in Xy may be set to one of A, B, C, and D; y may be set to 1 or 2. The alphabets A, B, C, and D and numbers 1 and 2 are used for distinction and may be obviously changed by other alphabets and numbers depending on the situation. The eNB and UE may agree that, if the Xs of x, and $x_3$ are different from each other, the 4 REs indicated by the two indicators are aggregated into one CDM-4 group. The eNB and UE may also agree that, if y of $x_i$ is 1 and y of $x_3$ is 2, the given orthogonal codes are used as they were at the REs indicated by $x_i$ and the given orthogonal codes are used with or without multiplication of −1 at the REs indicated by $x_3$ as in the embodiment 2-2.

For example, if $x_i$=B1 and $x_3$=B2, the eNB and the UE may ascertain that the 4 REs indicated by x, and $x_3$ form the second CDM-4 group. Here, the length-4 orthogonal code for up to 4 antenna ports to be mapped to the CDM-4 group may be generated according to the method descried in embodiment 2-2.

In the case of using the bitmap (or alphabet sequence) in the form of Equation 3, total 96 bits are required for forming the bitmap (or alphabet sequence) because x, has a length of 3 bits. In order to reduce higher layer signaling overhead caused by the increased number of bits, there is a need of a method for reducing the information amount. Supposed that the RE locations for transmitting 8 or more CSI-RSs using one of the methods described in embodiments 2-1, 2-2, and 2-3. In this case, the configured RE locations may be indicated via the CSI-RS configuration in the column for one or two antenna ports. For example, if the resource configuration is made for 12 CSI-RS ports, it is possible to indicate the locations of the 6 CDM-2 groups with 6 CSI-RS configurations. In this case, the relationship among the CDM-2 groups may be indicated by the length-$N_P$ bitmap (or alphabet sequence) as follows. Here, $N_P$ denotes the number of CSI-RS ports being aggregated. The bitmap conveying such information may be expressed as Equation 4.

$$I_{PortMapping}=[x_1\ x_2\ x_3\ \ldots\ x_{P_p2}], \text{ where } x_i \in \{A1, A2, B1, B2, C1, C2, (D1, D2 \text{ for 16 ports})\} \quad [\text{Equation 4}]$$

According to Equation 4, the information amount required for designating the CDM-4 group is 3*6=18 bits for 12 CSI-RS ports transmission and 3*8=24 bits for 16 CSI-RS ports transmission that are dramatically reduced in comparison with Equation 2. Equation 3 is derived under the assumption of the case of aggregating 16-port CSI-RS based on the 2-port CSI-RS patterns and, if 16 or more CSI-RS ports are configured, it is obvious that the alphabet for indicating the 'selected resources' can be extended to be equal to or greater than D.

As another example, it may be possible to assume that the CSI-RS aggregation is performed based on the legacy 4-port CSI-RS mapping pattern. In this case, a CDM-4 group may be configured in such a way of forming the CDM-4 groups with 4 REs designated by the 4-port CSI-RS mapping pattern. The legacy 4-port CSI-RS mapping pattern is designed to designate two CDM-2 groups. The two CDM-2 groups designated by the legacy 4-port CSI-RS mapping pattern may be bound into a CDM-4 groups through a method similar to that of embodiment 2-2.

Another method for configuring a CDM-4 group when the CSI-RS aggregation is performed based on the legacy 4-port CSI-RS mapping pattern is to use a bitmap (or alphabet sequence). The bitmap with a length L=16 as shown in Equation 5 may include information on CSI-RS resources locations selected for channel measurement resource (CMR) configuration, a port numbering rule, and a CDM-4 mapping rule. Although L=16 in this embodiment in consideration of 16 CSI-RS resource configurations for 4 ports as in FIG. 15, the bitwidth of the bitmap may be adjusted according to the situation in consideration of only FFD or TTD.

$$I_{PortMapping} = [x_1\ x_2\ x_3\ \ldots\ x_{16}], \quad [\text{Equation 5}]$$

where $$x_i \in \begin{cases} A1, A2, B1, B2, \text{ for selected resources} \\ 0 \text{ for other resources} \end{cases}$$

The definitions of the respective variables in Equation 5 are similar to those in Equation 2. In Equation 4, $x_i$ is an alphabet indicating whether CSI-RS configurations {0 to 9, 20 to 25} and the REs belonging to the CDM-2 group designated by the column for 4 antenna ports are in use for CSI-RS aggregation and transmission and, if so, how they are associated with CDM-4 group configuration. Equation 4 is derived under the assumption of forming a 16-port CSI-RS based on 4-port CSI-RS patterns and, if 16 or more CSI-RS ports are configured, it is obvious that the alphabet for indicating 'selected resources' may be extended to be equal or greater than B.

In reference to FIG. 21, supposed that $x_i$ indicating the same location as the legacy 4-port CSI-RS pattern 2100 is set to A1 and $x_3$ indicating the same location as the legacy 4-port CSI-RS pattern 2130 is set to A2. Here, it may be agreed that the first CDM-2 group 2110 of the 4-port CSI-RS pattern 2100 and the first CDM-2 group 2140 of the 4-port CSI-RS pattern 2130 are aggregated into one CDM-4 group. Similarly, it may be agreed that the second CDM-2 group 2120 of the 4-port CSI-RS pattern 2100 and the second CDM-2 group 2150 of the 4-port CSI-RS pattern 2130 are aggregated into one CDM-4 group. The detailed orthogonal code assignment in each CDM-4 group may be performed through the method described in embodiment 2-2.

In the case of using the bitmap (or alphabet sequence) in the form of Equation 5, total 32 bits are required for forming the bitmap (or alphabet sequence) because x, has a length of 2 bits. In order to reduce higher layer signaling overhead caused by the increased number of bits, there is a need of a method for reducing the information amount. Supposed that the RE locations for transmitting 8 or more CSI-RSs using one of the methods described in embodiments 2-1, 2-2, and 2-3. In this case, the configured RE locations may be indicated via the CSI-RS configuration in the column for 4 antenna ports. For example, if the resource configuration is made for 12 CSI-RS ports, it is possible to indicate the locations of the 6 or 8 CDM-2 groups with 3 or 4 CSI-RS configurations. In this case, the relationship among the CDM-2 groups may be indicated by the length-$N_P/4$ bitmap (or alphabet sequence) as Equation 6. Here, $N_P$ denotes the number of CSI-RS ports being aggregated.

$$I_{PortMapping}=[x_1\ x_2\ x_3\ \ldots\ x_{Np4}], \text{ where } x_i \in \{A1, A2, B1, B2\} \quad [\text{Equation 6}]$$

According to Equation 6, the information amount required for designating the CDM-4 group is 2*3=6 or 2*4=8 bits for 12 CSI-RS ports transmission and 2*4=8 bits for 16 CSI-RS ports transmission that are dramatically reduced in comparison with Equation 4. Equation 5 is derived under the assumption of the case of aggregating 16-port CSI-RS based on the 4-port CSI-RS patterns and, if 16 or more CSI-RS ports are configured, it is obvious that the alphabet for indicating the 'selected resources' can be extended to be equal to or greater than B.

As another example, it may be possible to assume that the CSI-RS aggregation is performed based on the legacy 8-port CSI-RS mapping pattern. The detailed method may be elaborated in a similar way to extending the 2-port CSI-RS mapping pattern-based method to the 4-port CSI-RS mapping pattern-based method. Thus, detailed description thereof is omitted herein.

Embodiment 2-5

This embodiment is directed to a CDM-4 or CDM-8 mapping method for configuring a CDM-4 or CDM-8 groups through a specification-defined rule.

As the first example, it is possible to support the CDM-4 or CDM-8 mapping based on distance between component CDM groups. As in embodiment 2-4, the component CDM group for CDM-4 mapping is CDM-2 mapping group, and the component CDM group for CDM-8 mapping is CDM-2 mapping group or CDM-4 mapping group. For convenience of explanation, the description is directed to the case of using the CDM-4 mapping group as the component CDM group, and the basic principle may be applied to the case of using the CDM-2 mapping group as the component CDM group.

As described in embodiment 2-1, it is assumed that the RE locations for transmitting 8 or more CSI-RSs are configured through CSI-RS aggregation based on the 4-port CSI-RS patterns. Here, the eNB and the UE may configure a reference CSI-RS RE location (reference CDM-4 group location) in the descending or ascending order of the CSI-RS configurations in FIG. 15. The eNB and the UE may determine the CSI-RS RE location closest to the reference RE location (i.e., other CDM-4 group location) among the rest CSI-RS REs based on the CSI-RS configuration in the column for 4 antenna ports in FIG. 15. On the basis of the reference CSI-RS RE and the CSI-RS REs found adjacently, it may be possible to perform the CDM-8 mapping by applying the methods described in embodiments 2-2 and 2-3. As shown in FIG. 12, the OFDM symbols available for CSI-RS transmission are located far from each other, while the subcarriers available for CSI-RS transmission are bound. The first example may be expressed as a method for performing the CDM-8 mapping in accordance with a frequency domain-preferred extension principle.

As the second example, it may be possible to support the CDM-8 mapping based on the legacy 8-port mapping. For the upper one (or lower one) of the two CDM-4 groups designated by a legacy 8-port CSI-RS configuration, the legacy orthogonal code [1 1 1 1], [1 1 −1 −1], [1 −1 1 −1], or [1 −1 −1 1] is used as it was. Meanwhile, for the lower one (or upper one) of the two CDM-4 groups, the legacy orthogonal code [1 1 1 1], [1 1 −1 −1], [1 −1 1 −1], or [1 −1 −1 1] is used as it is or the code obtained by multiplying −1 (i.e., [−1 −1 −1 −1], [−1 −1 1 1], [−1 1 −1 1], or [−1 1 1 −1]). For more details of the mapping method, see embodiment 2-3.

As the third example, it may be possible to support the CDM-8 mapping with a time domain-preferred extension principle. In this example, a CDM-8 group is generated by binding two CDM-4 groups located in different OFDM symbols. The two CDM-4 groups located in different OFDM symbols are selected in such a way of configuring the CDM-4 group located in the $5^{th}$ and $6^{th}$ OFDM symbols of slot 0 as resource pool 1, the CDM-4 group located in the $2^{nd}$ and $3^{rd}$ OFDM symbols of slot 1 as resource pool 2, and the CDM-4 group located in the $5^{th}$ and $6^{th}$ OFDM symbols of slot 1 as resource pool 3, and binding the CDM-4 groups located in different resource pools into a CDM-8 group. For more details of the mapping method, see embodiment 2-3.

The specification-defined rule-based CDM-4 or CDM-8 mapping methods may be used along with the higher layer signaling-based CDM-4 or CDM-8 mapping methods of embodiment 2-4. For example, the eNB may apply the method of using a 1-bit indicator indicating the orthogonal code extension in the frequency or time direction to notify the user of one of two or three methods of this embodiment as the method for performing CDM-4 or CDM-8 mappings. For example, the eNB may transmits the 1-bit indicator to the UE in order for the UE to select one of the exemplary methods 1 and 2 proposed in this embodiment for CDM-4 or CDM-8 mapping. It may also be possible to instruct the UE to select one of the exemplary methods 1 and 3 proposed in this embodiment for CDM-4 or CDM-8 mapping in the same principle. It may also be possible for the eNB to transmit a 2-bit indicator to the UE in order for the UE to select one of the exemplary methods 1 to 3 proposed in this embodiment for CDM-4 or CDM-8 mapping.

Embodiment 2-6

This embodiment is directed to a CDM orthogonal code length configuration method for system adaptability enhancement. For example, it may be possible to indicate CDM-2/cdm-4 switching, CDM-4/CDM-8 switching, or CDM-2/CDM-8 switching via 1-bit L1 signaling (physical layer signaling) or higher layer signaling. As another example, it may be possible to consider indicating CDM-2/CDM-4/CDM-8 switching via 2-bit L1 signaling or higher layer signaling.

In embodiments 2-2 to 2-5, various exemplary method for configuring CSI-RS a CDM-4 pattern or a CDM-8 pattern by aggregating CSI-RS CDM-2 or CDM-4 patterns. In consideration of following situation, it may be necessary to use the legacy CDM-2 or CDM-4 patterns for 8 or more CSI-RSs transmission. In the legacy LTE-A or LTE-A Pro, a UE may simulate interference measurement by measuring CSI-RSs of other cells. In this case, if CDM-8 is applied to all CSI-RSs in a cell, the legacy UEs designed to operate based on the legacy CDM-2 or CDM-4 pattern cannot simulate interference measurement with the CSI-RSs of the corresponding cell. The same problem may arise when the UE generates and report CSI-RS RSRP. Accordingly, it is necessary for the eNB to apply CDM-2, CDM-4, and CDM-8 mapping patterns selectively even for transmitting 8 or more CSI-RSs and, for this purpose, a 1-bit or 2-bit indicator may be introduced.

For example, it is possible for the eNB to perform CDM-2/CDM-4 switching, CDM-4/CDM-8 switching, or CDM-2/CDM-8 switching and notifying the UE of the switching via 1-bit L1 signaling or higher layer signaling. As another example, it may be considered to indicate CDM-2/CDM-4/CDM-8 switching via 2-bit L1 signaling or higher layer signaling. Similarly, the eNB may notify the UE of a specific CDM mapping pattern configuration scheme using a 1-bit or 2-bit indicator being transmitted via higher layer (RRC) or L1 signaling.

Embodiment 2-7

As described in the above embodiments, it is possible to generate CDM-4 or CDM-8 patterns in conformance with various rules. It may also be possible to use one or more CDM patterns generation rules in one CSI-RS resource. That is, it may be possible to aggregate CDM patterns in part of multiple CSI-RS configurations belonging to one CSI-RS resource in an RRC configuration order (i.e., one CDM pattern is over multiple CSI-RS configurations) and, in another part of the CSI-RS configurations, to apply the CDM patterns only in the corresponding CSI-RS configurations (e.g., there can be two CDM-4 patterns or one CDM-8 pattern in one 8-port CSI-RS configuration).

For example, 2 4-port CSI-RS configurations including 2 CDM-2 pattern each include 8 different REs and may be used to designate total 2 CDM-4 patterns in the RRC configuration order of the CSI-RS configuration. In this case, it is possible to form a CDM-4 pattern by aggregating two REs designated by ports 15 and 16 of the first CSI-RS configuration and two REs designated by ports 15 and 16 of the second CSI-RS configuration. Also, it is possible to form another CDM-4 pattern by aggregating two REs designated by ports 17 and 18 of the first CSI-RS configuration and two REs designated by ports 17 and 18 of the second CSI-RS configuration. Here, it should be noted that the port numbers are the antenna port numbers before the CSI-RS aggregation and they may be changed after CSI-RS aggregation.

Figure 22:
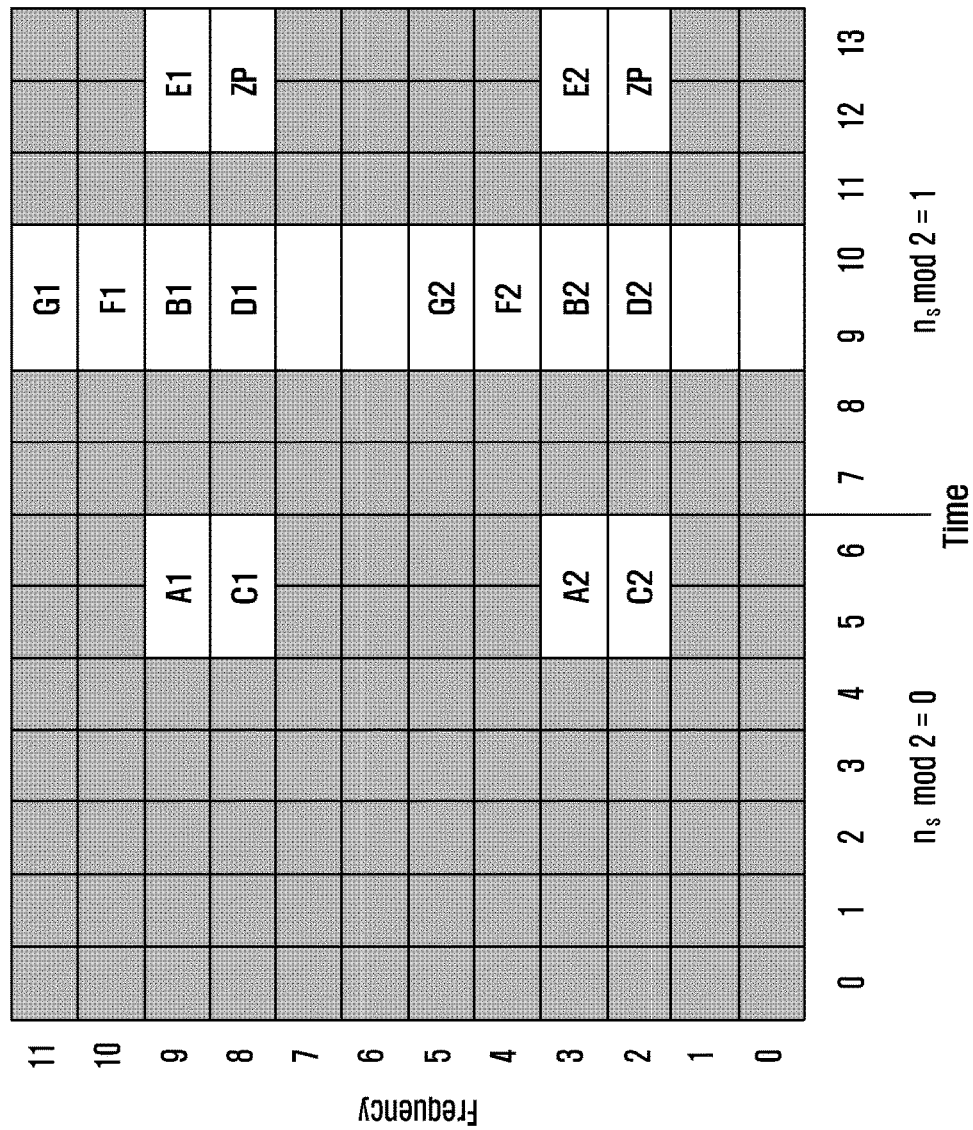
FIG. 22 is a diagram for explaining a method of configuring 7 4-port CSI-RS configurations for supporting 28 port CSI-RS resources.

The above description has been made by way of example and may be elaborated appropriately for various CSI-RS aggregation environments. FIG. 22 is a diagram for explaining a method of configuring 7 4-port CSI-RS configurations for supporting 28 port CSI-RS resources. In reference to FIG. 22, it may be possible to configure total 7 4-port CSI-RS configurations for supporting 28 port CSI-RS resources. Supposed that the 7 4-port CSI-RSs correspond to A, B, . . . , G in FIG. 11 Here, X1 and X2 represent the REs indicated by ports 15 and 16 and ports 17 and 18 of each CSI-RS configuration. Assuming that CDM-2-based CDM aggregation is supported between two adjacent CSI-RS configurations, the eNB assigns CSI-RS configuration subgroups {A, B} and {C, D} to 4 OFDM symbols as similar in FIG. 22 (OFDM symbols 5 and 6 of slot 0 and OFDM symbols 9 and 10 of slot 1 in FIG. 22) to configure 4 CDM-4 patterns {A1, B1}, {C1, D1}, {A2, B2}, and {C2, D2}. Through this, it is possible to achieve 6 dB CSI-RS power boosting in the corresponding resources. The eNB assigns CSI-RS configuration subgroup {E, F} to 4 OFDM symbols as similar in FIG. 22 (OFDM symbols 9 and 10 of slot 0 and OFDM symbols 12 and 13 of slot 1 in FIG. 22) to configure 2 CDM-4 patterns {E1, F1} and {E2, F2}. This aims to secure additional resources because the CSI-RS REs located in the OFDM symbols 5 and 6 of slot 0 have been already used in the example of FIG. 22. In this case, it may be possible to configure the REs marked by "ZP" in FIG. 22 may be configured as ZP CSI-RS for guaranteeing 6 dB CSI-RS power boosting for two CDM-4 patterns {E1, F1} and {E2, F2}. It may be possible to transmit the 4 remaining CSI-RS ports at the REs designated with G and agree that {G1, G2} is configured into one CDM-4 pattern. It should be noted that the CSI-RS configurations A to G and one ZP CSI-RS configuration in FIG. 22 are depicted by way of example and may be changed in adaptation to the situation.

Figure 23:
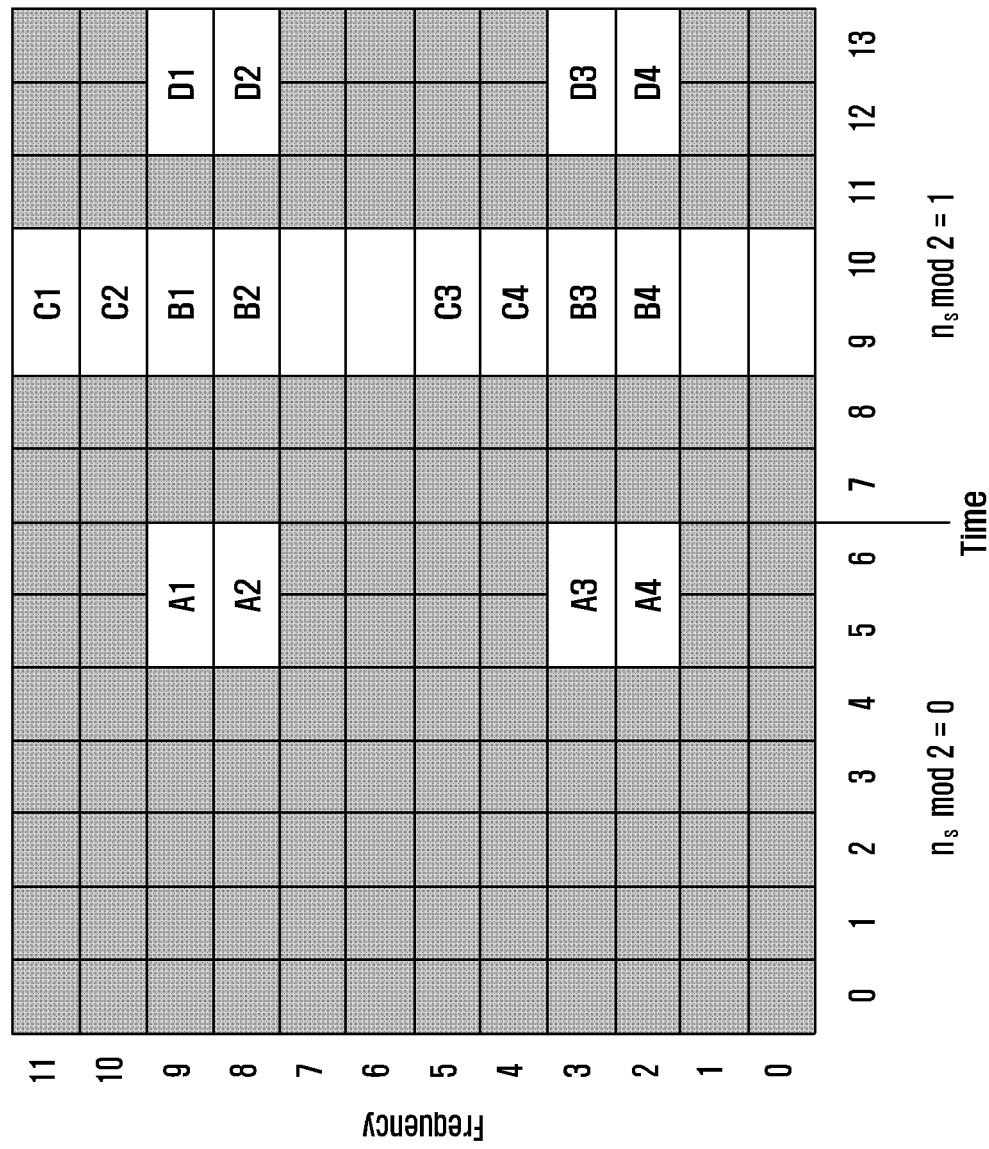
FIG. 23 is a diagram for explaining a method of configuring 4 8-port CSI-RS configurations for supporting 32 port CSI-RS resources.

In reference to FIG. 23 depicting another example, it may be possible to configure total 4 8-port CSI-RS configurations for supporting 32-port CSI-RS resources. Supposed that the 4 4-port CSI-RSs correspond to A, B, C, and D in FIG. 23. Here, X1, X2, X3, and X4 represent the REs indicated by ports {15, 16}, {19, 20}, {17, 18}, and {21, 22} of each CSI-RS configuration. Assuming that CDM-2-based CDM aggregation is supported between two adjacent CSI-RS configurations, the eNB assigns CSI-RS configuration {A, B, C, D} to 6 OFDM symbols appropriately as similar in FIG. 22 (assigning A to OFDM symbols 5 and 6 of slot 0, {B, C} to OFDM symbols 9 and 10 of slot 1, 1 and D to OFDM symbols 12 and 13 of slot 1 in FIG. 23) to configure 4 CDM-8 patterns {A1, B1, C1, D1}, {A2, B2, C2, D2}, {A3, B3, C3, D3}, and {A4, B4, C4, D4}. This aims to distribute the REs constituting individual CDM-8 patterns appropriately to perform 6 dB CSI-RS power boosting based on the OFDM symbols 5 and 6 of slot 0 or OFDM symbols 12 and 13 of slot 1 in which the number of available CSI-RS REs is small. The eNB may perform CSI-RS power boosting up to 6 dB for the 32 CSI-RS ports identically through the CDM-8 configuration as shown in FIG. 23. It should be noted that the 4 CSI-RS configurations A, B, C, and D in FIG. 23 are depicted by way of example and may be hanged in adaptation to the situation.

Embodiment 2-8

For non-precoded CSI-RS, it is possible to provide up to 32 CSI-RS ports for accurate channel estimation along with the adjustment of CSI-RS RE density in the frequency domain for CSI-RS transmission overhead. Here, the CSI-RS density may take one of three values, i.e., d={1, ½, ⅓} RE/RB/port. In the case of taking the CSI-RS RE density of Rel-13 (i.e., d=1 RE/RB/port), the CSI-RS ports are transmitted every PRB. If the CSI-RS RE density is reduced to half that of Rel-13 (i.e., ½ RE/RB/port), each of the CSI-RS configurations is assigned a comb-offset of 0 or 1. That is, the CSI-RS ports belonging to the CSI-RS configuration configured with d=½ RE/RB/port are transmitted in the $n^{th}$ PRB satisfying the comb-offset set to n mod 2 and, in this case, the comb-offset may be set to a different value per CSI-RS configuration. If the CSI-RS RE density is reduced to one third (i.e., d=⅓ RE/RB/port), each of the CSI-RS configuration is assigned a comb-offset of 0, 1, or 2. That is, if the CSI-RS ports belonging to the CSI-RS configuration configured with d=⅓ RE/RB/port are transmitted in the $n^{th}$ PRB satisfying the comb-offset set to n mod 3 and, in this case, the comb-offset may be set to a different value per CSI-RS configuration.

The above-described CSI-RS overhead reduction method may be applied along with the CDM aggregation. If the CSI-RS configurations used in one CDM pattern aggregation have different CSI-RS densities or comb-offset configuration values, this may cause ambiguity in CDM patterns and have a CDM pattern distributed over too wide time and frequency resources, resulting in channel estimation performance degradation. As a method for overcoming this problem, it may be agreed to configure the same CSI-RS RE density and comb-offset for all CSI-RS configurations in one CSI-RS resource when the CSI-RS RE density is less than 1 RE/RB/port. In this case, although the degree of freedom of CSI-RS configuration decreases, the high CSI-RS RE density improves the channel estimation performance of the CDM pattern. As an alternative method, it may be agreed to configure the same CSI-RS RE density and comb-offset for the CSI-RS configurations constituting one CDM pattern when the CSI-RS density is less than 1/RE/RB/port. In this case, although the degree of freedom of CSI-RS configuration increases, the channel estimation performance is degraded because the CSI-RS configurations that are not sharing one CDM pattern may have different comb-offsets.

Figure 24:
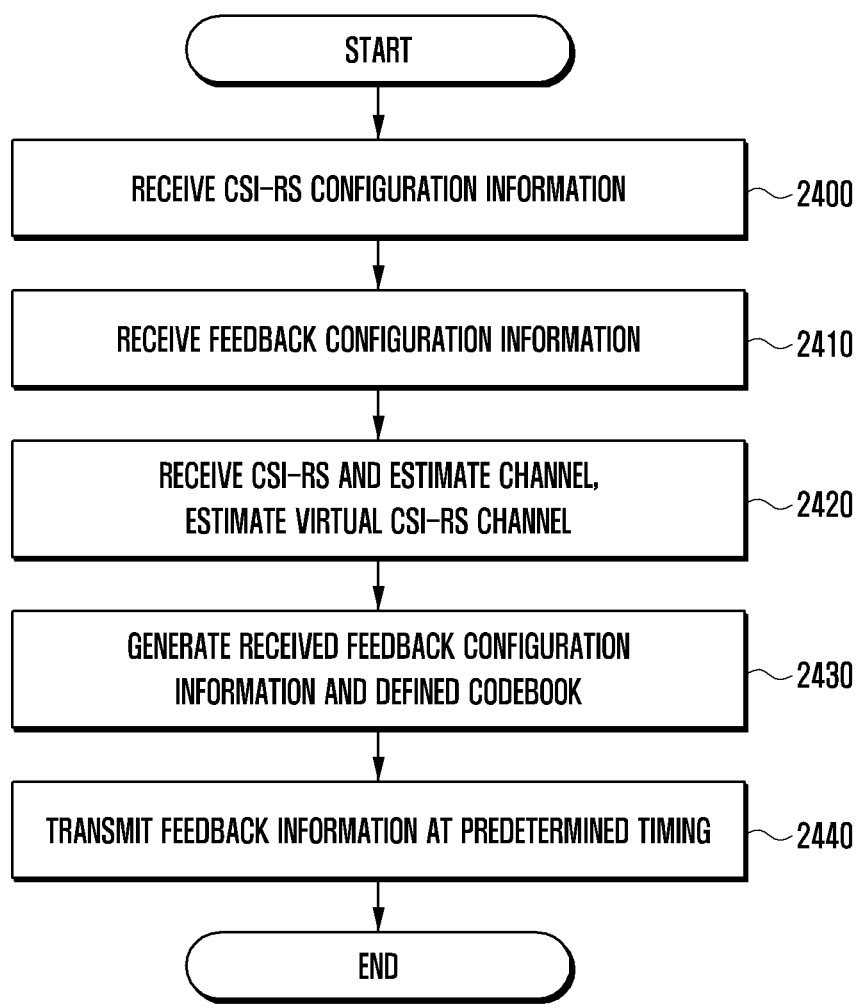
FIG. 24 is a flowchart illustrating a UE operation according to an embodiment of the present invention.

FIG. 24 is a flowchart illustrating a UE operation according to an embodiment of the present invention.

In reference to FIG. 24, the UE receives CSI-RS configuration information at step 2400. The UE may ascertain at least one of number of ports, transmission timings and resource locations, and transmit power per CSI-RS based on the received configuration information. Next, the UE receives feedback configuration information based on at least one CSI-RS at step 2410. The UE receives the CSI-RS and estimates channels between the transmit antennas of the eNB and the receive antennas of the UE based on the CSI-RS at step 2420. At step 2430, the UE generates an RI, PMI, and CQI as feedback information using the feedback configuration received through the estimated channel and a virtual channel added between CSI-RSs and a predefined codebook. At step 2440, the UE transmits the feedback information at the feedback timings determined according to the feedback configuration received from the eNB and ends the channel feedback generation and reporting procedure.

Figure 25:
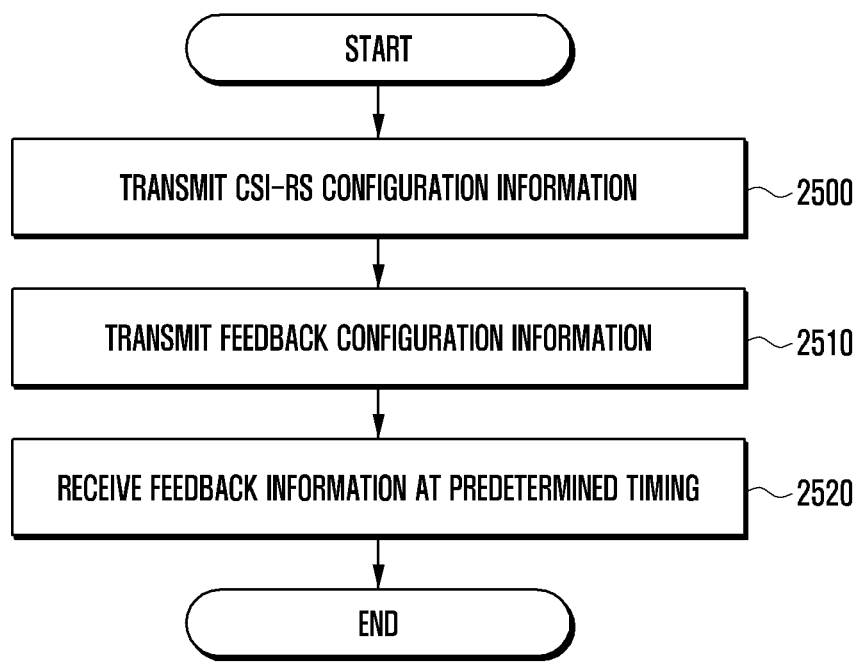
FIG. 25 is a flowchart illustrating an eNB operation according to an embodiment of the present invention.

FIG. 25 is a flowchart illustrating an eNB operation according to an embodiment of the present invention.

In reference to FIG. 25, the eNB transmits, at step 2500, CSI-RS configuration information for use in channel estimation. The configuration information may include at least one of number of ports, transmission timings and resource locations, and transmit power per CSI-RS. At step 2510, the eNB transmits at least one CSI-RS-based feedback configuration information to the UE. Next, the eNB transmits configured the CSI-RS to the UE. the UE estimates per-antenna port channels and then additional channels on virtual resources based on the estimated per-antenna port channels. The UE determines feedback information to transmit, generates corresponding PMI, RI, and CQI, and transmit the generated PMI, RI, and CQI to the eNB. At step 2520, the eNB receives the feedback information transmitted by the terminal at predetermined timings for use in determining channel state between the terminal and the eNB.

Figure 26:
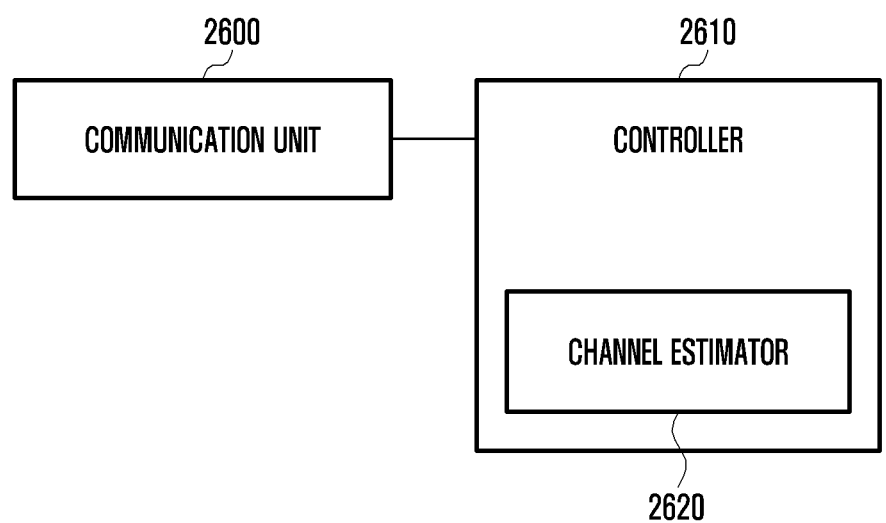
FIG. 26 is a block diagram illustrating a configuration of a UE according to an embodiment of the present invention.

FIG. 26 is a block diagram illustrating a configuration of a UE according to an embodiment of the present invention. In reference to FIG. 26, the UE includes a communication unit 2600 and a controller 2610. The communication unit 2600 is responsible for transmitting and receiving data to and from the outside (e.g., eNB). Here, the communication unit 2600 may transmit feedback information to the eNB under the control of the controller 2610. The controller 2610 controls states and operations of all components constituting the UE. In detail, the controller 2610 generates the feedback information based on the information received from the eNB. The controller 2600 also control the communication unit 2600 to transmit the channel information generated as the feedback information to the eNB at the timing assigned by the eNB. For this purpose, the controller 2610 may include a channel estimator 2620. The channel estimator 2620 generates the feedback information based on the CSI-RSs and feedback assignment information received from the eNB and estimates channel based on the CSI-RSs received based on the feedback assignment information.

Although FIG. 26 depicts that the UE includes the communication unit 2600 and the controller 2610 by way of example, the UE may further include other components necessary for other functions of the UE. For example, the UE may include a display for displaying operation status of the UE, an input unit for receiving a signal input by the user for executing a function, and a storage unit for storing data generated in the UE. Although it is depicted that the channel estimator 2620 is included in the controller 2610, the configuration of the UE is not limited thereto. The controller 2610 may control the communication unit 2600 to receive configuration information per reference signal resource. The controller 2610 may control the communication unit 2600 to measure the at least one reference signal and receive the feedback configuration information for use in generating the feedback information based on the measurement result.

The controller 2610 may measure the at least one reference signal via the communication unit 2600 and generate feedback information based on the feedback configuration information. The controller 2610 may control the communication unit 2600 to transmit the generated feedback information to the eNB at the feedback timings indicated in the feedback configuration information. The controller 2610 may receive the CSI-RS from the eNB, generate the feedback information based on the received CSI-RS, and transmit the generated feedback information to the eNB. The controller 2610 may select a precoding matrix per antenna port group of the eNB and an additional precoding matrix based on a relationship between the antenna port groups of the eNB.

The controller 2610 may receive a CSI-RS from the eNB, generate feedback information based on the received CSI-RS, and transmit the generated feedback information to the eNB. The controller 2610 may select a precoding matrix for all antenna groups of the eNB. The controller 2610 may receive feedback configuration information from the eNB, receive a CSI-RS from the eNB, generate feedback information based on the received feedback configuration information and CSI-RS, and transmit the generated feedback information to the eNB. The controller 2610 may receive additional feedback configuration information based on the feedback configuration information per antenna port group of the eNB and the relationship between the antenna port groups.

Figure 27:
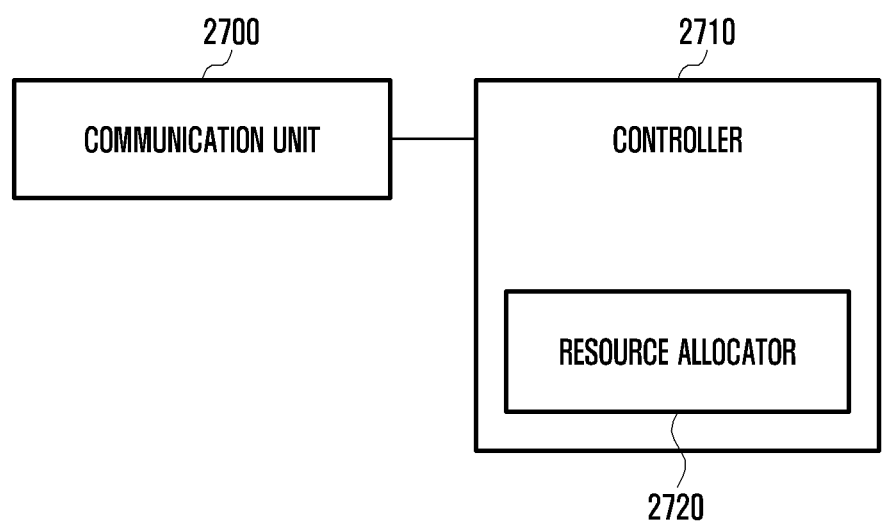
FIG. 27 is a block diagram illustrating a configuration of an eNB according to an embodiment of the present invention.

FIG. 27 is a block diagram illustrating a configuration of an eNB according to an embodiment of the present invention. In reference to FIG. 27, the eNB includes a controller 2710 and a communication unit 2700. The controller 2710 controls states and operations of all components constituting the eNB. In detail, the controller 2710 allocates CSI-RS resources for channel estimation at a UE and feedback resources and feedback timings to the UE. For this purpose, the controller 2710 may include a resource allocator 2720. The controller 2710 allocates feedback configuration and feedback timings such that the feedbacks from multiple UEs do not collide each other and receives and interprets the feedback information at the corresponding timing. The communication unit 2700 transmits data and reference signals to the UE and receives feedback information from the UE. The communication unit 2700 transmits the CSI-RS on the resources allocated under the control of the controller 2710 and receives channel status information feedback from the UE.

Although it is depicted that the resource allocator 2720 is included in the controller 2710, the configuration of the eNB is not limited thereto. The controller 2710 may control the communication unit 2700 to transmit configuration information per reference signal and generate at least one reference signal. The controller 2710 may control the communication unit 2700 to transmit feedback configuration information for use in generating feedback information based on measurement result to the UE. The controller 2710 may control the communication unit 2700 to transmit the at least one reference signal to the UE and receive the feedback information transmitted by the UE at the feedback timing indicated in the feedback configuration information. The controller 2710 may transmit the feedback configuration information to the UE, transmit the CSI-RS, and receive the feedback information generated based on the feedback configuration information and the CSI-RS from the UE. The controller 2710 may transmit the feedback configuration information per antenna port group and additional feedback configuration information generated based on the relationship between the antenna port groups. The controller may transmit a beamformed CSI-RS to the UE based on the feedback information and receive the feedback information generated based on the CSI-RS from the UE. According to the above-described embodiments of the present invention, the eNB may configure various numbers of CSI-RSs in adaptation to a number of its TXRUs and other communication conditions and configure various CSI-RS CDM patterns in consideration of CSI-RS power boosting. By configuring the UE to generate channel status information effectively according to the configuration information provided by the eNB, it is possible to reduce CQI mismatch and extra processing on the reported channel status information at the eNB.

Embodiment 3

The present invention relates to a method and apparatus for transmitting DL and UL scheduling information in a mobile communication operating in an unlicensed band or in a mobile communication system requiring a channel sensing or listen-before-talk operation and, in particular, to a method for a UE to receive the DL and UL scheduling information of one eNB or cell from one or more different eNBs or cells.

The mobile communication system has evolved to a high-speed, high-quality wireless packet data communication system capable of providing data and multimedia services beyond the early voice-oriented services. In order to meet the requirements for the high-speed high quality wireless packet data transmission services, many mobile communication standards such as high-speed downlink packet access (HSDPA), high speed uplink packet access (HSUPA), LTE, and LTE-A of the $3^{rd}$ generation partnership project (3GPP), high rate packet data (HRPD) of 3GPP2, and 801.16 of the Institute of Electrical and Electronics Engineers (IEEE) have been developed. In particular, LTE/LTE-A (hereinafter, collectively referred to as LTE) standards are still growing and evolving for improvement in system throughput and frequency utilization efficiency.

For example, LTE has adopted carrier aggregation (CA), which is capable of using multiple frequency bands to increase dramatically data rate and system throughput. Typically, an LTE system is operating in a frequency band licensed to a certain operator (licensed spectrum or licensed carrier). In the environment where the frequency resources for mobile communication services (e.g., frequency band below 5 GHz) are in use by other operators or communication systems, however, it is difficult for one operator to secure multiple licensed band frequencies. Thus, much research has focused on LTE over unlicensed band (unlicensed spectrum or unlicensed carrier) to handle the explosive increase in mobile data in a situation difficult to secure licensed band frequency resources (e.g., LTE in unlicensed (LTE-U) and licensed-assisted access (LAA)). The unlicensed bands are not constrained to a specific operator or system but may be shared by all available communication devices. In particular, a 5 GHz unlicensed band is still less occupied by communication devices in comparison with a 2.4 GHz unlicensed band, and it is relatively easy to secure extra frequency bands.

This makes it possible to consider performing LTE CA across licensed and unlicensed frequency bands. That is, it may be possible to implement the legacy LTE CA technique across licensed and unlicensed bands by configuring an LTE cell operating in the licensed band as a PCell (or Pcell) and an LTE cell (or LTE-U cell) operating in the unlicensed band as an SCell (or Scell). Although implementation of CA in an environment where licensed and unlicensed bands are connected through an ideal backhaul and in a dual connectivity environment where licensed and unlicensed bands are connected through a non-ideal backhaul can be considered, the following description is made under the assumption of an environment where licensed and unlicensed bands are connected through an ideal backhaul.

Figure 28:
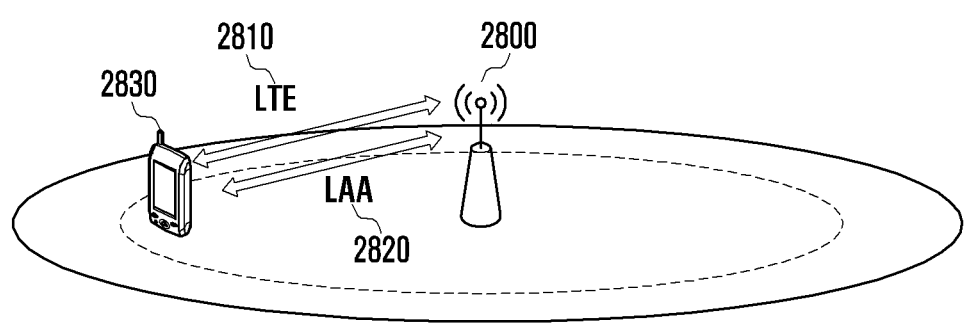
FIGS. 28 and 29 are diagrams illustrating communication systems to which the present invention is applied.
Figure 29:
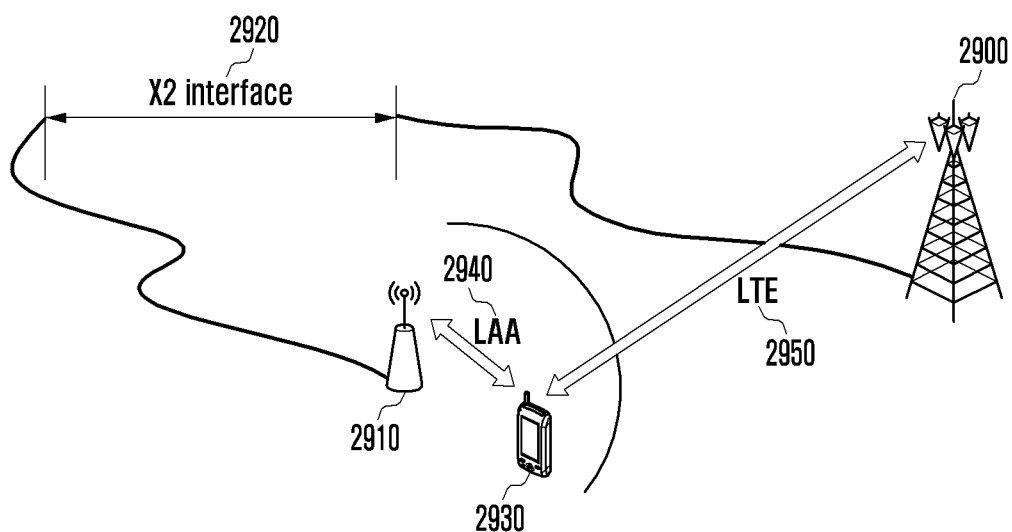

FIGS. 28 and 29 are diagrams illustrating communication systems to which the present invention is applied.

In reference to FIGS. 28 and 29, FIG. 18 depicts an exemplary system where a small base station 2800 supports an LTE cell 2810 and an LAA cell 2820 through which a terminal 2830 communicates data with the base station 2800. The LTE cell 2810 and the LAA cell 2820 are not limited to any duplex mode, and it is assumed that a cell operating in a licensed band for data communication is an LTE cell 2810 or PCell and a cell operating in an unlicensed band for data communication is an LAA cell 2820 or SCell. However, if the LTE cell 2810 is a PCell, it may be allowed that the uplink transmission is made to the LTE cell 2810.

FIG. 29 depicts an exemplary system where an LAA small base station 2910 is installed in a coverage area of an LTE macro base station 2900 for increasing a data rate and, in this case, the LTE and LAA base stations 2900 and 2910 are not limited to any duplex mode. The LTE macro base station 2900 may be replaced by an LTE small base station 2910. If the LTE base station corresponds to the PCell, it may be allowed that uplink transmission is made to the LTE base station 2900. Here, it is assumed that the LTE base station 2900 and the LAA base station 2910 are connected via a backhaul link. In this case, it is possible to guarantee fast communication between the base stations via X2 interface 2920; thus, the LAA base station 2910 can receive control information from the LTE base station 2900 in real time even when uplink transmission is allowed only to the LTE base station 2900. The methods proposed in the present invention can be applied to both the systems of FIGS. 28 and 29.

Typically, an LTE system adopts an orthogonal frequency division multiple access (OFDM) transmission scheme for data transmission. In the OFDM scheme, a modulation signal is mapped to a position in a 2-dimensional time-frequency resource grid. The resources on the time axis are divided into OFDM symbols that are orthogonal with each other. The resources on the frequency axis are divided into subcarriers that are orthogonal with each other. That is, it may be possible to indicate a smallest unit of resource by designating an OFDM symbol on the time axis and a subframe on the frequency axis, the smallest unit of resource being referred to as resource element (RE).

Since different REs are orthogonal, although the signals mapped to different REs experience frequency selective channels, it may be possible for a receiver to receive the signals without mutual interferences. FIG. 30 is a diagram illustrating DL radio resources of a LTE system. In the OFDM communication system, the downlink bandwidth is comprised of a plurality of resource blocks (RBs), and each physical resource block (PRB) consists of 12 subcarriers arranged on the time axis and 6 or 7 OFDM symbols on the time axis as shown in FIG. 30. On the time axis, a subframe consists of 2 slots, i.e., first slot and second slot, each spanning 0.5 msec, as shown in FIG. 2. It may be possible to configure radio resources as shown in FIG. 30 for transmitting different types of signals as follows:

1. Cell-specific Reference Signal (CRS): This is a reference signal broadcast periodically for use commonly by all UEs within one cell.
2. Demodulation Reference Signal (DMRS): This is a reference signal transmitted for a specific UE and used only for transmitting data to a corresponding UE. It may be possible to support up to 8 DMRS ports. In LTE/LTE-A, antenna ports 7 to 14 are allocated for DMRS and these ports maintain orthogonality with Code Division Multiplexing (CDM) or Frequency Division Multiplexing (FDM) to avoid interference with each other.
3. Physical Downlink Shared Channel (PDSCH): This is a downlink channel for use in transmitting traffic (or data) from an eNB to a UE using the REs to which no reference signal is mapped in the data region of FIG. 2.
4. Channel Status Information Reference Signal (CSI-RS): This is a reference signal transmitted for use by UEs within a cell in channel status measurement. It may be possible that multiple CSI-RSs are transmitted within a cell. In an LTE-A system, a CSI-RS may correspond to one, two, four, or eight antenna ports.
5. Other control channels (Physical Hybrid-ARQ Indicator Channel (PHICH), Physical Control Format Indicator Channel (PCFICH), and Physical Downlink Control Channel (PDCCH)): An eNB may provide a UE with control information for use in receiving data on PDSCH or transmit HARQ ACK/NACK corresponding to uplink data transmission.

The physical downlink control channel (PDCCH) being transmitted in the control channel region and the physical downlink shared channel (PDSCH) as a data channel are transmitted as separated in the time domain. This aims to receive and demodulate the control channel signal promptly. The PDCCH region is arranged across the entire downlink band, and one control channel is divided into small units of control channels dispersed in the entire downlink band. An enhanced PDCCH (EPDCCH) may be transmitted in the data region. The uplink is divided into a control channel (PUCCH) and a data channel (PUSCH), and the acknowledgement channel corresponding to a downlink data channel and other feedback information are transmitted on the control channel for the case where there is no data channel and on the data channel for the case where there is the data channel. In the following description, control information transmission on PDCCH may be interchangeably referred to as PDCCH transmission, and data transmission on PDSCH may be interchangeably referred to as PDSCH transmission.

In LTE communication, it may be possible to transmit at least one of control signal, channel, or data may be transmitted using part of SC-FDMA or OFDM symbols in a UL or DL subframe. For example, OFDM symbols 0 to k1 (k1<13) of 14 OFDM symbols (OFDM symbols 0, 1, 2, . . . , 13) constituting a subframe spanning 1 ms may be used for transmitting a control signal or channel or a data channel, or if OFDM symbols k to 13 (k1>0) may be used for transmitting a control signal or a data channel. In this case, the subframe composed of the symbols of which part are used for transmitting control signal or channel or data channel is referred to as partial subframe.

Exemplary embodiments of the present invention are described with reference to the accompanying drawings in detail. Detailed description of well-known functions and structures incorporated herein may be omitted to avoid obscuring the subject matter of the present invention. Further, the following terms are defined in consideration of the functionality in the present invention, and may vary according to the intention of a user or an operator, usage, etc. Therefore, the definition should be made on the basis of the overall content of the present specification.

Although the description is directed to a system transmitting/receiving signal in at least one unlicensed band in an LTE, LTE-A, or LTE-A Pro system by way of example, the present invention is applicable to other communication systems operating in both the licensed and unlicensed bands and systems operating in such a way of sensing the frequency band (measuring received signal strength) for use in transmitting the signal and performing signal transmission based on the sensing result. Although the description is made under the assumption that the cell operating in an unlicensed band is configured as a secondary cell (SCell) for convenience of explanation, the cell operating in the unlicensed band may be configured as a primary cell (PCell) or a primary secondary cell (PSCell). In the following description, a base station or cell operating in the unlicensed band for communication is interchangeably referred to as LAA SCell, LAA cell, LAA base station, base station, or cell in the same meaning, and a terminal operating in the unlicensed band for communication is interchangeably referred to as LAA terminal, LAA user equipment (UE), UE, and terminal in the same meaning.

Although the description is made under the assumption of a frequency aggregation (CA) environment in which at least one licensed band cell and at least one unlicensed band cells are connected through an ideal backhaul for convenience of explanation, the present invention is also applicable to a stand-alone environment including only the cells connected through a non-ideal backhaul and supporting dual connectivity or operating in the unlicensed band. Although the description is made under the assumption that an LAA terminal transmits a UL control signal or channel or UL data to an LAA cell in the unlicensed band, the present invention may also be applicable to the case where the LAA cell transmits a DL control signal or channel or DL data to an LAA terminal in the unlicensed band.

Typically, an unlicensed frequency band or channel is shared by a plurality of devices. At this time, the devices using the unlicensed band may be different system devices. In order to share the unlicensed band, the devices operating in the unlicensed band has to perform a channel sensing operation on the unlicensed band before starting unlicensed band communication and may perform unlicensed band communication or not according to the channel sensing result.

If it is possible to use the unlicensed band as a result of the channel sensing result, the device may occupy the unlicensed band continuously during a predefined or pre-configured maximum channel occupancy time (MCOT). Typically, the devices are operating in the unlicensed band as follows. If it wants to transmit a signal conveying data or a control signal, the device has to determine whether the unlicensed band or channel is occupied (in use) by other devices before starting signal transmission and may occupy or may not occupy the channel depending on the channel occupancy states of other devices thereon. Such an operation is referred to as listen-before-talk (LBT). That is, at least the transmitting devices, among the devices that want to perform communication in the unlicensed band, have to check whether the corresponding channel is preoccupied according to a predetermined or preconfigured method.

Here, the channel sensing time for determining whether the unlicensed band or channel is preoccupied may be predefined or configured by the transmitting device or a specific device or selected as an arbitrary value in a predetermined range. The channel sensing time may be set in proportion of the maximum channel occupancy time during which a device is capable of occupying the unlicensed band without another channel sensing operation. The channel sensing time may also configured for the channel sensing operation according to the maximum channel occupancy time. At this time, the channel sensing operation for checking whether the channel can be occupied may be configured differently depending on the unlicensed band frequency, area, and/or country regulation. For example, in the USA, the 5 Ghz frequency band is allowed to be used without any channel sensing operation with the exception of the radar detection operation.

A transmitting device that wants to use the unlicensed band senses the corresponding channel through a channel sensing operation (or LBT) to determine whether the channel is occupied by other devices and, if the channel is not preoccupied by any device, it occupies the channel to use. At this time, the device using an unlicensed band may predefine or configure the maximum channel occupancy time after the channel sensing operation. The maximum occupancy time may be predefined according to the regulation stipulated per frequency band and area and/or country regulation or configured by another device, e.g. eNB serving a terminal. For example, the maximum occupancy time for the 5 GHz band unlicensed spectrum is 4 ms in Japan.

A description is made of the channel occupancy method in an LAA cell for use of an unlicensed band in an LAA system hereinafter. In the case of performing the channel sensing operation for the corresponding unlicensed band during a fixed period (e.g., 25 us) in the LAA cell, if the signal strength of the signal received during the whole or part of the fixed channel sensing period is greater than a predefined threshold value, the LAA cell determines that the unlicensed band is occupied by at least one other device and thus does not attempt to use the unlicensed band. If the signal strength of the signal received during the whole or part of the fixed channel sensing period is less than a predefined threshold value, the LAA cell determines that the unlicensed band is idle and thus uses the unlicensed band during the maximum channel occupancy period predefined or configured.

In the case of performing the channel sensing operation for the corresponding unlicensed band during a variable period in the LAA cell, if the signal strength of the signal received during the whole or part of the variable channel sensing period is greater than a predefined threshold value, the LAA cell determines that the unlicensed band is occupied by at least one other device and thus does not attempt to use the unlicensed band. If the signal strength of the signal received during the whole or part of the variable channel sensing period is less than a predefined threshold value, the LAA cell determines that the unlicensed band is idle and thus uses the unlicensed band during the maximum channel occupancy period predefined or configured.

Here, the variable channel sensing period may be changed by selecting an arbitrary value in a contention window configured or managed by the LAA cell. For example, the transmitting device selects an arbitrary variable N from a channel contention period set selected based on at least one of the type of the signal to be transmitted in the LAA cell and the maximum channel occupancy period for occupying the unlicensed band in the LAA cell (e.g., arbitrary integer N from (0, 15) if the maximum initial contention period value is 15) and occupies the unlicensed band for transmitting the signal. Here, the contention period may be changed and initialized based on the acknowledgement (e.g., ACK/NACK transmitted by a terminal) corresponding to the data signal transmitted in the unlicensed band to reduce the probability of simultaneous use by other devices. For example, if 80% or more of the feedbacks corresponding to the data signals transmitted by all terminals in the earliest subframe during the maximum channel period in the unlicensed band are NACKs, the LAA cell initialize the contention window.

Figure 31:
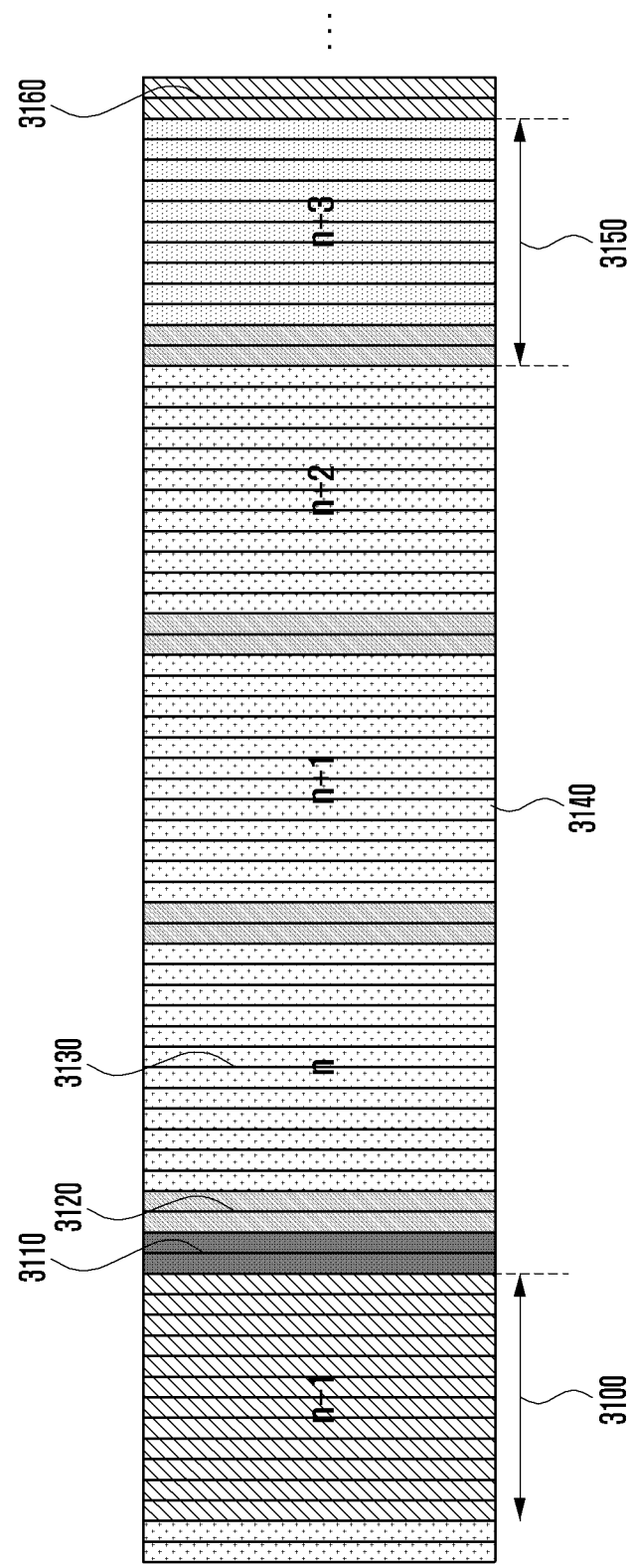
FIG. 31 is a diagram illustrating a downlink channel access scheme in an unlicensed band of a LAA system.

FIG. 31 is a diagram for explaining a LAA DL transmission operation.

A description is made of a normal DL transmission operation by way of example with reference to FIG. 31 hereinafter. An LAA cell that wants to transmit a DL signal in the unlicensed band performs channel sensing in the unlicensed band during a time period 3100 corresponding to the variable period selected in a preconfigured contention window. If it is determined that the unlicensed band is idle as a result of the channel sensing, the LAA cell may occupy the unlicensed band during the maximum channel occupancy period 3140. At this time, if the channel sensing operation stops before a subframe boundary or a slot boundary, the LAA cell may transmit a predetermined signal 3110 until the subframe boundary or slot boundary arrives to occupy the unlicensed band and transmit a normal LTE signal (e.g., control signal 3120 on PDCCH, data signal 3130 on PDSCH, and reference signal) at the start time point of a slot. At this time, the last subframe in the maximum channel occupancy period may be a partial subframe 3150.

Figure 32:
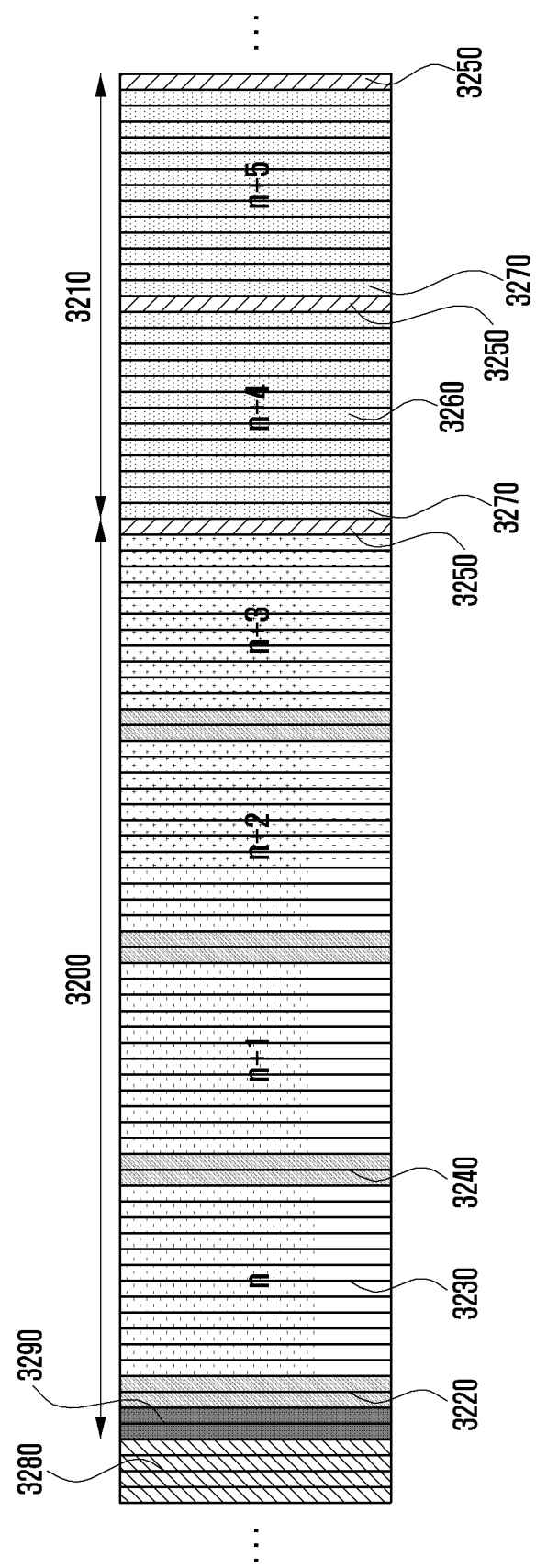
FIG. 32 is a diagram for explaining a normal LAA UL transmission operation.

FIG. 32 is a diagram for explaining a normal LAA UL transmission operation.

A description is made of a normal LAA UL transmission operation by way of example with reference to FIG. 32 hereinafter. An LAA terminal that wants to transmit a UL signal in the unlicensed band may receive UL transmission configuration information through a DL control channel 3220 at subframe n in the DL transmission period 3200 of the LAA cell and perform UL transmission 3260 at subframe n+4 configured for UL transmission based on the UL transmission configuration information. If the UL transmission of the LAA terminal is scheduled in the unlicensed band, it has to perform a channel sensing operation before starting the UL transmission 3260. The channel sensing operation of the LAA terminal may be performed in the same way as that of the LAA cell with or without change of variables (e.g., contention window size). The channel sensing operation of the LAA terminal may be performed during a period of at least one SC-FDMA symbol 3270 in the subframe in which the UL transmission is scheduled or at least one SC-FDMA symbol 3250 right before the configured UL subframe. The LAA terminal may perform the scheduled UL transmission or not on the basis of the channel sensing operation result.

In the LTE system, a UE may perform UL data transmission according to the configuration or instruction from an eNB. The signal transmission on the UL data channel (physically uplink shared channel (PUSCH)) of the UE is scheduled via the control information on the DL control channel (physical downlink control channel (PDCCH)) transmitted by the eNB, and the UE transmits the UL signal based on the timing relationship between the ul transmission configuration information reception timing (e.g., PDCCH reception timing) pre-agreed with the eNB and the configure UL signal transmission timing (e.g., PUSCH transmission timing). In the FDD system, if the eNB schedules the PUSCH transmission of the UE via the PDCCH at subframe n, the UE performs the PUSCH transmission at subframe n+K using the resources configured by the eNB. In the TDD system, the UE may perform the PUSCH transmission based on the timing relationship between the PDCCH reception timing and PUSCH transmission timing included in the UL transmission configuration information, which is pre-defined between the eNB and the UE. In the case of a system using a third type of frame structure different from those of FDD and TDD systems, it may be possible to reuse the timing relationship between the UL transmission configuration information reception timing and the UL signal transmission timing in use by the FDD or TDD system or define a timing relationship between the UL transmission configuration information reception timing and the UL signal transmission timing.

In the LTE system, the UE may transmit UL control information (UCI) including UCI type and eNB/UE configuration information to the eNB via at least one of a UL control channel (physical uplink control channel (PUCCH)) and PUSCH determined according to at least one criteria. Here, the UCI may include at least one of HARQ ACK, periodic channel station information (CSI), aperiodic CSI, and scheduling request (SR). For example, the UE may channel state to the eNB through the PUCCH at an interval configured through high layer signaling. If the eNB instructs, through the PDCCH, the UE to report CSI aperiodically, the UE may report measured CSI to the eNB through the PUSCH configured via the PDCCH.

This embodiment is directed to the case where the eNB and the UE are configured to transmit/receive signals through one or more cells operating in a licensed or unlicensed band, which includes the case where the eNB and the UE are capable of transmitting/receiving signals through one or more cells operating in the licensed band and the case where the eNB is capable of transmitting a signal through at least one cell operating in the unlicensed band and the UE is capable of receiving the signal through the at least one cell operating in the unlicensed band. In this embodiment, the description is made under the assumption that the UE is configured to transmit/receive a signal to/from the eNB through at least one cell, unless otherwise stated. Also, the description is made under the assumption that at least one cell operating in at least one licensed band and at least one cell operating in at least one unlicensed band cell are configured. The present invention is applicable to the case where the eNB and the UE operate in the unlicensed band without any licensed band.

In this embodiment, the description is made under the assumption that the cell or eNB and the UE operating in the licensed band are configured to operate in at least one of FDD (or with frame structure type 1) and TDD (or with frame structure type 2). Also, the description is made under the assumption that the cell or eNB and the UE operating in the unlicensed band are configured to operate with a third type of frame structure (frame structure type 3). The frame structure type 3 is designed in supportive of a channel sensing operation and allowing to configure all subframes constituting the frame as DL or UL subframes such that the DL and UL durations are changeable under the control of the eNB without departing from the tolerable range of the technology or standard.

The proposed method of the present invention is not limited to the disclosed embodiments but may be implemented in various different ways.

A UE configured to transmit/receive signal to/from at least one cell may receive the cell-specific DL and UL scheduling information from the respective cells or a representative cell. A detailed description thereof is made hereinafter with reference to FIG. 33.

Figure 33:
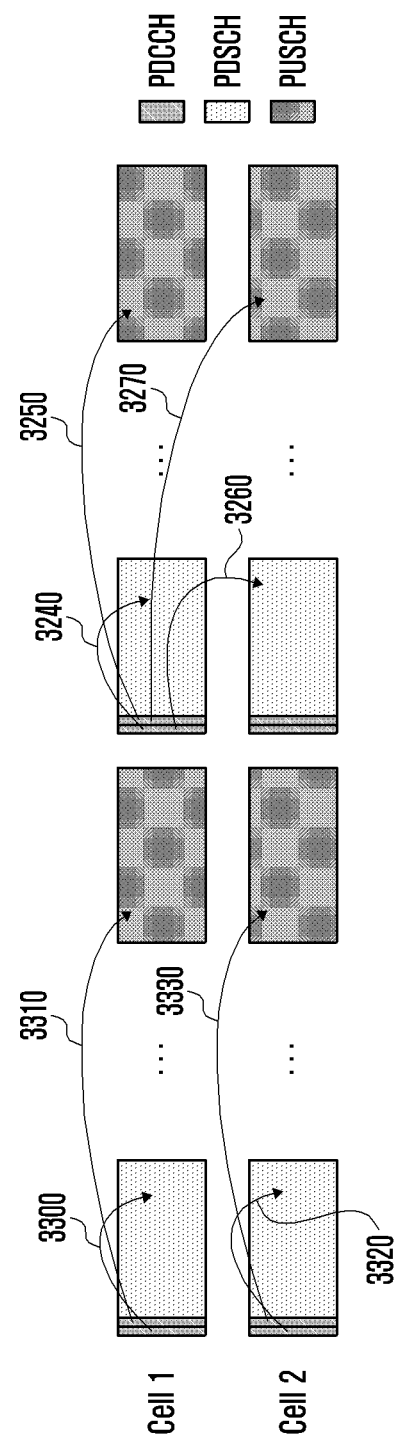
FIG. 33 is a diagram for explaining cell-specific DL and UL scheduling information for a case where DL and UL scheduling cells are identical with each other.

FIG. 33 is a diagram for explaining cell-specific DL and UL scheduling information for a case where DL and UL scheduling cells are identical with each other. FIG. 33 is depicted under the assumption that the UE is configured by the eNB to transmit UL signals and received DL signals through cell 1 and cell 2. The UE may receive UL and DL scheduling information of the configured cells (cell 1 and cell 2) through cell 1 and cell 2 respectively or, if the eNB configures a cell (hereinafter, referred to as scheduling cell) for transmitting the scheduling information associated with the cell 1 and cell 2, through the scheduling cell. That is, the UE may receive the cell-specific UL and DL scheduling information through one cell.

A detailed description thereof is made hereinafter. In this embodiment, the description is made under the assumption that cell 1 is the PCell and cell 2 is an SCell. The UE configured, by the eNB, to transmit and receive signals through cell 1 and an additional cell 2 may receive RRC configuration information specific to cell 2 from cell 1. If the configuration information specific to the scheduling cell (schedulingCellId) for use in transmitting scheduling information specific to cell 2 (e.g., CrossCarrierSchedulingConfig-r10 and CrossCarrierSchedulingConfig-r13) is not configured in the RRC configuration information specific to cell 2 or if cell 2 is the scheduling cell for transmitting the scheduling information specific to cell 2, the UE assumes that the UL and DL scheduling information specific to cell 2 is transmitted in the PDCCH region specific to cell 2 as denoted by 3220 and 3330. At this time, if carrier indication field (CIF) is configured, the CIF value may be included in the scheduling information being transmitted on the PDCCH, and the cell in use for the scheduled UL and DL transmissions is indicated via the scheduling information. If the scheduling cell in use for transmitting the scheduling information is identical with the cell in use for UL and DL transmissions scheduled via the scheduling information, this scheduling scheme is referred to as self-carrier scheduling (SCS) or self-scheduling. In the present invention, the term SCS is used to refer to such a scheduling scheme. That is, the SCS is used for scheduling in cell 2.

If no CIF value indicative of a cell is set, the UE assumes that the SCS is used in the corresponding cell. That is, if CIF is set to a value indicative of a cell, the UE assumes that the scheduling information specific to the cell is transmitted through the corresponding cell. In the case of the PCell, the UE assumes that the DL and UL scheduling information specific to the PCell is always transmitted in the PDCCH region of the PCell as denoted by reference number 3300 and 3310 without any explicit configuration.

At a UE configured, by the eNB, to transmit/receive signals through cell 1 and an additional cell 2, if the RRC configuration information specific to cell 2 which is received through cell 1 includes configuration information specific to the scheduling cell (schedulingCellID) for transmitting the scheduling information specific to cell 2 (e.g., CrossCarrierSchedulingConfig-r10 and CrossCarrierSchedulingConfig-r13) or the CIF set to a value indicative of cell 2 for transmitting the scheduling information through a different cell, the UE assumes that the DL and UL scheduling information specific to cell 2 is transmitted in the PDCCH region of cell 2 as denoted by reference numbers 3260 and 3270. If the cell in use for transmitting the scheduling information is different from the cell in use for UL and DL transmissions scheduled via the scheduling information, this scheduling is referred to as cross-carrier scheduling (CCS). In the present invention, the term CCS is used to refer to such a scheduling scheme. That is, the CCS is used for cell 2, which is scheduled by cell 1 as the scheduling cell (scheduling CellID).

If the CIF is set to a value indicative of a cell, the UE assumes that the scheduling information specific to the corresponding cell is transmitted through a different cell and, in this case, the information on the scheduling cell may be configured by the eNB. In the case of the PCell, the UE assumes that the DL and UL scheduling information specific to the PCell is always transmitted in the PDCCH region of the PCell as denoted by reference numbers 3240 and 3250 without any explicit configuration.

According to the above-described scheduling scheme, the UE may always receive the UL and DL scheduling information specific to one cell from one cell. In the case where the number of DL subframes is less than the UL subframes among available subframes, part of the UL subframes may not be scheduled in conformance of the above scheduling scheme (e.g., SCS). For example, the UL subframes available for the scheduling scheme (SCS) scheme in the eNB or cell which wants to schedule multiple UL transmissions after two DL subframes n and n+1 are just two, i.e., n+K and n+K+1. Here, K is set to a value equal to or greater than 4, which may be predefined between the eNB and the UE, or the eNB may configure and transmit K to the UE.

If it wants to use subframe n+K+2 as a UL subframe, the eNB or cell may schedule the UL subframe in the CCS scheme rather than the SCS scheme. However, since the CCS scheme requires transmitting scheduling information specific to one or more cells, if a large number of cells use the CCS scheme, the control channel resources available for a specific cell or scheduling cell (PDCCH resources, cell-specific search space, UE-specific search space) may become insufficient.

Accordingly, it is necessary to make it possible for the UE to receive the UL and DL scheduling information specific to one cell through more than one cell. For example, the UE may receive the DL scheduling information specific to cell 2 through cell 2 and the UL scheduling information specific to cell 2 through cell 1. For this operation, the eNB or cell has to distinguish between the cell for the DL scheduling information transmission and the cell for UL scheduling information transmission, and the eNB may uses CrossCarrierSchedulingConfig in the RRC configuration information specific to cell 2 for such distinction. A detailed description thereof is made hereinafter with reference to FIG. 34.

Figure 34:
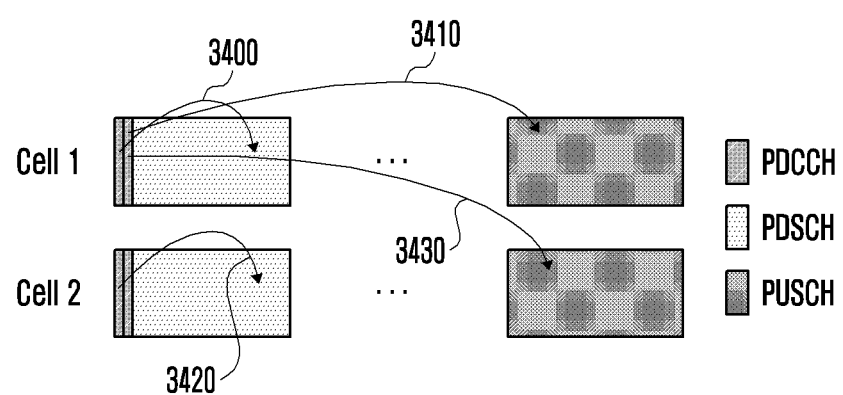
FIG. 34 is a flowchart illustrating a method for scheduling DL and UL transmissions using different DL and UL scheduling cells.

FIG. 34 is a flowchart illustrating a method for scheduling DL and UL transmissions using different DL and UL scheduling cells. If, at a UE configured to transmit/receive signals through cell 1 and an additional cell 2, the RRC configuration information specific to cell 2 which is received through cell 1 includes configuration information specific to the scheduling cell (schedulingCellID) for transmitting the scheduling information specific to cell 2 (e.g., CrossCarrierSchedulingConfig-r10 and CrossCarrierSchedulingConfig-r13) or the CIF set to a value indicative of cell 2 for transmitting the scheduling information through a different cell, the eNB may configure to the UE to transmit the DL scheduling information specific to cell 2 and the UL scheduling information specific to cell 2 through different cells. For example, the eNB may make a configuration for transmitting to the UE the DL scheduling information specific to cell 2 in the PDCCH region of cell 2 as denoted by reference number 3420 and the UL scheduling information specific to cell 2 in the PDCCH region of cell 1 as denoted by reference number 3430. In this embodiment, the description is made of the assumption that the DL scheduling information is transmitted in the SCS scheme and the Ul scheduling information is transmitted in the CCS scheme. That is, the description is made under the assumption that the cell for the DL scheduling information transmission is identical with the cell for the data channel transmission while the cell for the UL scheduling information transmission is different from the cell for the UL control channel or data channel transmission. However, the proposed method of the present invention is applicable to the case where the DL scheduling information is transmitted in the CCS scheme and the UL scheduling information is transmitted in the SCS scheme without departing from the scope of the present invention.

A description is made of the method for an eNB to configure a DL scheduling information transmission cell and a UL scheduling information transmission cell separately.

In the first method, if it is necessary to distinguish between the DL and UL scheduling information transmission cells, the eNB or cell notifies the UE of the DL and UL scheduling information transmission cells via CrossCarrierSchedulingConfig as shown in table 4. For example, it may be possible to add newly defined messages indicative of the DL and UL scheduling information transmission cells such as DLschedulingCellId and ULschedulingCellId such that the UE is capable of the distinguishing between the DL and UL scheduling information transmission cells based on these messages.

TABLE 4

```
CrossCarrierSchedulingConfig-r14 ::=     SEQUENCE {
    schedulingCellInfo-r14               CHOICE {
        own-r14                          SEQUENCE {            -- No cross carrier
scheduling
            cif-Presence-r14                 BOOLEAN
        },
        other-r14                        SEQUENCE {            -- Cross carrier scheduling
            DLschedulingCellId-r14           ServCellIndexFull-r13,
            ULschedulingCellId-r14           ServCellIndexFull-r13,
            pdsch-Start-r14                  INTEGER (1..4),
            cif-InDLSchedulingCell-r14           INTEGER (1..7)
            cif-InULSchedulingCell-r14           INTEGER (1..7)
        }
    }
}
```

That is, under the assumption that the UL scheduling information is transmitted through the cell indicated by the ULschedulingCellId included in the CrossCarrierSchedulingConfig, the UE receives the UL scheduling information on the PDCCH of the UL scheduling information transmission cell indicated by the ULschedulingCellId. Also, under the assumption that the DL scheduling information is transmitted through the cell indicated by the DLschedulingCellId included in the CrossCarrierSchedulingConfig, the UE receives the DL scheduling information on the PDCCH of the UL scheduling information transmission cell.

In the case where the cell for transmitting the DL scheduling information and the cell for transmitting the DL control and data channels are identical with each other (SCS scheduling scheme), the pdcch-Start information for the cell is not included in the CrossCarrierSchedulingConfig information and the UE may make a PDCCH start timing determination based on the control information being received a physical control format indicator channel (PCFICH) for the cell (PDFICH information). The UE may also determine the PDCCH transmission symbol or PDSCH transmission start symbol of the cell based on the configured pdcch-Start information without receipt of the PCFICH information. If it obtains both the pdcch-Start information and PCFICH information, the UE may determine the PDCCH transmission symbol or PDCCH transmission start symbol based on the PCFICH information.

In the second method, if it is necessary to distinguish between the DL and UL scheduling information transmission cells, the eNB or cell notifies the UE of only the UL scheduling information transmission cell using the CrossCarrierSchedulingConfig as shown in table 5 under the assumption that the cell for transmitting the DL scheduling information is identical with the cell for transmitting the DL control channel and data channel (i.e., SCS scheme).

In this case, because the DL scheduling information transmission cell is identical with the DL control and data channel transmission cell, the pdcch-Start information is not included in the CrossCarrierSchedulingConfig information, and the UE may determine the PDCCH transmission symbol or PDSCH transmission start symbol based on the PCFICH information of the corresponding cell. the UE may also determine the PDCCH transmission symbol or PDSCH transmission start symbol based on the configured pdcch-Start information without receipt of the PCFICH information of the cell. If it obtains both the pdcch-Start information and PCFICH information, the UE may determine the PDCCH transmission symbol or PDCCH transmission start symbol based on the PCFICH information.

If the UL scheduling information transmission configuration information is received, the UE receives the DL scheduling information on the PDCCH of the cell identical with the cell in which the DL signal is received and the UL scheduling information on the PDCCH of the UL scheduling information transmission cell configured via the CrossCarrierSchedulingConfig.

In the third method, if it is necessary to distinguish between the DL and UL scheduling information transmission cells, the eNB may notify the UE of the DL and UL scheduling information transmission cells via CrossCarrierSchedulingConfig as shown in table 6. For example, if a new message for distinction between the DL and UL scheduling information transmission cells such as DLULschedulingCellDiff field is added and set to 'true', the UE may receive, under the assumption that the ul scheduling information is transmitted through the cell indicated by schedulingCellID included in the CrossCarrierSchedulingConfig, the UL scheduling information on the PDCCH of the UL scheduling information transmission cell. The UE may receive the DL scheduling information on the PDCCH of the same cell through which the DL signal is received (i.e., in SCS scheme).

TABLE 5

```
CrossCarrierSchedulingConfig-r14 ::=    SEQUENCE {
    schedulingCellInfo-r14              CHOICE {
        own-r13                         SEQUENCE {        -- No cross carrier
scheduling
            cif-Presence-r14                BOOLEAN
        },
        other-r14                       SEQUENCE {        -- Cross carrier scheduling
            ULschedulingCellId-r14          ServCellIndexFull-r14,
            pdsch-Start-r14                 INTEGER (1..4),
            cif-InSchedulingCell-r13        INTEGER (1..7)
        }
    }
}
```

TABLE 6

```
CrossCarrierSchedulingConfig-r14 ::=    SEQUENCE {
    schedulingCellInfo-r14              CHOICE {
        own-r14                         SEQUENCE {        -- No cross carrier
scheduling
            cif-Presence-r14                BOOLEAN
        },
        other-r14                       SEQUENCE {        -- Cross carrier scheduling
            schedulingCellId-r14            ServCellIndexFull-r13,
            pdsch-Start-r14                 INTEGER (1..4),
            DLULschedulingCellDiff          ENUMERATED {true}
            cif-InSchedulingCell-r14        INTEGER (1..7)
        }
    }
}
```

In the case where the DL scheduling information transmission cell is identical with the DL control and data channel transmission cell (or if DLULschedulingCellDiff is set to 'true' or scheduling is performed in the SCS scheme), no DL transmission is performed in the UL scheduling information transmission cell such that the CrossCarrierSchedulingConfig information may not include the pdcch-Start information for the corresponding cell. The UE may receive the PCFICH information for the cell to determine the PDCCH transmission symbol or PDSCH start timing. It may also be possible for the UE to determine the PDCCH transmission symbol and PDSCH transmission start symbol of the cell based on the configured pdcch-Start information without receipt of the PCFICH information of the cell. If it obtains both the pdcch-Start information and PCFICH information, the UE may determine the PDCCH transmission symbol or PDCCH transmission start symbol based on the PCFICH information.

If the DL scheduling information transmission cell differs from the DL control and data channel transmission cell (or DLULschedulingCellDiff is set to 'false' or scheduling is performed in the CCS scheme), the pdcch-Start information for DL scheduling information transmission cell may be included in the CrossCarrierSchedulingConfig information.

If the eNB configure different cells for transmitting the DL and UL scheduling information transmissions to the UE using at least one of the above described methods, the UE may configure the PDCCH region and search space in which the DL scheduling information and the UL scheduling information are transmitted per cell.

For example, in the case where the DL scheduling information transmission cell is identical with the UL scheduling information transmission cell, if the scheduling information transmission cells are different from the cell through which the UE transmits and receives signals (i.e., if both the UL and DL scheduling informations specific to cell 2 are transmitted through cell 1 in the CCS scheme as denoted by reference numbers 3260 and 3270), the PDCCH region available for transmission of the scheduling information (search space) specific to cell 2 may be configured as part of the PDSCH region of cell 1. It is also possible that the search space available for transmission of the scheduling information specific to cell 1 is configured as part of the PDCCH region of cell 1 but to be different from the search space for cell 2. It may be possible that the search spaces for cell 1 and cell 2 are configured to be overlapped.

Accordingly, in the case where the eNB configures different cells for the DL and UL scheduling information transmissions, there is a need of defining the search spaces for the respective scheduling information transmission cells. If the eNB configures the dl scheduling information transmission cell and the UL scheduling information transmission cell to the UE separately or if the CIF indicative of the scheduling cells is configured by the eNB, the UE may calculate the search spaces for the specific scheduling cells based on the CIF value. The search space per scheduling cell is determined by Formula 7:

$$L\{(Y_k + m') \bmod (\text{floor}(\frac{N_{CCE,k}}{L}))\} + i \quad \text{[Formula 7]}$$

Here, L denotes an aggregation level of {1, 2, 4, 8} for PDCCH. $Y_k = (AY_{k-1}) \bmod(D)$ where $Y_{-1} = n_{RNTI}$, $A=39827$, $D=65537$, and $k=\text{floor}(n_s/2)$, and $n_s$ denotes a slot index of 0 to 19. $n_{RNTI}$ denotes a unique identifier of the corresponding control channel. $m' = m + M^{(L)} n_{CI}$, and $n_{CI}$ denotes CIF value, and $M^{(L)}$ denotes the number of PDCCH candidates per aggregation level. For example, $M^{(1)}=6$ $M^{(2)}=6$ $M^{(4)}=2$ $M^{(8)}=2$ for a UE-specific search space.

In the case where no CIF is configured, m' is equal to m.

Accordingly, if the CIF values for the DL and UL scheduling information transmission cells are received from the eNB according to the first method, the UE may calculate the search spaces for use in the respective scheduling cells based on the CIF values using the above formula and perform decoding PDCCHs in the corresponding search spaces to determine whether the DL and UL scheduling information is transmitted to the UE. In the case where the DL scheduling transmission cell is identical with the UL control channel and data transmission cell, it may be possible, although the CIF values are configured, to calculate the search space for use in the DL scheduling information transmission cell under the assumption of the use of the SCS scheme (i.e., m'=m).

If the CIF value for one of the DL and UL scheduling information transmission cells is received from the eNB according to the second method, the UE may calculate the search space in the cell for which the CIF value is received using the CIF value and the search space calculation formula. In this case, the UE calculates the search space for use in the cell for which no CIF value is configured under the assumption that the $n_{CI}$ is 0 (i.e., m'=m) in the search calculation formula. That is, although the CIF for the cell (e.g., cell 2 in FIG. 33) is configured, the UE is capable of calculating the search spaces for sue in the respective cells under the assumption that the CIF value is applied to one of the DL and UL scheduling cells and no CIF is configured for the scheduling cell to which the CIF value is not applied. It may also be possible to calculate the search space for use in the cell for which no CIF value is configured among the DL and UL scheduling information transmission cells under the assumption that the same CIF (e.g., $n_{CI}$) for the other cell is configured (i.e., $m'=m+M^{(L)}n_{CI}$). That is, it is possible to calculate the search spaces for use in the cells under the assumption that the same CIF is used without distinction between the DL and UL scheduling cells.

A description is made of the case where a message for notifying that the UL and DL scheduling cells are configured separately is configured and set to 'true' when the CIF value for one (e.g., UL scheduling information transmission cell) of the DL and UL scheduling information transmission cells or the CIF value for use without distinction between the DL and UL scheduling information transmission cells is received from the eNB according to the third method. In this case, the UE may assume that the CIF is configured for a predetermined scheduling cell (UL or DL scheduling cell) of the DL and UL scheduling information transmission cells and calculates the search space for use in the predetermined cell using the CIF and the search space calculation formula. At this time, the UE may calculate the search space for the other cell under the assumption that no CIF is configured for the other cell and $n_{CI}$ is 0 (i.e., m'=m) in the search space calculation formula. That is, the UE may calculate the search space for use in the cells under the assumption that the CIF value, although the CIF is configured for the cell (e.g., cell 2 in FIG. 33), is applied for one of the DL and UL scheduling cells and no CIF value is configured for the cell for which the CIF value is not applied. It may also be possible to calculate the search space for use in the cell for which no CIF value is configured between the DL and UL scheduling information transmission cells using the configured CIF value (i.e., $m'=m+M^{(L)}n_{CI}$). That is, the UE may calculate the search spaces for use in the DL and UL scheduling cells under the assumption that the CIF is configured for use without distinction between the DL and UL scheduling cells.

If the eNB configures the DL and UL scheduling information transmission cells differently in order for the UE to calculate the search spaces for the respective scheduling information transmission cells as described above, this may increase the number of blind decoding attempts for the UE to receive the scheduling information in comparison with the case where the DL and UL scheduling information transmission cells are identical with each other. There is therefore a need of a method for reducing the number of blind decoding attempts.

In the case where the eNB configures the DL and UL scheduling information transmission cells differently in order for the UE to calculate the search spaces for the respective scheduling information transmission cells, the UE may perform blind decoding just on the scheduling information or downlink control information (DCI) format associated with the DL scheduling information transmission in the DL scheduling information transmission cell and just on the scheduling information or DCI format associated with the UL scheduling information transmission in the UL scheduling information transmission cell. That is, the UE may perform blind decoding for the DCI formats with the exception of the DCI format (e.g., DCI format 4) in use for UL scheduling information transmission in the search space configured for the DL scheduling information transmission cell. For this operation, the eNB may configure a new higher layer signaling field such as skipMonitoringDCI-format4 and set the field to 'true' to instruct the UE to skip blind decoding for the DCI format (e.g., DCI format 4) in use for UL scheduling information transmission in the corresponding scheduling cell.

The UE may perform blind decoding for the DCI formats (e.g., DCI format 1, 1A, 1B, 1C, 1D, 2, 2A, 2C, and 2D) in use for DL scheduling information transmission in the search space configured for the UL scheduling information transmission cell. For this purpose, the eNB may further configure a higher layer signaling field, such as skipMonitoringDCI-format1x, skipMonitoringDCI-format2x, and skipMonitoringDCI-format1x-2x, for the cell and set the corresponding field to 'true' to instruct the UE to skip blind decoding for the DCI format (e.g., DCI formats 1, 1A, 1B, 1C, 1D, 2, 2A, 2C, and 2D) in use for DL scheduling information transmission in the corresponding scheduling cell. At this time, it may be possible to perform blind decoding for DCI formats 0 and 1A at one time because the DCI format in use for UL scheduling information transmission and DCI format 1A in use for DL scheduling information transmission has the same DCI format size. Accordingly, it may be possible to configure such that the eNB and UE skip blind decoding for the DCI formats 0 and 1A in the search space configured for at least the DL scheduling information transmission cell. For example, the eNB may further configure a higher layer signaling field such as skipMonitoringDCI-format0-1A and set the field to 'true' to instruct the UE to skip blind decoding for DCI formats 0 and 1A in the corresponding scheduling cell.

Figure 35:
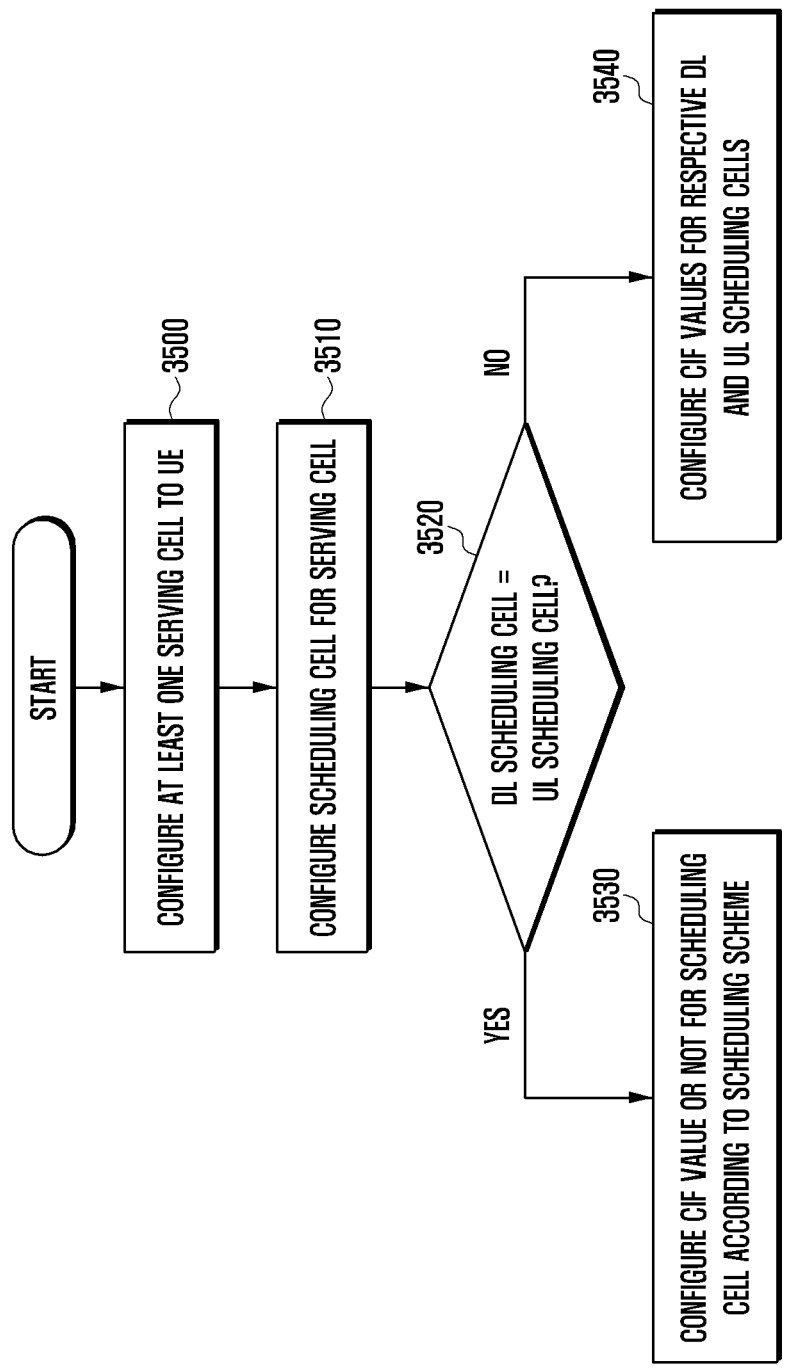
FIG. 35 is a flowchart illustrating an eNB operation according to an embodiment of the present invention.

FIG. 35 is a flowchart illustrating an eNB operation according to an embodiment of the present invention. At step 3500, the eNB may configure at least one serving cell to the UE according to eNB and UE capabilities. The at least one serving cells may include a cell operating in an unlicensed band and a cell operating in a licensed cell according to the eNB and UE capabilities, and the number of configurable cells may be determined according to the eNB and UE capabilities. At step 3510, the eNB may configure a cell for scheduling information specific to the configured serving cell. Here, the eNB may configure the serving cell to the UE in the SCS or CCS scheme. If the CCS scheme is used, the eNB may configure a cell index of the scheduling information transmission cell and CIF information to the UE. The cells for transmitting the DL scheduling information and UL scheduling information specific to the serving cell may be identical with or different from each other.

If it is determined at step 3520 that cells that transmit the DL and UL scheduling information are identical with each other, the eNB may determine the search space for use in the scheduling cell at step 3530 according to the scheduling scheme pre-agreed with the UE and transmit PDCCH carrying the DL and UL scheduling information specific to the serving cell in the corresponding search space. If it is determined at step 2530 that the DL and UL scheduling information transmission cells are different from each other, the eNB may determine the search spaces for use in the respective scheduling cells at step 3540 according to the scheduling scheme pre-agreed with the UE and transmit PDCCHs carrying the DL and UL scheduling information specific to the serving cell in the respective search spaces.

Figure 36:
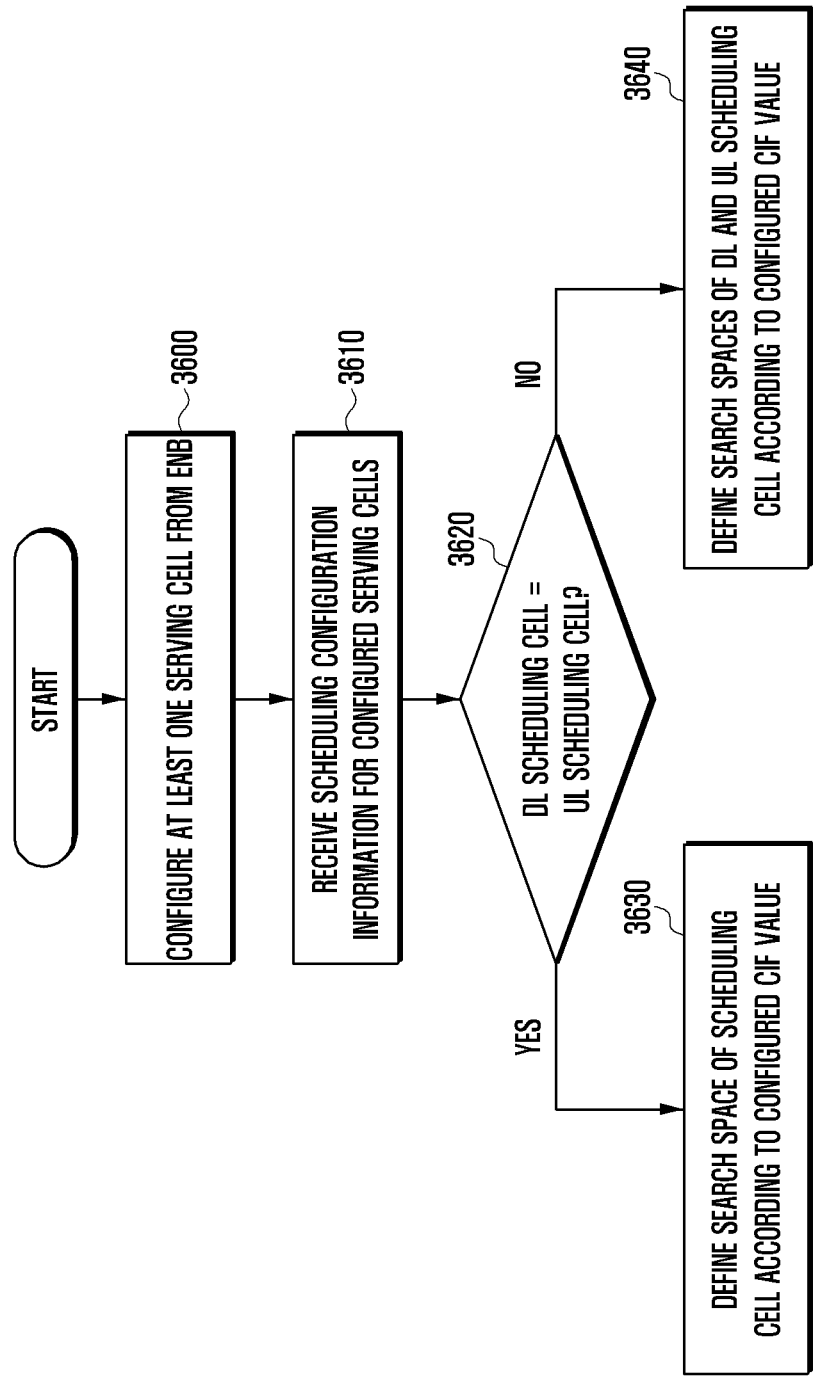
FIG. 36 is a flowchart illustrating a UE operation according to an embodiment of the present invention.

FIG. 36 is a flowchart illustrating a UE operation according to an embodiment of the present invention. At step 3600, the UE may configure at least one serving cell based on the configuration information from the eNB according to eNB and UE capabilities. The at least one serving cells may include a cell operating in an unlicensed band and a cell operating in a licensed cell according to the eNB and UE capabilities, and the number of configurable cells may be determined according to the eNB and UE capabilities. At step 3610, the UE may receive the information on the cell for transmitting scheduling information specific to the configured serving cell from the eNB. Here, the UE may determine whether the scheduling scheme configured for the serving cell is SCS or CCS. In the case where the CCS scheme is configured for the serving cell, the UE may receive the cell index of the scheduling information transmission cell and CIF information. The UE may determine whether the cells for transmitting the DL and UL scheduling informations specific to the serving cell are identical with or different from each other.

If it is determined at step 3620 that the DL and UL scheduling information transmission cells are identical with each other, the UE may determine the search space for use in the scheduling cell at step 3630 according to the scheduling scheme pre-agreed with the eNB and perform PDCCH monitoring in the corresponding search space to receive the DL and UL scheduling information specific to the serving cell. If it is determined at step 3620 that the DL and UL scheduling information transmission cells are different from each other, the UE may determine the search spaces for use in the respective scheduling cells at step 3640 according to the scheduling scheme pre-agreed with the UE and perform PDCCH monitoring in the corresponding search spaces for the respective scheduling cells to receive the DL and UL scheduling information specific to the serving cell, respectively.

Figure 37:
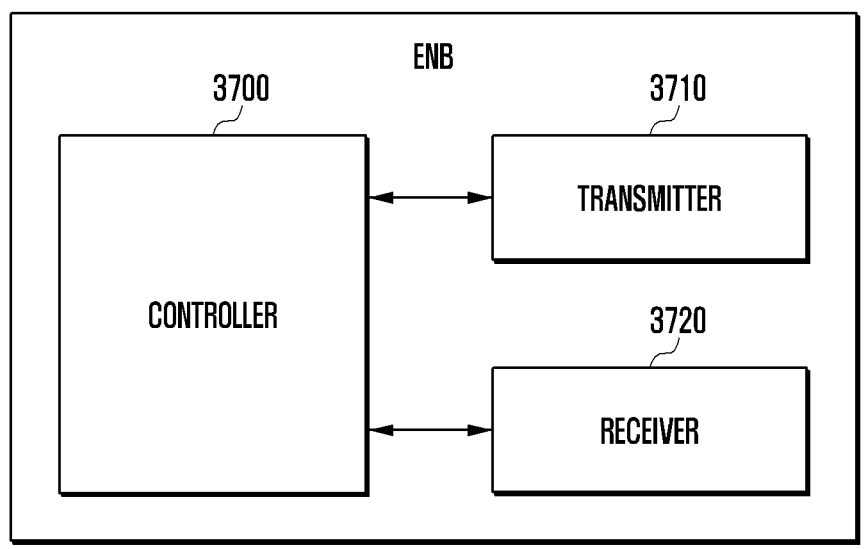
FIG. 37 is a block diagram illustrating a configuration of an eNB according to an embodiment of the present invention.

FIG. 37 is a block diagram illustrating a configuration of an eNB according to an embodiment of the present invention.

The eNB may include a controller 3700, a transmitter 3710, and a receiver 3720. The receiver 3720 may receive signals from a neighboring eNB and a UE, measure channels from the neighboring eNB and UE, and perform unlicensed band channel sensing with the channel sensing parameters configured by the controller 3700. The receiver 3720 may determine, when occupying the unlicensed band, the transmit power for transmission in the unlicensed band. The controller 3700 may determine whether the unlicensed band is idle based on the information on the unlicensed band sensed by the receiver 3720. If it is determined that the unlicensed band is idle, the controller 3700 may control the transmitter 3700 to transmit to the UE a signal for channel occupancy, control channel and data channel information for the UE, or transmit power configuration information for LAA cell. The eNB may configure the cells for transmitting DL and UL scheduling information specific to the serving cell, the DL and UL scheduling information transmission cells being identical with or different from each other. If the DL and UL scheduling information transmission cells are different from each other, the eNB may transmit the DL and UL scheduling informations for the UE in the search spaces for the respective scheduling cells.

Figure 38:
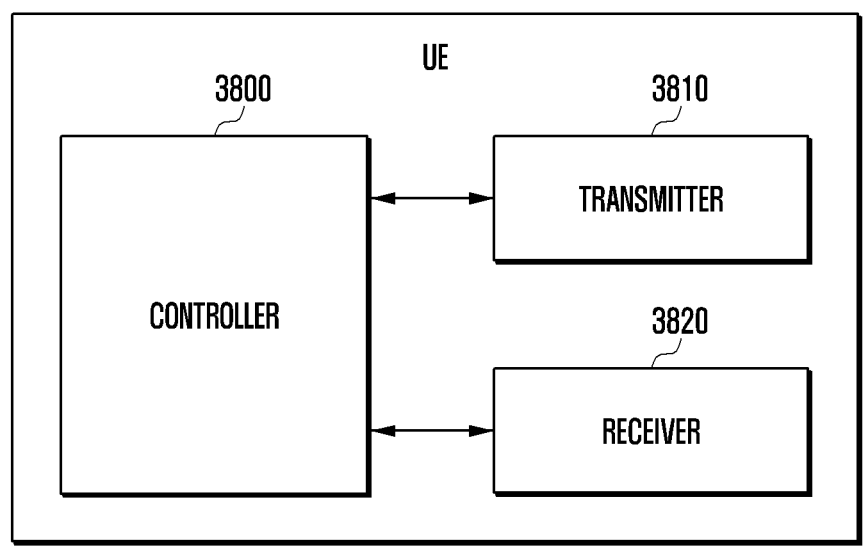
FIG. 38 is a block diagram illustrating a configuration of a UE according to an embodiment of the present invention.

FIG. 38 is a block diagram illustrating a configuration of a UE according to an embodiment of the present invention.

The UE may include a controller 3800, a transmitter 3810, and a receiver 3820. The controller 3800 may control the receiver 3820 to receive information on the configuration between an eNB and the UE from the eNB for transmitting signal in the licensed and unlicensed band and use the unlicensed band based on the received configuration information. The controller 3800 may also control the receiver 3820 to receive channel occupancy period configuration of an LAA cell or information on the method for determining the last partial subframe. The controller 3800 may also control the receiver 3820 to receive the information on the transmit power configuration information for the channel occupancy period of the LAA cell. The controller 3800 may acquire the unlicensed band status information based on at least one of a setting value for use in determining whether the eNB is capable of performing scheduling in the subframe in which channel sensing operation is performed as configured by the eNB, unlicensed band status information which the eNB may transmit to the UE in a licensed band or an unlicensed band, and transmit power configuration information for the channel occupancy period of the LAA cell, and then receive a signal in the unlicensed band. The controller 3800 may receive a scheduling information from the eNB, determine data signal reception result based on the scheduling information, and report the data reception result to the eNB by means of the transmitter 3810. The UE may be configured to have cells for transmitting DL and UL scheduling information specific to the serving cell based on the configuration information received from the eNB, the DL and UL scheduling information transmission cells being identical with or different from each other; if the DL and UL scheduling information transmission cells are different from each other, the UE may calculate search spaces for the respective scheduling cells and receive the DL and UL scheduling information transmitted by the eNB in the respective search spaces.

Embodiment 4

The present invention relates to a wireless communication system and, in particular, to a method and system for facilitating data communication to support various services provided in supportive of various communication parameters in one system to meet requirements for various wireless communications.

The mobile communication system has evolved to a high-speed, high-quality wireless packet data communication system capable of providing data and multimedia services (such as high-speed downlink packet access (HSDPA), high speed uplink packet access (HSUPA), LTE, and LTE-A of the $3^{rd}$ generation partnership project (3GPP), high rate packet data (HRPD) of 3GPP2, and 801.16 of the Institute of Electrical and Electronics Engineers (IEEE)) beyond the early voice-oriented services.

The LTE system as one of the representative broadband wireless communication systems uses orthogonal frequency division multiplexing (OFDM) in the downlink and single carrier frequency division multiple access (SC-FDMA) in the uplink. The term 'uplink (UL)' denotes a radio link for transmitting data or control signals from a user equipment (UE) or mobile station (MS) to an evolved Node B (eNB) or base station (BS), and the term 'downlink (DL)' denotes a radio link for transmitting data or control signals from an eNB to a UE. Such a multiple access scheme is characterized by allocating the time-frequency resources for transmitting user-specific data and control information without overlap each other, i.e. maintaining orthogonality, so as to distinguish among user-specific data and control information.

As a next generation communication system after LTE, the 5G communication system should be designed to meet various requirements of services demanded by users and service providers. The services supported by 5G systems may be categorized into three categories: enhanced mobile broadband (eMBB), massive machine type communications (mMTC), and ultra-reliable and low-latency communications (URLLC).

The eMBB aims to provide exceptionally high data rate in comparison with those supported by the legacy LTE, LTE-A, and LTE-A Pro. For example, the eMBB aims to increase the peak data rate up to 20 Gbps in DL and 10 Gbps in UL per base station. Simultaneously, it aims to increase the user-perceived data rate. In order to meet such requirements, it is necessary to improve signal transmission/reception technologies including multi-input multi-output (MIMO) technique. The data rate requirements for the 5G communication systems may be met by use of a frequency bandwidth broader than 20 MHz in the frequency band of 3 to 6 GHz or above 6 GHz instead of the current LTE band of 2 GHz.

Meanwhile, the mMTC is considered to support application services for Internet of Things (IoT). In order to provide mMTC-based IoT application services effectively, it is required to secure massive access resources for terminals within a cell, improve terminal coverage and battery life span, and reduce device manufacturing cost. The IoT services should be designed to support a large amount of terminals (e.g., 1,000,000 terminals/km$^2$) within a cell in consideration by the nature of the IoT terminals that are attached to various sensors and devices for providing a communication function. By the nature of the IoT services, the mMTC terminals are likely to be located in coverage holes such as basement of a building, which requires broader coverage in comparison with other services being supported in the 5G communication system. The mMTC terminals that are characterized by their low prices and battery replacement difficulty should be designed to have very long battery lifetime.

Finally, the URLLC is targeted for mission-critical cellular-based communication services such as remote robot and machinery control, industrial automation, unmanned aerial vehicle, remote health care, and emergency alert services that are requiring ultra-low latency and ultra-high reliability. For example, a URLLC service needs to meet the requirements of air-interface latency lower than 0.5 ms and packet error rate equal to or less than $10^{-5}$. In this respect, in order to support the URLLC services, the 5G system has to support transmit time intervals (TTI) shorter than those of other services and assign broad resources in the frequency band.

The aforementioned services considered to be supported in the 5G communication system should be provided on one framework in a mixed manner. That is, it is preferred to administrate and control the services in an integrated manner rather than individually in terms of efficient resource management and control.

Figure 39:
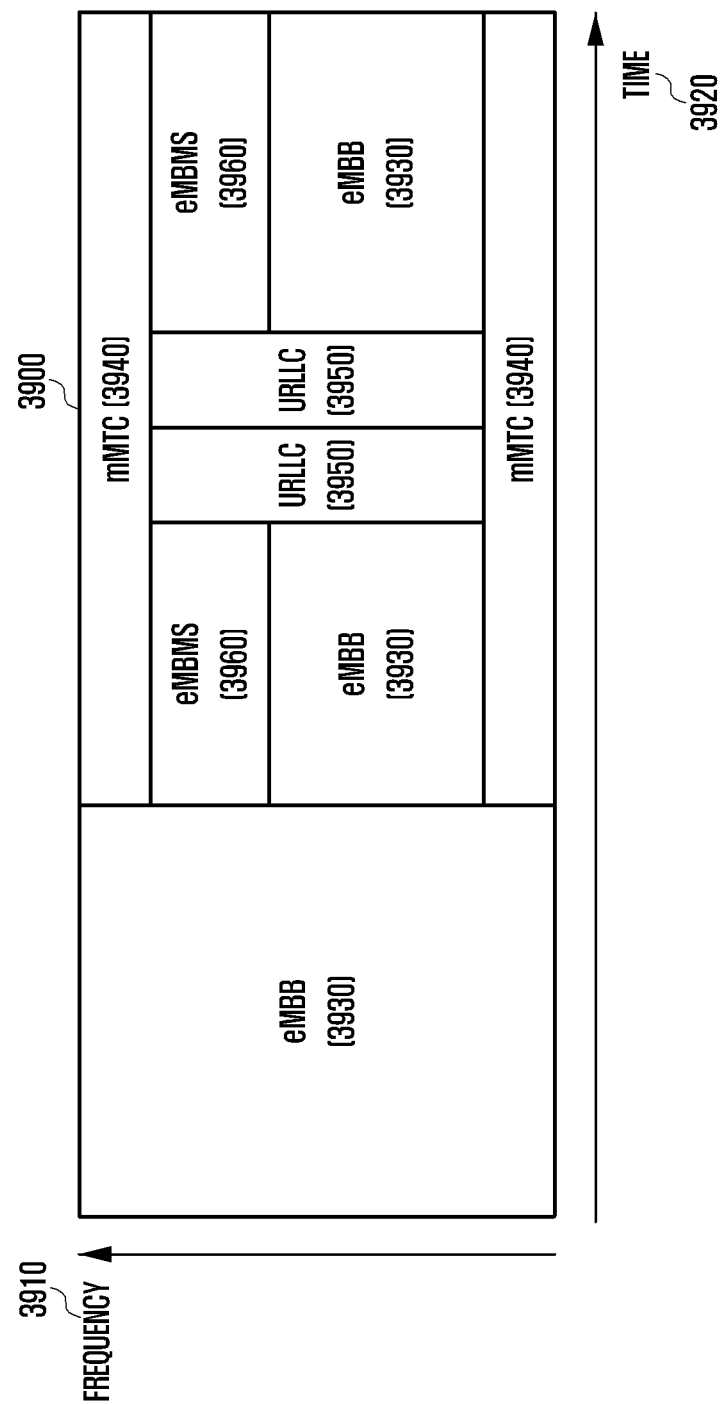
FIG. 39 is a diagram for explaining resource allocation for supporting multiple services in a 5G communication system.

FIG. 39 is a diagram for explaining resource allocation for supporting multiple services in a 5G communication system.

In FIG. 39, the frequency-time resources 3900 for use in the 5G communication system are defined by the frequency axis 3900 and the time axis 3920. The frequency-time resources 3900 consists of a plurality of resource blocks (RBs) on the frequency axis 3910 and successive subframes on the time axis 3920. Here, one RB is the smallest unit of scheduling in the frequency domain and it may be composed of a plurality of subcarriers as in LTE. Also, one subframe is the smallest unit composed of a plurality of OFDM symbols in the time domain for scheduling as in LTE.

FIG. 39 depicts that eMBB 3930, mMTC 3940, and URLLC 3950 are administrated by way of example on one frame in the 5G communication system. As an additional type of services considered to be supported in the 5G communication system is enhanced mobile broadcast/multicast service (eMBMS) for providing cellular-based broadcast services. the eMBB 3930, mMTC 3940, URLLC 3950, and eMBMS 3960 considered to be supported in the 5G communication system may be time-division-multiplexed (TDMed) and/or frequency-division-multiplexed (FDMed) in the system frequency bandwidth, and/or spatial-division-multiplexed.

For the eMBB 3930, it is preferred to occupy the frequency bandwidth as broad as possible during an arbitrary time period to secure increased data rate as described above. That is, it is preferred for the terminal to be allocated RBs as many as possible for data transmission. The eMBB service 3930 is preferred to be TDMed with other services in the system frequency-time resources 3900, and it may be possible that the eMBB service is FDMed with other services in the system frequency-time resources 3900.

For the mMTC 3940, it is required to increase transmission period to secure a broad coverage unlike other services and it is possible transmit the same packet repetitively in the same transmission period to secure the coverage. The low complexity and manufacturing price of the terminal contribute to transmission bandwidth restriction. In consideration of such requirements, the mMTC service 3940 is preferred to be FDMed with other services in the 5G communication system frequency-time resources 3900.

For the URLLC 3950, it is preferred to use a TTI shorter than those for other services to meet the ultra-low latency requirement. Also, in order to meet the ultra-high reliability requirement, it is preferred to secure a broad bandwidth in the frequency domain to achieve a low coding rate. In consideration of such requirements, the URLLC service 3950 is preferred to be TDMed with other services in the 5G communication system time-frequency resources 3900.

The aforementioned services may be provided with different transmission/reception schemes and transmission/reception parameters to meet the service-specific requirements. For example, the individual services may be provided with different numerologies to meet the service-specific requirements. The term 'numerology' is intended to include cyclic prefix (CP) length, subcarrier spacing, OFDM symbol length, and TTI in the OFDM-based or OFMDA-based communication systems.

As an example of using service-specific numerologies, the eMBMS 3960 may be provided with a CP length longer than those for other services. The eMBMS 3960 is characterized in that the same data are transmitted within all cells because it is provided in such a way of broadcasting higher layer traffic. In view of the terminal, if the signals transmitted via multiple cells are received with a delay shorter than the CP length, the terminal is capable of decoding all of the signals so as to achieve single frequency network (SFN) diversity, and this means that even the cell edge terminals may receive the broadcast information without coverage restriction. However, the CP overhead caused by using the CP length longer that those for other services to support the eMBMS 3960 in the 5G communication system brings about resource waste, and this may be interpreted as a situation of requiring an OFDM symbol length longer than those for other services and, simultaneously, a subcarrier spacing narrower than those for other services.

As another example of using service-specific numerologies, the URLLC service 3950 may be provided with a TTI shorter than those for other services, which requires a very short OFDM symbol length and a broad subcarrier spacing.

Hereinabove, descriptions have been made to the services that are considered to be supported and the requirements for supporting the services in the 5G communication system. In order to support other services being introduced in the future, it may also be necessary to consider technologies for guaranteeing forward compatibility in the 5G communication system. The lack of consideration on the forward compatibility in the initial LTE standardization stage has brought about restrictions on supporting new services within the LTE framework. For example, the eMTC introduced LTE release-13 is limited in that the terminal is able to operate only in a 1.4 Mhz frequency band regardless of the system bandwidth of the serving cell in order to reduce complexity and terminal manufacturing cost. This means that the eMTC-enabled terminal may not receive a physical downlink control channel (PDCCH) that is transmitted across the whole system bandwidth of the legacy system, resulting in restriction in signal reception during a PDCCH transmission time interval.

In this respect, the 5G communication system should be designed in consideration of coexistence and efficient operations of the services supported in beyond-5G system with the services supported in the 5G communication system. It may also be necessary to design the 5G communication system to support forward compatibility such that the services being introduced in the future are fairly allocated transmission resources in the 5G communication system resources.

Figure 40:
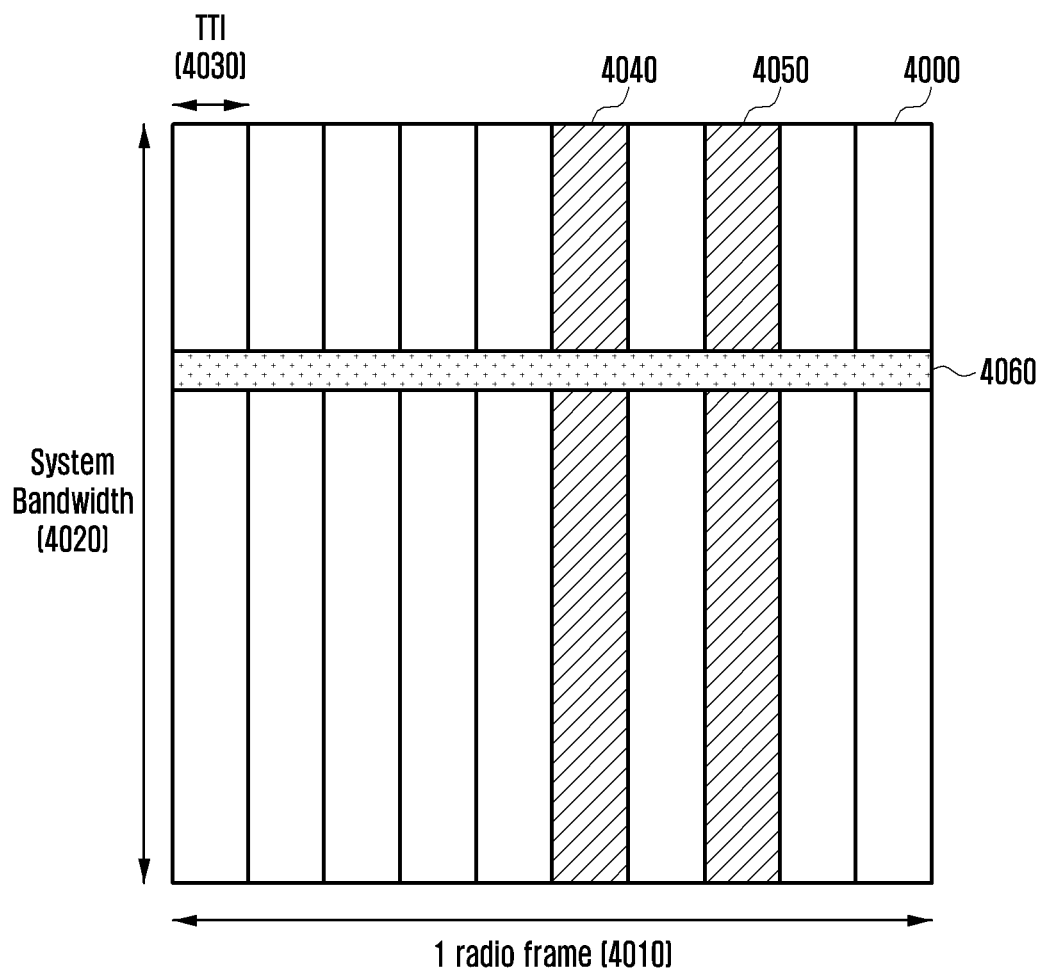
FIG. 40 is a diagram for explaining resource allocation in a time-frequency resources grid in consideration of forward compatibility for future services in a 5G communication system.

FIG. 40 is a diagram for explaining resource allocation in a time-frequency resources grid in consideration of forward compatibility for future services in a 5G communication system.

In FIG. 40, the time-frequency resources 4000 for use in the 5G communication system are defined by a radio frame 4010 and a system bandwidth 4020 of the 5G communication system. The radio frame 4010 may comprise of a plurality of TTI 4030 as a basic unit of packet transmission and, in the present invention, the radio frame 4010 consists of 10 TTIs 4030 by way of example.

As shown in FIG. 40, it may be possible to use a TDM-based or FDM-based resource allocation in consideration of forward compatibility for future services. FIG. 40 depicts a scheme of allocating specific TTIs 4040 and 4050 for future services in a TDM manner. Although not shown in FIG. 40, it may be possible to allocate resources for future services in combination of TDM and FDM in the 5G communication system. That is, the future services may be allocated restricted resources in both the time and frequency domains.

In FIG. 40, it is considered that the resource allocation scheme designed in consideration of coexistence of the TDMed resources 4040 and 4050 being allocated for future services with the TDMed resources for other services being supported in the current 5G communication system is appropriate for the services requiring relatively high data rate and low transmission delay in a wide band. Meanwhile, it is assumed that the resource allocation scheme designed in consideration of coexistence of the FDMed resources 4060 being allocated for future service with the TDMed resources for other services being supported in the current 5G communication system is appropriate for the services requiring a narrowband transmission, relatively less delay sensitivity, relatively broad coverage, low data rate, and seamless communication resources.

In the case of multiplexing the future services and current services being supported by the 5G communication system in an FDM scheme, it is necessary to consider the following factors.

First, in the 5G communication system, a physical channel being transmitted across the system bandwidth or carrying a reference signal for channel equalization or synchronization function exists, it is difficult to multiplex the future and current services in an FDM system. Examples of the signal being transmitted across the system bandwidth every transmission unit in the current LTE include a cell-specific reference signal (CRS) and a physical downlink control signal. Such signals are always transmitted across the system bandwidth, and the terminal performs channel equalization, synchronization, and uplink and downlink scheduling based on the corresponding signals. Accordingly, it is difficult to use a specific frequency region for a certain purpose with transmitting such signals or a physical channel in the current LTE. Accordingly, it may be considered to transmit all physical channels and reference signals are transmitted in an arbitrary frequency band rather the across the system band in the 5G communication system.

Second, it may occur that a future service considered to be introduced in the 5G communication system is overlapped with a signal or physical channel required for system operations. That is, certain frequency resources allocated for a future service may be overlapped with the frequency resources allocated for cell search of a terminal located in the cell, synchronization or transmission of synchronization signals for initial access, master information block (MIB) and system information blocks (SIBs). For example, in the case where the synchronization signals, MIB, and SIBs are transmitted in a fixed frequency region in the middle of the system bandwidth (e.g., 6 RBs located in the middle of the system bandwidth in LTE), it may not be considered to guarantee compatibility for the future services on the corresponding frequency resources. That is, there is a problem in that the frequency resources located in the middle of the system bandwidth cannot be used for the services considered to appear after the 5G communication system. In other words, if the synchronization signals, MIB, and SIBs required for operations of the 5G communication system are assigned fixed frequency resources in the middle of the system bandwidth, this may bring about the forward compatibility problem in the 5G communication system in the future as in LTE.

The present invention aims to propose an efficient initial access procedure for use in designing the 5G communication system with forward compatibility as well as meeting various service requirements. Also, the present invention proposes physical channels and signal structures and procedures required for initial access in the 5G communication system supporting various services being provided with various numerologies and transmission parameters. Also, the present invention proposes physical channels and signal structures and procedures required for initial access in consideration of the robust forward compatibility for future services in the 5G communication system.

Embodiment 4-1

Embodiment 4-1 is directed to physical channels and signal structures required for system operations such as initial access and procedures of a terminal based thereon in 5G communication system supporting various services that are provided with different transmission/reception parameters and transmission schemes to meet various service requirements. Here, the different transmission parameters include numerology for use in modulating the physical channels or signals, and the numerology includes CP length, subcarrier spacing, and OFDM symbol interval by way of example. The physical channels and signals required for system operation may include the synchronization signals, MIB, and SIBs.

In the 5G communication system, the synchronization signals may be used for cell search and synchronization like the primary synchronization signal (PSS) and secondary synchronization signal (SSS) of LTE and configured in the form of signals or channels. The MIB is a broadcast channel for broadcasting system information including system frame number (SFN) and system bandwidth of the current cell as in LTE and other information required for system operation. The SIB is a signal carrying system information for use by a terminal to perform initial access to the system and data communication. Even in the 5G communication system, a terminal has to receive the aforementioned physical channels and signals required for system operation regardless of the services it supports.

In order to accomplish this, the present invention proposes the use of a numerology common for all services supported in the 5G communication system (common default numerology) for transmitting the physical channels and signals carrying the synchronization signals and MIB and SIBs required for the operation of the 5G communication system. The individual services are provided with respective numerologies to meet the service-specific requirements while the physical channels and signals carrying the synchronization signals and MIB and SIBs are transmitted with a numerology that makes it possible for all terminals to receive the synchronization signals and MIB and SIBs. In order to accomplish this, a terminal attempting to access the 5G communication system should have a hardware configuration capable of receiving signals modulated with at least two numerologies and it performs synchronization and cell search with the common numerology used for transmitting the synchronization signals, MIB, and SIB s in the initial access procedure and acquires system information.

After acquiring the system information through the synchronization and cell search with the common numerology, the UE performs hardware switching to receive a signal with a predetermined numerology specific to the target service and receives the physical channel carrying the target service.

Figure 41:
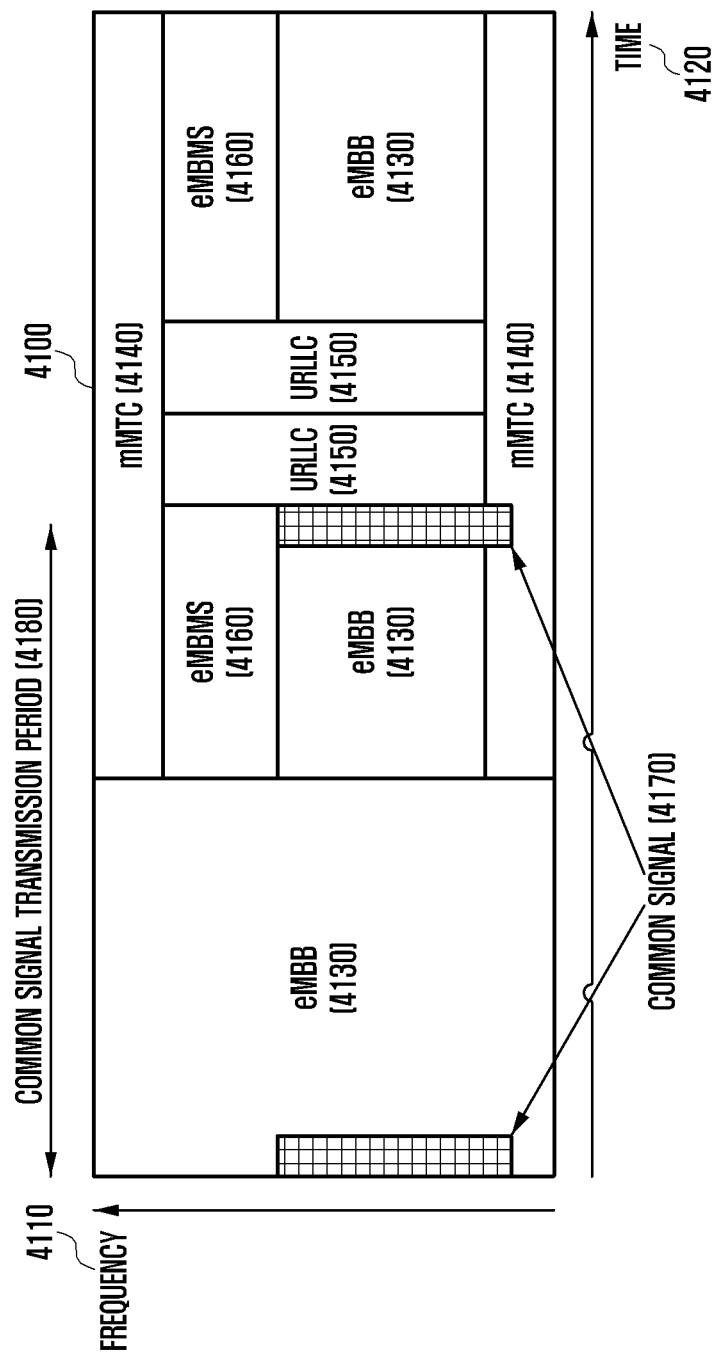
FIG. 41 is a diagram illustrating multiplexing of physical channels and signals related to the system operation in time-frequency resources of a 5G communication system.

FIG. 41 is a diagram illustrating multiplexing of physical channels and signals related to the system operation in time 4120—frequency 4110 resources 4100 of a 5G communication system.

FIG. 41 shows a situation where multiple services such as eMBB 4130, mMTC 4140, URLLC 4150, and eMBMS 4160 are multiplexed provided in a multiplexed manner in the 5G communication system as in FIG. 39. In FIG. 41, the signals carrying the synchronization signals, MIB, and SIBs are collectively referred to as common signal 4170, and the common signal may be TDMed and/or FDMed with the physical channels carrying the services. The common signal 4170 may be transmitted at a common signal transmission interval 4180 and it may be configured with one or more subframes in the time domains. Similar to LTE, a subframe is the smallest unit of scheduling in the 5G communication system and it is designed to have a fixed length even though the individual services are provided with different numerologies. However, the URLLC 4150 may be provided with a different length of subframe to minimize transmission latency.

The common signal 4170 may be transmitted in a fixed frequency bandwidth predetermined in the frequency domain. The synchronization signals, MIB, and SIBs constituting the common signal 417 are transmitted in the same fixed frequency bandwidth. Accordingly, after the synchronization signal-based cell search and downlink synchronization achievement, the terminal assumes that the MIB and SIBs are transmitted in the same frequency band as the common signal 4170. The frequency location of the common signal 4170 may be configured by the system per cell, and detailed description thereof is made in embodiment 4-2.

Figure 42:
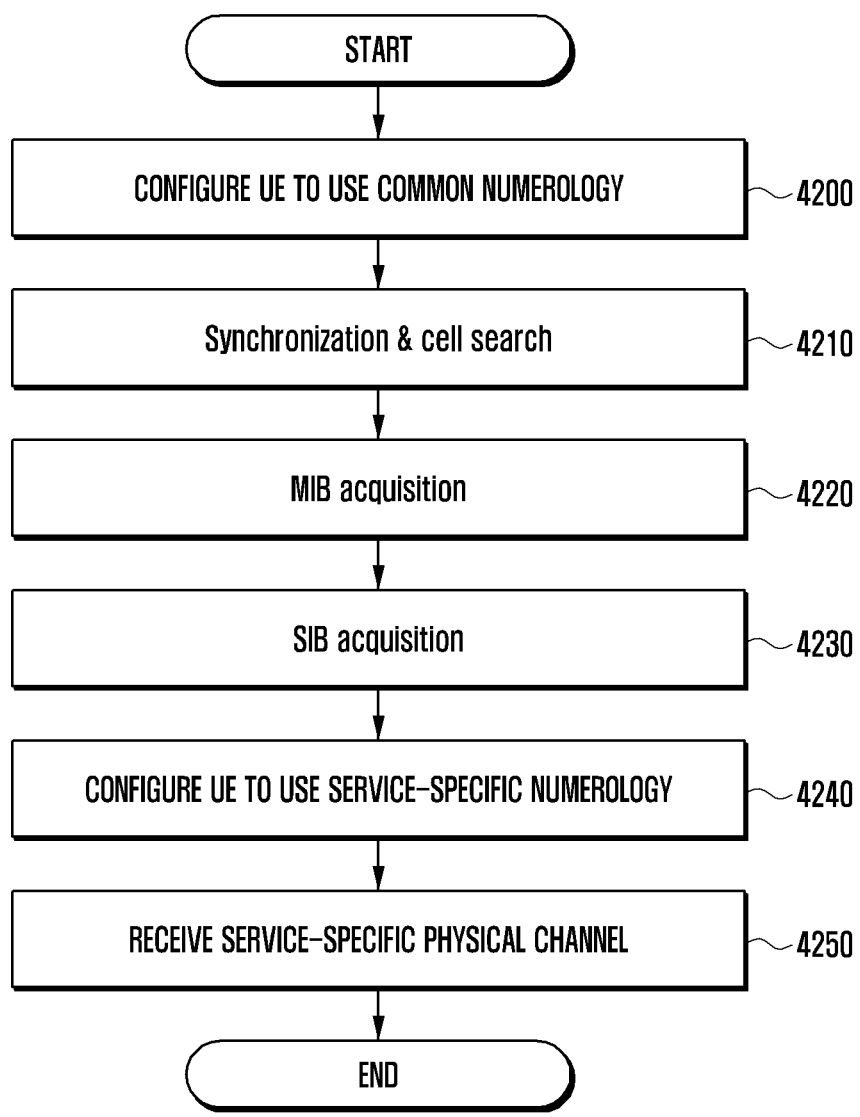
FIG. 42 is a flowchart illustrating a procedure for a terminal to achieve synchronization and acquire system information in initial access a numerology and receive a service with another numerology in a 5G communication system.

FIG. 42 is a flowchart illustrating a procedure for a terminal to achieve synchronization and acquire system information in initial access a numerology and receive a service with another numerology in a 5G communication system.

In reference to FIG. 42, a terminal attempting to access a 5G communication system is configured with a numerology at step 4200 to receive a downlink signal transmitted by a base station, the numerology in use by the base station for transmitting a common signal including synchronization signals, MIB, and SIBs. Here, the numerology may include parameters such as CP length, OFDM symbol length, and subcarrier spacing, and a hardware component (particularly, receiver) of the terminal operations in accordance with the numerology. At step 4210, the terminal performs synchronization and cell search with the numerology configured at step 4200. After completing the cell search and achieving synchronization, the terminal receives the MIB, at step 3220, with the same numerology as used at the previous step. After receiving the MIB at step 4220, the terminal receives an SIB, at step 4230, with the same numerology as used at the previous step.

After receiving the SIB at step 4230, the terminal acquires the transmission parameters and configuration information necessary for use of a target service and change its hardware configuration for receiving the target service. At step 4240, the terminal may check the numerology of the physical channel carrying the target service based on the SIB and configure a numerology specific to the target service. That is, the terminal configures its hardware component with the service-specific numerology including parameters such as CP length, OFDM symbol length, and subcarrier spacing. If the hardware configuration with the service-specific numerology, the terminal may receive a physical channel corresponding to the target service at step 4250.

Embodiment 4-2

Embodiment 4-2 is directed to an efficient initial access signal transmission method and a signal structure for avoiding forward compatibility restriction caused by the common signal required for system operation in the 5G communication system, thereby guaranteeing more robust forward compatibility to the future services.

As described in embodiment 401, it is assumed that the synchronization signals, MIB, and SIB s required for system operation are transmitted in a fixed frequency bandwidth. In order to avoid the forward compatibility restriction to the future services with additional service requirements in the 5G communication system because of the synchronization signals, MIB, and SIBs, the present invention proposes the use of configuring a common signal including the synchronization signals, MIB, and SIBs in the middle of the system bandwidth.

In the legacy LTE, the synchronization signals and MIB are always transmitted in a 1.4 MHz frequency band located in the middle of the system bandwidth. However, the present invention proposes a method for locating the common signal at an arbitrary location in the system bandwidth to achieve more robust forward compatibility and higher degree of freedom in the 5G communication system.

In order to make it possible to locate the common signal at an arbitrary location in the system bandwidth, there is a need of a set of candidate frequency locations for transmitting the common signal in order for the terminal to select an arbitrary frequency location from the set to transmit the common signal. Here, the candidate frequency location set may be determined in unit of one or multiple RBs. Here, one RB is the smallest unit of scheduling in the frequency domain and it may be composed of a plurality of subcarriers as in LTE. For example, if 6 RBs are required for transmitting the common signal as in the legacy LTE and if the base station configure the $10^{th}$ RB as the starting RB for transmitting the common signal in the system bandwidth, the common signal may be transmitted in the bandwidth starting from the $10^{th}$ RB to the $15^{th}$ RB.

If the RBs for transmitting the common signal is located at an arbitrary location in the system bandwidth as described above, there is a need of additional information for transmitting the information on the system bandwidth being supported in the 5G communication system unlike the legacy LTE. In the legacy LTE, the terminal may assume that the common signals such as PSS, SSS, and MIB are transmitted in the middle of the system bandwidth. Accordingly, if the terminal acquires the information on the system bandwidth from the MIB, it may ascertain all of the system bandwidth configurations. That is, if it acquires the size of the system bandwidth, the terminal is capable of ascertaining both the start and end frequencies of the system bandwidth of the base station that is serving the terminal.

As proposed in embodiment 4-2, however, if the common signal carrying the system information for use in synchronization and cell search is not transmitted in the middle of the system bandwidth, it is difficult to ascertain all system bandwidth-related configurations only with the system bandwidth included in the MIB. That is, a problem arises in that the terminal cannot ascertain the start and end frequencies of the system bandwidth only with the system bandwidth size information unlike the legacy LTE. In order to solve this problem, embodiment 4-2 discloses a method for transmitting common signal transmission location information in the MIB or an SIB.

The first method for transmitting the common signal transmission location information is to transmit common signal transmission frequency location information in the MIB. In this case, the system bandwidth information and the common signal transmission frequency location information may be all transmitted in the MIB of the 5G communication system. Here, the common signal transmission frequency location may be notified to the terminal in the form of an offset or a center frequency of the bandwidth in which the common signal is transmitted. The size of a set of the candidates of frequency offset or center frequency of bandwidth may vary depending on the system bandwidth supported by the 5G communication system.

However, a problem arises in that it is impossible to ascertain the size of the set of candidates of the common signal transmission frequency location because the terminal cannot ascertain the information on the system bandwidth in the MIB acquisition procedure. Thus, the terminal has to determine the size of the field carrying the common signal transmission frequency location information in the MIB under the assumption that the maximum system bandwidth is always applied. That is, the information field indicating the common signal transmission frequency location in the MIB should be determined according to the size of the set of the candidates of the common signal transmission frequency location under the assumption of the maximum system bandwidth always. For example, assuming that the system bandwidth being supported by the 5G communication system includes $N_{RB}$ RBs and the size of the set of candidates of the common signal transmission frequency location in the system bandwidth including $N_{RB}^{Comm-candidate}$, the field for indicating the common signal transmission frequency location should always have the size of $\log_2(N_{MAX}^{Comm-candidate})$ regardless of the system bandwidth of the corresponding cell. If the real transmission bandwidth in use by the system is less than the maximum system bandwidth, the valid value of the field for indicating the common signal transmission frequency location may be less than $\log_2(N_{MAX}^{Comm-candidate})$, and the remaining values are all padded with 0.

The second method for transmitting the common signal transmission location information is to transmit the corresponding information in an SIB. That is, this method is characterized in that the system bandwidth is ascertained from the MIB and the common signal transmission frequency location is ascertained from the SIB. Here, the common signal transmission frequency location may be notified to the terminal in the form of an offset or a center frequency of the bandwidth in which the common signal is transmitted. The size of a set of the candidates of frequency offset or center frequency of bandwidth may vary depending on the system bandwidth supported by the 5G communication system. Unlike the first method, as the terminal ascertain the system bandwidth information from the MIB in advance, it may be possible to determine the size of the transmission bandwidth center location information field or offset field included in the SIB based on the corresponding system bandwidth.

Figure 43:
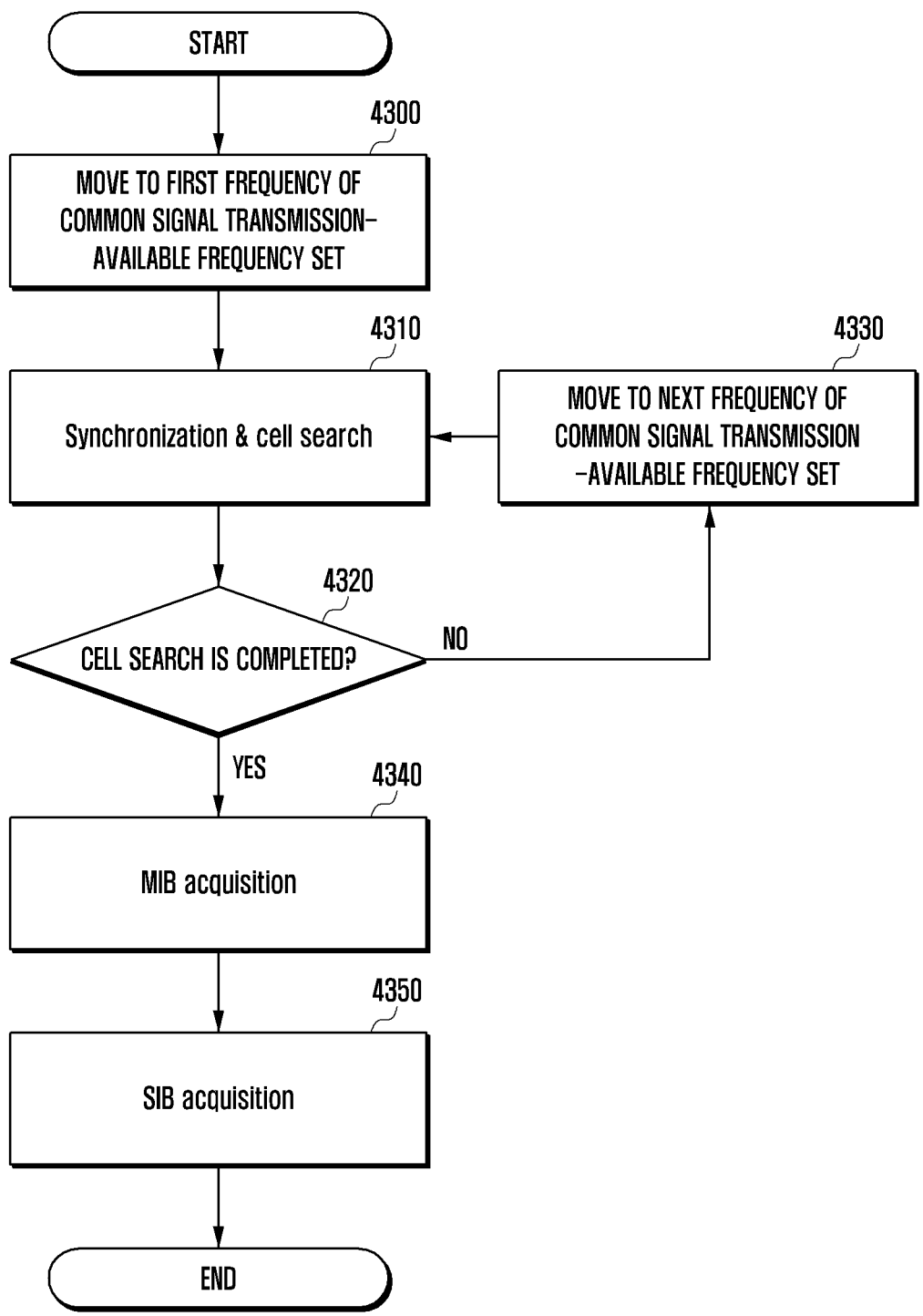
FIG. 43 is a flowchart illustrating an initial access procedure of a terminal in a 5G communication system according to embodiment 4-2 of the present invention.

FIG. 43 is a flowchart illustrating an initial access procedure of a terminal in a 5G communication system according to embodiment 4-2 of the present invention.

In reference to FIG. 43, the terminal moves its center frequency to the first frequency among the candidate frequencies available for transmitting the common signal at step 4300 in the initial access procedure. After step 4300, the terminal performs synchronization and cell search at step 4310. If it is determined at step 4320 that the cell search is not completed because at least one of conditions for completing the cell search is not fulfilled and if this determination lasts for a predetermined time period, the terminal tunes its center frequency to the next frequency, at step 4330, among the candidate frequencies available for transmitting the common signal and performs synchronization and cell search at step 4310. If it is determined at step 4320 that the cell search is completed because all of the conditions for completing the cell search are fulfilled, the procedure goes to step 4340.

At step 4340, the terminal ascertains the information on the MIB in the frequency band in which the cell search has been completed. If there is a filed for indicating the common signal transmission frequency location in the MIB as described in the first method of embodiment 4-2, it may be possible to ascertain the start and end frequencies of the system bandwidth in consideration of the common signal transmission frequency location and the system bandwidth size included in the MIB. If the field for indicating the common signal transmission frequency location is included in the SIB as described in the second method of embodiment 4-2, the terminal may ascertain the start and end frequency of the system bandwidth based on the system bandwidth information obtained at step 4340 and the common signal transmission frequency location information ascertained from the SIB at step 4350.

Figure 44:
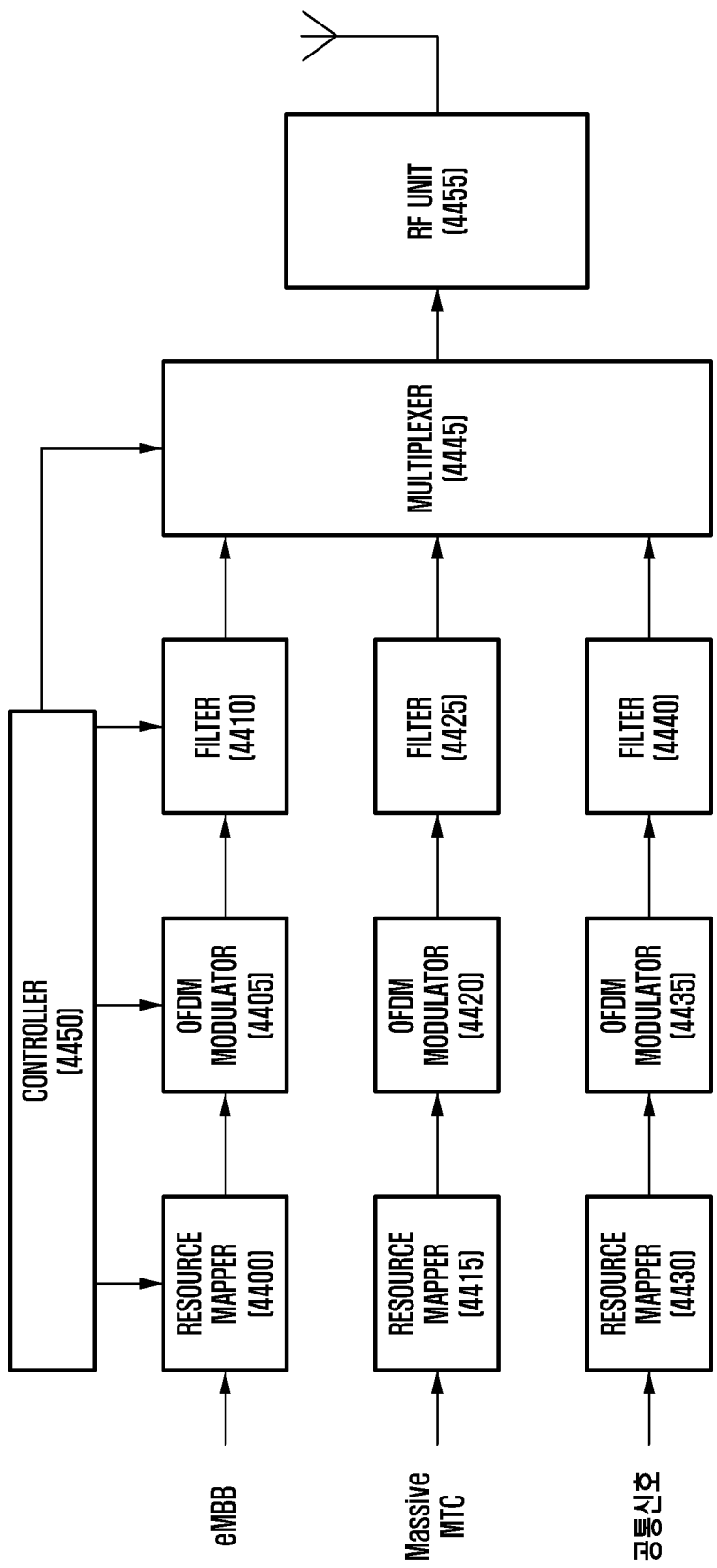
FIG. 44 is a block diagram illustrating a configuration of a transmitter of a base station according to an embodiment of the present invention.
Figure 45:
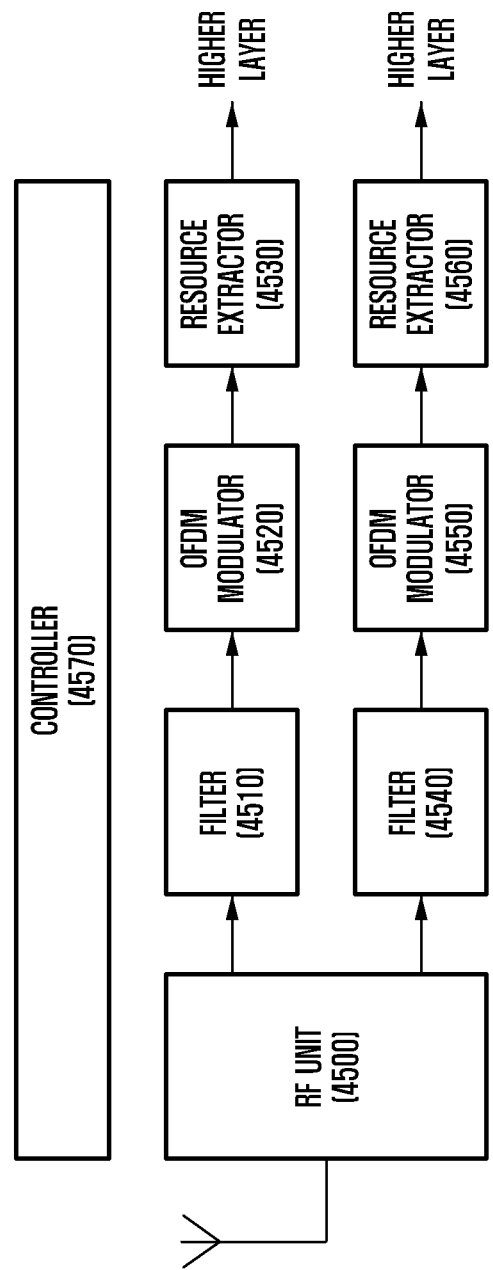
FIG. 45 is a block diagram illustrating a configuration of a receiver of terminal according to an embodiment of the present invention.

A transmitter of the base station and a receiver of the terminal for performing the methods of the embodiments of the present are depicted in FIGS. 44 and 45, respectively. The transmitter of the base station and the receiver of the terminal should operate as disclosed in the description of the initial access method and apparatus in the 5G communication system according to embodiments 4-1 and 4-2.

FIG. 44 is a block diagram illustrating a configuration of a transmitter of a base station according to an embodiment of the present invention. As shown in FIG. 44, the transmitter of the base station includes resource mappers 4400, 4415, and 4430, OFDM modulators 4405, 4420, and 4435, and filters 4410, 4425, and 4440 for transmitting service-specific signals. The resource mapper 4400, 4415, and 4430 modulates data to be transmitted in QPSK/QAM and map the modulated signals to the time-frequency resources. The OFDM modulators 4405, 4420, and 4435 performs OFDM modulation on the mapped signals. The orthogonal modulation includes performing IFFT and inserting CP in the OFDM symbols. The filters 4410 4425, and 4440 performs filtering to meet the frequency band spectrum mask limit of the generated signals A physical channel and signal carrying a service may be generated via the resource mapper, OFDM modulator, and filter specific to the corresponding service. For example, a physical channel and signal carrying an eMBB service may be generated by the resource mapper, OFDM modulator, and filter assigned for the eMBB service. Here, the resource mapper 4400, OFDM modulator 4405, and filter 4410 may operate to generate the physical channel and signal with the numerology configured for the eMBB service. Likewise, a physical channel and signal carrying the common signal may be generated via the resource mapper 4430, OFDM modulator 4435, and filter 4440 assigned for the common signal. Here, the common signal is generated with a numerology configured for the common signal. The resource mapper 4430 may configure the common signal transmission frequency location flexibly unlike in the legacy LTE. The transmitter of the base station includes a controller 4450 for controlling the resource mappers, OFDM modulators, filters, and a multiplexer 4445 efficiently. The transmitter of the base station also includes an RF unit 4455 and an antenna for transmitting the service traffic multiplexed by the multiplexer 4445 to the corresponding terminals.

FIG. 45 is a block diagram illustrating a configuration of a receiver of terminal according to an embodiment of the present invention. The receiver of the terminal includes an antenna, an RF unit 4500, filters 4510 and 4540, OFDM demodulator 4520 and 4550, resource extractors 4530 and 4560, and a controller 4570. The receiver includes two or more filters 4510 and 4540, two or more OFDM demodulators 4520 and 4550, and two or more resource extractors 4530 and 4560 to support services being provided with two or more different numerologies, and FIG. 45 exemplifies the case of supporting services being provided with two different services.

In more detail, the signals received by the terminal are converted to a baseband signal in a pass band through via the RF unit 4500. The baseband signals are input to the filter 4510 and 4540. Each filter may be turned on/off or change the configured numerology according to the service to receive. The filters are used to cancel the interferences to the signals FDMed in the adjacent frequency regions. The OFDM demodulators 4520 and 4550 are responsible for performing OFDM demodulation on the filtered signals. Each of the OFDM demodulators 4520 and 4550 may include a CP remover and an FFT. The resource extractors 4530 and 4560 are responsible for extracting physical channels and signals on the resources allocated for the respective services. The controller 4570 may control the overall operations of the terminal according to an embodiment of the present invention.

The embodiments disclosed in the specification and drawings are proposed to help explain and understand the present invention rather than limit the scope of scope of the present invention. It is obvious to those skilled in the art that can be made thereto without departing from the spirit and scope of the present invention. It is obvious to those skilled in the art that various modifications and changes can be made thereto without departing from the broader spirit and scope of the invention. If necessary, the embodiments may be combined in whole or in part. For example, embodiments 1 and 2 of the present invention and part of embodiment 5 may be combined to form an embodiment for the operations of a base station and a terminal.

Embodiment 5

The present invention relates to a wireless communication system and, in particular to, a data communication method and apparatus of a terminal that is capable of communicating data with a least one of a plurality of communication systems operating on one or more carrier frequencies.

Mobile communication systems were developed to provide subscribers with voice communication services on the move. Recently, mobile communication systems have evolved to the level of supporting high speed data communication services beyond the early voice-oriented services. However, the resource shortage and growing user demand for higher speed services are spurring evolution towards more advanced mobile communication systems.

As one of the next-generation mobile communication standards to meet such requirements, long term evolution (LTE) is underway in the 3$^{rd}$ generation partnership project (3GPP). The LTE is a technology designed to provide high-speed packet-based communication of up to 100 Mbps.

In order to accomplish the aim, a discussion is being held on several schemes: one scheme for reducing the number of nodes located in a communication path by simplifying a configuration of the network, and another scheme for maximally approximating wireless protocols to wireless channels.

The LTE system adopts a Hybrid Automatic Repeat Request (HARQ) scheme for physical layer retransmission when decoding failure occurs in initial data transmission. HARQ scheme is designed to operate in such a way that a receiver which fails in decoding data sends a transmitter a negative acknowledgement (NACK) indicative of decoding failure in order for the transmitter to retransmit the corresponding data on the physical layer. The receiver combines the retransmitted data with the decoding-failed data to improve data reception performance. It may also be possible for the receiver to send the transmitter an Acknowledgement (ACK) indicative of successful decoding, when the data are decoded successfully, in order for the transmitter to transmit new data.

Figure 46:
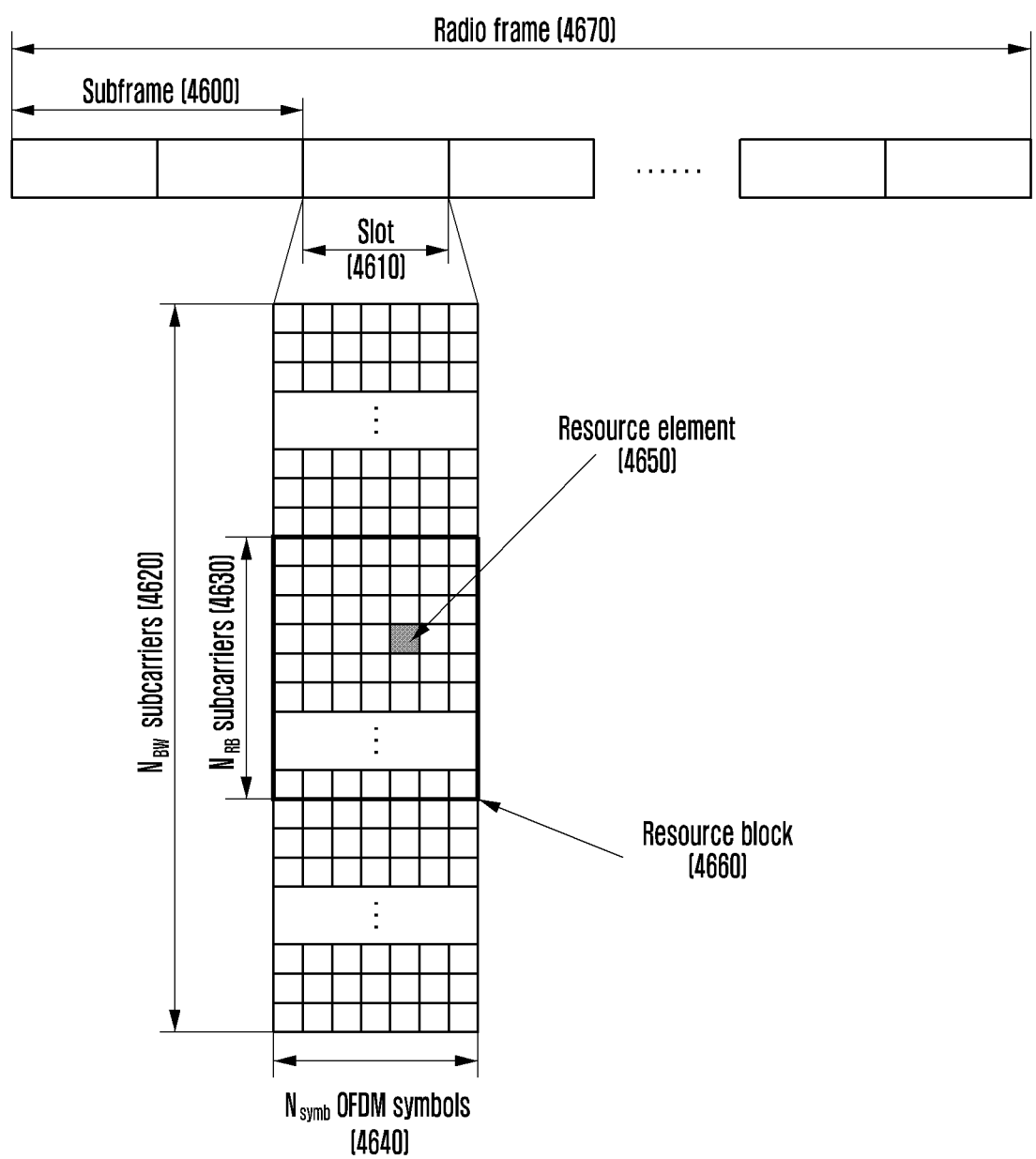
FIG. 46 is a diagram illustrating basic time-frequency resource structure for transmitting downlink data or control channels in an LTE system.

FIG. 46 is a diagram illustrating basic time-frequency resource structure for transmitting downlink data or control channels in an LTE system.

In FIG. 46, the horizontal axis denotes the time, and the vertical axis denotes the frequency. The smallest transmission unit in the time domain is an OFDM symbol, and $N_{symb}$ OFDM symbols 4640 forms a slot 4610, and 2 slots forms a subframe 4600. Each slot spans 0.5 ms, and each subframe spans 1.0 ms. A radio frame 4670 is a time unit consisted of 10 subframes. In the frequency domain, the smallest transmission unit is a subcarrier, and the total system transmission bandwidth consists of $N_{BW}$ subcarriers 4620.

In the time-frequency resource structure, the basic resource unit is a Resource Element (RE) indicated by an OFDM symbol index and a subcarrier index. A Resource Block (RB) (or Physical Resource Block (PRB)) 4660 is defined by $N_{symb}$ consecutive OFDM symbols 4640 in the time domain and $N_{RB}$ consecutive subcarriers 4630 in the frequency domain. That is, one RB 4660 consists of $N_{symb} \times N_{RB}$ REs 4650. Typically, the RB is the smallest data transmission unit. Typically, in the LTE system, $N_{symb}=7$, $N_{RB}=12$, and $N_{BW}$ and $N_{RB}$ are proportional to the system transmission bandwidth. The data rate increases in proportional to the number of RBs scheduled for the terminal.

For the LTE system, 6 transmission bandwidths are defined. In the case of an FDD system in which downlink and uplink are separated in frequency, the downlink transmission bandwidth and uplink transmission bandwidth may differ from each other. The channel bandwidth denotes an RF bandwidth in comparison with the system transmission bandwidth. Table 1 shows the relationship between the system transmission bandwidth and channel bandwidth defined in the LTE standard. For example, an LTE system having 10 MHz channel bandwidth uses the transmission bandwidth of 50 RBs.

TABLE 7

| | Channel bandwidth $BW_{Channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

The downlink control information is transmitted in N OFDM symbols at the beginning of the subframe. Typically, N={1, 2, 3}. Accordingly, N value varies at every subframe depending on the control information amount to be transmitted. The control information includes a control channel transmission period indicator for indicating a number of OFDM symbols for conveying the control information, scheduling information for downlink or uplink data transmission, and an HARQ ACK/NACK signal.

In the LTE system, the downlink or uplink data scheduling information is transmitted from the base station to the terminal using Downlink Control Information (DCI). The uplink (UL) denotes a radio link for transmitting data or control signals from the terminal to the base station, and the downlink (DL) denotes a radio link for transmitting data or control signals from the base station to the terminal. The DCI is categorized into different DCI formats depending on the purpose, e.g., indicating UL grant for UL data scheduling or DL grant for DL data scheduling, indicating usage for control information that is small in size, indicating whether multiple antenna-based spatial multiplexing is applied, and indicating usage for power control. For example, the DCI format 1 for DL grant is configured to include at least the following information.

Resource allocation type 0/1 flag: Resource allocation type 0/1 flag indicates whether the resource allocation scheme is Type 0 or Type 1. A Type-0 is to allocate resources in units of Resource Block Group (RBG) by applying a bitmap scheme. In the LTE system, the basic unit of scheduling may be a Resource Block (RB) that is expressed by time-frequency domain resources, and the RBG may include multiple RBs and may be the basic unit of scheduling in the Type-0 scheme. A Type-1 is to allocate a particular RB in an RBG.

Resource block assignment: Resource block assignment indicates an RB allocated for data transmission. The resources may be determined depending on the system bandwidth and the resource allocation scheme.

Modulation and coding scheme (MCS): MCS indicates a modulation scheme used for data transmission and a size of a transport block to be transmitted.

HARQ process number: HARQ process number indicates a process number of HARQ.

New data indicator: New data indicator indicates whether the HARQ transmission is an initial transmission or a retransmission.

Redundancy version: Redundancy version indicates a redundancy version of HARQ.

TPC command for PUCCH: Transmit Power Control (TPC) command for Physical Uplink Control Channel (PUCCH) indicates a power control command for a PUCCH that is an uplink control channel.

The DCI may be transmitted over a Physical Downlink Control Channel (PDCCH) or Enhanced PDCCH (EPDCCH) after undergoing a channel coding and modulation process. In the following description, PDCCH transmission/reception may be understood as DCI transmission/reception on the PDCCH. Other channels may be understood in a similar way.

Typically, the DCI may undergo channel coding for each terminal independently, and then the channel-coded DCI may be configured with its dependent PDCCH and transmitted. In the time domain, a PDCCH may be mapped and transmitted during the control channel transmission period. The frequency-domain mapping location of the PDCCH may be determined by an ID of each terminal, and it may be spread throughout the entire system transmission band.

Downlink data may be transmitted over a Physical Downlink Shared Channel (PDSCH) that is a physical channel for downlink data transmission. A PDSCH may be transmitted after the control channel transmission period, and the scheduling information such as the detailed mapping location in the frequency domain and the modulation scheme may be indicated by the DCI that is transmitted over the PDCCH.

Using a 5-bit MCS in the control information constituting the DCI, the base station notifies the terminal of the modulation scheme applied to the PDSCH to be transmitted and the size of data (e.g., Transport Block Size (TBS)) to be transmitted. The TBS corresponds to the size given before channel coding for error correction is applied to the data (e.g., Transport Block (TB)) to be transmitted by the base station.

The modulation schemes supported by the LTE system may include Quadrature Phase Shift Keying (QPSK), 16 Quadrature Amplitude Modulation (QAM), and 64QAM, and they have modulation orders ($Q_m$) 2, 4, and 6, respectively. That is, the QPSK modulation transmits 2 bits per symbol, the 16QAM transmits 4 bits per symbol, and the 64QAM transmits 6 bits per symbol.

The 3GPP LTE Rel-10 adopts a Bandwidth extension to accommodate more data traffic in comparison to LTE Rel-8. This technology called Bandwidth extension or Carrier Aggregation (CA) is capable of increasing data rate as much as the extended band in comparison to the LTE Rel-8 in which the data are transmitted in a signal band. Each band is referred to as Component Carrier (CC), and the LTE Rel-8 terminal is configured to have a DL CC and UL CC. The DL CC and the UL CC having a SIB-2 connection relationship are paired to be referred to as a cell. The SIB-2 connection relationship between the DL CC and UL CC is informed by a terminal-specific signal. A CA-enabled may receive DL data and transmit UL data through a plurality of serving cells.

In Rel-10, the base station may configure a Carrier Indicator Field (CIF) as a field indicating that a serving cell for transmitting a Physical Downlink Control Channel (PDCCH), when it is difficult to transmit the PDCCH cannot through a specific serving cell, and that the corresponding PDCCH indicates a Physical Downlink Shared Channel (PDSCH) or a Physical Uplink Shared Channel (PUSCH of the corresponding serving cell. The CIF may be configured to the terminal supporting CA. The CIF is configured to indicate a serving cell by adding 3 bits to the PDCCH information in a specific serving cell and included in the information only when cross carrier scheduling is performed; if no CIF is included, the cross carrier scheduling is not performed. The CIF is included in the DL assignment to indicate the serving cell in which the PDSCH scheduled by the DL assignment is transmitted or in the UL grant to indicate the serving cell in which the PUSCH scheduled by the UL grant is transmitted.

As described above, LTE Rel-10 supports CA as a bandwidth extension technique, which makes it possible to configure multiple serving cells to a UE. The UE transmits channel information of the multiple serving cells for use by the eNB in scheduling data transmission periodically or aperiodically. The eNB schedules data transmission per carrier, and the UE transmits ACK/NACK feedback corresponding to the per-carrier data transmission. In LTE Rel-10, it is designed that the UE transmits the ACK/NACK with up to 21 bits and, if the ACK/NACK feedback and channel information transmission are overlapped in one subframe, it transmits the ACK/NACK feedback preferentially and discards the channel information. In LTE Rel-11, it is designed that the UE transmits the ACK/NACK feedback and channel information of one cell multiplexed with up to 22 bits and in PUCCH format 3 on the PUCCH format 3 resources.

In LTE Rel-13 assuming a scenario for configuring up to 32 serving cells, the number of serving cells is increased up to 32 using an unlicensed band in addition to a licensed ban. The technology introduced for providing the LTE service in the unlicensed band such as 5 GHz band in consideration of the limit of the number of licensed bands such as LTE frequency is referred to as Licensed Assisted Access (LAA). The LAA makes it possible to use an LTE cell operating in the licensed band as a primary cell (PCell) and an LAA cell operating in the unlicensed band as a secondary cell (SCell). As in LTE, the feedback information occurring in the LAA cell, i.e., SCell, should be transmitted in the PCell, and the LAA cell may flexible use uplink and downlink subframes. In the following description, unless otherwise stated, the term "LTE" is intended to include all of the advanced LTE technologies such as LTE-A and LAA.

As a next generation communication system after LTE, the 5G communication system should be designed to meet various requirements of services demanded by users and service providers.

Accordingly, it is necessary to categorize various 5G-oriented services a few types of services such as enhanced mobile broadband (eMBB), massive machine type communications (mMTC), and ultra-reliable and low-latency communications (URLLC) having various requirements such as per-UE maximum data rate of 30 Gbps, per-UE maximum mobility of 500 km/h, maximum latency of 0.5 ms, and maximum UE density of 1,000,000 UEs/km$^2$).

For example, the eMBB aims to increase the peak data rate up to 20 Gbps in DL and 10 Gbps in UL per base station. Simultaneously, it aims to increase the user-perceived data rate. In order to meet such requirements, it is necessary to improve signal transmission/reception technologies including multi-input multi-output (MIMO) technique.

Meanwhile, the mMTC is considered to support application services for Internet of Things (IoT). In order to provide mMTC-based IoT application services effectively, it is required to secure massive access resources for terminals within a cell, improve terminal coverage and battery life span, and reduce device manufacturing cost. The IoT services should be designed to support a large amount of terminals (e.g., 1,000,000 terminals/km$^2$) within a cell in consideration by the nature of the IoT terminals that are attached to various sensors and devices for providing a communication function. By the nature of the IoT services, the mMTC terminals are likely to be located in coverage holes such as basement of a building, which requires broader coverage in comparison with other services being supported in the 5G communication system. The mMTC terminals that are characterized by their low prices and battery replacement difficulty should be designed to have very long battery lifetime.

Finally, the URLLC is targeted for mission-critical cellular-based communication services such as remote robot and machinery control, industrial automation, unmanned aerial vehicle, remote health care, and emergency alert services that are requiring ultra-low latency and ultra-high reliability. For example, a URLLC service needs to meet the requirements of air-interface latency lower than 0.5 ms and packet error rate equal to or less than 10$^{-5}$. In this respect, in order to support the URLLC services, the 5G system has to support transmit time intervals (TTI) shorter than those of other services and assign broad resources in the frequency band.

The aforementioned services considered to be supported in the 5G communication system should be provided on one framework in a mixed manner. That is, it is preferred to administrate and control the services in an integrated manner rather than individually in terms of efficient resource management and control.

Figure 47:
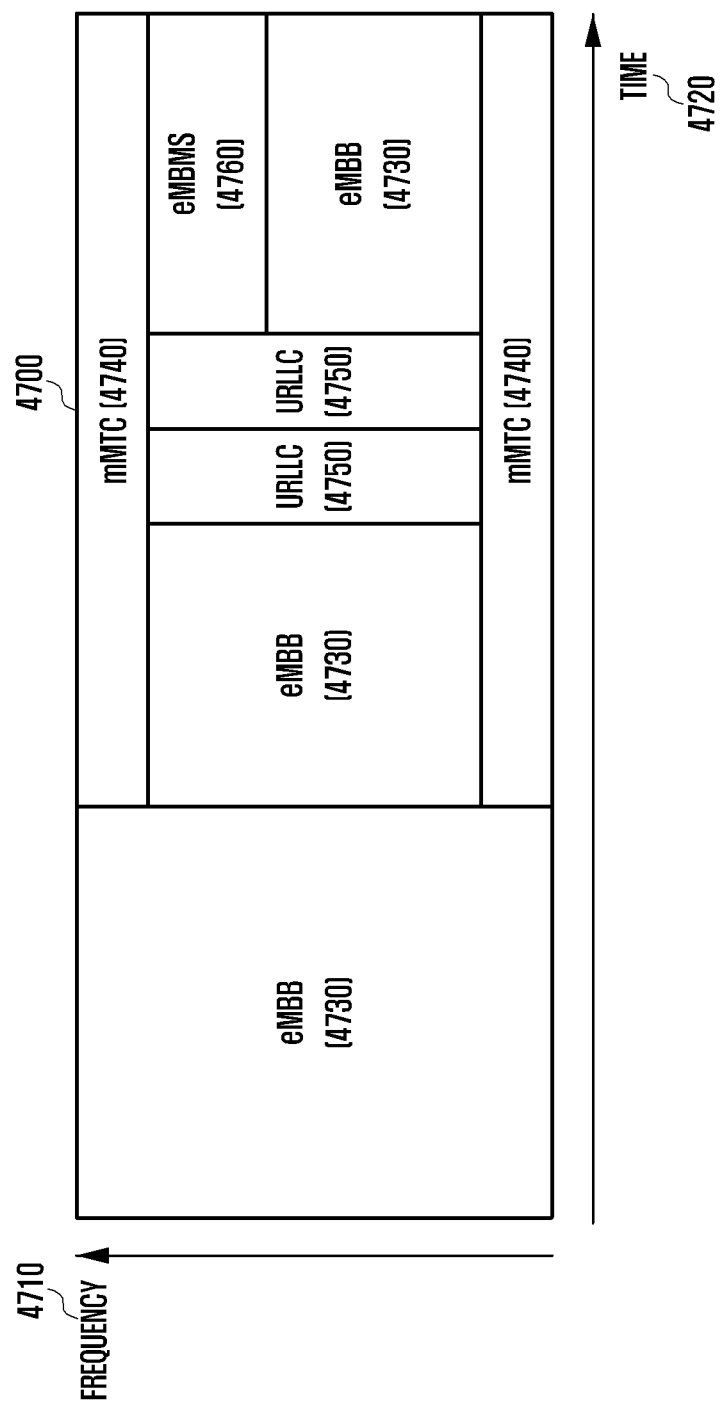
FIG. 47 is a diagram for explaining resource allocation for supporting multiple services in a 5G communication system.

FIG. 47 is a diagram for explaining resource allocation for supporting multiple services in a 5G communication system.

In FIG. 47, the frequency-time resources 4700 for use in the 5G communication system are defined by the frequency axis 4700 and the time axis 4720. The frequency-time resources 4700 consists of a plurality of resource blocks (RBs) on the frequency axis 4710 and successive subframes on the time axis 4720. Here, one RB is the smallest unit of scheduling in the frequency domain and it may be composed of a plurality of subcarriers as in LTE. Also, one subframe is the smallest unit composed of a plurality of OFDM symbols in the time domain for scheduling as in LTE.

FIG. 47 depicts that eMBB 4730, mMTC 4740, and URLLC 4750 are administrated by way of example on one frame in the 5G communication system. As an additional type of services considered to be supported in the 5G communication system is enhanced mobile broadcast/multicast service (eMBMS) for providing cellular-based broadcast services. the eMBB 4730, mMTC 4740, URLLC 4750, and eMBMS 4760 considered to be supported in the 5G communication system may be time-division-multiplexed (TDMed) and/or frequency-division-multiplexed (FDMed) in the system frequency bandwidth, and/or spatial-division-multiplexed.

For the eMBB 4730, it is preferred to occupy the frequency bandwidth as broad as possible during an arbitrary time period to secure increased data rate as described above. That is, it is preferred for the terminal to be allocated RBs as many as possible for data transmission. The eMBB service 4730 is preferred to be TDMed with other services in the system frequency-time resources 4700, and it may be possible that the eMBB service is FDMed with other services in the system frequency-time resources 4700.

For the mMTC 4740, it is required to increase transmission period to secure a broad coverage unlike other services and it is possible transmit the same packet repetitively in the same transmission period to secure the coverage. The low complexity and manufacturing price of the terminal contribute to transmission bandwidth restriction. In consideration of such requirements, the mMTC service 4740 is preferred to be FDMed with other services in the 5G communication system frequency-time resources 4700.

For the URLLC 4750, it is preferred to use a TTI shorter than those for other services to meet the ultra-low latency requirement. Also, in order to meet the ultra-high reliability requirement, it is preferred to secure a broad bandwidth in the frequency domain to achieve a low coding rate. In consideration of such requirements, the URLLC service 4750 is preferred to be TDMed with other services in the 5G communication system time-frequency resources 4700.

The aforementioned services may be provided with different transmission/reception schemes and transmission/reception parameters to meet the service-specific requirements. For example, the individual services may be provided with different numerologies to meet the service-specific requirements. The term 'numerology' is intended to include cyclic prefix (CP) length, subcarrier spacing, OFDM symbol length, and TTI in the OFDM-based or OFMDA-based communication systems.

As an example of using service-specific numerologies, the eMBMS 4760 may be provided with a CP length longer than those for other services. The eMBMS 4760 is characterized in that the same data are transmitted within all cells because it is provided in such a way of broadcasting higher layer traffic. In view of the terminal, if the signals transmitted via multiple cells are received with a delay shorter than the CP length, the terminal is capable of decoding all of the signals so as to achieve single frequency network (SFN) diversity, and this means that even the cell edge terminals may receive the broadcast information without coverage restriction. However, the CP overhead caused by using the CP length longer that those for other services to support the eMBMS 4760 in the 5G communication system brings about resource waste, and this may be interpreted as a situation of requiring an OFDM symbol length longer than those for other services and, simultaneously, a subcarrier spacing narrower than those for other services.

As another example of using service-specific numerologies, the URLLC service 4750 may be provided with a TTI shorter than those for other services, which requires a very short OFDM symbol length and a broad subcarrier spacing.

Unlike the legacy LTE system which is mainly operating in the 2 GHz frequency band, the 5G system is designed to operate in a frequency band below 6 GHz frequency band (hereinafter, referred to as sub-6 Ghz) or above 6 GHz frequency band (hereinafter, referred to as over-6 GHz) on a bandwidth equal to or broader than 20 MHz to meet the data rate requirement of 5G. It may also be considered to support coexistence of LTE and 5G on one or more sub-6 GHz LTE carriers, which is expected as an important technology for early commercialization of the 5G communication system without introduction of extra carrier for 5G. There is therefore a need of a method for enabling coexistence of LTE and 5G on at least one LTE carrier.

Exemplary embodiments of the present invention are described in detail with reference to the accompanying drawings. The same reference numbers are used throughout the drawings to refer to the same or like parts. Detailed description of well-known functions and structures incorporated herein may be omitted to avoid obscuring the subject matter of the present invention.

Although the description is directed to LTE and 5G system, it will be understood by those skilled in the art that the present invention can be applied even to other communication systems having a similar technical background and channel format, with a slight modification, without departing from the spirit and scope of the present invention.

A description is made of the coexistence system in which LTE and 5G cells coexist in support of dual connectivity or carrier aggregation or the LTE and 5G cells as stand-alone systems.

FIGS. 48, 49, and 50 are diagrams for explaining communication systems to which the present invention is applied according to embodiments 5-1, 5-2, and 5-3. These drawings depict the scenarios of the coexistence of two systems, e.g., LTE and 5G systems, and the proposed methods of the present invention is applicable to all of the systems depicted in FIGS. 48, 49, and 50.

Figure 48A:
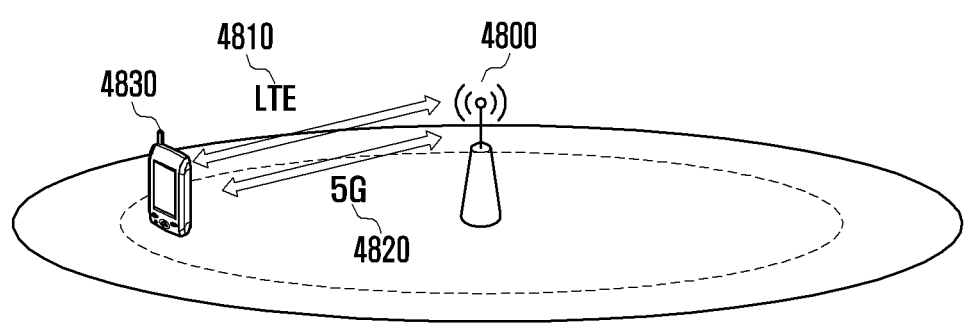
FIGS. 48A, 48B, and 48C are diagrams for explaining a communication system according to embodiment 5-1 of the present invention.

FIG. 48A is a diagram illustrating coexistence of a LTE cell and a 5G cell according to embodiment 5-1 of the present invention. FIG. 48A shows the coexistence of an LTE cell 4810 and a 5G cell 4820 that are hosted by a base station 4600. The terminal 4830 may be an LTE-capable terminal equipped with an LTE communication module, a 5G-capable terminal equipped with a 5G communication module, or a terminal equipped with the LTE communication module and the 5G communication module.

The terminal 4830 achieves synchronization based on the synchronization signals transmitted through the LTE and 5G cells 4810 and 4820 and receives system information and it communicates data with the base station 4800 through the LTE and 5G cells 4810 and 4820. In this case, the LTE and 5G cells 4810 and 4820 may operate without limitation to any duplex mode. The uplink control information is transmitted through the PCell, which is the LTE cell 4810 or the 5G cell 4820. The system depicted in FIG. 48A may support up to 32 serving cells without distinction between LTE and 5G serving cells.

It is assumed that the base station 4800 is equipped with both the LTE and 5G communication modules (systems) and controls the LTE and 5G systems in real time. In the case where the LTE and 5G systems are time-multiplexed, the base station may allocate time resources to the LTE and 5G systems dynamically. The terminal 4820 may ascertain the resources allocated for data transmission through the LTE and 5G cells 4810 and 4820 based on the resource allocation information (indicating time, frequency, antenna, and/or space resources) included in the signals received through the LTE and 5G cells.

Next, a description is made of the procedure for the base station 4800 to configure 5G resources and communicate data with the 5G-capable terminal 4830 on the 5G resources.

Figure 48B:
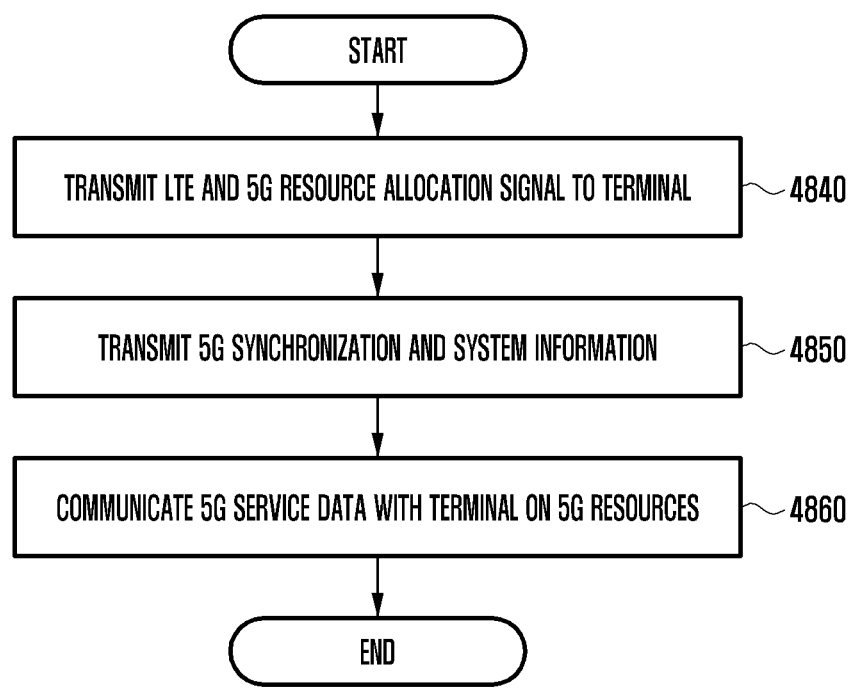

FIG. 48B is a flowchart illustrating a base station operation according to embodiment 5-1 of the present invention.

At step 4840, the base station 4800 transmits to the 5G-capable terminal 4830 an LTE or 5G resource allocation signal. This signal may be a higher layer signal or a physical layer signal. The LTE or 5G resource allocation signal conveys LTE or 5G resource location information including frequency information (information indicating carrier frequency or physical resource block (PRB)), time information (radio frame index, subframe index, MBSFN subframe information for 5G transmission, and UL subframe information for 5G transmission), antenna information, space information, duplex information (FDD DL, UL carrier information, TDD UL/DL configuration information, LAA operation-related information, etc.), and information for use by the terminal in ascertaining whether the LTE and/or 5G resources are occupied in real time according to reference signal or synchronization signal transmission. The 5G resource allocation signal may convey the information indicating whether the 5G resources are LTE UL subframes or LTE MBSFN subframes. The 5G resource allocation signal may convey the information on the 5G transmission start location such as whether the 5G resources start from the first OFDM symbol or the third OFDM symbol. The signals transmitted at the 5G transmission start location includes a synchronization or reference signal necessary for 5G data transmission, a DL control channel indicating 5G data transmission, and reference signal necessary for receiving DL control channel. The 5G resource allocation signal may convey information indicating whether the 5G transmission is performed over 12 OFDM symbols or 14 OFDM symbols. The 5G-capable terminal 4830 may further acquire synchronization information for use in the LTE system, which may be transmitted by the base station 4800.

At step 4850, the base statin 4800 may transmit 5G synchronization and system information to the 5G-capable terminal 4830. The 5G synchronization signal may be a service-specific synchronization signal for eMBB, mMTC, and URLLC services being provided with different numerologies or a common synchronization signal being transmitted on specific 5G resources with a common numerology. The system information may be the common system information being received on specific 5G resources with a common numerology or service-specific system information for eMBB, mMTC, and URLLC services being provided with different numerologies.

At step 4860, the base station 4800 communicates 5G service data with the 5G-capable terminal 4830 on the 5G resources.

Next, a description is made of the procedure for the terminal 4830 to be allocated 5G resources from the base station 4800 and perform data communication on the 5G resources.

Figure 48C:
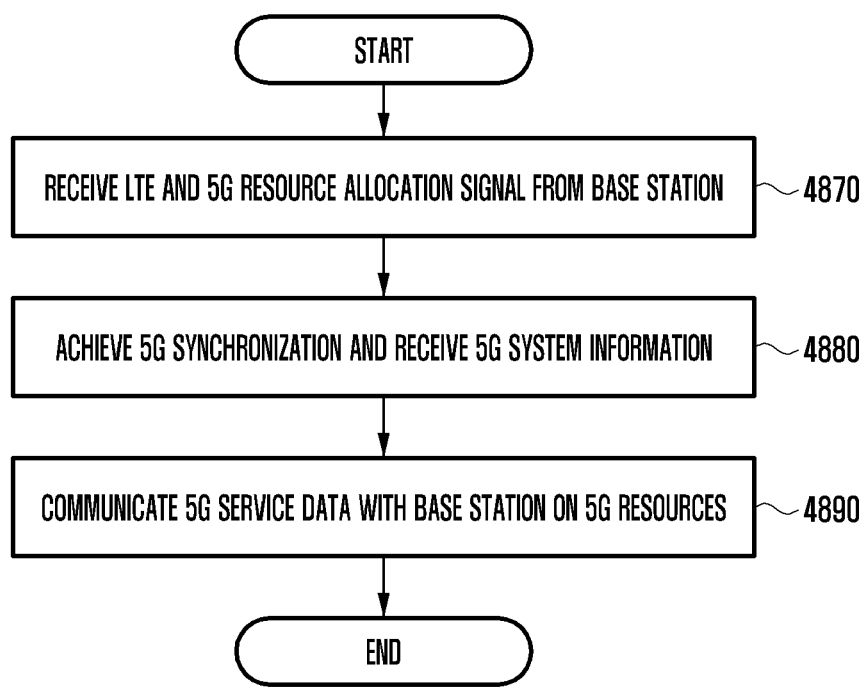

FIG. 48C is a flowchart illustrating a terminal operation according to embodiment 5-1 of the present invention.

At step 4870, the 5G-enable terminal 4830 receives LTE or 5G resource allocation signal from the base station 4800. This signal may be a higher layer signal or a physical layer signal. The LTE or 5G resource allocation signal conveys LTE or 5G resource location information including frequency information (information indicating carrier frequency or physical resource block (PRB)), time information (radio frame index, subframe index, MBSFN subframe information for 5G transmission, and UL subframe information for 5G transmission), antenna information, space information, duplex information (FDD DL, UL carrier information, TDD UL/DL configuration information, LAA operation-related information, etc.), and information for use by the terminal in ascertaining whether the LTE and/or 5G resources are occupied in real time based on reference signal or synchronization signal transmission. The 5G resource allocation signal may convey the information indicating whether the 5G resources are LTE UL subframes or LTE MBSFN subframes. The 5G resource allocation signal may convey the information on the 5G transmission start location such as whether the 5G resources start from the first OFDM symbol or the third OFDM symbol. The signals transmitted at the 5G transmission start location includes a synchronization or reference signal necessary for 5G data transmission, a DL control channel indicating 5G data transmission, and reference signal necessary for receiving DL control channel. The 5G resource allocation signal may convey information indicating whether the 5G transmission is performed over 12 OFDM symbols or 14 OFDM symbols. The 5G-capable terminal 4830 may further acquire synchronization information for use in the LTE system, which may be transmitted by the base station 4800.

At step 4880, the 5G-capable terminal 4800 achieves synchronization based on the 5G synchronization signal transmitted by the base station 4800 and receives system information transmitted by the base station 4800. The 5G synchronization signal may be a service-specific synchronization signal for eMBB, mMTC, and URLLC services being provided with different numerologies or a common synchronization signal being transmitted on specific 5G resources with a common numerology. The system information may be the common system information being received on specific 5G resources with a common numerology or service-specific system information for eMBB, mMTC, and URLLC services being provided with different numerologies.

At step 4890, the 5G-capable UE 4830 communicates 5G service data with the base station 4800 on the 5G resources.

Figure 49A:
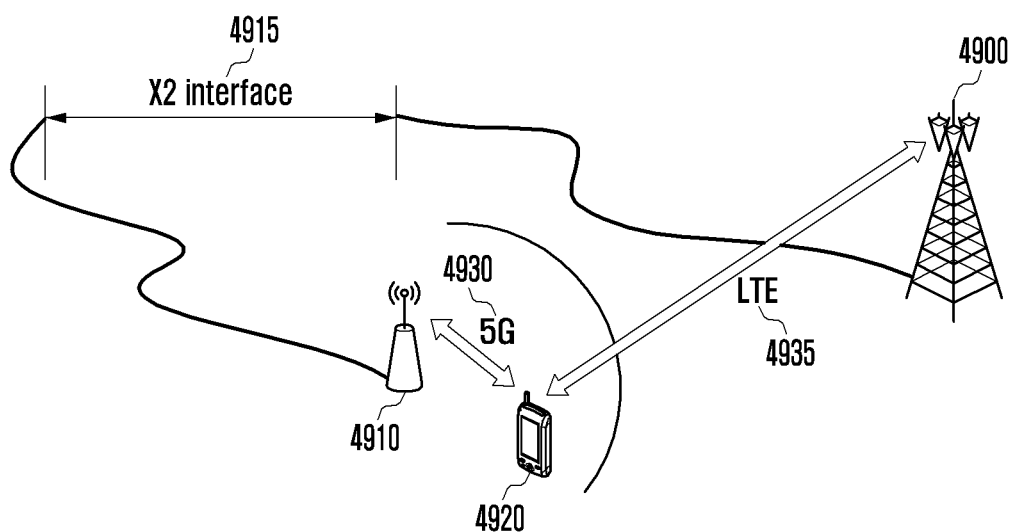
FIGS. 49A, 49B, and 49C are diagrams for explaining a communication system according to embodiment 5-2 of the present invention.

FIG. 49A is a diagram illustrating coexistence of an LTE cell and a 5G cell according to embodiment 5-2 of the present invention. FIG. 49A shows a network in which a LTE macro base station 4900 for securing large coverage and a 5G small base station 4910 for improvement data rate are installed. The terminal 4920 may be an LTE-capable terminal equipped with an LTE communication module, a 5G-capable terminal equipped with a 5G communication module, or a terminal equipped with the LTE communication module and the 5G communication module.

The terminal 4920 achieves synchronization based on the synchronization signal transmitted by the LTE base station 4900 or the 5G base station and receives system information and it communicates data with the LTE base station 4900 and the 5G base station 4910. In this case, the LTE macro base station 4900 or the 5G small base station 4910 may operate without limitation to any duplex mode. The plink control information is transmitted through the PCell, which is the LTE cell 4935 or the 5G cell 4930.

Here, it is assumed that the LTE base station 4900 and the 5G base station 4910 are connected through an ideal backhaul network or a non-ideal backhaul network. In the case of the ideal backhaul network 4915, it is possible to achieve fast inter-base station X2 communication 4915 and thus, although the UL transmission is performed only to the LTE base station 4900, the 5G base station may obtain the related control information from the LTE base station in real time.

In the system depicted in FIG. 49A, the LTE and 5G base stations 4900 and 4910 may support up to 32 serving cells in total. The base station 4900 or 4910 may control the LTE and 5G systems in real time. In the case where the base station 4900 multiplexes the LTE and 5G systems in time, it may allocate time resources to the LTE and 5G systems dynamically and send the resource allocation information to the other base station 4910 via X2 interface. The terminal 4920 may ascertain the resources allocated for data transmission through the LTE and 5G cells 4935 and 4930 based on the resource allocation information (indicating time, frequency, antenna, and/or space resources) included in the signals received from the LTE base station 4900 or the 5G base station 4910.

Meanwhile, in the case where LTE base station 4900 and the 5G base station 4910 are connected through the non-ideal backhaul network, it is impossible to perform the fast inter-base station X2 communication 4915. Accordingly, the base stations 4900 and 4910 may operate the LTE and 5G systems semi-statically. If the base station 4900 multiplexes the LTE and 5G systems in time, it may allocate time resources to the LTE and 5G systems dynamically and send the resource allocation information to the other base station 4910 in advance via X2 interface to make a distinction between LTE and 5G system resources. The terminal 4920 may ascertain the resources allocated for data transmission through the LTE and 5G cells 4935 and 4930 based on the resource allocation information (indicating time, frequency, antenna, and/or space resources) included in the signals received from the LTE base station 4900 or the 5G base station 4910.

Next, a description is made of the procedure for the base station 4900 or 4910 to configure 5G resources and communicate data with the 5G-capable terminal 4920 on the 5G resources.

Figure 49B:
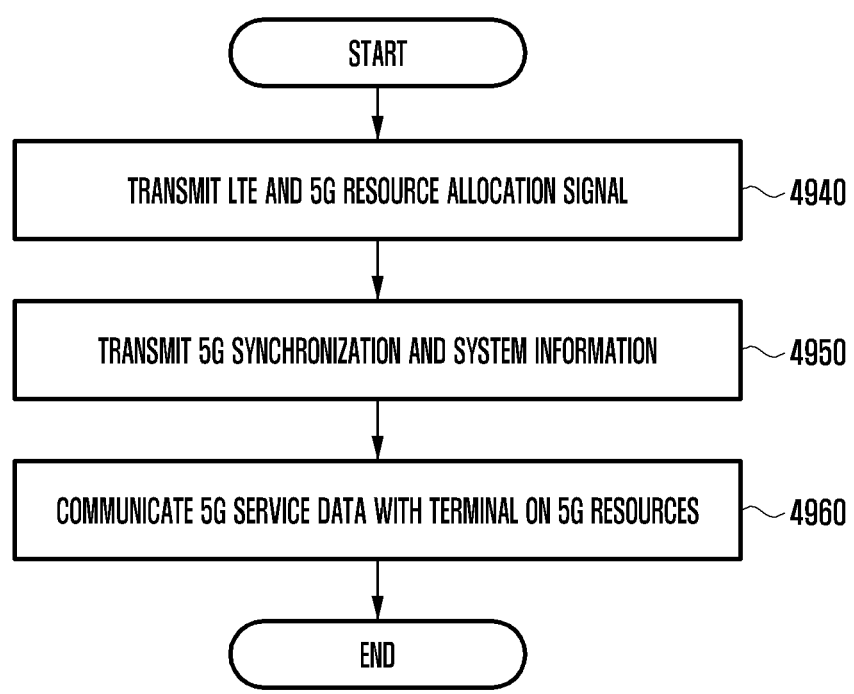

FIG. 49B is a flowchart illustrating a base station operation according to embodiment 5-2 of the present invention.

At step 4940, the base station 4900 transmits an LTE or 5G resource allocation signal to the 5G base station via the X2 interface 4915 and to the terminal 4920. In the case of distinguishing between resources for LTE and 5G systems, the base station 4900 may allocate the time resources to the LTE and 5G systems dynamically and send the resource allocation information to the other base station 4910 for distinction between the LTE and 5G system resources. The LTE or 5G resource allocation signal being transmitted to the 5G-capable terminal 4920 may be a higher layer signal or a physical layer signal. The LTE or 5G resource allocation signal conveys LTE or 5G resource location information including frequency information (carrier frequency or physical resource block (PRB) location information), time information (radio frame index, subframe index, MBSFN subframe information for 5G transmission, and UL subframe information for 5G transmission), antenna information, space information, duplex information (FDD DL, UL carrier information, TDD UL/DL configuration information, LAA operation-related information, etc.), and information for use by the terminal in ascertaining whether the LTE and/or 5G resources are occupied in real time based on reference signal or synchronization signal transmission. The 5G resource allocation signal may convey the information indicating whether the 5G resources are LTE UL subframes or LTE MBSFN subframes. The 5G resource allocation signal may convey the information on the 5G transmission start location such as whether the 5G resources start from the first OFDM symbol or the third OFDM symbol. The signals transmitted at the 5G transmission start location includes a synchronization or reference signal necessary for 5G data transmission, a DL control channel indicating 5G data transmission, and reference signal necessary for receiving DL control channel. The 5G resource allocation signal may convey information indicating whether the 5G transmission is performed over 12 OFDM symbols or 14 OFDM symbols. The 5G-capable terminal 4920 may further acquire synchronization information for use in the LTE system, which may be transmitted by the base station 4900.

At step 4950, the base station 4900 or 4910 transmits 5G synchronization and system information to the 5G-capable terminal 4920. The 5G synchronization signal may be a service-specific synchronization signal for eMBB, mMTC, and URLLC services being provided with different numerologies or a common synchronization signal being transmitted on specific 5G resources with a common numerology. The system information may be the common system information being received on specific 5G resources with a common numerology or service-specific system information for eMBB, mMTC, and URLLC services being provided with different numerologies.

At step 4960, the base station 4910 communicate 5G service data with the 5G-capable terminal 4920 on the 5G resources.

Next, a description is mad of the procedure for the 5G-capable terminal 4920 to be allocated 5G resources from the base station 4900 or 4910 and perform data communication on the 5G resources.

Figure 49C:
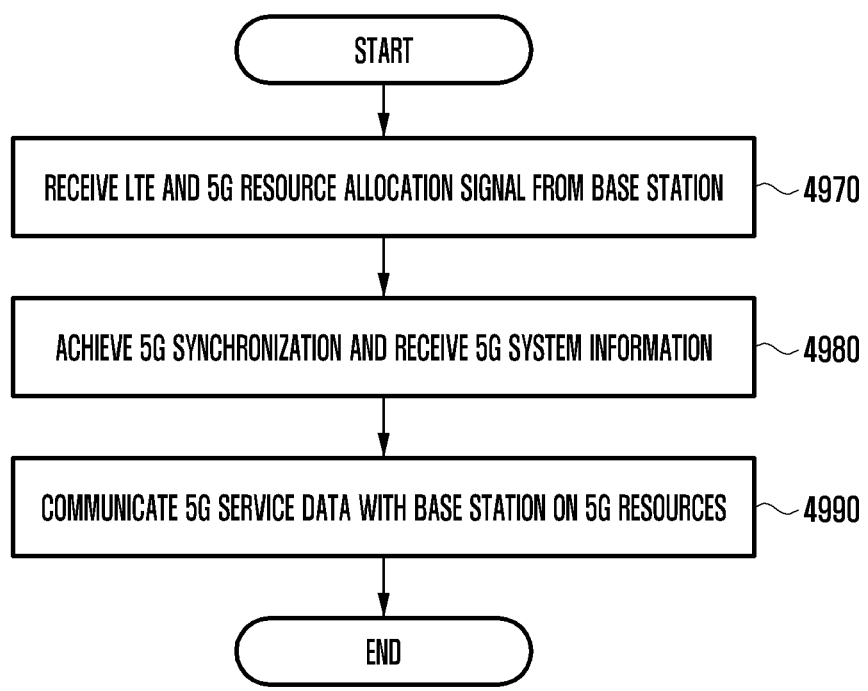

FIG. 49C is a flowchart illustrating a terminal operation according to embodiment 5-2 of the present invention.

At step 4970, the 5G-capable terminal 4920 receives LTE or 5G resource allocation signal from the base station 4900 or 4910. This signal may be a higher layer signal or a physical layer signal. The LTE or 5G resource allocation signal conveys LTE or 5G resource location information including frequency information (carrier frequency or physical resource block (PRB) location information), time information (radio frame index, subframe index, MBSFN subframe information for 5G transmission, and UL subframe information for 5G transmission), antenna information, space information, duplex information (FDD DL, UL carrier information, TDD UL/DL configuration information, LAA operation-related information, etc.), and information for use by the terminal in ascertaining whether the LTE and/or 5G resources are occupied in real time based on reference signal or synchronization signal transmission. The 5G resource allocation signal may convey the information indicating whether the 5G resources are LTE UL subframes or LTE MBSFN subframes. The 5G resource allocation signal may convey the information on the 5G transmission start location such as whether the 5G resources start from the first OFDM symbol or the third OFDM symbol. The signals transmitted at the 5G transmission start location includes a synchronization or reference signal necessary for 5G data transmission, a DL control channel indicating 5G data transmission, and reference signal necessary for receiving DL control channel. The 5G resource allocation signal may convey information indicating whether the 5G transmission is performed over 12 OFDM symbols or 14 OFDM symbols. The 5G-capable terminal 4920 may further acquire synchronization information for use in the LTE system, which may be transmitted by the base station 4900.

At step 4980, the 5G-capable terminal 4920 achieves synchronization based on the 5G synchronization signal transmitted by the base station 4900 or 4910 and receives system information transmitted by the base station 4900 or 4910. The 5G synchronization signal may be a service-specific synchronization signal for eMBB, mMTC, and URLLC services being provided with different numerologies or a common synchronization signal being transmitted on specific 5G resources with a common numerology. The system information may be the common system information being received on specific 5G resources with a common numerology or service-specific system information for eMBB, mMTC, and URLLC services being provided with different numerologies.

At step 4990, the 5G-capable UE 4920 communicates 5G service data with the base station 4910 on the 5G resources.

Figure 50A:
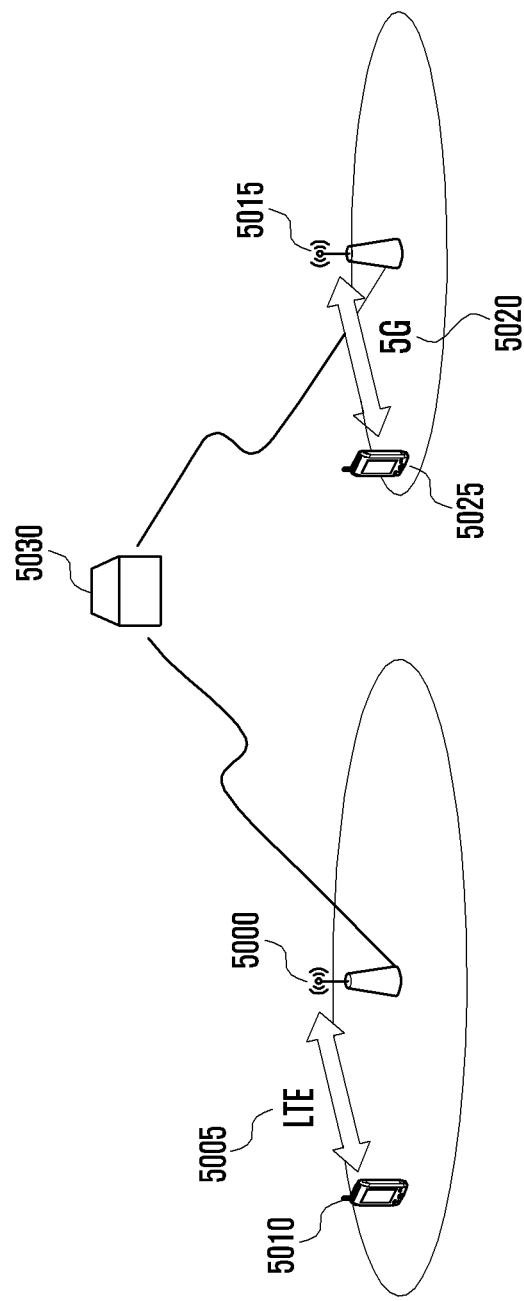
FIGS. 50A, 50B, and 50C are diagrams for explaining a communication system according to embodiment 5-3 of the present invention

FIG. 50A is a diagram illustrating coexistence of an LTE cell and a 5G cell according to embodiment 5-3 of the present invention. FIG. 50A shows a situation where a LTE base station 5000 and a 5G base station 5015 are installed. In this case, the LTE and 5G base stations 5000 and 5015 may operate without limitation to any duplex mode. The LTE and 5G base stations 5000 and 5015 are operating as stand-along base stations, and a terminal may camp on both the base stations.

The LTE-capable terminal 5010 equipped with an LTE communication module may camp on the LTE eNB 5000 and then it may achieve synchronization based on the synchronization signal transmitted by the LTE base station 500, receive system information, and communicate data with the LTE base station 5000 as denoted by reference number 5005. The 5G-capable terminal 5025 equipped with a 5G communication module may camp on the 5G base station 5015 and then it may achieve synchronization based on the synchronization signal transmitted by the 5G base station 5015, receive system information, and communicate data with the 5G base station 5015 as denoted by reference number 5020.

In the case where there is an integrated controller 5030, it may be possible for the integrated controller 5030 to control the LTE and 5G base stations 5000 and 5015 in real time. If the integrated controller 5030 multiplexes the LTE and 5G systems in time, it may be possible to dynamically allocate time resources to the LTE and 5G systems and transmit resource allocation information to the LTE and 5G base stations 5000 and 5015. The LTE-capable terminal 5010 may ascertain the resources allocated for data transmission from the LTE base station based on the resource allocation information (indicating time, frequency, antenna, and/or space resources) included in the signal received from the LTE base station 5000. The 5G-capable terminal 5025 may ascertain the resources allocated for data transmission from the 5G base station based on the resource allocation information (indicating time, frequency, antenna, and/or space resources) included in the signal received from 5G base station 5015.

In the case where there is no integrated controller, the base station and terminal operate as described with reference to FIG. 49. If the two base station are connected through a non-ideal backhaul, it is impossible to communicate via fast inter-base station X2 interface. Accordingly, the base stations 5000 and 5015 may operate the LTE and 5G systems semi-statically. If the base station 5000 or 5015 multiplexes the LTE and 5G systems in time, it may allocate time resources to the LTE and 5G systems dynamically and send the resource allocation information to the other base station 5015 or 5000 in advance via X2 interface to make a distinction between LTE and 5G system resources. The LTE-capable terminal 5010 may ascertain the resources allocated for data transmission from the LTE base station based on the resource allocation information (indicating time, frequency, antenna, and/or space resources) included in the signal received from the LTE base station 5000. The 5G-capable terminal 5025 may ascertain the resources allocated for data transmission from the 5G base station based on the resource allocation information (indicating time, frequency, antenna, and/or space resources) included in the signal received from 5G base station 5015.

Next, a description is made of the procedure for the base station 5015 configure 5G resources and communicate data with the 5G-capable terminal 5025 on the 5G resources.

Figure 50B:
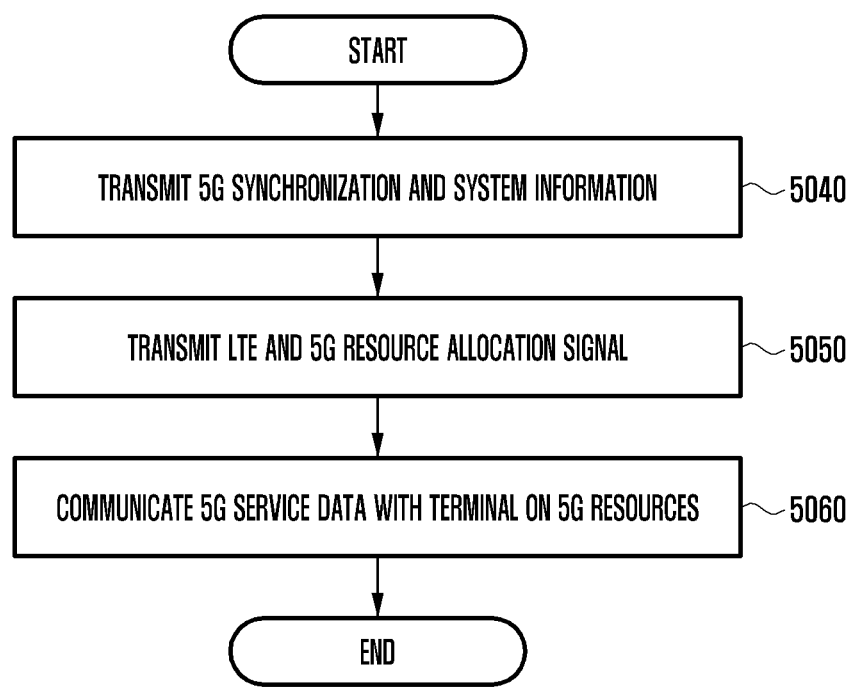

FIG. 50B is a flowchart illustrating a base station operation according to embodiment 5-3 of the present invention.

At step S040, the base station 5015 transmits 5G synchronization and system information to the terminal 5025 on the resources configured for 5G transmission. The 5G synchronization signal may be a service-specific synchronization signal transmitted for the eMBB, mMTC, and URLLC services with service-specific numerologies or a common synchronization signal transmitted on specific 5G resources with a common numerology. The system information may be the common system information transmitted on specific 5G resources with a common numerology and the service-specific system information for the eMBB, mMTC, and URLLC services transmitted with service-specific numerologies.

At step S050, the 5G base station 5015 transmits an LTE or 5G resource allocation signal to the terminal 5025. The LTE or 5G resource allocation signal being transmitted to the 5G-capable terminal 5025 may be a higher layer signal or a physical layer signal. The LTE or 5G resource allocation signal conveys LTE or 5G resource location information including frequency information (carrier frequency or physical resource block (PRB) location information), time information (radio frame index, subframe index, MBSFN subframe information for 5G transmission, and UL subframe information for 5G transmission), antenna information, space information, duplex information (FDD DL, UL carrier information, TDD UL/DL configuration information, LAA operation-related information, etc.), and information for use by the terminal in ascertaining whether the LTE and/or 5G resources are occupied in real time based on reference signal or synchronization signal transmission. The 5G resource allocation signal may convey the information indicating whether the 5G resources are LTE UL subframes or LTE MBSFN subframes. The 5G resource allocation signal may convey the information on the 5G transmission start location such as whether the 5G resources start from the first OFDM symbol or the third OFDM symbol. The signals transmitted at the 5G transmission start location includes a synchronization or reference signal necessary for 5G data transmission, a DL control channel indicating 5G data transmission, and reference signal necessary for receiving DL control channel. The 5G resource allocation signal may convey information indicating whether the 5G transmission is performed over 12 OFDM symbols or 14 OFDM symbols. The 5G-capable terminal 5025 may further acquire synchronization information for use in the LTE system, which may be transmitted by the base station 5000.

If there is an integrated controller 5030, the integrated controller 5030 may allocate LTE or 5G resources and transmits the resource allocation information to the 5G base station 5015 via an X2 interface. In detail, in the case where the resources are divided into LTE system resources and 5G system resources, the integrated controller 5030 may allocate resources for the LTE and 5G systems and transmits resource allocation information to the base station 5000 or 5015 via the X2 interface to make a distinction between the LTE and 5G system resources. If there is no integrated controller, the LTE or 5G base station may allocate the LTE or 5G resources and sends the resource allocation information to the other base station.

At step S060, the base station 5015 communicate 5G service data with the 5G-capable terminal 5025 on the 5G resources.

Steps S040 and S050 may be performed in the reverse order. Next, a description is made of the procedure for the 5G-capable terminal 5025 to be allocated 5G resources from the base station 5015 and communicate data on the 5G resources.

Figure 50C:
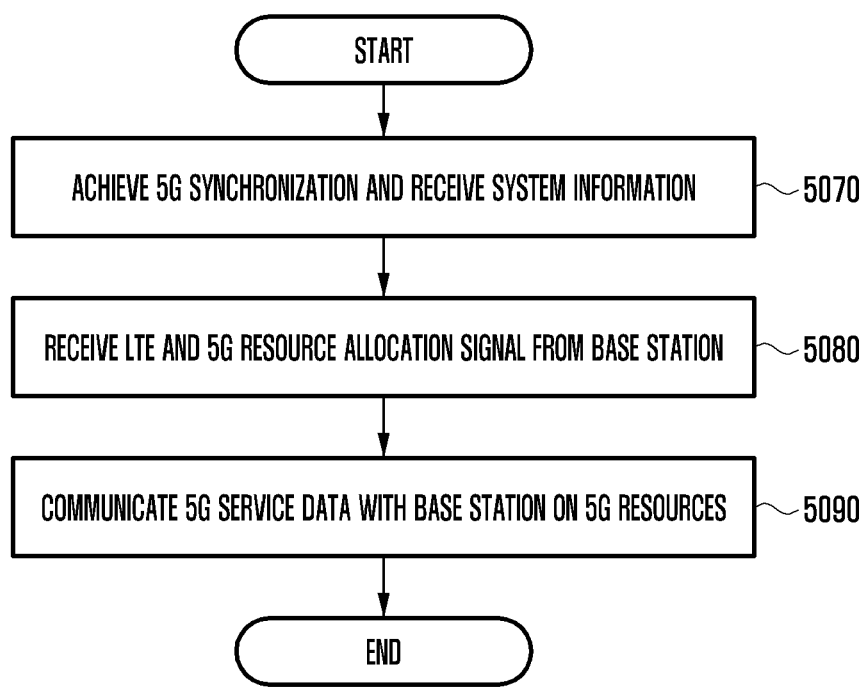

FIG. 50C is a flowchart illustrating a terminal operation according to embodiment 5-3 of the present invention.

At step S070, the 5G-capable terminal 5025 achieves synchronization based on the 5G synchronization signal transmitted by the base station 5015 on the resources configured for 5G transmission and receives system information transmitted by the base station 5015. The 5G synchronization signal may be service-specific synchronization signal for eMBB, mMTC, and URLLC services being transmitted with service-specific numerologies or a common synchronization signal transmitted on specific 5G resources with a common numerology. The system information may be the common system information transmitted on specific 5G resources with a common numerology and the service-specific system information for the eMBB, mMTC, and URLLC services transmitted with service-specific numerologies.

At step S080, the 5G-capable terminal 5025 may receive an LTE or 5G resource allocation signal from the base station 5015. This signal may be a higher layer signal or a physical layer signal. The LTE or 5G resource allocation signal conveys LTE or 5G resource location information including frequency information (carrier frequency or physical resource block (PRB) location information), time information (radio frame index, subframe index, MBSFN subframe information for 5G transmission, and UL subframe information for 5G transmission), antenna information, space information, duplex information (FDD DL, UL carrier information, TDD UL/DL configuration information, LAA operation-related information, etc.), and information for use by the terminal in ascertaining whether the LTE and/or 5G resources are occupied in real time based on reference signal or synchronization signal transmission. The 5G resource allocation signal may convey the information indicating whether the 5G resources are LTE UL subframes or LTE MBSFN subframes. The 5G resource allocation signal may convey the information on the 5G transmission start location such as whether the 5G resources start from the first OFDM symbol or the third OFDM symbol. The signals transmitted at the 5G transmission start location includes a synchronization or reference signal necessary for 5G data transmission, a DL control channel indicating 5G data transmission, and reference signal necessary for receiving DL control channel. The 5G resource allocation signal may convey information indicating whether the 5G transmission is performed over 12 OFDM symbols or 14 OFDM symbols. The 5G-capable terminal 5025 may further acquire synchronization information for use in the LTE system, which may be transmitted by the base station 5000.

At step S090, the 5G-capable terminal 5025 communicate 5G service data with the base station 5015 on the 5G resources.

Steps S070 and S080 may be performed in the reverse order. Next, a description is made of the method for performing LTE and 5G data communications that are multiplexed in time on one LTE carrier in an environment where the LTE and 5G systems coexist as shown in FIGS. 48, 49, and 50.

Figure 51:
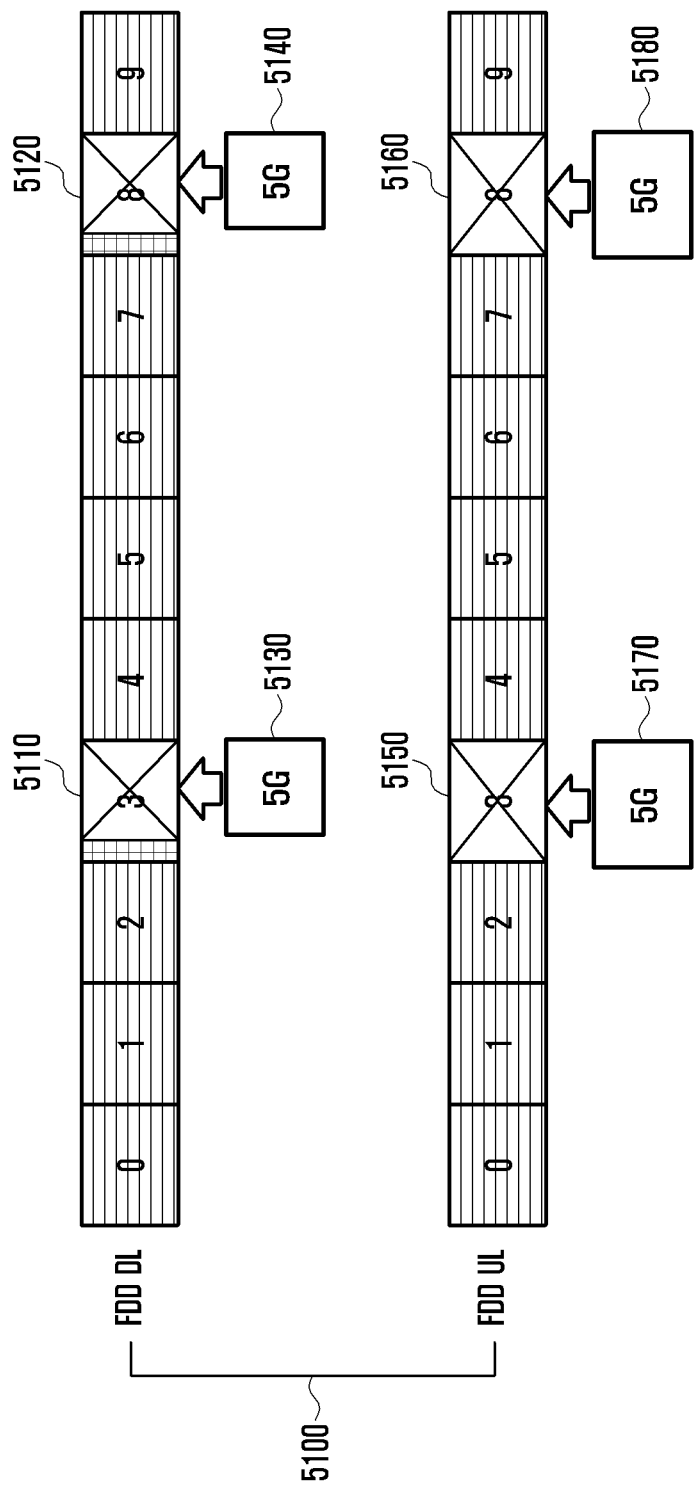
FIG. 51 is a diagram for explaining a method for multiplexing LTE and 5G data communications in time using MBSFN subframes on LTE FDD carriers.

FIG. 51 is a diagram for explaining a method for multiplexing LTE and 5G data communications in time using MBSFN subframes on LTE FDD carriers.

In FIG. 51, a 5G base station may transmit to a 5G-capable terminal the information on FDD resources 5100 (e.g., at least one of DL carrier frequency bandwidth (BW), DL carrier frequency location, UL carrier frequency BW, and Ul carrier frequency location), and the 5G-capable terminal may ascertain the FDD resource allocation information after achieving synchronization and receiving system information.

In FDD 5100, the MBSFN subframe may be configured selectively among subframes #1, #2, #3, #6, #7 and #8 via higher layer signaling. The 5G base station may transmit to the 5G-capable terminal the configuration information indicating the subframes for use in 5G transmission among the configured MBSFN subframes, and the 5G-capable terminal may ascertain the resources allocated for 5G data transmission based on the received subframe configuration information. It may also be possible to transmit the configuration information indicating the subframe in use for 5G transmission to the 5G-capable terminal implicitly via the configuration information indicating the subframes not in use for 5G transmission, i.e., reserved resource configuration information) rather than explicitly.

Meanwhile, the 2 OFDM symbols at the beginning of the MBSFN subframes composed of 14 OFDM symbols are used for CRS and control channel transmission to LTE terminals. Accordingly, the 5G transmission is performed in the remaining 12 OFDM symbols as denoted by reference numbers 5130 and 5140 with the exception of the 2 OFDM symbols at the beginning. The 5G DL transmission 5130 and 5140 should start at the third OFDM symbol following the two OFDM symbols at the beginning, and the 5G terminal should ascertain the start point of the 5G DL transmission 5130 and 5140 in synchronization with the start of the $3^{rd}$ OFDM symbol.

In UL, however, all of the 14 OFDM symbols constituting the MBSFN subframe 5150 and 5160 may be configured for use in 5G UL data transmission as denoted by reference number 5170 and 5180. Accordingly, the 5G UL transmission 5170 and 5180 should start at the first OFDM symbol, and the 5G terminal should ascertain the start point of the 5G UL transmission 5170 and 5180 in synchronization with the start of the first OFDM symbol.

Considering that the LTE terminals supporting transmission modes 9 and 10 within an LTE cell may perform data transmission based on the demodulation reference signal (DMRS) and channel state indicator reference signal (CSI-RS) in the MBSFN subframes, it may be possible to multiplex the LTE and 5G transmissions in frequency within the MBSFN subframe for the 5G and LTE terminals. In this case, the LTE and 5G transmissions should be configured with the same numerology. For example, the subcarrier spacing of 15 kHz configured for LTE should be applied for the 5G transmission. In this way, the LTE and 5G transmission may be performed without affecting each other.

In order to use different numerologies between LTE and 5G, there is a need of a guard band between LTE and 5G resources for protecting LTE transmission. In the case of configurating the guard band, it may be necessary to signal the guard band-related information to the 5G terminal, which may receive 5G control information and reference signal or data on the 5G resources with the exception of the guard band based on the guard band-related information. Such a frequency-division resource allocation may be performed according to one of the procedures described with reference to FIGS. 48, 49, and 50.

In the embodiment of FIG. 51, the MBSFN subframes #3 and #8 5110 and 5120 are used for 5G data transmissions 5130 and 5140, and the base stations and terminals perform 5G data communications according to the procedures as described with reference to FIGS. 48, 49, and 50. In order to transmit uplink control information for 5G data, uplink resources 5170 and 5180 for 5G data are configured. The UL resource location may be changed according to the 5G HARQ feedback timing or UL control information design. In the case where the UL feedback timing corresponding to the 5G DL data is located in the next subframe #4 or #9, the subframe #4 or #9 may be configured as UL resources.

Figure 52:
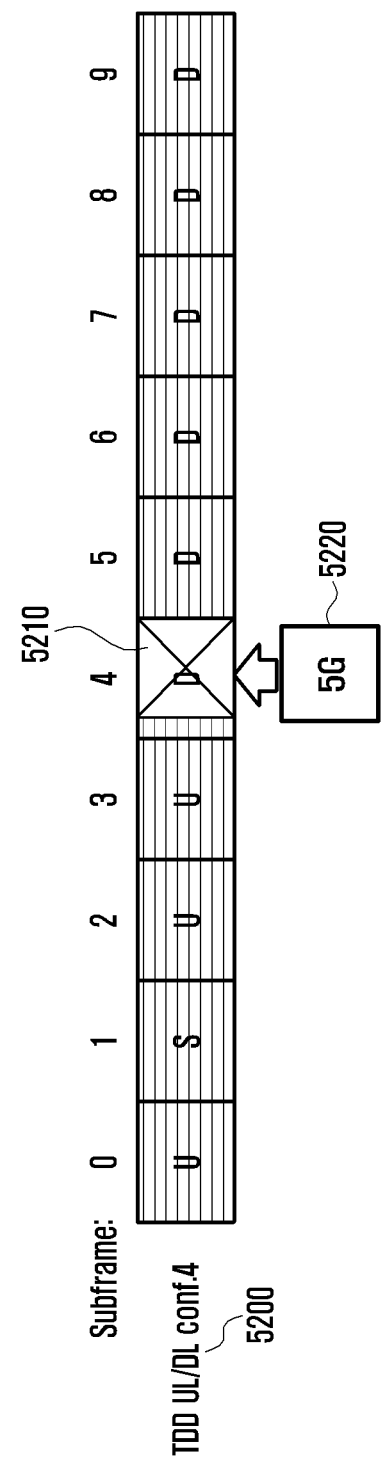
FIG. 52 is a diagram for explaining a method for multiplexing LTE and 5G data communications in time using an MBSFN subframe on an LTE TDD carrier.

FIG. 52 is a diagram for explaining a method for multiplexing LTE and 5G data communications in time using an MBSFN subframe on an LTE TDD carrier.

In FIG. 52, a 5G base station may transmit to a 5G-capable terminal the information on TDD resources 5200 (e.g., carrier frequency BW, carrier frequency location, TDD UL-DL configuration information, TDD special subframe configuration information, and dynamic TDD UL-DL configuration information for enhanced interference management and traffic adaptation (eIMTA)), and the 5G-capable terminal may ascertain the TDD resource allocation information after achieving synchronization and receiving system information.

In TDD 5200, the MBSFN subframe may be configured selectively among subframes #3, #4, #7, #8, and #9 via higher layer signaling. The 5G base station may transmit to the 5G-capable terminal the configuration information indicating the subframes for use in 5G transmission among the configured MBSFN subframes, and the 5G-capable terminal may ascertain the resources allocated for 5G data transmission based on the received subframe configuration information.

Meanwhile, the 2 OFDM symbols at the beginning of the MBSFN subframes composed of 14 OFDM symbols are used for CRS and control channel transmission to LTE terminals. Accordingly, the 5G transmission is performed in the remaining 12 OFDM symbols as denoted by reference number 5210 with the exception of the 2 OFDM symbols at the beginning and should start in synchronization with the start point of the third OFDM symbol following the two OFDM symbols at the beginning. The 5G terminal should ascertain the start point of the 5G DL transmission 5220 in synchronization with the start of the 3$^{rd}$ OFDM symbol.

Considering that the LTE terminals supporting transmission modes 9 and 10 within an LTE cell may perform data transmission based on the demodulation reference signal (DMRS) and channel state indicator reference signal (CSI-RS) in the MBSFN subframes, it may be possible to multiplex the LTE and 5G transmissions in frequency within the MBSFN subframe for the 5G and LTE terminals. In this case, the LTE and 5G transmissions should be configured with the same numerology. For example, the subcarrier spacing of 15 kHz configured for LTE should be applied for the 5G transmission.

In order to use different numerologies between LTE and 5G, there is a need of a guard band between LTE and 5G resources for protecting LTE transmission. In the case of configurating the guard band, it may be necessary to signal the guard band-related information to the 5G terminal, which may receive 5G control information and reference signal or data on the 5G resources with the exception of the guard band based on the guard band-related information.

Such a frequency-division resource allocation may be performed according to one of the procedures described with reference to FIGS. 48, 49, and 50.

In the embodiment of FIG. 52, the MBSFN subframes #4 5210 are used for 5G data transmissions 5220. The base stations and terminals perform 5G data communications according to the procedures as described with reference to FIGS. 48, 49, and 50. Also, the UL control information for 5G data may be transmitted in the subframe #4. The resource location of the UL control signal in the subframe #4 may be changed according to the 5G HARQ feedback timing or UL control information design.

Figure 53:
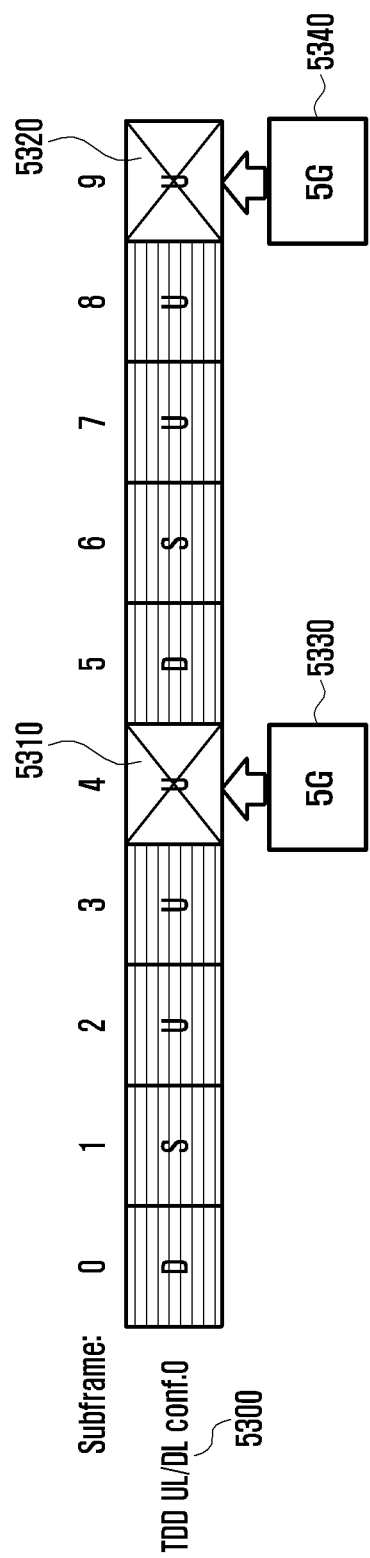
FIG. 53 is a diagram for explaining a method for multiplexing LTE and 5G data communications in time using an uplink subframe on an LTE TDD carrier.

FIG. 53 is a diagram for explaining a method for multiplexing LTE and 5G data communications in time using an uplink subframe on an LTE TDD carrier.

In FIG. 53, a 5G base station may transmit to a 5G-capable terminal the information on TDD resources 5300 (e.g., carrier frequency BW, carrier frequency location, TDD UL-DL configuration information, TDD special subframe configuration information, and dynamic TDD UL-DL configuration information for eIMTA), and the 5G-capable terminal may ascertain the TDD resource allocation information after achieving synchronization and receiving system information.

In TDD 5300, the 5G base station may transmit to the 5G-capable terminal the configuration information indicating the UL subframe in use for 5G transmission, and the 5G-capable terminal may ascertain the resources allocated for 5G data transmission based on the received subframe configuration information.

In the subframe 5310 or 5320 as the resources configured for 5G data transmission in UL and DL, all of 14 OFDM symbols may be used for 5G transmission 5330 or 5340. Accordingly, the 5G UL or DL transmission should start at the first OFDM symbol, and the 5G terminal should ascertain the start point of the 5G UL or DL transmission 5330 or 5340 in synchronization with the start of the first OFDM symbol.

In the embodiment of FIG. 53, the UL subframes #4 and #9 5310 and 5320 are used for 5G data transmission 5330 or 5340, and the base stations and terminals perform 5G data communications according to the procedures as described with reference to FIGS. 48, 49, and 50. The uplink control information for 5G data is also transmitted in the subframe #4 or #9. The resource location of the uplink control information in the subframe #4 or #9 may be changed according to the 5G HARQ feedback timing or UL control information design.

Figure 54:
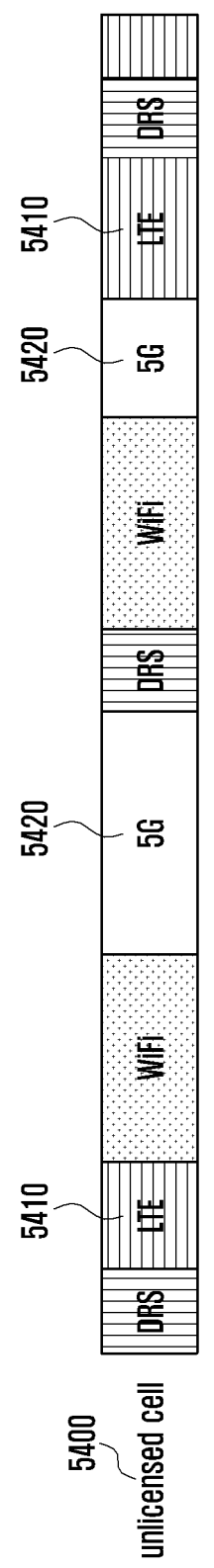
FIG. 54 is a diagram for explaining a method for multiplexing LTE and 5G data communications in an LAA mode on an unlicensed band carrier.

FIG. 54 is a diagram for explaining a method for multiplexing LTE and 5G data communications in an LAA mode on an unlicensed band carrier. Although FIG. 54 depicts an LAA operation on an unlicensed band carrier, it may also be possible to apply the LAA operation on a licensed band carrier.

In FIG. 54, a 5G base station may transmit to a 5G-capable terminal the information on the carrier 5400 (e.g., carrier frequency BW, carrier frequency location, and discovery reference signal (DRS) configuration information), and the 5G-capable terminal may ascertain the above information after achieving synchronization and receiving system information.

On the carrier 5400, the 5G base station may transmit to the 5G-capable terminal the configuration information indicating the subframes for use in 5G transmission, and the 5G-capable terminal may ascertain the resources allocated for 5G data transmission based on the received subframe configuration information.

In the embodiment of FIG. 54, the resources 5410 are used for LTE transmission, and the resources 5420 are used for 5G transmission. The base stations and terminals perform 5G data communications according to the procedures as described with reference to FIGS. 48, 49, and 50. The uplink control information for 5G data is also transmitted in the resources 5420 configured for 5G transmission. The resource location of the uplink control information in the resources 5420 may be changed according to the 5G HARQ feedback timing or UL control information design.

Figure 55:
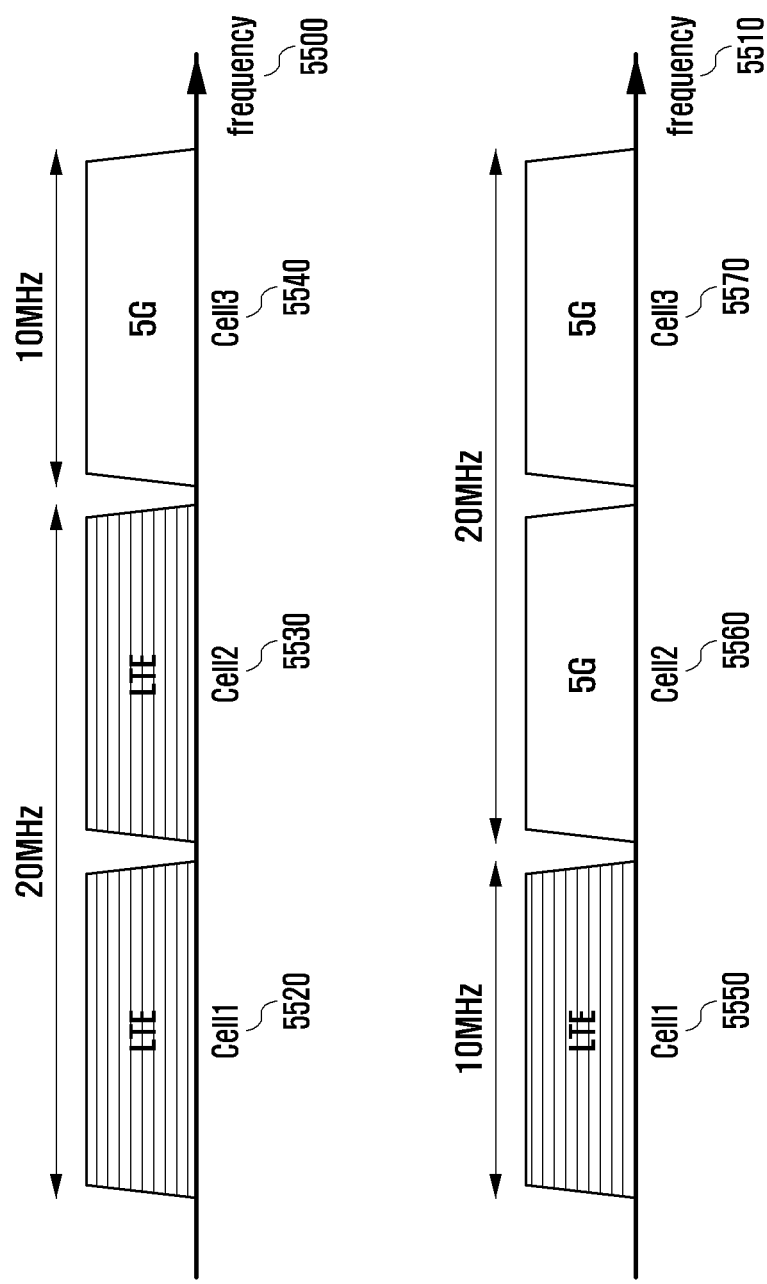
FIG. 55 is a diagram for explaining a method for multiplexing LTE and 5G data communication in frequency by cell activation and deactivation operation in a CA mode supporting a plurality of LTE carriers.

FIG. 55 is a diagram for explaining a method for multiplexing LTE and 5G data communication in frequency by cell activation and deactivation operation in a carrier aggregation (CA) mode supporting a plurality of LTE carriers.

In FIG. 55, a plurality of cells 5520 to 5570 are configured to operate duplex of in FDD, TDD, LAA, and a 5G base station may transmit FDD cell information (at least one of DL carrier frequency BW, DL carrier frequency location, UL carrier frequency BW, and UL carrier frequency location), TDD cell information (at least one of carrier frequency BW, carrier frequency location, TDD UL-DL configuration information, TDD special subframe configuration information, and dynamic UL-DL configuration for eIMTA operation), LAA cell information (at least one of carrier frequency BW, carrier frequency location information, and DRS configuration information) to a 5G-capable terminal, and the 5G-capable terminal may ascertain the above information after achieving synchronization and receiving system information.

For LTE and 5G transmission, it may be possible to activate or deactivate the cells to permit or block data communication of LTE terminals in the corresponding cells. It may also be possible to block data communication of 5G terminals. Although the embodiment of FIG. 55 is directed to an exemplary case of activating or deactivating the cell, it may be possible to multiplex LTE and 5G transmission in frequency by configuring de-configuring the cells aggregated in the CA mode.

Here, a cell in use for 5G transmission may be deactivated for the LTE terminals, and the 5G eNB may transmit the cell-specific information to the 5G-capable terminals. The 5G-capable terminals may ascertain the resource location for 5G data transmission based on the received cell-specific information.

FIG. 55 depicts a situation where, among cell 1 5520, cell 2 5530, and cell 3 5540 that are in use by an LTE terminal, cell 3 5540 is deactivated for use in 5G data transmission. In order to increase the 5G transmission throughput, it may be possible that more LTE cells are deactivated for use in 5G transmission as shown in the drawing where cell 2 5560 in use by LTE terminals is deactivated for use in 5G transmission.

Figure 56:
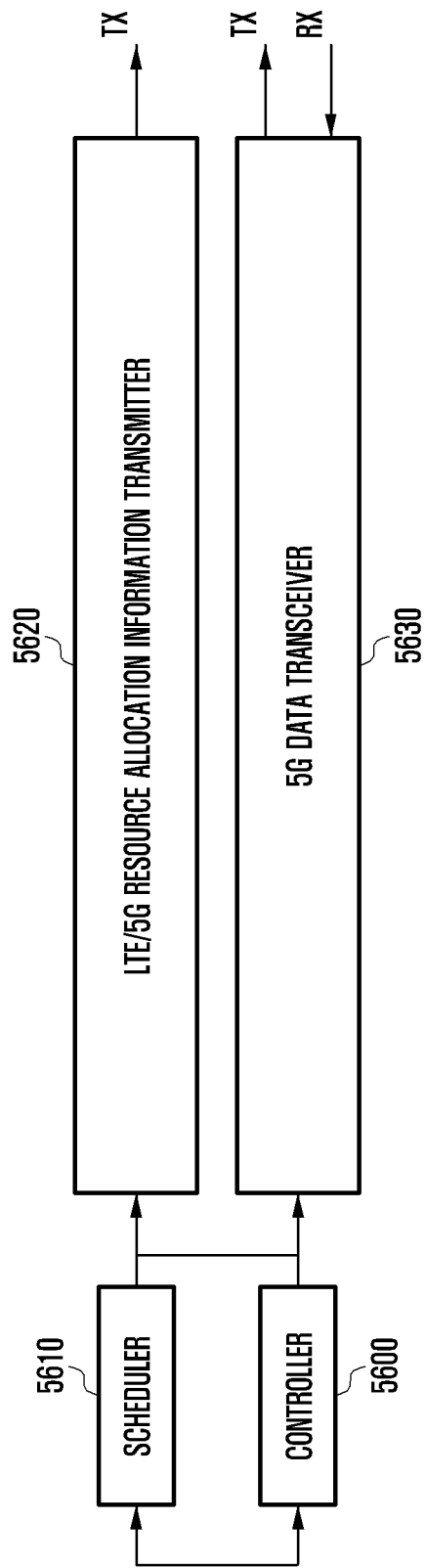
FIG. 56 is a block diagram illustrating a configuration of a base station according to an embodiment of the present invention.

FIG. 56 is a block diagram illustrating a configuration of a base station according to an embodiment of the present invention.

The base station may include a controller 5600, a scheduler 5620, an LTE/5G resource allocation information transmitter 5620, and a 5G data transceiver 5630. The controller 5600 controls LTE and 5G resource allocation according to the base station procedures described with reference to FIGS. 48, 49, and 50 and the LTE and 5G resource allocation methods described with reference to FIGS. 51, 52, 53, 54, and 55; the controller transmits the resource allocation information to the terminal and/or another base station by means of the LTE/5G resource allocation information transmitter 5620. The controller 5600 may schedule 5G data on the 5G resources by means of the scheduler 5610 and communicate 5G data with the 5G terminal by means of the 5G data transceiver 5630.

Figure 57:
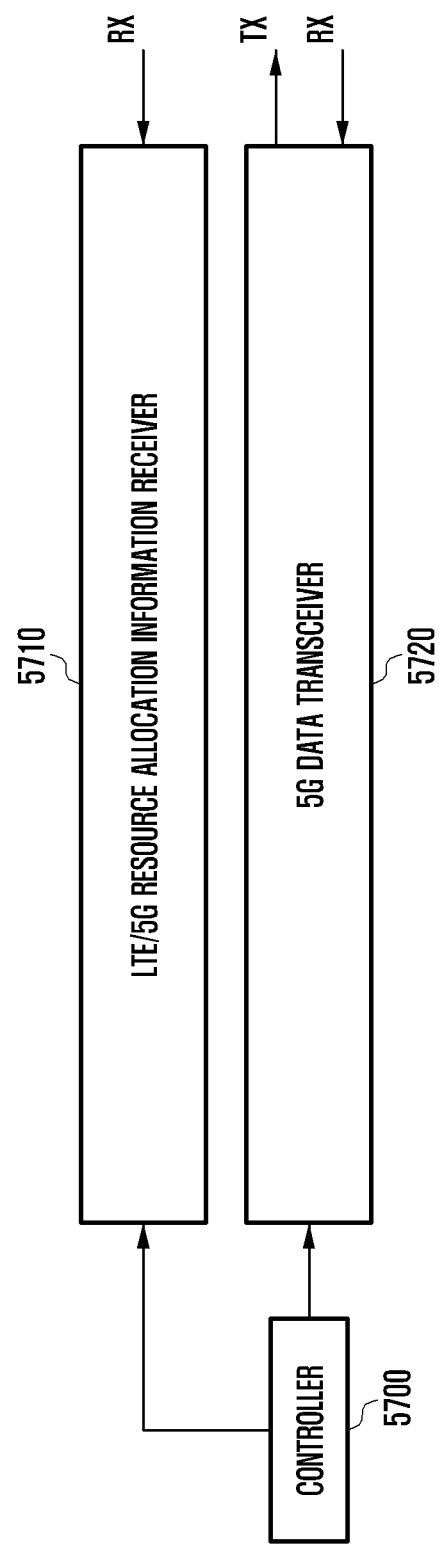
FIG. 57 is a block diagram illustrating a configuration of a terminal according to an embodiment of the present invention.

FIG. 57 is a block diagram illustrating a configuration of a terminal according to an embodiment of the present invention.

The terminal may include a controller 5700, an LTE/5G resource allocation information receiver 5710, and a 5G data transceiver 5720. The controller 5700 controls the LTE/5G resource allocation information receiver 5700 to receive LTE and 5G resource allocation information from the base station according to the terminal procedures described with reference to FIGS. 48, 49, and 50 and the LTE and 5G resource allocation methods described with reference to FIGS. 51, 52, 53, 54, and 55. The controller 5700 controls the 5G data transceiver 5720 to communicate 5G data with the base station as scheduled on the 5G resources.

Figure 58A:
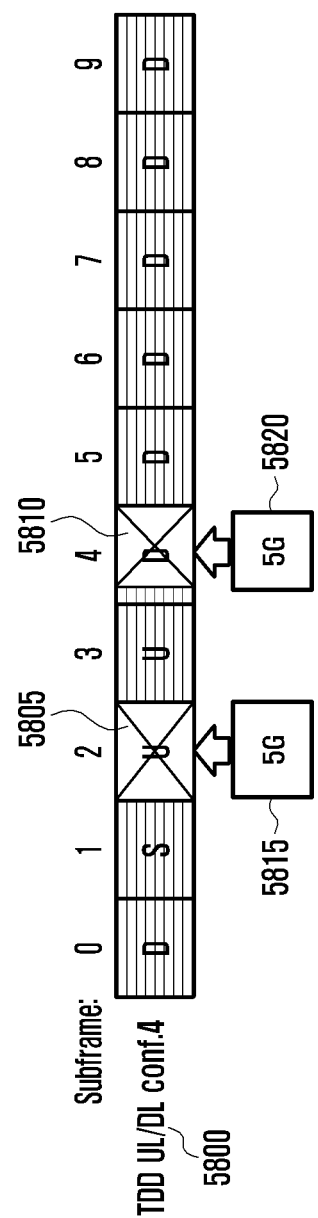
FIG. 58 is diagrams for explaining a method for multiplexing LTE and 5G data communications in time in an MBSFN or UL subframe on an LTE TDD carrier.

FIG. 58A is a diagram for explaining a method for multiplexing LTE and 5G data communications in time in an MBSFN or UL subframe on an LTE TDD carrier.

In FIG. 58A, a 5G base station may transmit to a 5G-capable terminal the information on TDD information 5800 (e.g., carrier frequency BW, carrier frequency location, TDD UL-DL configuration information, TDD special subframe configuration information, and dynamic TDD UL-DL configuration information for eIMTA), and the 5G-capable terminal may ascertain the TDD resource allocation information after achieving synchronization and receiving system information.

In the TDD, the MBSFN subframe may be configured selectively among subframes #3, #4, #7, #8, and #9 via higher layer signaling. The 5G base station may transmit to the 5G-capable terminal the configuration information indicating the subframes for use in 5G transmission among the configured MBSFN subframes or UL subframes, and the 5G-capable terminal may ascertain the resources allocated for 5G data transmission based on the received subframe configuration information.

Meanwhile, the 2 OFDM symbols at the beginning of the MBSFN subframes composed of 14 OFDM symbols are used for CRS and control channel transmission to LTE terminals. Accordingly, the 5G transmission is performed in the remaining 12 OFDM symbols 5810 as denoted by reference numbers 5820 with the exception of the 2 OFDM symbols at the beginning. In this case, the 5G UL/DL transmission 5815 and 5820 should start in synchronization with the start point of the third OFDM symbol with the exception of the two symbols at the beginning, and the 5G terminal should ascertain the start point of the 5G UL/DL transmission 5815 and 5820 in synchronization with the start of the $3^{rd}$ OFDM symbol.

Considering that the LTE terminals supporting transmission modes 9 and 10 within an LTE cell may perform data transmission based on the DMRS and CSI-RS in the MBSFN subframes, it may be possible to multiplex the LTE and 5G transmissions in frequency within the MBSFN subframe for the 5G and LTE terminals. In this case, the LTE and 5G transmissions should be configured with the same numerology. For example, the subcarrier spacing of 15 kHz configured for LTE should be applied for the 5G transmission. In this way, the LTE and 5G transmission may be performed without affecting each other.

In order to use different numerologies between LTE and 5G, there is a need of a guard band between LTE and 5G resources for protecting LTE transmission. In the case of configurating the guard band, it may be necessary to signal the guard band-related information to the 5G terminal, which may receive 5G control information and reference signal or data on the 5G resources with the exception of the guard band based on the guard band-related information. Such a frequency-division resource allocation may be performed according to one of the procedures described with reference to FIGS. 48, 49, and 50.

In the UL subframe 5805 configured for 5G UL/DL transmission, all of 14 OFDM symbols may be used for 5G transmission 5815. Accordingly, the 5G UL or DL transmission should start at the first OFDM symbol, and the 5G terminal should ascertain the start point of the 5G UL/DL transmission 5815 in synchronization with the start of the first OFDM symbol.

In the TDD 5800, if the UL subframe 5805 and the MBSFN subframe 5810 are used for 5G transmission and if the TDD UL-DL configuration is changed by eIMTA every radio frame, the 5G base station has to transmit to the terminal a signal indicating whether the 5G transmission resources are assigned in the UL subframe or the MBSFN subframe. That is, the 5G base station transmits to the terminal the information indicating whether the resources configured for 5G transmission starts from the first OFDM symbol (in the UL subframe) or the third OFDM symbol (in the MBSFN subframe), and the terminal may ascertain the start point of the 5G transmission based on this information. Afterward, the terminal may receive a 5G control channel, 5G reference signal, and 5G data according to the 5G transmission start point in the 5G frame structure.

In the embodiment of FIG. 58A, the UL subframe #2 5805 and the MBSFN subframe #4 5810 are used for 5G data transmissions 5815 and 5820, and the 5G data communication may be performed according to one of the procedures described with reference to FIGS. 48, 49, and 50.

Figure 58B:
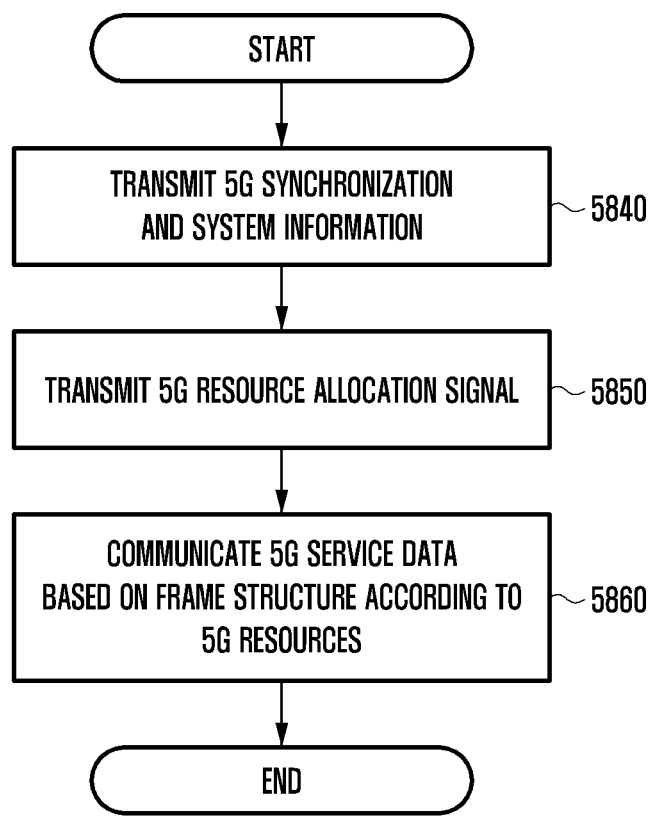

FIG. 58B is a flowchart illustrating a 5G base station operation.

At step S840, the 5G base station transmits 5G synchronization and system information to the 5G-capable terminal on the resources configured for 5G transmission. The 5G synchronization signal may be designed to be always transmitted in the third OFDM symbol. If the 5G synchronization and system information is designed in this way, it may be possible to negate the necessity of indicating whether the 5G transmission starts at the first OFDM symbol or the third OFDM symbol. The 5G synchronization signal may be a service-specific synchronization signal transmitted for the eMBB, mMTC, and URLLC services with service-specific numerologies or a common synchronization signal transmitted on specific 5G resources with a common numerology. The system information may be the common system information transmitted on specific 5G resources with a common numerology and the service-specific system information for the eMBB, mMTC, and URLLC services transmitted with service-specific numerologies.

At step S850, the 5G base station transmits a 5G resource allocation signal to the 5G-capable terminal. The 5G resource allocation signal being transmitted to the 5G-capable terminal may be a higher layer signal or a physical layer signal. The LTE or 5G resource allocation signal conveys LTE or 5G resource location information including frequency information (carrier frequency or physical resource block (PRB) location information), time information (radio frame index, subframe index, MBSFN subframe information for 5G transmission, and UL subframe information for 5G transmission), antenna information, space information, duplex information (FDD DL, UL carrier information, TDD UL/DL configuration information, LAA operation-related information, etc.), and information for use by the terminal in ascertaining whether the LTE and/or 5G resources are occupied in real time based on reference signal or synchronization signal transmission. The 5G resource allocation signal may convey the information indicating whether the 5G resources are LTE UL subframes or LTE MBSFN subframes. The 5G resource allocation signal may convey the information on the 5G transmission start location such as whether the 5G resources start from the first OFDM symbol or the third OFDM symbol. The signals transmitted at the 5G transmission start location includes a synchronization or reference signal necessary for 5G data transmission, a DL control channel indicating 5G data transmission, and reference signal necessary for receiving DL control channel. The 5G resource allocation signal may convey information indicating whether the 5G transmission is performed over 12 OFDM symbols or 14 OFDM symbols. The 5G-capable terminal may further acquire synchronization information for use in the LTE system, which may be transmitted by the base station.

If there is an integrated controller, the integrated controller may allocate LTE or 5G resources and transmits the resource allocation information to the 5G base station via an X2 interface. If there is an integrated controller, the integrated controller may allocate LTE or 5G resources and transmits the resource allocation information to the 5G base station via X2 interface. In detail, in the case where the resources are divided into LTE system resources and 5G system resources, the integrated controller may allocate resources for the LTE and 5G systems and transmits resource allocation information to the 5G base station and/or the LTE base station via the X2 interface to make a distinction between the LTE and 5G system resources. If there is no integrated controller, the LTE or 5G base station may allocate the LTE or 5G resources and sends the resource allocation information to the other base station.

At step S860, the 5G base station may communicate 5G service-related data, control information, and reference signals with the 5G-capable terminal based on the frame structure with the 5G resource start location (e.g., whether 5G transmission starts at the first OFDM symbol or the third OFDM symbol) or the 5G resources size in one subframe (e.g., whether 5G transmission is performed over 14 OFDM symbols or 12 OFDM symbols).

Figure 58C:
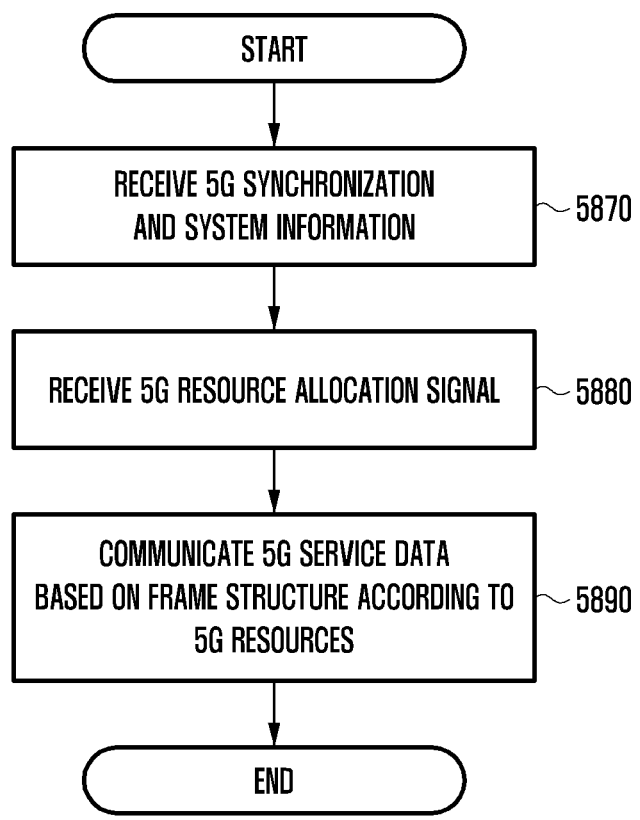

FIG. 58C is a flowchart illustrating a 5G terminal operation.

At step S870, the 5G terminal receives 5G synchronization and system information from the 5G base station. The 5G synchronization may be designed to be transmitted at the third OFDM symbol. If the 5G synchronization and system information is designed in this way, it may be possible to negate the necessity of indicating whether the 5G transmission starts at the first OFDM symbol or the third OFDM symbol. The 5G synchronization signal may be a service-specific synchronization signal transmitted for the eMBB, mMTC, and URLLC services with service-specific numerologies or a common synchronization signal transmitted on specific 5G resources with a common numerology. The system information may be the common system information transmitted on specific 5G resources with a common numerology and the service-specific system information for the eMBB, mMTC, and URLLC services transmitted with service-specific numerologies.

At step S880, the 5G terminal receives a 5G resource allocation signal from the 5G base station. The 5G resource allocation signal may be a higher layer signal or a physical layer signal. The LTE or 5G resource allocation signal conveys LTE or 5G resource location information including frequency information (carrier frequency or physical resource block (PRB) location information), time information (radio frame index, subframe index, MBSFN subframe information for 5G transmission, and UL subframe information for 5G transmission), antenna information, space information, duplex information (FDD DL, UL carrier information, TDD UL/DL configuration information, LAA operation-related information, etc.), and information for use by the terminal in ascertaining whether the LTE and/or 5G resources are occupied in real time based on reference signal or synchronization signal transmission. The 5G resource allocation signal may convey the information indicating whether the 5G resources are LTE UL subframes or LTE MBSFN subframes. The 5G resource allocation signal may convey the information on the 5G transmission start location such as whether the 5G resources start from the first OFDM symbol or the third OFDM symbol. The signals transmitted at the 5G transmission start location includes a synchronization or reference signal necessary for 5G data transmission, a DL control channel indicating 5G data transmission, and reference signal necessary for receiving DL control channel. The 5G resource allocation signal may convey information indicating whether the 5G transmission is performed over 12 OFDM symbols or 14 OFDM symbols. The 5G-capable terminal may further acquire synchronization information for use in the LTE system, and the 5G base station may transmit the synchronization information in the form of a value indicating difference between the 5G synchronization and LTE synchronization.

At step S890, the 5G terminal ascertains the 5G resource start location (e.g., whether 5G transmission starts at the first OFDM symbol or the third OFDM symbol) or the 5G resources size in one subframe (e.g., whether 5G transmission is performed over 14 OFDM symbols or 12 OFDM symbols) based on the signal received at step S880 and communicates 5G service-related data, control information, and reference signals with the base station based on the frame structure with the ascertained 5G resource size and start location.

Figure 59:
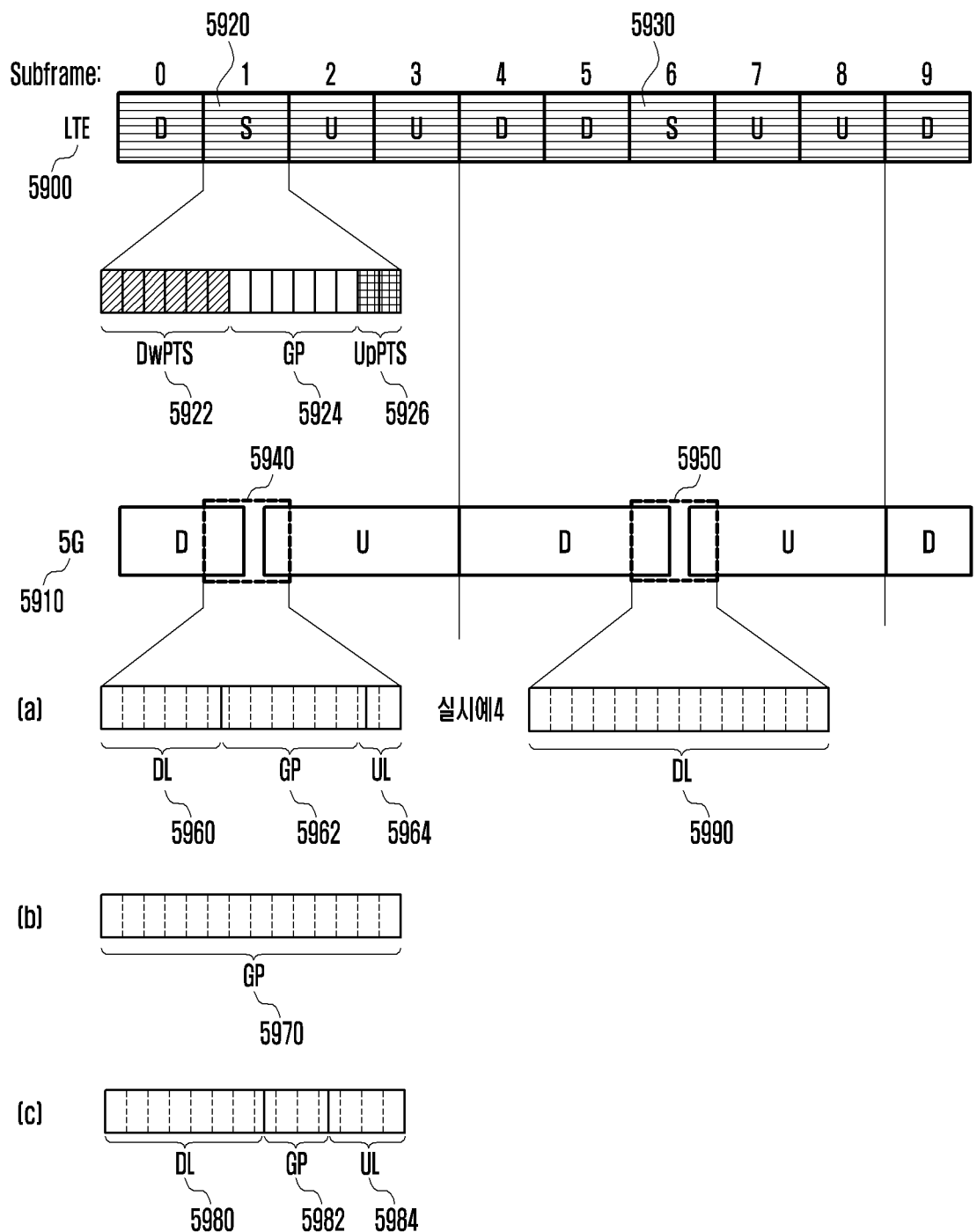
FIG. 59 is a diagram for explaining LTE and 5G communications of stand-alone LTE and 5G base stations without multiplexing the LTE and 5G communication in time or frequency on an LTE TDD carrier.

FIG. 59 is a diagram for explaining LTE and 5G communications of stand-alone LTE and 5G base stations without multiplexing the LTE and 5G communication in time or frequency on an LTE TDD carrier. In the case of configuring the LTE and 5G base stations to operate on a stand-alone basis, it is necessary to consider interference problem arising between communications.

The interference between the transmissions of the LTE and 5G base stations in the same direction (i.e., interference between LTE DL and 5G DL transmissions or between LTE UL and 5G UL transmissions) is similar to the inter-LTE base station interference and thus may be solved by LTE and 5G base stations implementation approach. However, there is also a need of a method for cancelling the interference between the transmissions of the LTE and 5G base stations in different directions (i.e., interference between LTE DL and 5G UL transmissions or LTE UL and 5G DL transmissions), and the present invention proposes a method for canceling such interference.

In FIG. 59, an LTE base station 5900 and a 5G base station 5910 are operating in a TDD mode, the 5G base station may transmit to a 5G-capable terminal the base station-specific TDD information (carrier frequency BW, carrier frequency location, TDD UL-DL configuration information, TDD special subframe configuration information, and dynamic TDD UL-DL configuration information for eIMTA), and the 5G-capable terminal may ascertain the base station-specific TDD information after achieving synchronization and receiving system information.

The LTE base station 5900 controls communication based on a configured TDD UL-DL configuration, and the 5G base station 5910 performs UL and DL transmissions according to the TDD UL-DL configuration selected by the LTE base station 5900. That is, the 5G base station 5910 configures downlink transmission resources in subframes #0, #4, #5, and #9 that are in use by the LTE base station 5910 for downlink transmission and uplink transmission resources in subframes #2, #3, #7, and #8 that are in use by the LTE base station 5910 for uplink transmission. In this way it may be possible to avoid opposite-direction interference between LTE and 5G base stations. The 5G terminal may ascertain UL/DL resource configuration information from a signal transmitted by the 5G base station 5910.

The LTE UL-DL configuration includes special subframes 5920 and 5930 5924 which is composed of a DwPTS 5922 for downlink transmission, a guard period (GP) for compensating for propagation delay and securing RF switching delay time of the terminal, and a UpPTS 5926 for uplink transmission. In this respect, there is a need of a method for cancelling the opposite-direction interference between the LTE and 5G base station when the 5G base station configures transmission resources in subframes #1 and #6 that are in use by the LTE base station as special subframes.

If the LTE and 5G transmissions are performed with the same numerology, e.g., if the 15 kHz subcarrier spacing of LTE is used for the 5G transmission, the 5G base station may use the 6 OFDM symbols in use by the LTE base station as the DwPTS 5922 for DL transmission and the 2 OFDM symbols in use by the LTE base station as the UpPTS 5926 for UL transmission.

If the LTE and 5G transmissions are performed with different numerologies, e.g., if the 5G transmission is performed with a subcarrier spacing broader or narrower than 15 kHz, the resource utilization methods of embodiments 1 to 4 may be used in the situation of FIG. 59.

Part (a) of FIG. 59 corresponds to embodiment 1. The 5G base station performs DL transmission with the resources 5960 in the DwPTS 5922 and DL transmission with the resources 5964 in the UpPTS. If the LTE and 5G transmissions are performed with different numerologies, this means that different TTI lengths are applied to the LTE and 5G transmission and thus the 5G base station performs the downlink transmission within duration of the DwPTS 5922 as denoted by reference number 5960 and uplink transmission within the duration of the UpPTS 5926 as denoted by reference number 5964 according to the TTI length for 5G transmission.

Part (b) of FIG. 59 corresponds to embodiment 2. The 5G base station transmits nothing for the duration in use by the LTE base station as the special subframe as denoted by reference number 5970. The corresponding subframe may be reserved for future services.

Part (c) of FIG. 59 corresponds to embodiment 3. The 5G base statin may perform downlink transmission on the resources longer in time than the DwPTS 5922 as far as causing no opposite-direction interference as denoted by reference number 5980 and uplink transmission on the resources longer in time than the UpPTS 5926 as far as causing no opposite-direction interference as denoted by reference number 5984. In the case where the 5G base station has a cell smaller than that of the LTE base station, it may be possible to allocate more resources for UL and DL transmission using the above-described method.

Part (d) of FIG. 59 corresponds to embodiment 4. In the case where the LTE base station uses the special subframe as a UL subframe for eIMTA, the 5G base station may use the resources corresponding to the special subframe 5950 for downlink transmission as denoted by reference number 5990.

For the cases corresponding to embodiments 1 to 4 in FIG. 59, the 5G base station has to transmit to the 5G terminal a signal carrying the information indicating the downlink transmission duration and uplink transmission duration. The 5G terminal receives the signal and ascertain whether the TDD frequency resources are used for DL or UL transmission from the received signal.

The TDD frequency resource allocation may be performed in consideration of the deployments of the LTE and 5G base stations as shown in FIGS. 48, 49, and 50 and base station and terminal operations as described with reference to FIGS. 48, 49, and 50.

Figure 60A:
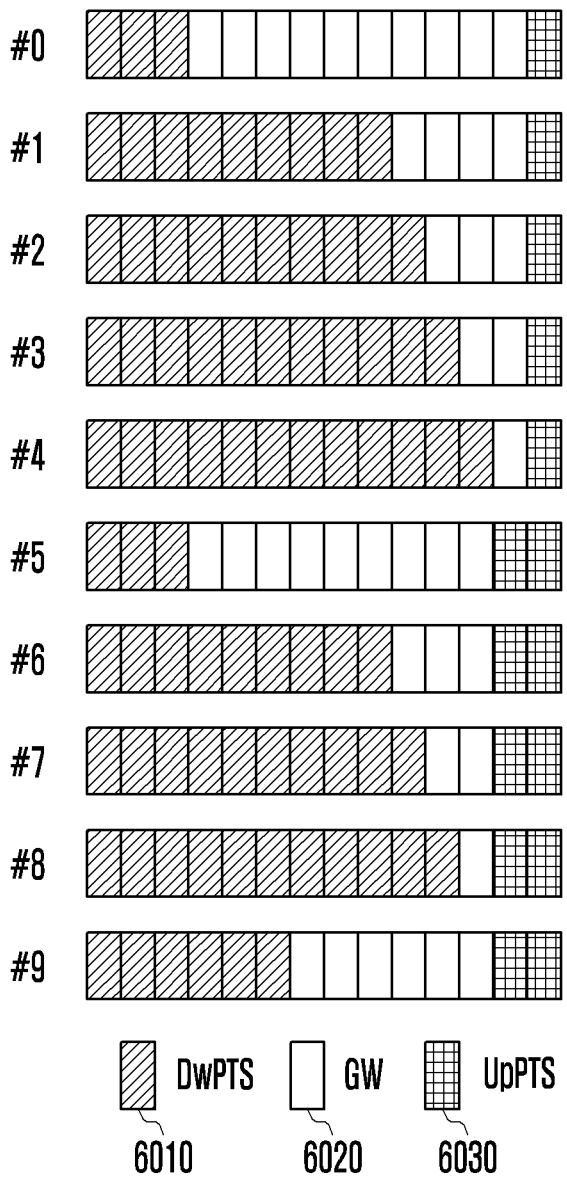
FIGS. 60A and 60B are diagrams illustrating configurations of an LTE special subframe according to an embodiment of the present invention.
Figure 60B:
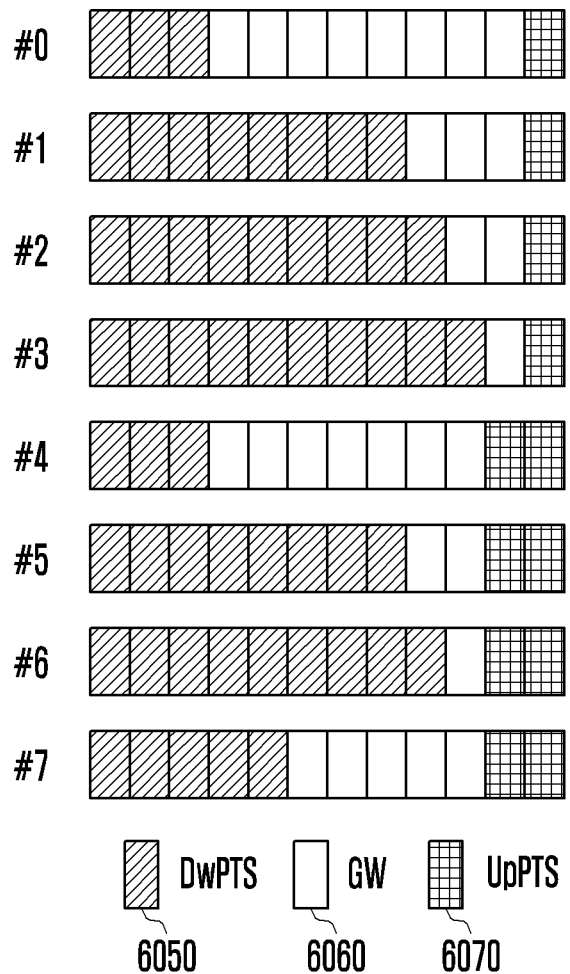

FIGS. 60A and 60B are diagrams illustrating configurations of an LTE special subframe according to an embodiment of the present invention.

The special subframe configurations are defined each with the lengths of the DwPTS, GP, and UpPTS in a special subframe and differently depending on whether the cyclic prefix (CP) in the downlink is a normal CP or an extended CP. FIG. 60A shows 10 special subframe configurations with the normal CP, and FIG. 60B shows 8 special subframe configurations with the extended CP. The terminal may ascertain whether the CP in the downlink is the normal CP or the extended CP by decoding the synchronization signal received from the corresponding cell.

The LTE base station selects one of the 10 special subframes as shown in FIG. 60A for the case where the normal CP is applied in the TDD UL DL configuration of FIG. 59 and one of the 8 special subframes as shown in FIG. 60B for the case where the expended CP is applied in the TDD UL-DL configuration. In the case where the LTE base station uses the selected special subframe configuration for LTE transmission, the 5G base station transmits a signal carrying 5G resources configuration information to the 5G terminals, and the 5G terminals receives the corresponding signal and ascertain the 5G DL and UL transmission resources information from the received signal as described in the embodiment of FIG. 59.

On the basis of the principle described with reference to FIG. 59, descriptions are made of the base station and terminal operations hereinafter with reference to FIGS. 61A and 61B.

Figure 61A:
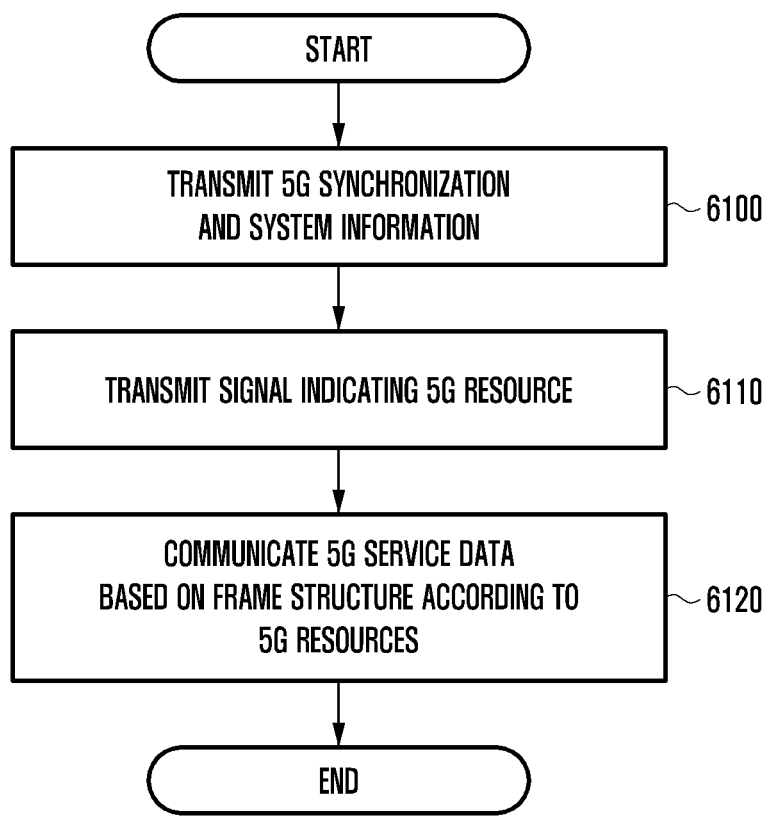
FIGS. 61A and 61B are flowchart illustrating operations of a base station and a terminal according to an embodiment of the present invention.

FIG. 61A is a flowchart illustrating a 5G base station.

At step 6100, the 5G base station transmits 5G synchronization and system information to a 5G-capable terminal on the resources configured for 5G transmission. The 5G synchronization signal may be a service-specific synchronization signal for eMBB, mMTC, and URLLC services being provided with different numerologies or a common synchronization signal being transmitted on specific 5G resources with a common numerology. The system information may be the common system information being received on specific 5G resources with a common numerology or service-specific system information for eMBB, mMTC, and URLLC services being provided with different numerologies.

At step 6110, the 5G base station transmits a signal indicating 5G resources allocation to the 5G-capable terminal. This signal may be a higher layer signal or a physical layer signal. The 5G resource allocation signal conveys LTE or 5G resource location information including frequency information (carrier frequency or physical resource block (PRB) location information), time information (radio frame index, subframe index, MBSFN subframe information for 5G transmission, and UL subframe information for 5G transmission), antenna information, space information, duplex information (FDD DL, UL carrier information, TDD UL/DL configuration information, LAA operation-related information, etc.), and information for use by the terminal in ascertaining whether the LTE and/or 5G resources are occupied in real time based on reference signal or synchronization signal transmission. The 5G resource allocation signal may also includes the information indicating whether the 5G resources are allocated in the LTE special subframe configured as described with reference to FIGS. 59, 60A and 60B. The 5G resource allocation signal may also include the information indication whether the 5G downlink transmission start and end points and the 5G uplink transmission start and end points in the special subframe configured as described with reference to FIGS. 59, 60A, and 60B. The 5G resource allocation signal may convey the information indicating whether the 5G resources are LTE UL subframes or LTE MBSFN subframes and the information on the 5G transmission start location such as whether the 5G resources start from the first OFDM symbol or the third OFDM symbol. The signals transmitted at the 5G transmission start location includes a synchronization or reference signal necessary for 5G data transmission, a DL control channel indicating 5G data transmission, and reference signal necessary for receiving DL control channel. The 5G resource allocation signal may convey information indicating whether the 5G transmission is performed over 12 OFDM symbols or 14 OFDM symbols.

The 5G-capable terminal may further acquire synchronization information for use in the LTE system, and the 5G base station may transmit the synchronization information in the form of a value indicating difference between the 5G synchronization and LTE synchronization. If there is an integrated controller, the integrated controller may allocate LTE or 5G resources and transmits the resource allocation information to the 5G base station via an X2 interface. In the case where the resources are divided into LTE system resources and 5G system resources, the integrated controller may allocate resources for the LTE and 5G systems and transmits resource allocation information to the 5G base station and/or LTE base station via the X2 interface to make a distinction between the LTE and 5G system resources. If there is no integrated controller, the LTE or 5G base station may allocate the LTE or 5G resources and sends the resource allocation information to the other base station as described with reference to FIG. 49.

At step 6120, the 5G base station communicate 5G service-related data, control information, and reference signals with the 5G-capable terminal based on the 5G uplink and downlink transmission start and end locations.

Figure 61B:
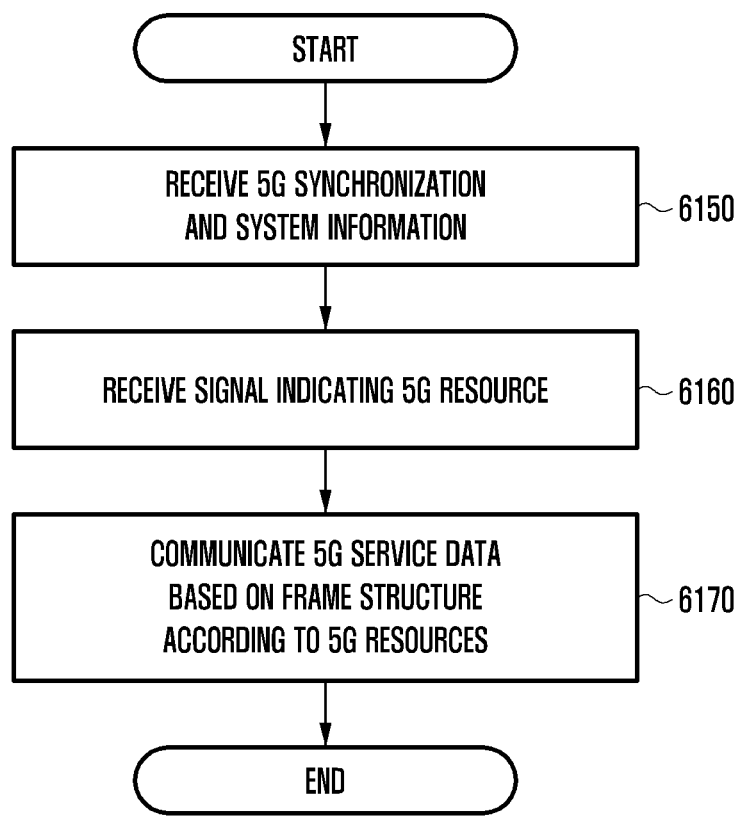

FIG. 61B is a flowchart illustrating a 5G terminal operation.

At step 6510, the 5G terminal receives 5G synchronization and system information from the 5G base station. The 5G synchronization signal may be a service-specific synchronization signal transmitted for the eMBB, mMTC, and URLLC services with service-specific numerologies or a common synchronization signal transmitted on specific 5G resources with a common numerology. The system information may be the common system information transmitted on specific 5G resources with a common numerology and the service-specific system information for the eMBB, mMTC, and URLLC services transmitted with service-specific numerologies.

At step 6160, the 5G terminal receives a signal indicating 5G resource allocation from the 5G base station. The 5G resource allocation signal may be a higher layer signal or a physical layer signal. The LTE or 5G resource allocation signal conveys LTE or 5G resource location information including frequency information (carrier frequency or physical resource block (PRB) location information), time information (radio frame index, subframe index, MBSFN subframe information for 5G transmission, and UL subframe information for 5G transmission), antenna information, space information, duplex information (FDD DL, UL carrier information, TDD UL/DL configuration information, LAA operation-related information, etc.), and information for use by the terminal in ascertaining whether the LTE and/or 5G resources are occupied in real time based on reference signal or synchronization signal transmission. The 5G resource allocation signal may convey the information indicating whether the 5G resources are LTE UL subframes or LTE MBSFN subframes. The 5G resource allocation signal may convey the information on the 5G transmission start location such as whether the 5G resources start from the first OFDM symbol or the third OFDM symbol. The signals transmitted at the 5G transmission start location includes a synchronization or reference signal necessary for 5G data transmission, a DL control channel indicating 5G data transmission, and reference signal necessary for receiving DL control channel. The 5G resource allocation signal may convey information indicating whether the 5G transmission is performed over 12 OFDM symbols or 14 OFDM symbols. The 5G-capable terminal may further acquire synchronization information for use in the LTE system, and the 5G base station may transmit the synchronization information in the form of a value indicating difference between the 5G synchronization and LTE synchronization.

At step 6170, the 5G terminal ascertain the 5G uplink and downlink transmission start and end locations and communicates 5G service-related data, control information, and reference signals with the base station based on the 5G resources size determined based on the 5G uplink and downlink transmission start and end locations.

The embodiments disclosed in the specification and drawings are proposed to help explain and understand the present invention rather than to limit the scope of scope of the present invention. It is therefore intended that the following claims to be interpreted to include all alterations and modification made to the disclosed embodiments as fall within the sprit and scope of the invention.

The invention claimed is:

1. A method of a 5$^{th}$ generation (5G) terminal in a wireless communication system, the method comprising:
   receiving, from a second base station, information associated with a resource allocation of a first base station; and
   receiving, from the second base station, data based on the information associated with the resource allocation of the first base station,
   wherein the first base station is an Evolved Universal Terrestrial Radio Access (EUTRA) base station and the second base station is a 5G base station,
   wherein the information allocation of resource allocation of the first base station includes frequency information of the first base station, information on resource occupancy based on a reference signal of the first base station, and information on a multicast broadcast single frequency network (MBSFN) subframe, and
   wherein the frequency information of the first base station indicates physical resource blocks (PRBs) of the first base station.

2. The method of claim 1, wherein a resource for the data is based on resource allocation information transmitted from the first base station to the second base station.

3. The method of claim 2, wherein the resource allocation information includes a radio frame index, information on the MBSFN subframe and information on a reference signal resource.

4. A method of a first base station in a wireless communication system, the method comprising:
   identifying resource allocation information of the first base station; and
   transmitting, to a second base station, the resource allocation information,
   wherein the first base station is an Evolved Universal Terrestrial Radio Access (EUTRA) base station and the second base station is a 5$^{th}$ generation (5G) base station, and
   wherein the resource allocation information includes information on a reference signal resource associated with the first base station.

5. The method of claim 4, wherein the resource allocation information further includes a radio frame index, information on a multicast broadcast single frequency network (MBSFN) subframe.

6. The method of claim 5, wherein the resource allocation information further includes information on resources which are not available for the second base station and information on a start symbol of a resource for the second base station.

7. A method of a second base station in a wireless communication system, the method comprising:
   receiving, from a first base station, resource allocation information associated with the first base station;
   identifying resources for the second base station based on the resource allocation information; and
   transmitting, to a 5$^{th}$ generation (5G) terminal, information associated with a resource allocation of the first base station based on the resource allocation information,
   wherein the first base station is an Evolved Universal Terrestrial Radio Access (EUTRA) base station and the second base station is a 5G base station, and
   wherein the resource allocation information includes information on a reference signal resource associated with the first base station.

8. The method of claim 7, wherein the resource allocation information further includes a radio frame index, information on a multicast broadcast single frequency network (MBSFN) subframe.

9. The method of claim 8, wherein the resource allocation information further includes information on resources which are not available for the second base station and information on a start symbol of the resources for the second base station.

10. The method of claim 7, further comprising:
    transmitting, to the 5G terminal, data based on the resource allocation of the first base station,
    wherein the information associated with a resource allocation of the first base station includes frequency information of the first base station, information on resource occupancy based on a reference signal of the first base station, and information on the MBSFN subframe, and
    wherein the frequency information of the first base station indicates physical resource blocks (PRBs) of the first base station.

11. A 5$^{th}$ generation (5G) terminal in a wireless communication system, the 5G terminal comprising:
    a transceiver; and
    a controller configured to:
    receive, from a second base station via the transceiver, information associated with a resource allocation of a first base station, and
    receive, from the second base station via the transceiver, data based on the information associated with the resource allocation of the first base station, and
    wherein the first base station is an Evolved Universal Terrestrial Radio Access (EUTRA) base station and the second base station is a 5G base station, and
    wherein the information associated with the resource allocation of the first base station includes frequency information of the first base station, information on resource occupancy based on a reference signal of the first base station, and information on a multicast broadcast single frequency network (MBSFN) subframe, and
    wherein the frequency information of the first base station indicates physical resource blocks (PRBs) of the first base station.

12. The 5G terminal of claim 11, wherein a resource for the data is based on resource allocation information transmitted from the first base station to the second base station.

13. The 5G terminal of claim 12, wherein the resource allocation information includes a radio frame index, information on the MBSFN subframe and information on a reference signal resource.

14. A first base station in a wireless communication system, the first base station comprising:
    a transceiver; and
    a controller configured to:
    identify resource allocation information of the first base station, and
    transmit, to a second base station, the resource allocation information,
    wherein the first base station is an Evolved Universal Terrestrial Radio Access (EUTRA) base station and the second base station is a 5$^{th}$ generation (5G) base station, and
    wherein the resource allocation information includes information on a reference signal resource associated with the first base station.

15. The first base station of claim 14, wherein the resource allocation information further includes a radio frame index, information on a multicast broadcast single frequency network (MBSFN) subframe.

16. The first base station of claim 15, wherein the resource allocation information further includes information on resources which are not available for the second base station and information on a start symbol of a resource for the second base station.

17. A second base station in a wireless communication system, the second base station comprising:
 a transceiver; and
 a controller configured to:
  receive, from a first base station, resource allocation information associated with the first base station, and
  identify resources for the second base station based on the resource allocation information, and
  transmit, to a 5$^{th}$ generation (5G) terminal via the transceiver, information associated with a resource allocation of the first base station based on the resource allocation information,
 wherein the first base station is an Evolved Universal Terrestrial Radio Access (EUTRA) base station and the second base station is a 5G base station, and
 wherein the resource allocation information includes information on a reference signal resource associated with the first base station.

18. The second base station of claim 17, wherein the resource allocation information further includes a radio frame index, information on a multicast broadcast single frequency network (MBSFN) subframe.

19. The second base station of claim 18, wherein the resource allocation information further includes information on resources which are not available for the second base station and information on a start symbol of the resources for the second base station.

20. The second base station of claim 17, wherein the controller is further configured to: transmit, to the 5G terminal, data based on the resource allocation of the first base station, and
 wherein the information associated with a resource allocation of the first base station includes frequency information of the first base station, information on resource occupancy based on a reference signal of the first base station, and information on the MBSFN subframe, and
 wherein the frequency information of the first base station indicates physical resource blocks (PRBs) of the first base station.

* * * * *